(12) United States Patent
Shimizu et al.

(10) Patent No.: US 7,267,150 B2
(45) Date of Patent: *Sep. 11, 2007

(54) METHOD OF AND APPARATUS FOR MANUFACTURING INSTANT PHOTOGRAPHIC FILM UNITS

(75) Inventors: Makoto Shimizu, Minamiashigara (JP); Hiroaki Tanaka, Minamiashigara (JP); Tatsuo Shiina, Minamiashigara (JP); Takayuki Kambara, Minamiashigara (JP); Hisashi Kikuchi, Minamiashigara (JP); Toru Shimizu, Minamiashigara (JP); Hiroaki Shinohara, Minamiashigara (JP)

(73) Assignee: Fujifilm Corporation, Tokyo (JP)

( * ) Notice: Subject to any disclaimer, the term of this patent is extended or adjusted under 35 U.S.C. 154(b) by 39 days.

This patent is subject to a terminal disclaimer.

(21) Appl. No.: 10/408,284

(22) Filed: Apr. 8, 2003

(65) Prior Publication Data

US 2003/0208992 A1    Nov. 13, 2003

Related U.S. Application Data

(62) Division of application No. 09/788,651, filed on Feb. 21, 2001, now Pat. No. 6,576,390.

(30) Foreign Application Priority Data

| Feb. 21, 2000 | (JP) | 2000-043618 |
|---|---|---|
| Mar. 17, 2000 | (JP) | 2000-077287 |
| Mar. 27, 2000 | (JP) | 2000-087602 |
| Mar. 27, 2000 | (JP) | 2000-087607 |
| Mar. 31, 2000 | (JP) | 2000-099592 |
| Mar. 31, 2000 | (JP) | 2000-099602 |
| May 29, 2000 | (JP) | 2000-159005 |
| May 29, 2000 | (JP) | 2000-159006 |

(51) Int. Cl.
*B32B 37/18* (2006.01)
*G03C 1/40* (2006.01)

(52) U.S. Cl. .............. 156/378; 156/379; 156/443; 156/515; 156/516; 156/543; 156/549; 403/207; 403/208

(58) Field of Classification Search .......... 53/447, 53/531; 430/207, 208, 209, 498, 499; 396/518, 396/528, 583, 527; 156/378, 379, 443, 515, 156/516, 543, 549
See application file for complete search history.

(56) References Cited

U.S. PATENT DOCUMENTS 3,752,723 A    8/1973    Bruneau (Continued)

FOREIGN PATENT DOCUMENTS

EP    1 065 558 A1    1/2001

(Continued)

*Primary Examiner*—George Koch
(74) *Attorney, Agent, or Firm*—Sughrue Mion, PLLC

(57) ABSTRACT

An instant photographic film unit includes a mask sheet having an image frame and two sheets, one of which has a photosensitive layer, laminated and bonded together, and a developing liquid container disposed in a predetermined position for supplying a developing liquid between the two sheets to produce an image. The mask sheer and the two sheets are bonded together in a predetermined laminated state, with at least one of the mask sheet and the two sheets being in the form of a continuous web. The continuous web is cut off into self-developed instant photographic film units of a predetermined length. A predetermined number of instant photographic film units are automatically stacked and placed in a film pack.

13 Claims, 141 Drawing Sheets

U.S. PATENT DOCUMENTS

| | | | |
|---|---|---|---|
| 3,753,330 A * | 8/1973 | Hujer et al. | 53/520 |
| 4,011,975 A * | 3/1977 | Brown, Jr. | 226/2 |
| 4,042,395 A | 8/1977 | Tone et al. | |
| 4,092,167 A * | 5/1978 | Bushey et al. | 430/498 |
| 4,312,939 A | 1/1982 | McCole | |
| 4,985,335 A | 1/1991 | Omote et al. | |
| 5,023,163 A | 6/1991 | Simizu et al. | |
| 5,491,526 A | 2/1996 | Shimizu | |
| 5,611,272 A * | 3/1997 | Steuer | 101/23 |
| 5,895,006 A | 4/1999 | Karaki et al. | |
| 6,068,413 A | 5/2000 | Karaki et al. | |
| 6,287,744 B1 | 9/2001 | Shimizu et al. | |
| 6,779,320 B2 * | 8/2004 | Shimizu et al. | 53/540 |

FOREIGN PATENT DOCUMENTS

| | | |
|---|---|---|
| JP | 54-080734 | 6/1979 |
| JP | 55-021218 | 2/1980 |
| JP | 56-175405 | 12/1981 |
| JP | 59-135455 | 8/1984 |
| JP | 62-55772 | 11/1987 |
| JP | 01-121042 | 8/1989 |
| JP | 02-005747 | 1/1990 |
| JP | 02-272545 | 11/1990 |
| JP | 03-77932 | 8/1991 |
| JP | 03-077932 | 8/1991 |
| JP | 05-163582 | 6/1993 |
| JP | 06-004375 | 1/1994 |
| JP | 07-233412 | 9/1995 |
| JP | 09-101659 | 4/1997 |
| JP | 09-297375 | 11/1997 |
| JP | 10-264913 | 10/1998 |

* cited by examiner

F I G. 19
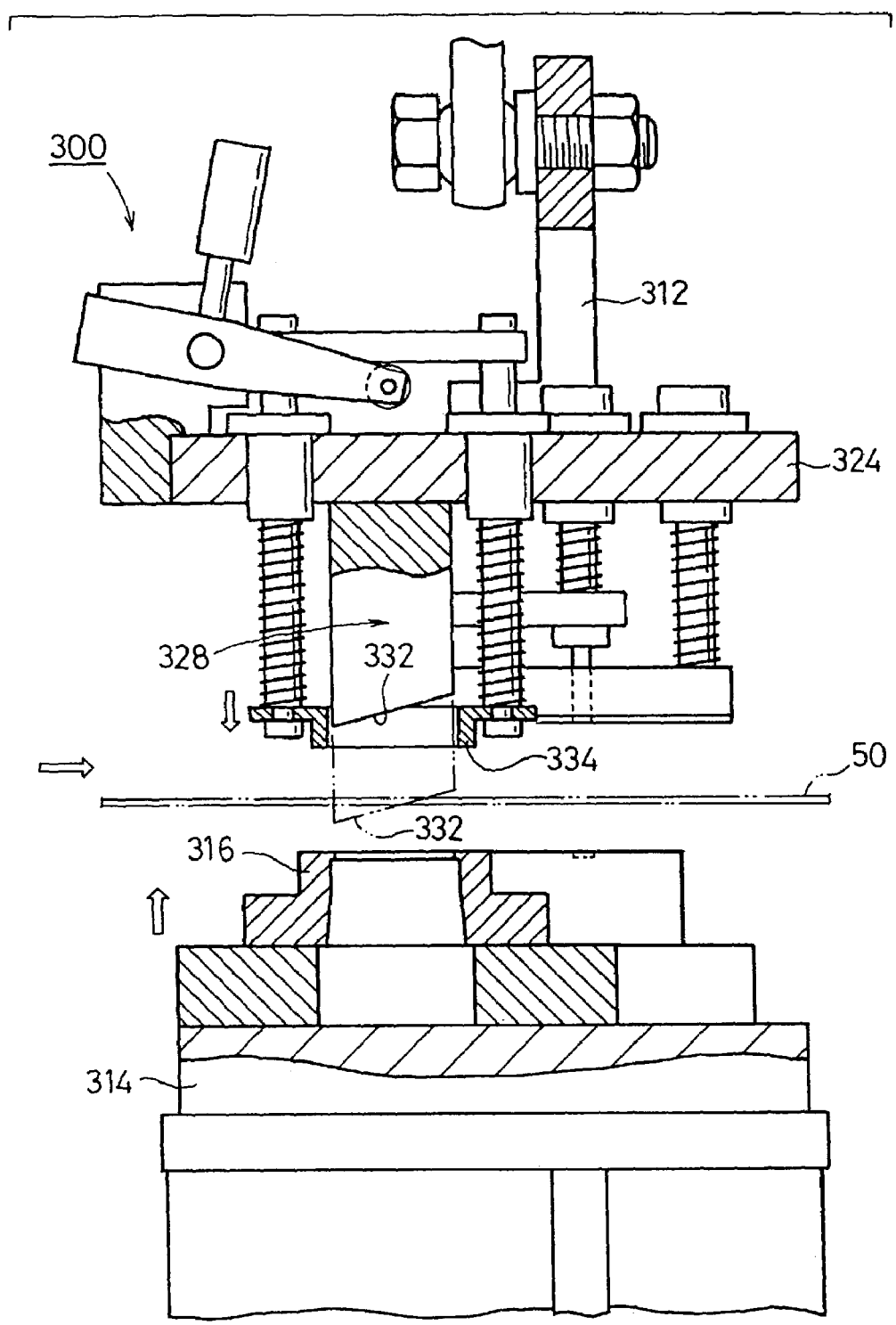

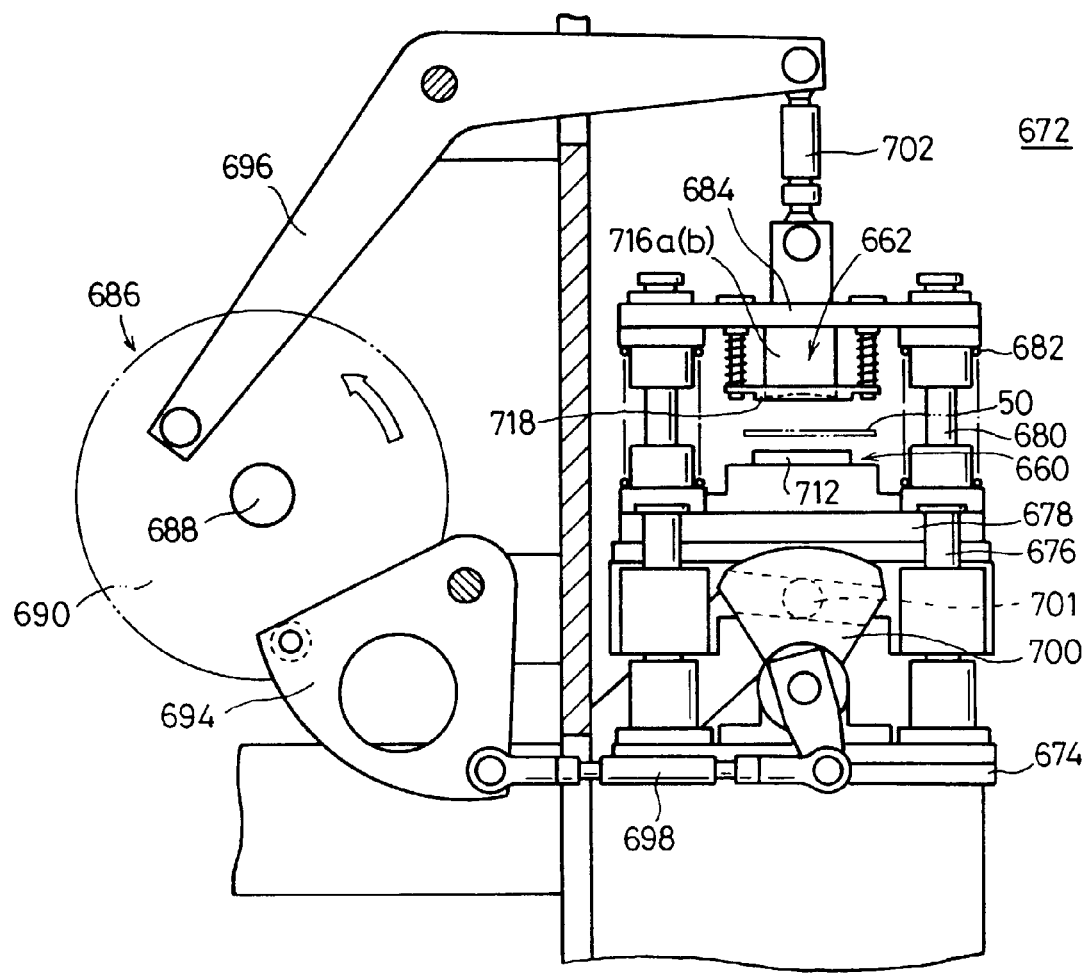
F I G. 31

FIG. 33
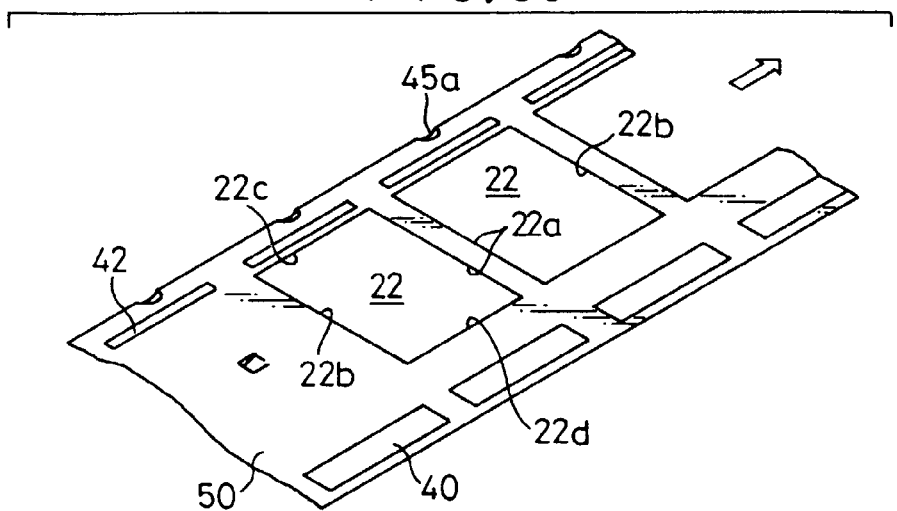
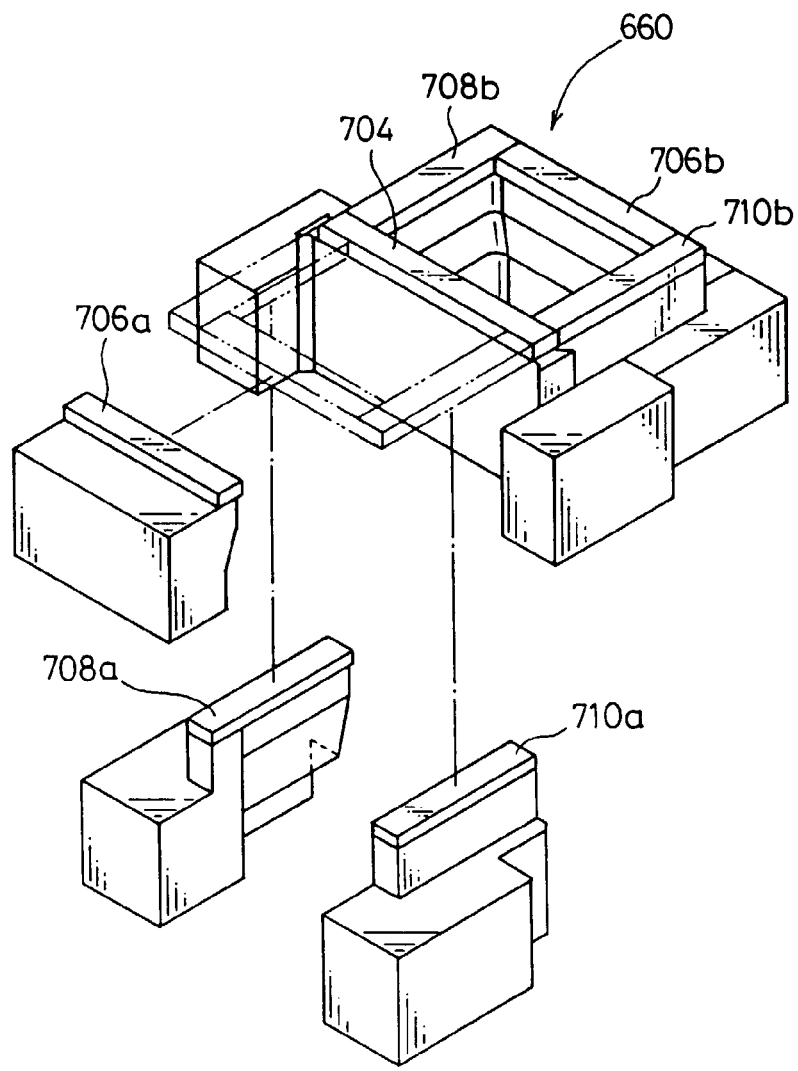

FIG. 57
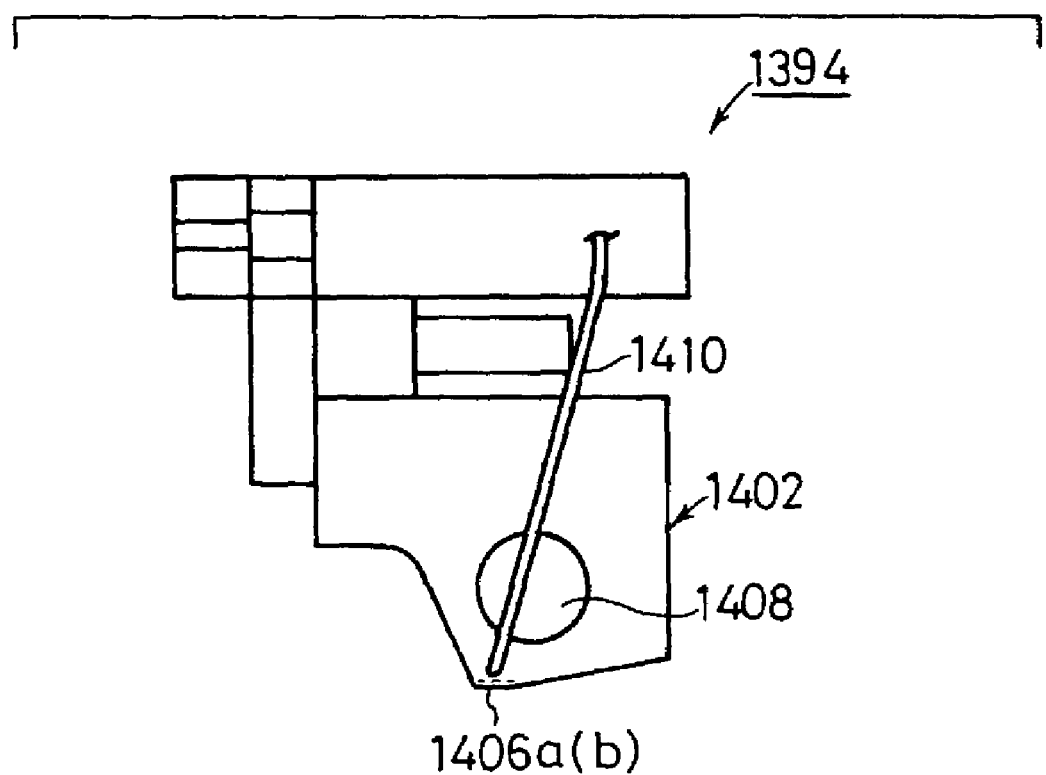
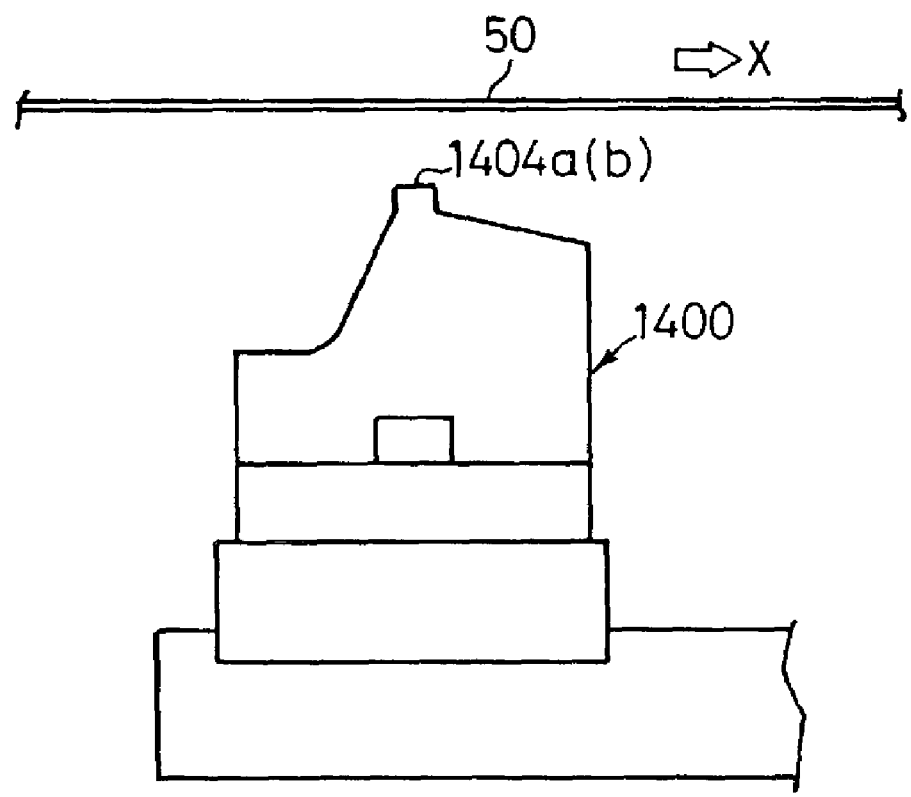

F I G. 64
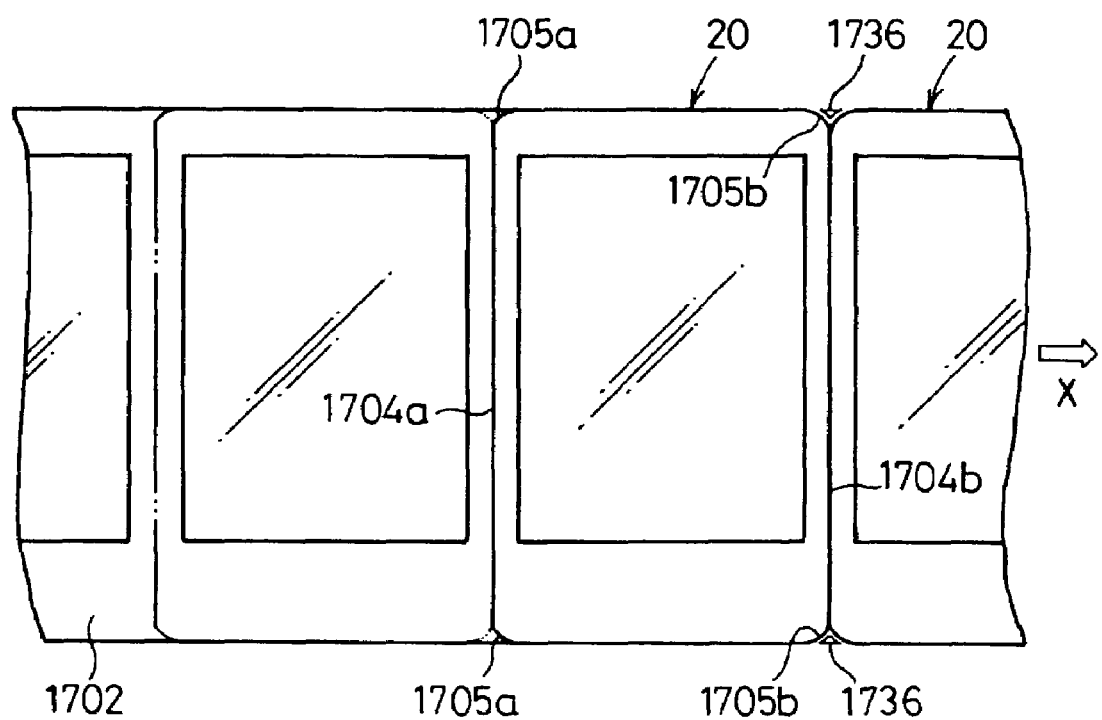

F I G. 69
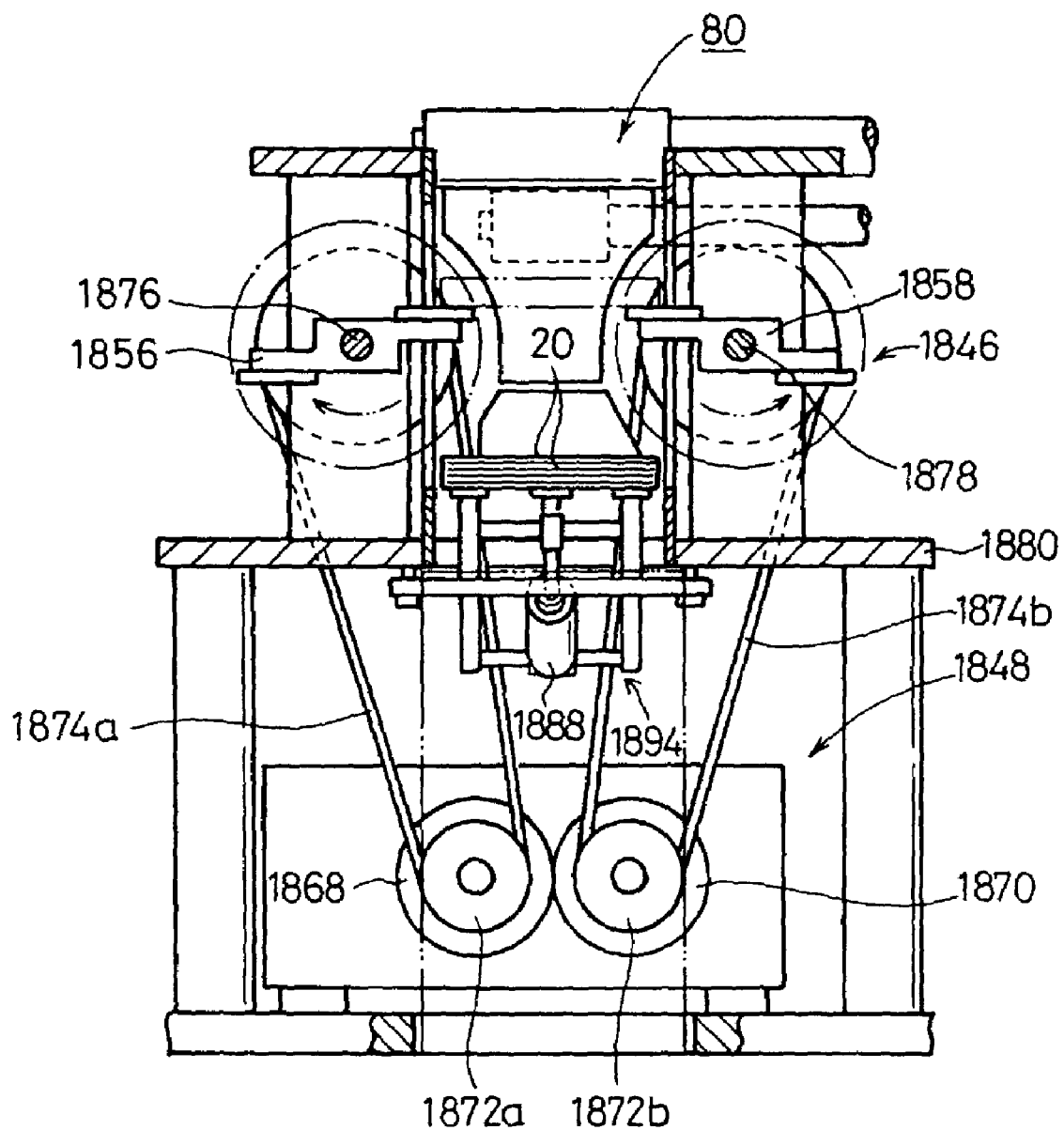

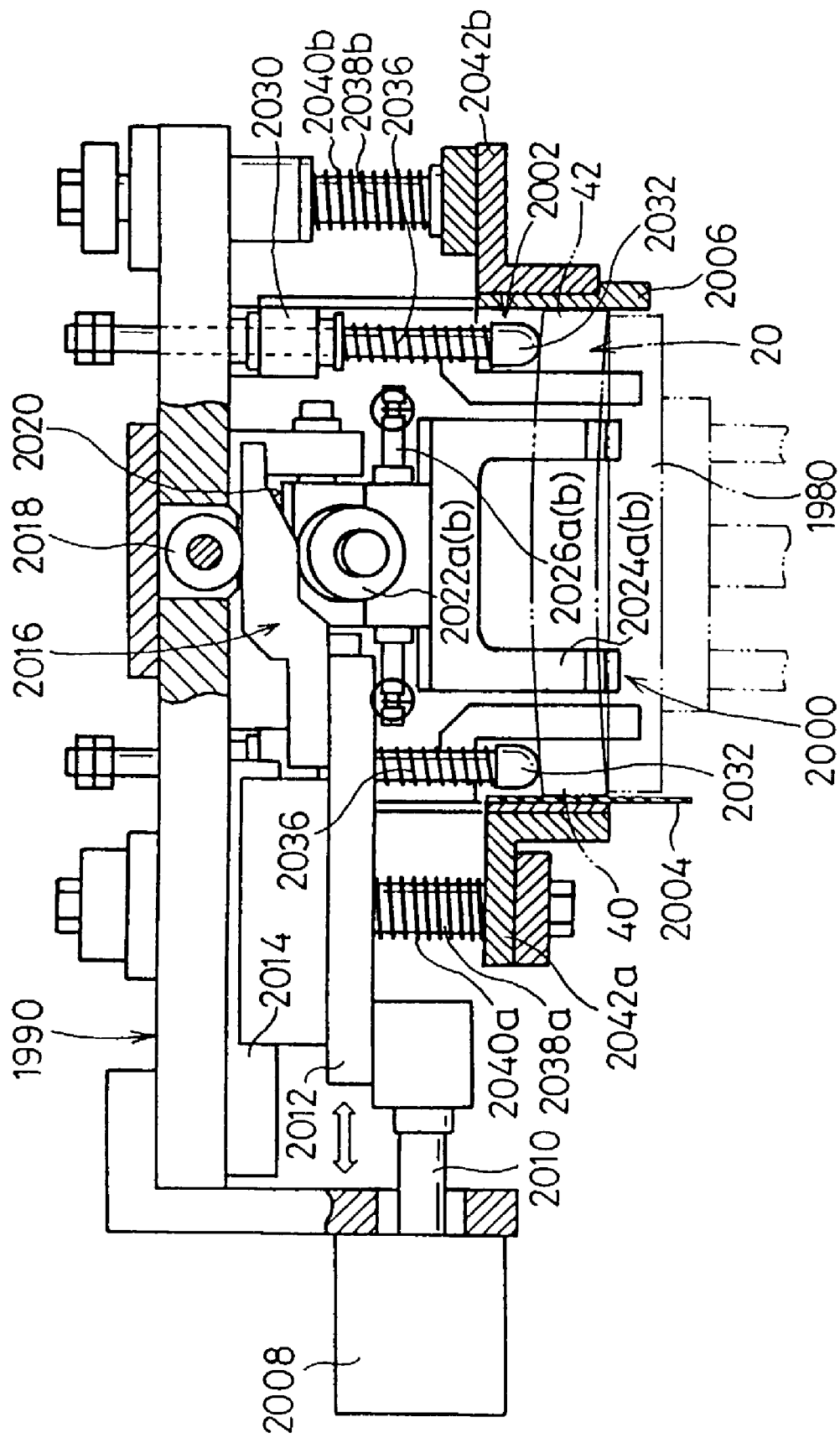
F I G. 76

FIG. 89

| TEMPERATURE (°C) \ LOAD (g) | 100 | 200 | 300 | 400 | 500 |
|---|---|---|---|---|---|
| 100 | × | × | △ | △ | △ |
| 150 | △ | ○ | ○ | ○ | △ |
| 200 | △ | ○ | ○ | ○ | △ |
| 250 | △ | △ | △ | × | × |

FIG. 92

| BLADE EDGE ANGLE α | 20° | 25° | 30° | 35° | 40° | 45° | 50° |
|---|---|---|---|---|---|---|---|
| SHARPNESS | ○ | ○ | ○ | △ | × | × | × |
| SERVICE LIFE | × | △ | ○ | ○ | ○ | ○ | × |
| DEBRIS ATTACHMENT | ○ | ○ | ○ | △ | × | × | × |
| DEFORMATION | ○ | ○ | ○ | △ | × | × | × |

FIG. 93

| SHEAR ANGLE β | 8° | 11° | 15° | 20° | 25° |
|---|---|---|---|---|---|
| SHARPNESS | △ | ○ | ○ | ○ | × |
| MECHANISM LIMITATION | ○ | ○ | △ | × | × |

F I G. 134
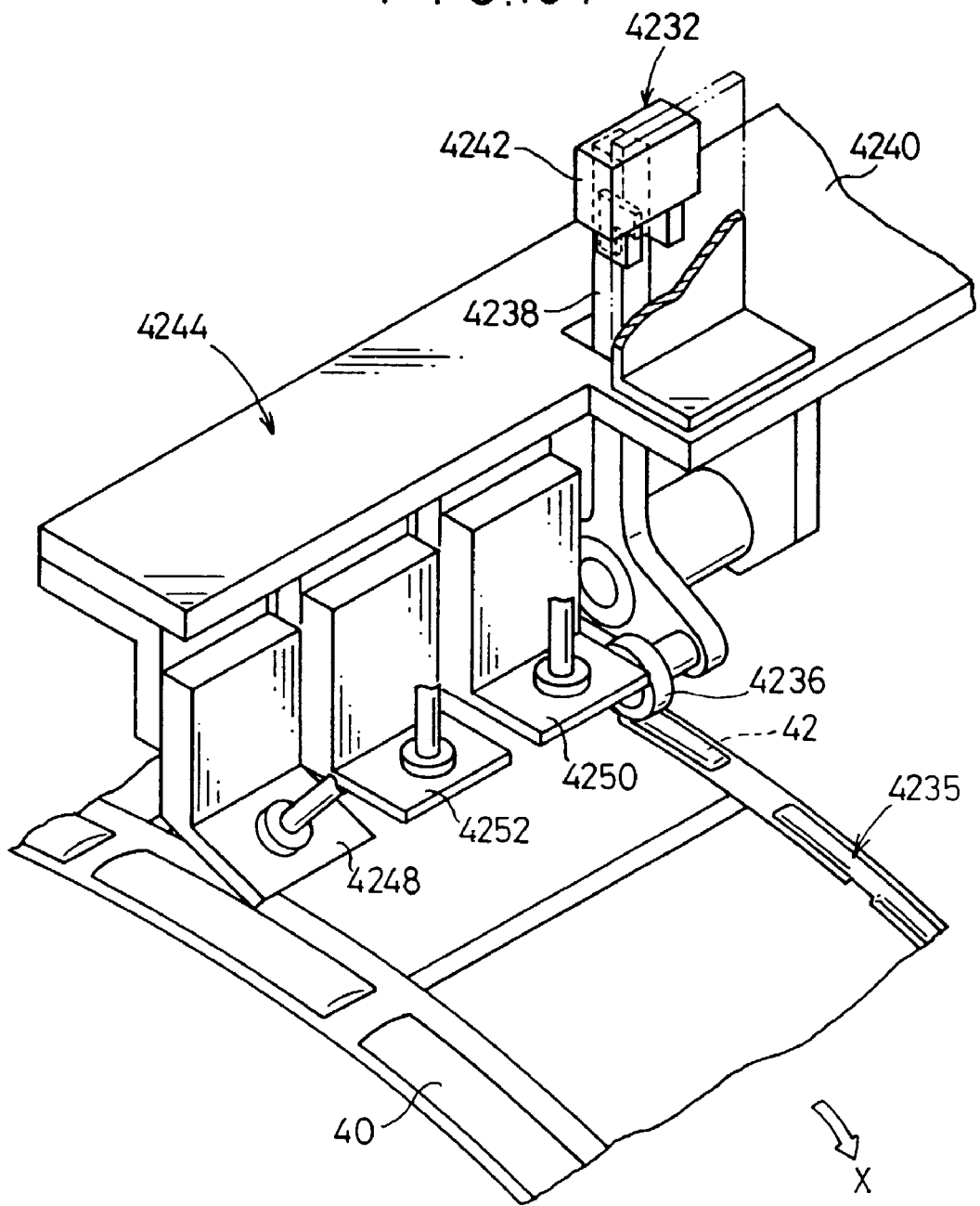

F I G.137
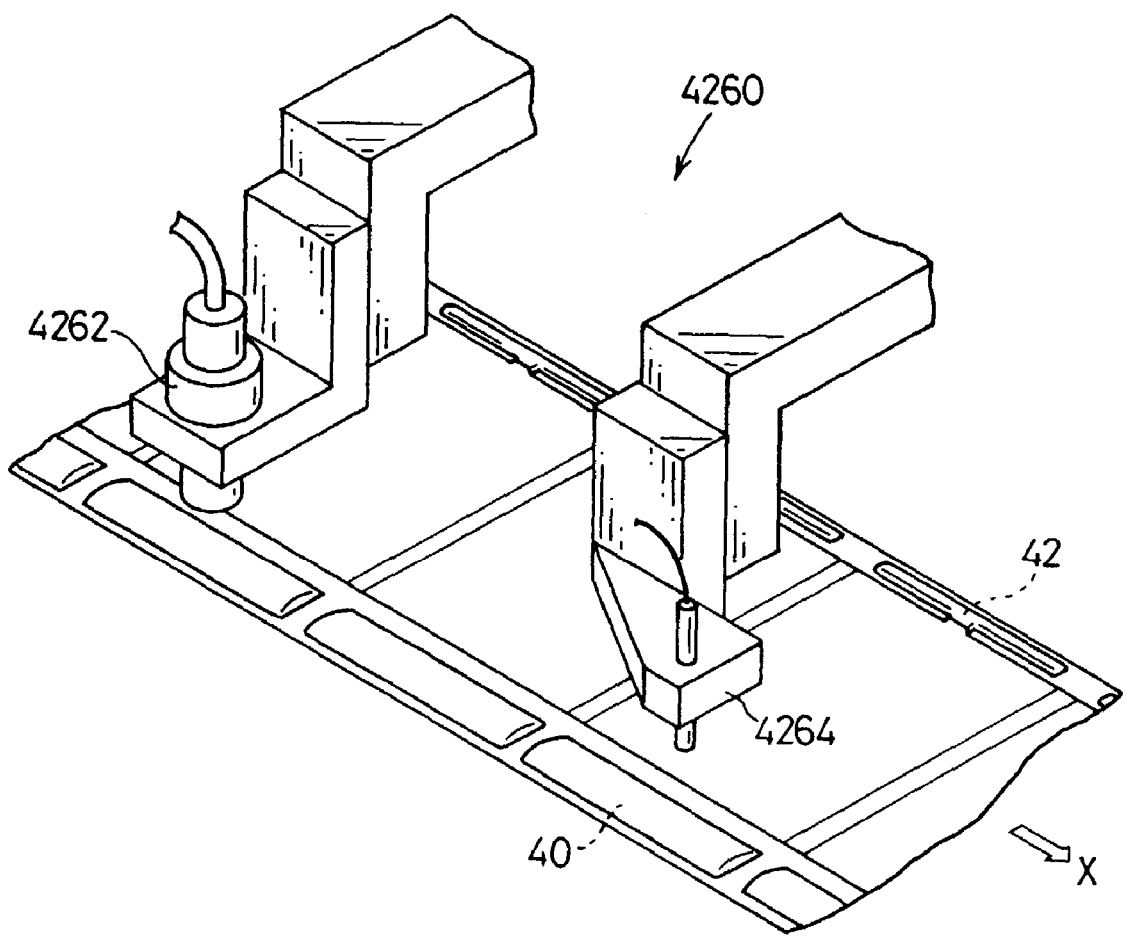

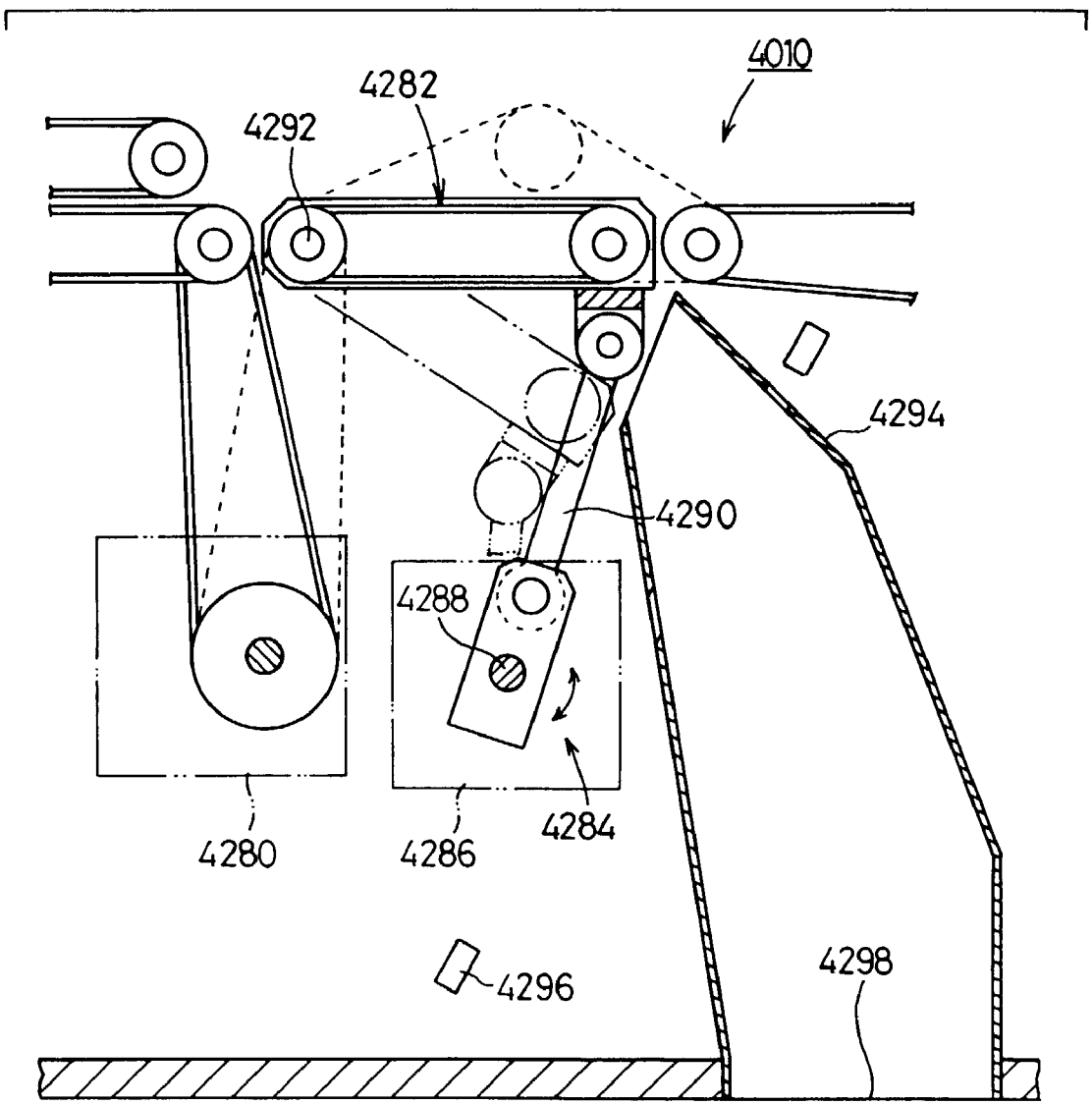
F I G.139

FIG. 140

| DEFECT DETECTING MECHANISM 4326 | PROCESSING AS A RESULT OF DEFECTS |
|---|---|
| REMAINING LENGTH DETECTING MEANS 4100 | ISSUE ALARM, REQUEST ROLL REPLACEMENT |
| ROLL DISPLACEMENT DETECTING MEANS 4102 | ISSUE ALARM, STOP OPERATION |
| SPLICING ERROR DETECTING MEANS 4106 | ISSUE ALARM, STOP OPERATION |
| JUNCTION DETECTING MEANS 4126 | SHIFT, DISCHARGE AS DEFECT |
| TRAP JUNCTION DETECTING MEANS 4134 | STOP OPERATION WHEN JUNCTION REACHES POSITION IMMEDIATELY PRIOR TO CUTTER REQUEST DISCHARGE |
| TRAP BONDING INSPECTING MEANS 4140 | NO TRAP → SHIFT, DISCHARGE AS DEFECT POSITIONAL DISPLACEMENT → ISSUE ALARM, STOP OPERATION |
| POD DETECTING MEANS | SHIFT, DISCHARGE AS DEFECT |
| POD BONDING INSPECTING MEANS 4146 | SHIFT, DISCHARGE AS DEFECT |
| MARK POSITIONAL DEVIATION DETECTING MEANS (4150)+ CONTINUOUS WEB POSITIONAL DEVIATION INSPECTING MEANS (4158) | SHIFT, DISCHARGE AS DEFECT + IF DETECTED N SUCCESSIVE TIMES, STOP OPERATION |
| RAIL PROJECTION INSPECTING MEANS (4190) | SHIFT, DISCHARGE AS DEFECT |
| IMAGE FRAME AND MEMBER POSITION INSPECTING MEANS (4192) | SHIFT, DISCHARGE AS DEFECT |
| FLAP SEAL INSPECTING MEANS 4202 | ISSUE MALFUNCTION ALARM, STOP OPERATION |
| FOLDED DIMENSION INSPECTING MEANS 4208 | ISSUE MALFUNCTION ALARM, STOP OPERATION |
| FOLDED DIMENSION IMAGE INSPECTING MEANS 4212 | SHIFT, DISCHARGE AS DEFECT |
| TRAP BONDED STATE DETECTING MEANS 4230 | SHIFT, DISCHARGE AS DEFECT |
| JUNCTION CONFIRMING MEANS 4244 | STOP OPERATION, REQUEST CONFIRMATION |
| POD RUPTURE DETECTING MEANS 4246 | SHIFT, DISCHARGE AS DEFECT |
| POD BONDED STATE DETECTING MEANS 4260 | SHIFT, DISCHARGE AS DEFECT |
| UNIT WIDTH DETECTING MEANS 4266 | ISSUE MALFUNCTION ALARM, STOP OPERATION |
| PHASE DETECTING MEANS 4270 | SHIFT, DISCHARGE AS DEFECT |
| CUTTING FAILURE DETECTING MEANS 4276 | ISSUE MALFUNCTION ALARM, STOP OPERATION |
| TRAP TRANSFER ERROR DETECTING MEANS | ISSUE ALARM, STOP OPERATION |

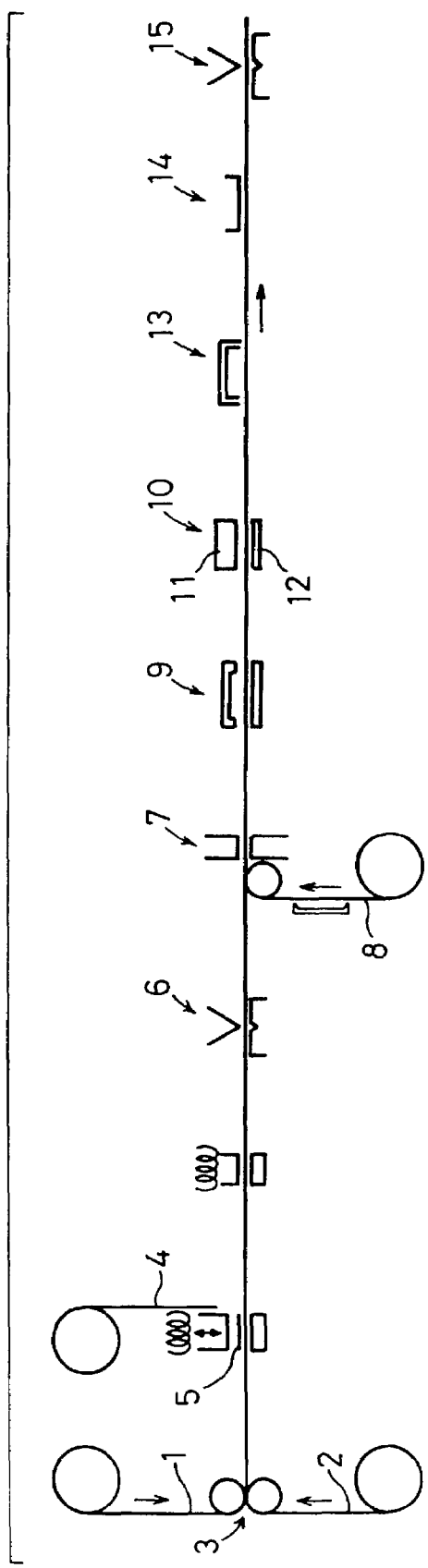

METHOD OF AND APPARATUS FOR MANUFACTURING INSTANT PHOTOGRAPHIC FILM UNITS

This application is a division of U.S. Ser. No. 09/788,651, filed Feb. 21, 2001, now U.S. Pat. No. 6,576,390.

BACKGROUND OF THE INVENTION

1. Field of the Invention

The present invention relates to a method of and an apparatus for manufacturing self-developed instant photographic film units.

2. Description of the Related Art

The recent widespread use of instant photographic cameras has resulted in the mass-production of self-developed instant photographic film units. An instant photographic film unit comprises a mask sheet having a central image frame that determines a screen size, a photosensitive sheet comprising a transparent or opaque support layer covered with a photosensitive layer, a transparent sheet for spreading a developing liquid between itself and the photosensitive sheet, and a pair of rails or spacers for defining a gap for passage of the developing liquid therethrough between the photosensitive sheet and the transparent sheet. To the mask sheet, there are bonded a developing liquid pod or container for containing the developing liquid therein and a trap for holding an excessive developing liquid, on respective marginal edges on both sides of the image frame.

There are available instant photographic film units of various structures. For example, one instant photographic film unit includes a photosensitive sheet joined to the upper surface of a mask sheet, a transparent sheet joined to the upper surface of the photosensitive sheet by rails, and a developing liquid pod and a trap that are wrapped by marginal edges of the mask sheet which are folded over the transparent sheet perpendicularly to the rails. Another instant photographic film unit includes a photosensitive sheet and a transparent sheet that are successively stacked in a given order on a mask sheet, rails bonded to the photographic sheet and the transparent sheet, and a developing liquid pod and a trap that are bonded to the mask sheet perpendicularly to the rails.

Various processes have been proposed to manufacture instant photographic film units. One proposed process is disclosed in Japanese patent publication No. 62-55772, for example. According to the disclosed process, as shown in FIG. 141, sheets 1, 2, one of which is a photosensitive sheet and the other of which is a transparent sheet, are joined to each other by a joining station 3, and thereafter rails 5 that have been severed from a rail web 4 are heat-sealed across the sheet 1 to the sheet 2 which is wider than the sheet 1.

The joined sheets 1, 2 are cut off along central lines of the rails 5 by a cutter 6, and then bonded to a mask sheet 8 by a heat sealer 7. In a periphery bonding station 9, the entire edges of the sheet 2 are bonded to the mask sheet 8 in surrounding relation to an image area opening thereof. In an attaching station 10, a developing liquid pod 11 and a trap 12 are bonded to the mask sheet 8 on its opposite sides. Thereafter, in a folding station 13, the developing liquid pod 11 and the trap 12 are folded over the opposite edges of the mask sheet 8. After the assembly is sealed in a sealing station 14, the mask sheet 8 is cut off in a cutting station 15, thereby completing an instant photographic film unit.

In the folding station 13, the instant photographic film unit has its outer longitudinal dimensions determined when the developing liquid pod 11 and the trap 12 are folded over the opposite edges of the mask sheet 8. Though it is necessary to establish folding positions of the mask sheet 8 with high accuracy, such a requirement cannot sufficiently be met by the conventional process.

Another problem of the conventional process is that when the image area opening is formed in the mask sheet 8, difficulty arises in processing the scrap punched out of the mask sheet 8. Specifically, the scrap punched out of the mask sheet 8 needs to be processed reliably without fail because the mask sheet 8 itself is easily electrically chargeable, and the scrap tends to be attracted to the mask sheet 8 or another member due to electrostatic charges of the mask sheet 8.

Instant photographic film units should preferably be beveled at their four corners in order to avoid their being caught by other members and stacked in error. The conventional process is unable to bevel the corners of instant photographic film units efficiently because it requires a separate beveling step.

According to the conventional process, the developing liquid pod 11 and the trap 12 are supplied one by one to the opposite sides of the mask sheet 8, and then bonded thereto by a heat-sealing process. Therefore, the bonding of the developing liquid pod 11 and the trap 12 is so time-consuming that the overall process of manufacturing instant photographic film units remains inefficient.

According to the conventional process, the bonding of the sheets 1, 2 and the bonding of the entire edges of the sheet 2 in surrounding relation to the image area opening of the mask sheet 8 are also time-consuming. Since the times required by the other steps are determined depending on the times of these bonding steps, the other steps necessarily require an unwanted dead time, with the result that the overall process of manufacturing instant photographic film units cannot be made efficient.

Furthermore, according to the conventional process, the sheets 1, 2 and the mask sheet 8 are exposed to temperature and humidity changes caused by the heat-sealing steps. The photosensitive sheet, in particular, tends to shrink in the manufacturing process because it is susceptible to humidity. If the sheets 1, 2 shrink, then the mask sheet 8 to which the sheets 1, 2 are bonded is displaced in the direction in which it is fed, making it difficult for the developing liquid pod 11 and the trap 12 to be bonded in accurate positions with respect to the opening in the mask sheet 8, and resulting in a shift of the position in which each instant photographic film unit is cut off. Consequently, high-quality instant photographic film units cannot efficiently be manufactured.

The conventional process is carried out by a facility which is placed in a dark chamber, and hence the sheets 1, 2, the rail web 4, and the mask sheet 8 are attached and processed in the dark chamber. For this reason, the manufacturing steps of the conventional process are tedious and time-consuming, and hence the overall process cannot be made efficient.

Furthermore, the distance from the joining station 3 to the cutting station 15 is considerably long, and many components including the rails 5, the mask sheet 8, and the developing liquid pod 11 and the trap 12 are bonded in positions between the joining station 3 and the cutting station 15. Since the relative positions of the components are liable to vary along the long production line, it is highly difficult to keep each instant photographic film unit finally severed in the cutting station 15 at a constant quality level.

The sheets 1, 2 and the mask sheet 8 are unreeled from respective rolls of sheet. When the rolls are used up, the trailing ends of the sheets 1, 2 and the mask sheet 8 are spliced to the leading ends of new sheets 1, 2 and a new mask sheet 8, which then start being supplied to the production line. Thus, some instant photographic film units necessarily contain spliced joints of the sheets 1, 2 and the mask sheet 8 as defects. If the positions of those spliced joints are varied for some reason, then instant photographic film units with such defects cannot be identified.

According to the conventional process, after instant photographic film units have successively been manufactured, the worker places a certain number of instant photographic film units in a case. In order to prevent the instant photographic films from being exposed to extraneous light, the packaging process needs to be performed in a dark chamber. Therefore, the packaging process is tedious and time-consuming.

Inasmuch as each instant photographic film has the developing liquid pod 11 and the trap 12 positioned at opposite ends thereof, it is difficult to stack such instant photographic films one on another stably. Consequently, it is a complex task to stack and handle a certain number of, e.g., 10, instant photographic films in the dark chamber.

Therefore, the process of packaging manufactured instant photographic films to produce packaged products is considerably tedious and time-consuming and cannot be made efficient.

SUMMARY OF THE INVENTION

It is a general object of the present invention to provide a method of and an apparatus for manufacturing instant photographic film units automatically and efficiently until they are packaged.

A major object of the present invention is to provide a method of and an apparatus for manufacturing instant photographic film units through simplified steps and arrangement by folding opposite marginal edges of a mask sheet reliably and highly accurately.

Another major object of the present invention is to provide a method of and an apparatus for manufacturing instant photographic film units by highly accurately forming image frames in a mask sheet and reliably retrieving the scrap punched out of the mask sheet.

Still another major object of the present invention is to provide a method of and an apparatus for manufacturing instant photographic film units at a high speed by efficiently supplying developing liquid containers and/or excessive developing liquid traps to image frames of a continuous member.

Yet still another major object of the present invention is to provide a method of and an apparatus for manufacturing instant photographic film units highly efficiently by efficiently and reliably performing various bonding steps.

A further major object of the present invention is to provide a method of and an apparatus for manufacturing instant photographic film units of high quality efficiently by reliably detecting defective components through simplified steps and arrangement and reliably discharging only defective instant photographic film units.

A still further major object of the present invention is to provide a method of and an apparatus for manufacturing instant photographic film units by easily and highly accurately positioning a continuous member through simplified steps and arrangement.

A still further major object of the present invention is to provide a method of and an apparatus for manufacturing instant photographic film units by placing light unshielded members in a bright chamber so that they can easily and efficiently handled, thereby making the entire manufacturing process simple and efficient.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 19 is a cross-sectional view of a portion of the mark forming mechanism;

FIG. 31 is a front elevational view of a portion of the image frame forming machine;

FIG. 33 is an exploded perspective view of a first punching die of the image frame forming machine;

FIG. 57 is a front elevational view of a portion of the temporary flap attaching mechanism;

FIG. 64 is a plan view of a joined body, illustrative of the manner in which the cutting mechanism operates;

FIG. 69 is a front elevational view of the stacking station;

FIG. 76 is a front elevational view, partly in cross section, of the unit loading mechanism;

FIG. 89 is a diagram showing a decision table for determining whether a carbide tip of the fold forming mechanism is acceptable or not depending on weight and temperature;

FIG. 92 is a diagram showing a table of blade edge angles of an upper blade of the first machining means shown in FIG. 63;

FIG. 93 is a diagram showing a table of shear angles of the upper blade;

FIG. 120 is a side elevational view of another displacement detecting means;

FIG. 121 is a schematic perspective view illustrative of a manufacturing method according to a fifth embodiment of the present invention;

FIG. 122 is a schematic elevational view of a manufacturing system for carrying out the manufacturing method according to the fifth embodiment of the present invention;

FIG. 123 is a schematic view, partly in block form, of the manufacturing system including a controller;

FIG. 124 is a schematic side elevational view of a portion of the manufacturing system upstream of a defect detecting mechanism;

FIG. 125 is a schematic side elevational view of a portion of the manufacturing system downstream of the defect detecting mechanism;

FIG. 126 is a schematic side elevational view of a mask sheet supply unit of the manufacturing system;

FIG. 127 is a perspective view of a trap supply unit;

FIG. 128 is a plan view of a trap application inspecting means;

FIG. 129 is a plan view of a pod application inspecting means;

FIG. 130 is a schematic side elevational view of a cover sheet supply unit;

FIG. 131 is a perspective view of a position inspecting means;

Figure 132:
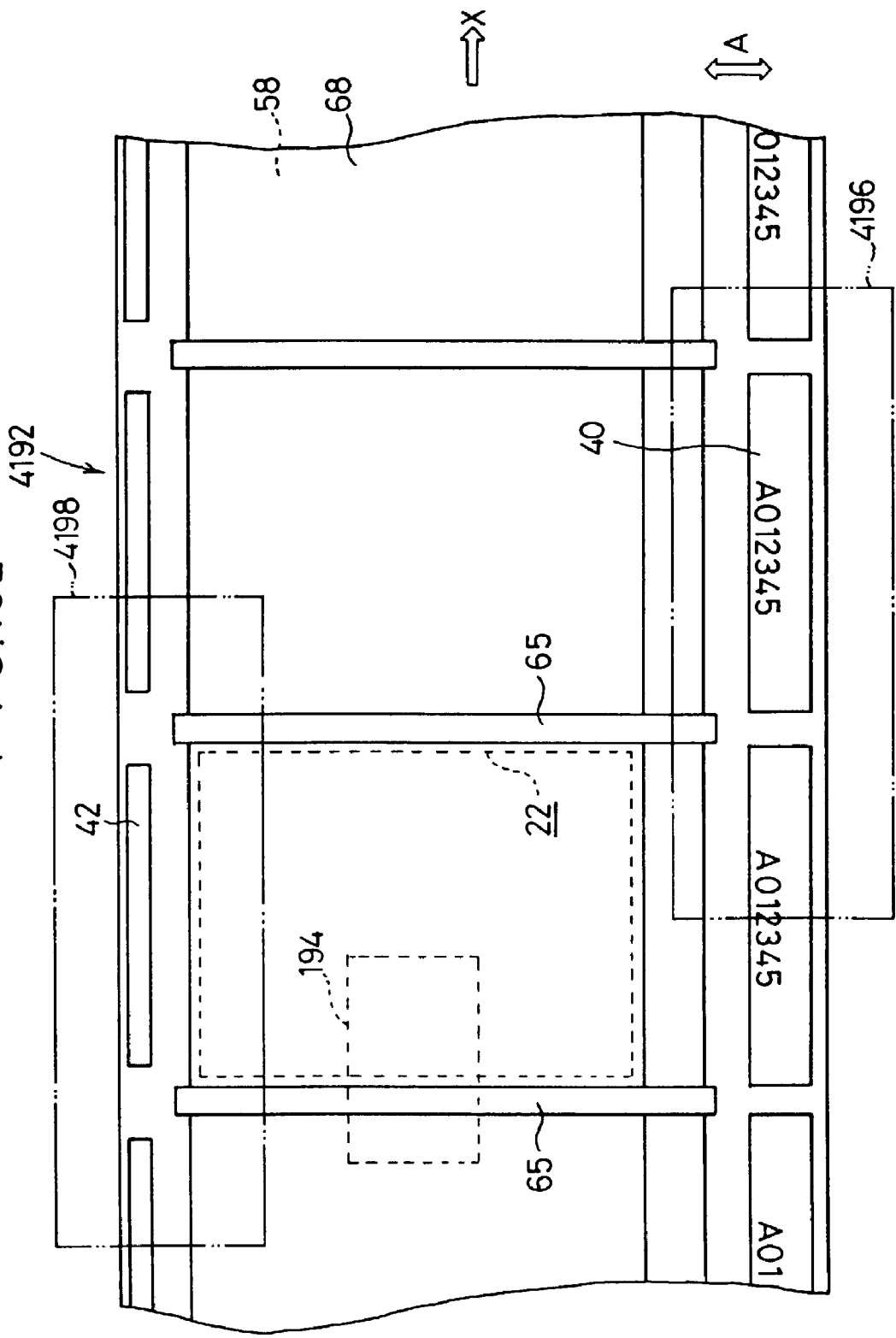
Figure 133:
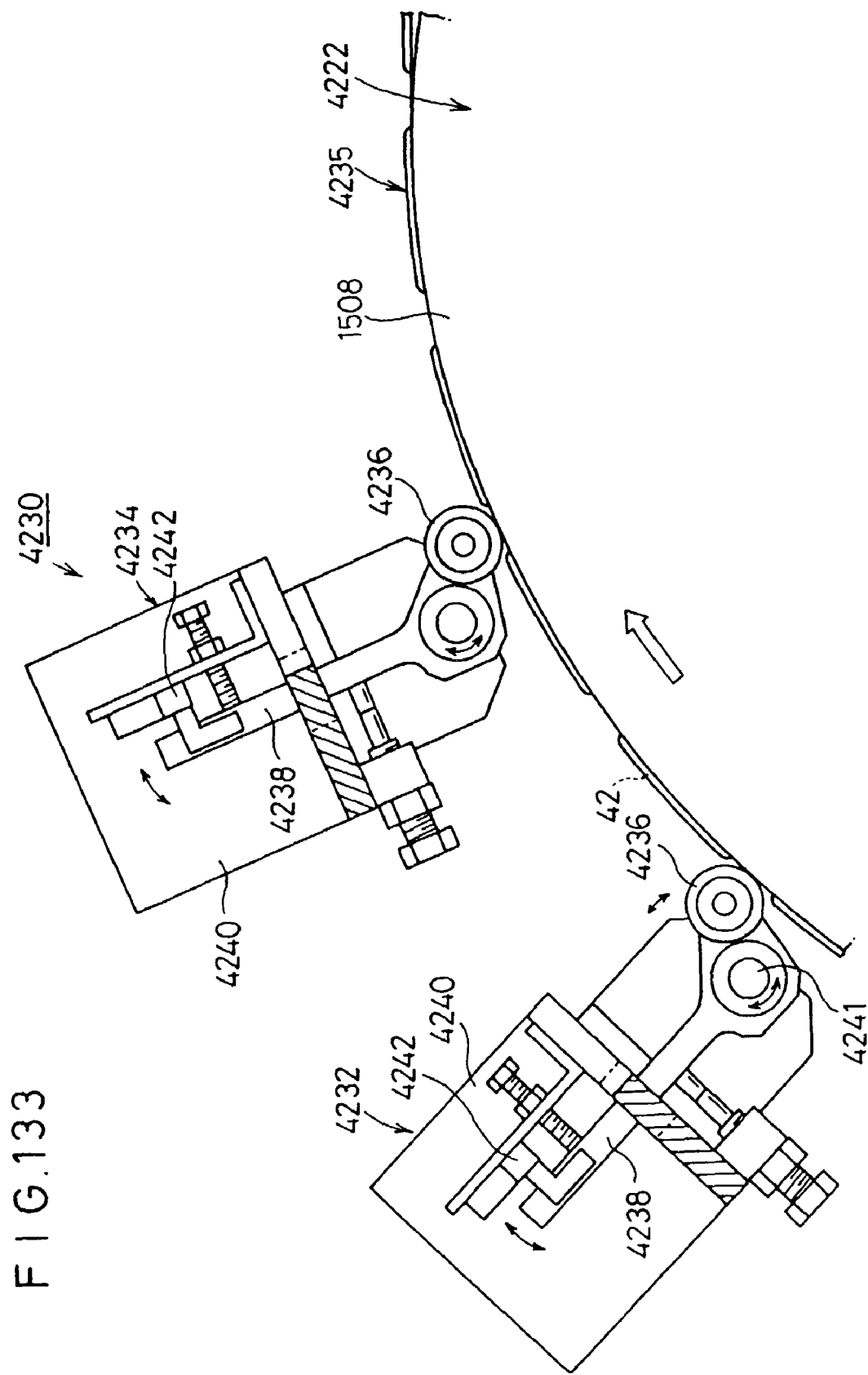
Figure 135:
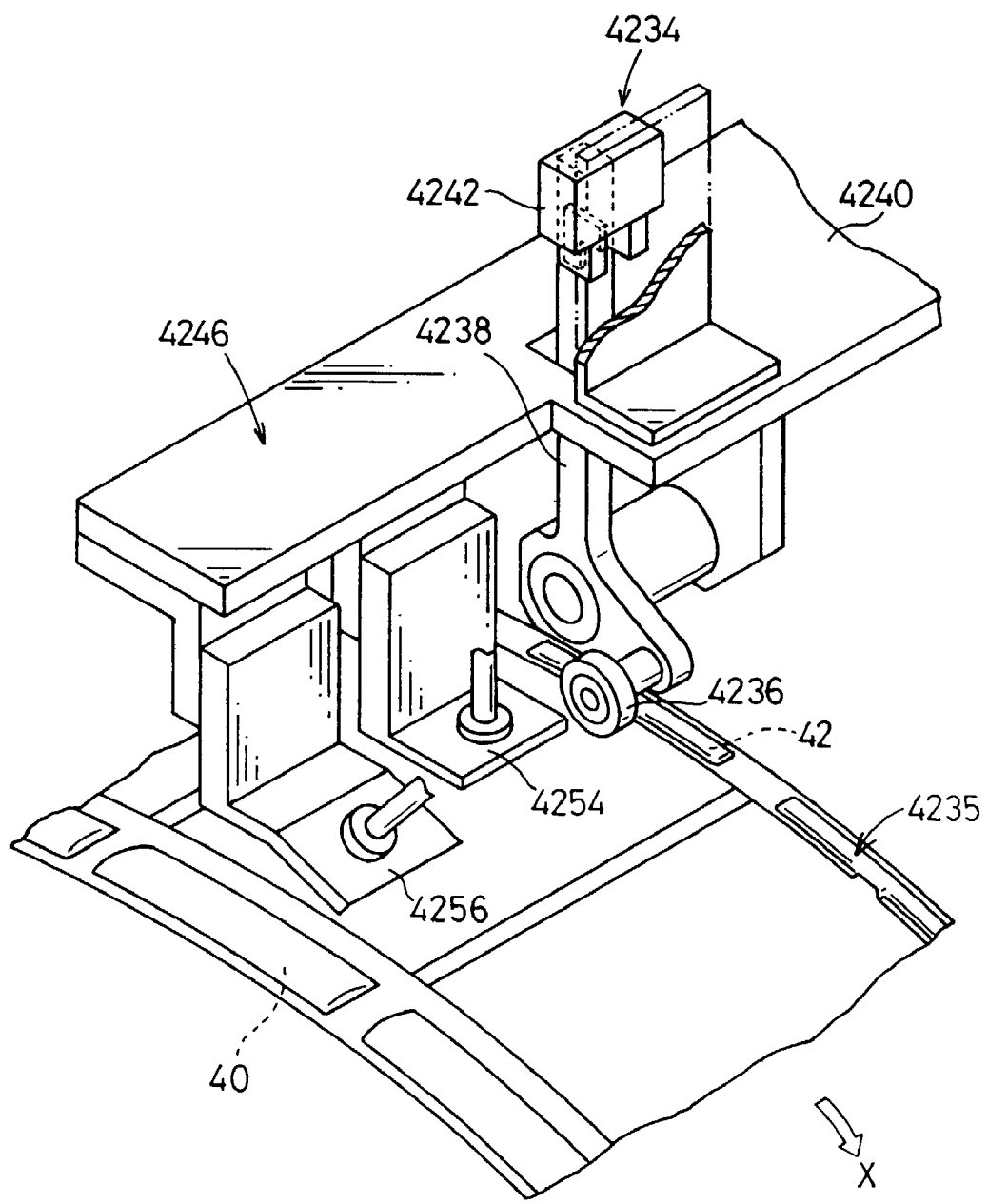
Figure 136:
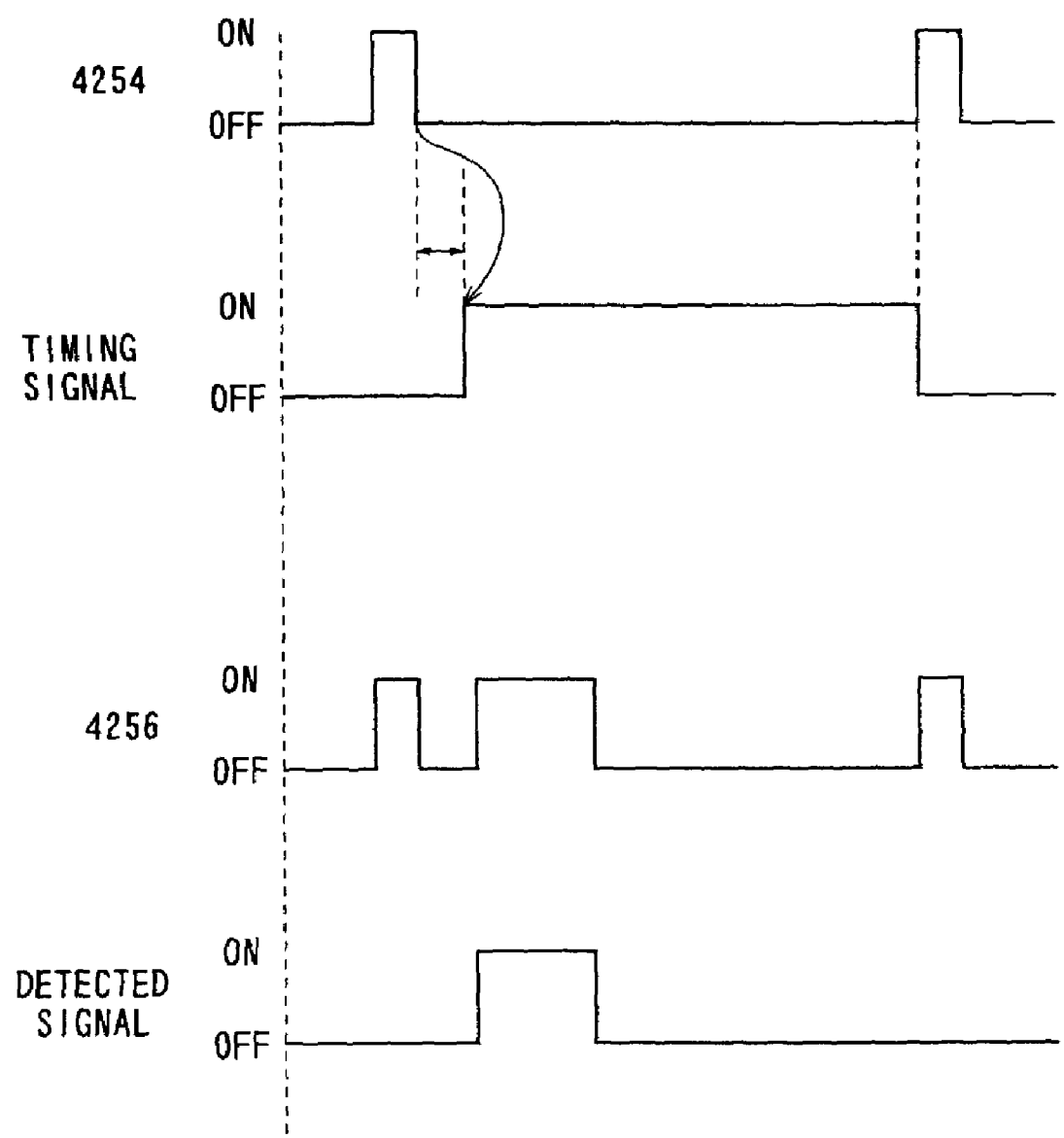
Figure 138:
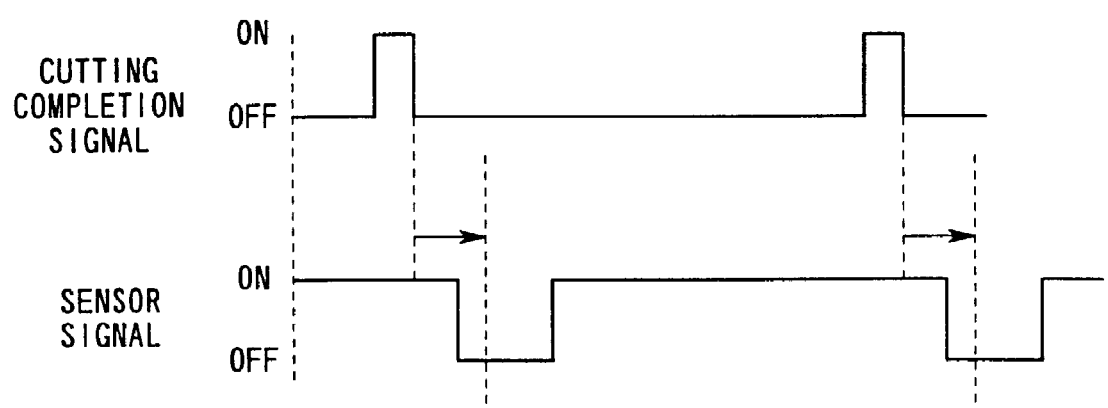

FIG. 132 is a plan view of the position inspecting means;

FIG. 133 is a front elevational view of a trap applied state detecting means;

FIG. 134 is a perspective view of a joint confirming means;

FIG. 135 is a perspective view of a pod rupture detecting means;

FIG. 136 is a diagram illustrative of a detecting process carried out by the trap applied state detecting means;

FIG. 137 is a perspective view of the trap applied state detecting means;

FIG. 138 is a diagram showing the manner in which a cutting failure detector operates;

FIG. 139 is a side elevational view, partly in cross section, of a defective product discharging mechanism;

FIG. 140 is a diagram showing details of a defect detecting mechanical and processing details upon failures; and FIG. 141 is a schematic side elevational view of a conventional process for manufacturing instant photographic film units.

DESCRIPTION OF THE PREFERRED EMBODIMENTS

Figure 1:
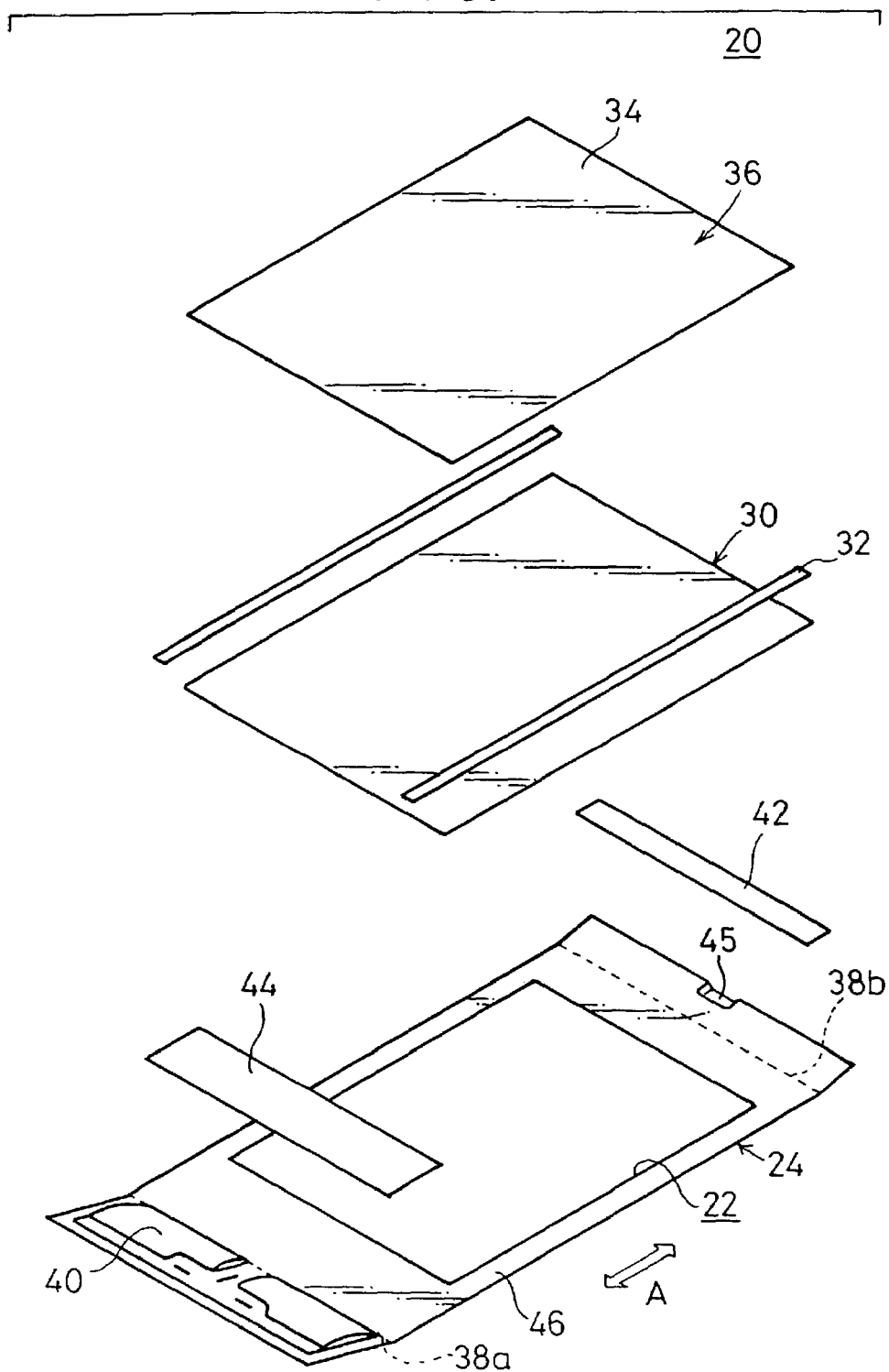
FIG. 1 is an exploded perspective view of an instant photographic film unit manufactured by a manufacturing method according to a first embodiment of the present invention.
Figure 2:
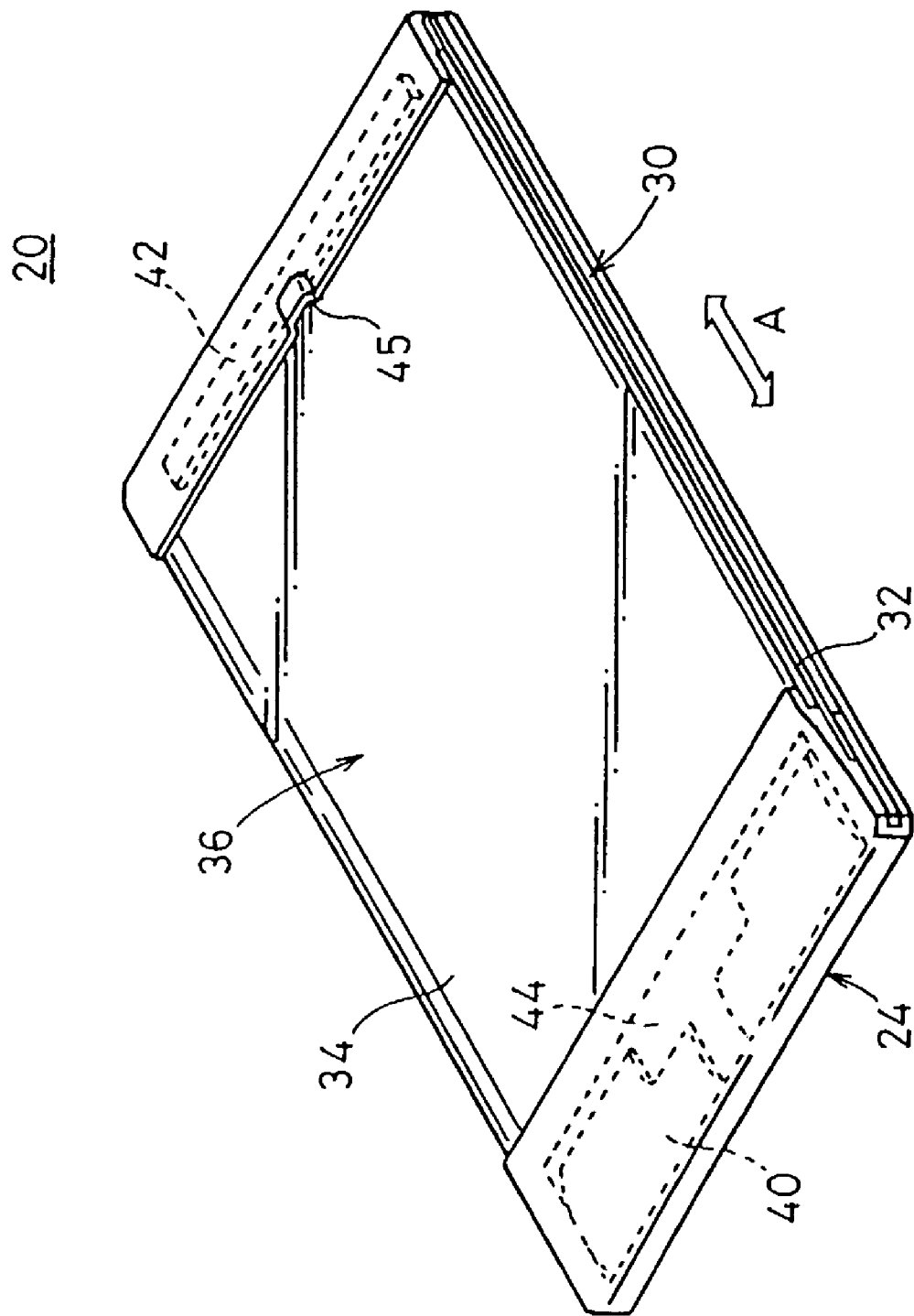
FIG. 2 is a perspective view of the instant photographic film unit.

FIG. 1 shows in exploded perspective an instant photographic film unit 20 manufactured by a manufacturing method according to a first embodiment of the present invention, and FIG. 2 shows in perspective the instant photographic film unit 20.

As shown in FIGS. 1 and 2, the instant photographic film unit 20 comprises a mask sheet 24 having an image frame 22, a photosensitive sheet 30 having an image reception layer and a photosensitive layer, a pair of laterally spaced spacers 32 disposed on the photosensitive sheet 30 in contact with the photosensitive layer, and a transparent cover sheet 36 disposed on the spacers 32 and having an exposure surface 34.

The mask sheet 24 has folds or thinner portions 38a, 38b on respective opposite end portions thereof in the longitudinal direction indicated by the arrow A, i.e., in the direction in which the mask sheet 24 is spread. A developing liquid pod or container 40 for containing a developing liquid therein and a trap 42 for holding an excessive developing liquid are bonded to respective opposite end portions of the mask sheet 24 outward of the folds 38a, 38b. An undersheet 44 is applied to the mask sheet 24 immediately inwardly of the fold 38a.

The photosensitive sheet 30, the spacers 32, and the cover sheet 36 are joined in superposed relation to the mask sheet 24. After the undersheet 44 is joined to the mask sheet 24, the opposite end portions of the mask sheet 24 are folded back and joined to the cover sheet 36, thus completing the instant photographic film unit 20. The instant photographic film unit 20 has an air passage 45 defined in the end portion of the mask sheet 24 which is folded over the trap 42.

The mask sheet 24 is made of colored polyethylene terephthalate (PET), and has a heat-sealing adhesive layer 46 on one surface thereof. Each of the spacers 32 comprises a transparent or colored PET layer and a light shielding layer on one surface thereof, and has heat-sealing adhesive layers on respective opposite surfaces thereof.

Figure 3:
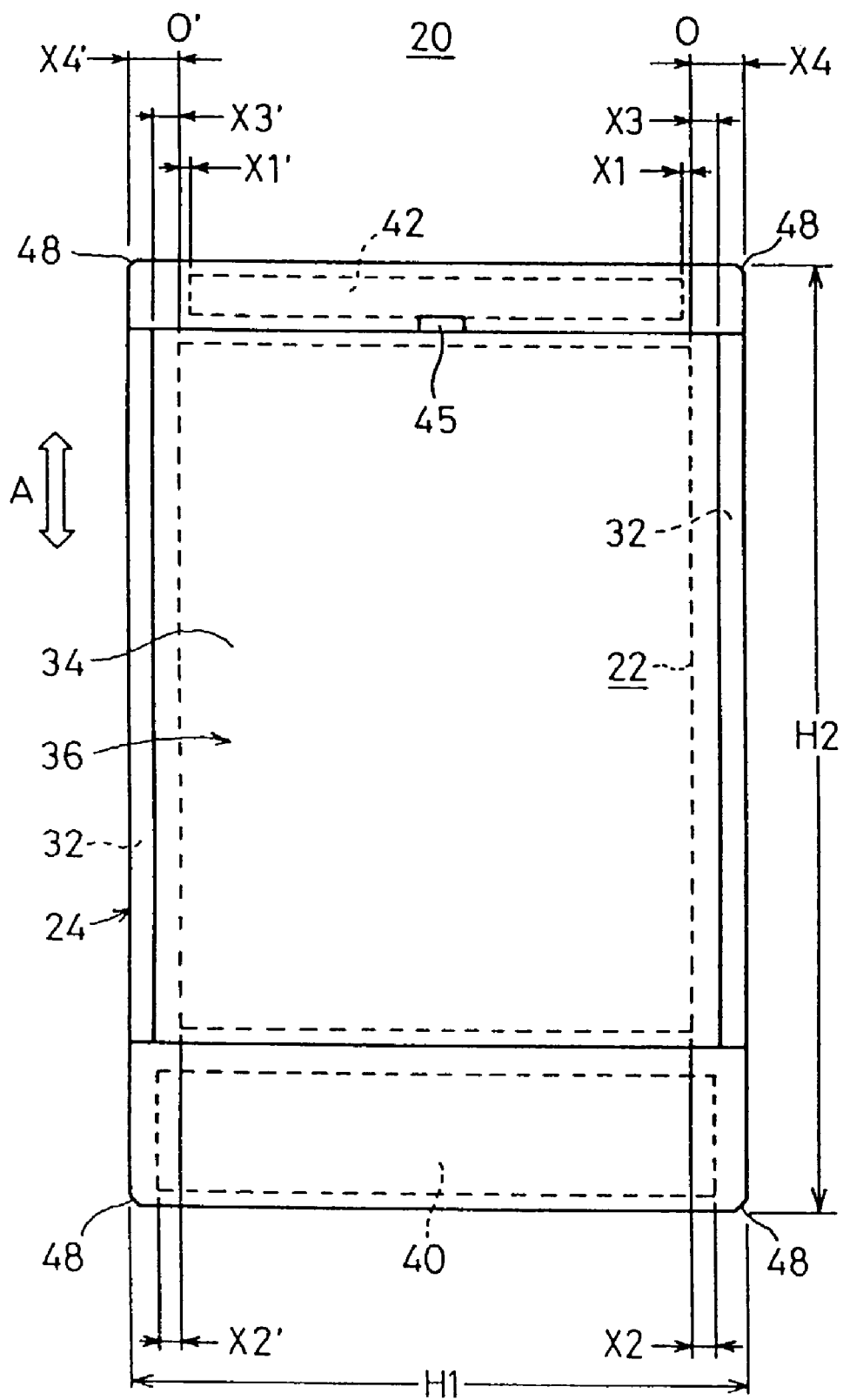
FIG. 3 is a front elevational view of the instant photographic film unit, showing an exposure surface thereof.

As shown in FIG. 3, the instant photographic film unit 20 has outer dimensions H1, H2 substantially equal to those of an ID card indicated by ISO 7810 or JIS X6301. Specifically, the outer dimension H1 in the transverse direction is set to 54 mm, and the outer dimension H2 in the longitudinal direction is set to 85.6 mm. The instant photographic film unit 20 has four beveled corners 48.

The instant photographic film unit 20 has a certain assembling accuracy in the transverse direction. The assembling accuracy is based on the image frame 22, and is defined with respect to distances X1, X1' from reference lines O, O' passing through opposite ends of the image frame 22 to opposite ends of the trap 42, distances X2, X2' from the reference lines O, O' to opposite ends of the developing liquid pod 40, distances X3, X3' from the reference lines O, O' to respective inner ends of the spacers 32, and distances X4, X4' from the reference lines O, O' to opposite ends of the instant photographic film unit 20. Specifically, the distances X1, X1' have a dimensional accuracy kept within an error range of ±0.5 mm, the distances X2, X2' have a dimensional accuracy kept within an error range of ±0.3 mm, the distances X3, X3' have a dimensional accuracy kept within an error range of ±0.5 mm, and the distances X4, X4' have a dimensional accuracy kept within an error range of ±0.5 mm.

Figure 4:
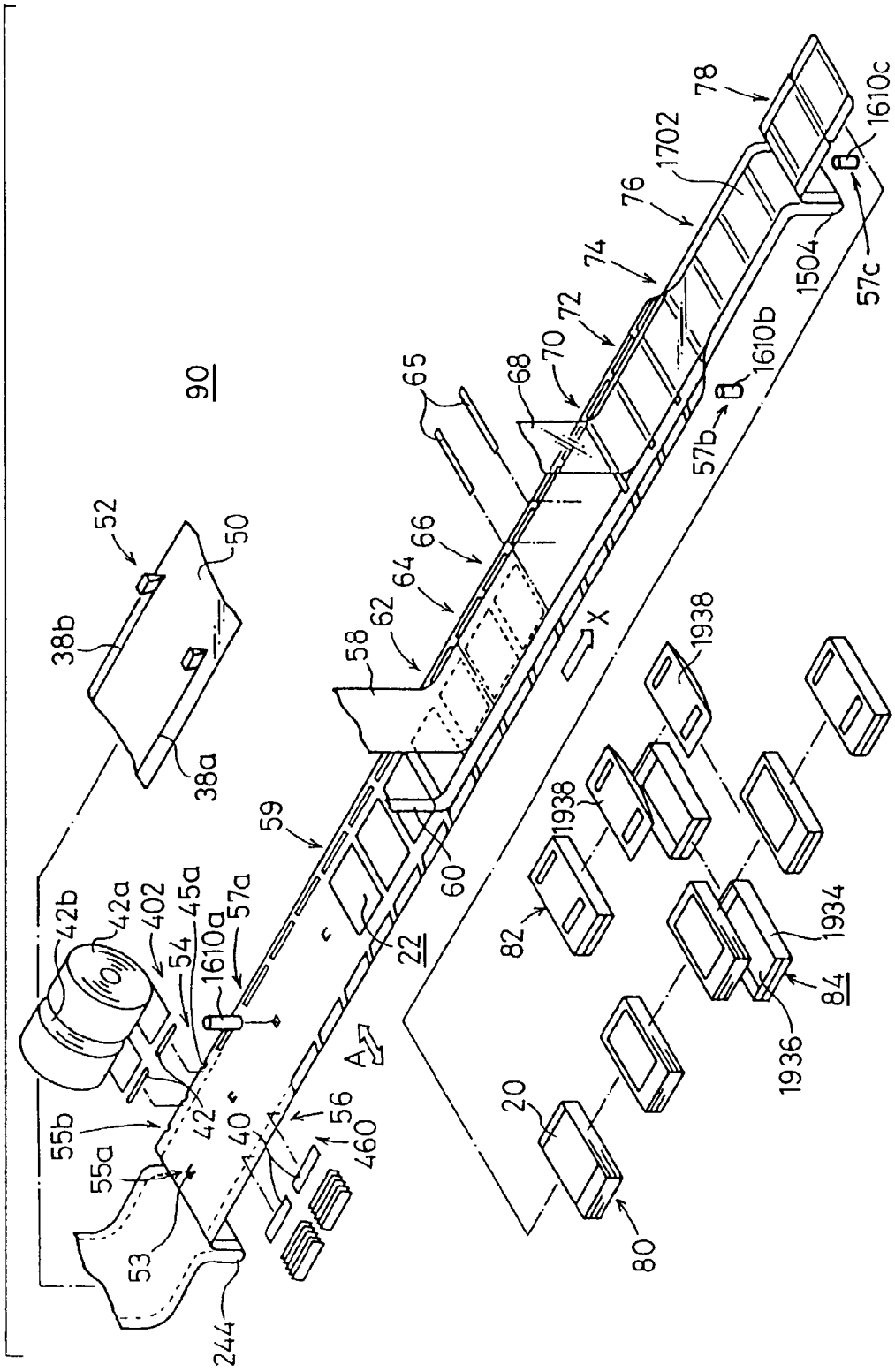
FIG. 4 is a schematic perspective view illustrative of the manufacturing method according to the first embodiment of the present invention.

FIG. 4 is illustrative of the manufacturing method according to the first embodiment of the present invention. As shown in FIG. 4, a first continuous web 50 for producing the mask sheet 24 is fed two pitches at a time in the direction indicated by the arrow X which is perpendicular to the longitudinal direction, indicated by the arrow A, of the mask sheet 24. A fold forming station 52 comprising a pair of heated steel wedges, for example, is disposed in an upstream region for forming folds 38a, 38b in respective marginal edges of the first continuous web 50.

Successively downwardly of the fold forming station 52, there are disposed a mark forming station 55a for forming a substantially channel-shaped mark 53 on the first continuous web 50 in every other image frame 22, an air hole forming station 55b for forming a recess (deformed portion) 45a in the first continuous web 50 which will become the air passage 45 when the instant photographic film unit 20 is spread, a trap attaching station 54 for attaching two traps 42 substantially simultaneously to one marginal edge of the first continuous web 50 when the first continuous web 50 is stopped, a pod attaching station 56 for attaching two developing liquid pods 40 simultaneously to the other marginal edge of the first continuous web 50 when the first continuous web 50 is stopped, a mark detecting station 57a for detecting the position of a mark 53, and a punching station 59 for forming two image frames 22 simultaneously on the first continuous web 50 when the first continuous web 50 is stopped.

Downstream of the punching station 59, there is disposed a first joining station 62 for joining a second continuous web 58 for producing the photosensitive sheet 30 and a continuous sheet 60 for producing the undersheet 44 to the first continuous web 50. A first heat-bonding station 64 is disposed downstream of the first joining station 62 for heat-bonding the second continuous web 58 and the continuous sheet 60 to the first continuous web 50 across two successive image frames 22.

A second heat-bonding station 66 is disposed downstream of the first heat-bonding station 64 for temporarily bonding two rails 65, each being twice as wide as the spacers 32, to the first continuous web 50 on opposite sides of the image frame 22. Both surfaces of each of the rails 65 are coated with a heat-sealing adhesive. Downstream of the second heat-bonding station 66, there is disposed a second joining station 70 for attaching a third continuous web 68 for producing the cover sheet 36. A third heat-bonding station 72 is disposed downstream of the second joining station 70 for bonding the third continuous web 68 to the second continuous web 58 with the rails 65.

Downstream of the third heat-bonding station 72, there are disposed a folding station 74 for folding back the opposite marginal edges of the first continuous web 50 over the trap 42 and the developing liquid pod 40, and a fourth heat-bonding station 76 for heat-bonding the folded marginal edges of the first continuous web 50 over two successive instant photographic film units 20. A cutting station (cutting mechanism) 78 is disposed downstream of the fourth heat-bonding station 76 for cutting each of the rails 65 at its substantially central area and beveling corners thereof thereby producing one instant photographic film unit 20 at a time.

Downstream of the cutting station 78, there are disposed a stacking station 80 for automatically stacking a certain number of, e.g., ten instant photographic film units 20, and a packing station 84 for reversing the instant photographic film units 20 stacked in the stacking station 80 and then automatically placing the reversed instant photographic film units 20 in a film pack 82.

In the first embodiment, the length or dimension H1 of an instant photographic film unit 20 in the direction perpendicular to the longitudinal direction thereof indicated by the arrow A is used as a unit pitch for feeding the assembly. In a process from the mark forming station 55a to the fourth heat-bonding station 76, the assembly is intermittently fed over a plurality of pitches, e.g., two pitches, at a time (so-called tact feed operation) so that the assembly is stopped for a long period of time between intermittent motions and products can be manufactured at a high speed. In the cutting station 78, the assembly is intermittently fed over one pitch at a time so as to efficiently bevel the corners of instant photographic film units 20.

Figure 5:
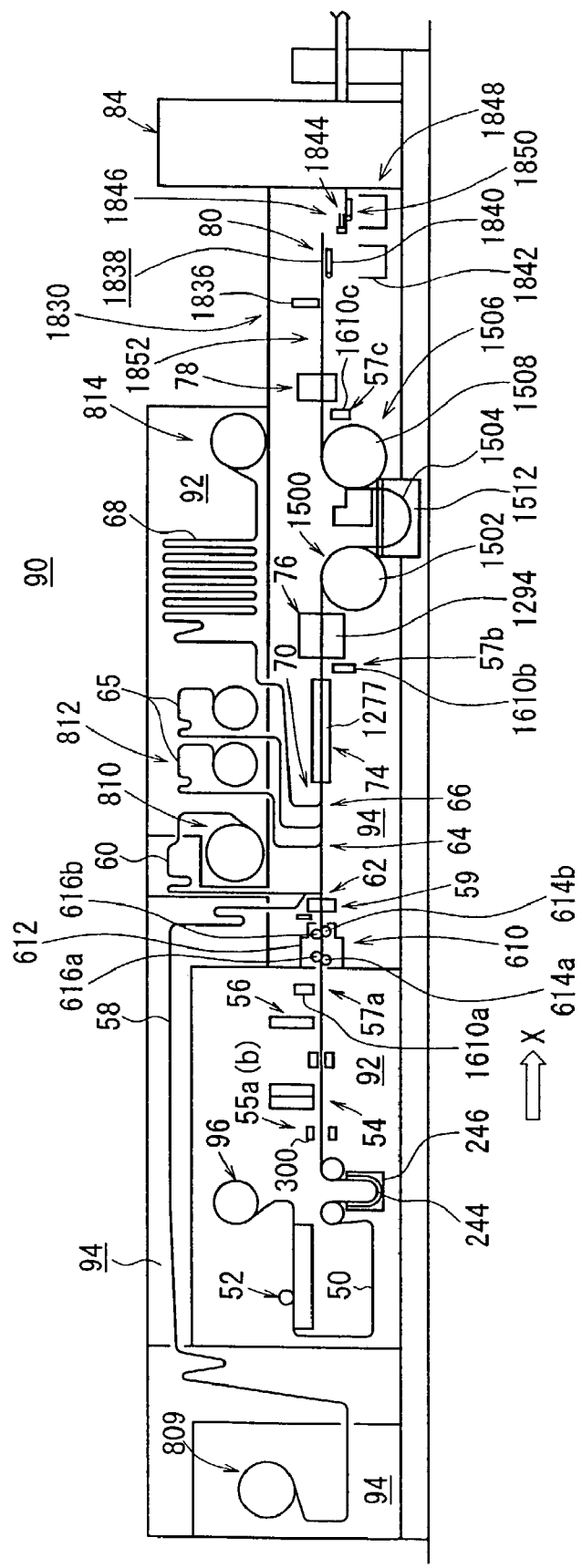
FIG. 5 is a schematic elevational view of a manufacturing system for carrying out the manufacturing method according to the first embodiment of the present invention.
Figure 6:
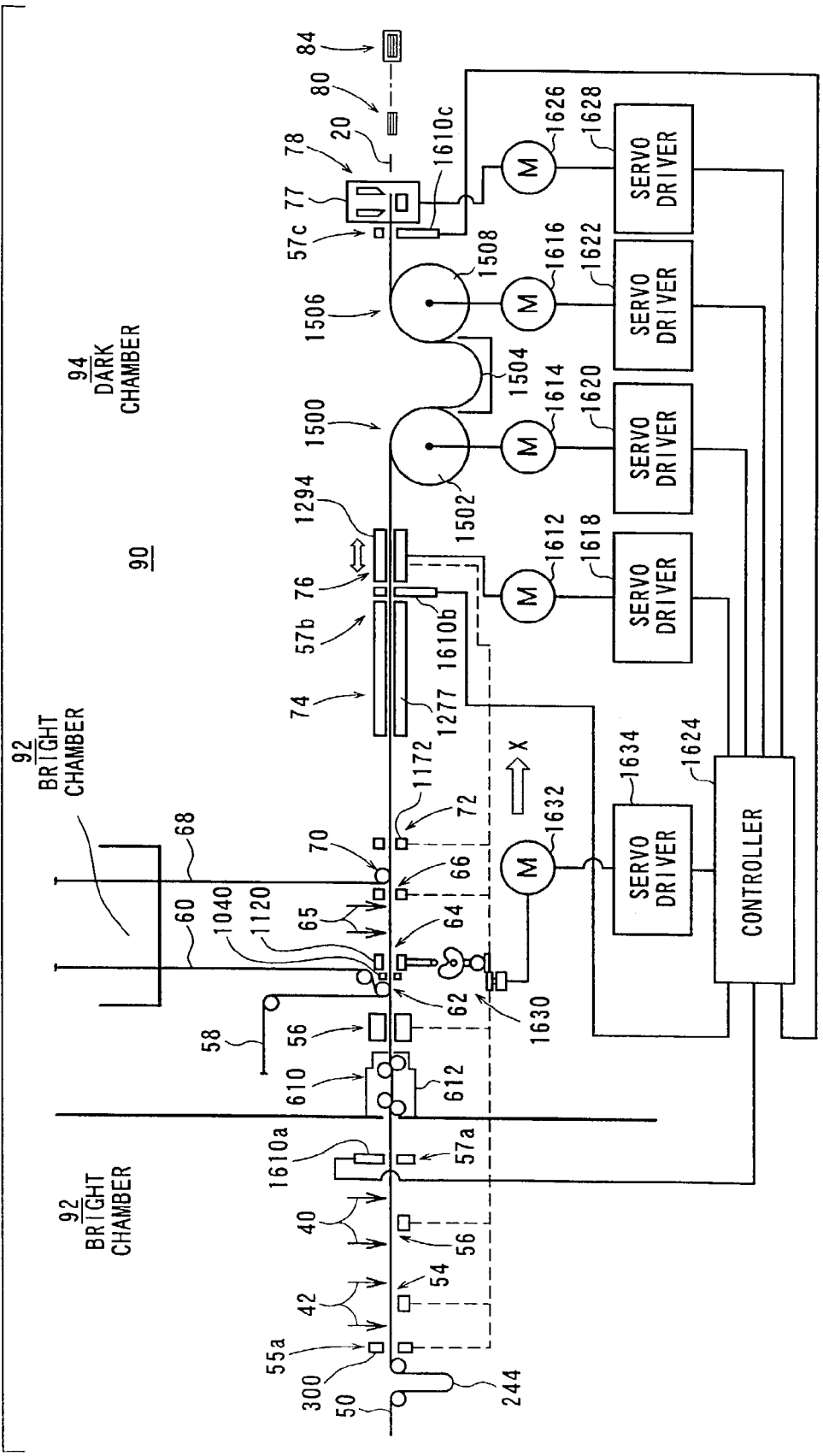
FIG. 6 is a schematic view, partly in block form, of the manufacturing system including a controller.

FIGS. 5 and 6 schematically show a manufacturing system (manufacturing apparatus) 90 for carrying out the manufacturing method according to the first embodiment of the present invention.

The manufacturing system 90 has a bright chamber 92 and a dark chamber 94. The bright chamber 92 houses therein a mask sheet supply unit (light unshielded member supply station) 96 for unreeling the first continuous web 50 as a light unshielded member from a web roll (it is not necessary to shield the first continuous web 50 from light).

The fold forming station 52, the mark forming station 55*a*, the air hole forming station 55*b*, the trap attaching station 54, and the pod attaching station 56 are successively disposed downstream of the mask sheet supply unit 96.

Figure 7:
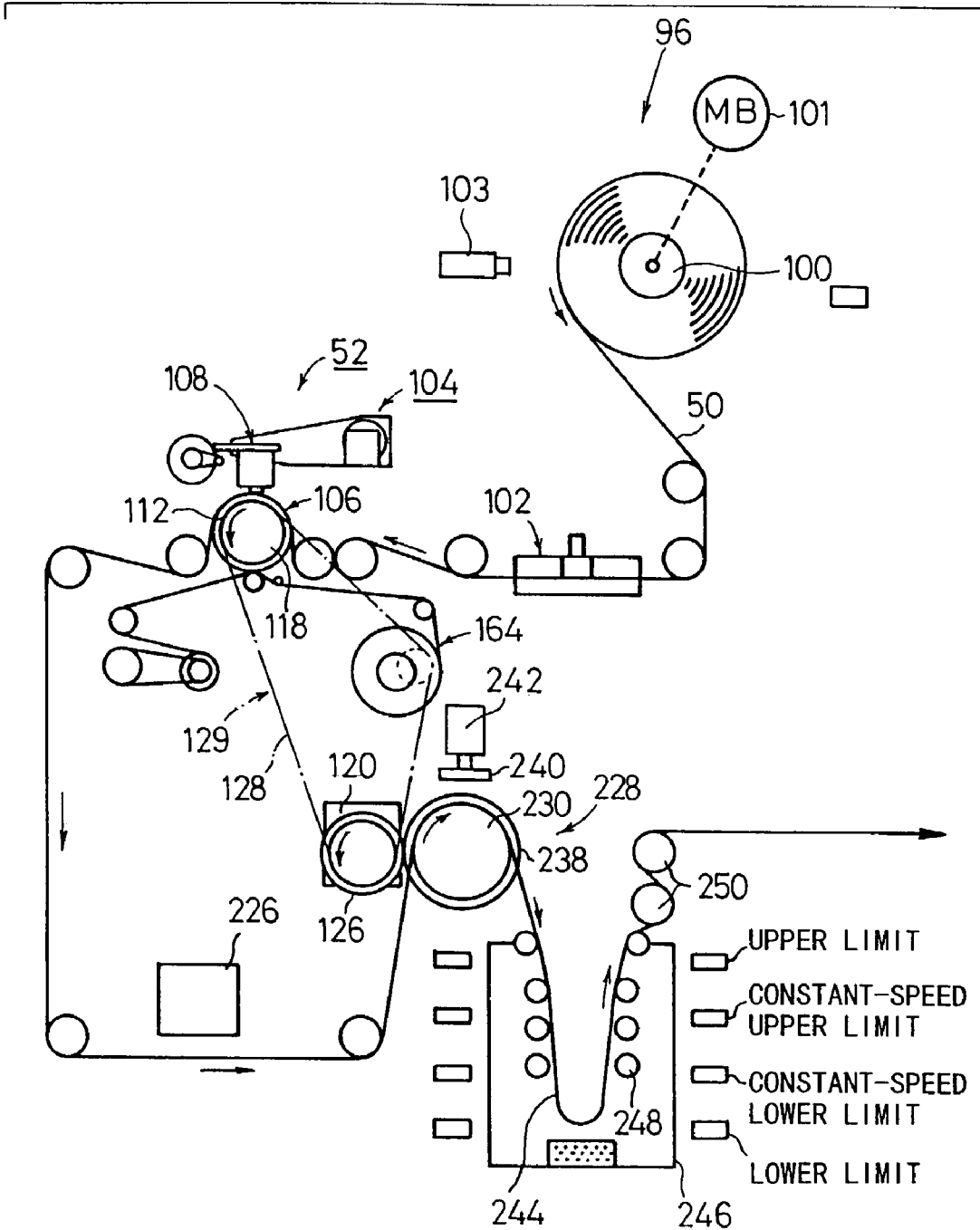
FIG. 7 is a schematic view of a fold forming station of the manufacturing system.

As shown in FIG. 7, the mask sheet supply unit 96 has an unreeling shaft 100 supporting a roll of the first continuous web 50 thereon. The unreeling shaft 100 is combined with a braking means 101 for applying a braking torque thereto. The mask sheet supply unit 96 includes a remaining length detecting means 103 for detecting a remaining length of the rolled first continuous web 50 on the unreeling shaft 100, and a splicing unit 102 for splicing the trailing end of a first continuous web 50 which has been unwound from the mask sheet supply unit 96 to the leading end of a first continuous web 50 which is newly loaded in the mask sheet supply unit 96.

Figure 8:
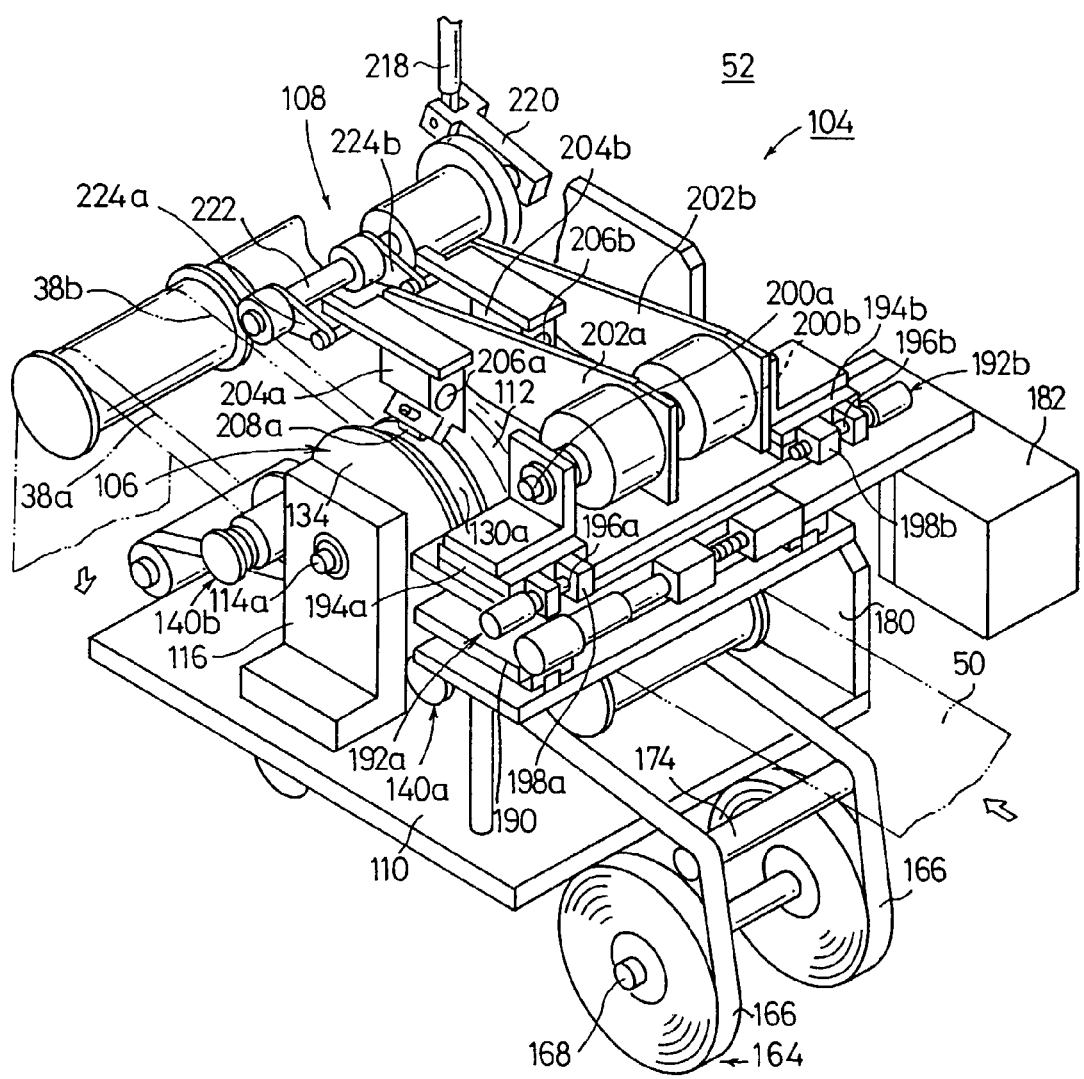
FIG. 8 is a perspective view of a fold forming mechanism in the fold forming station.
Figure 9:
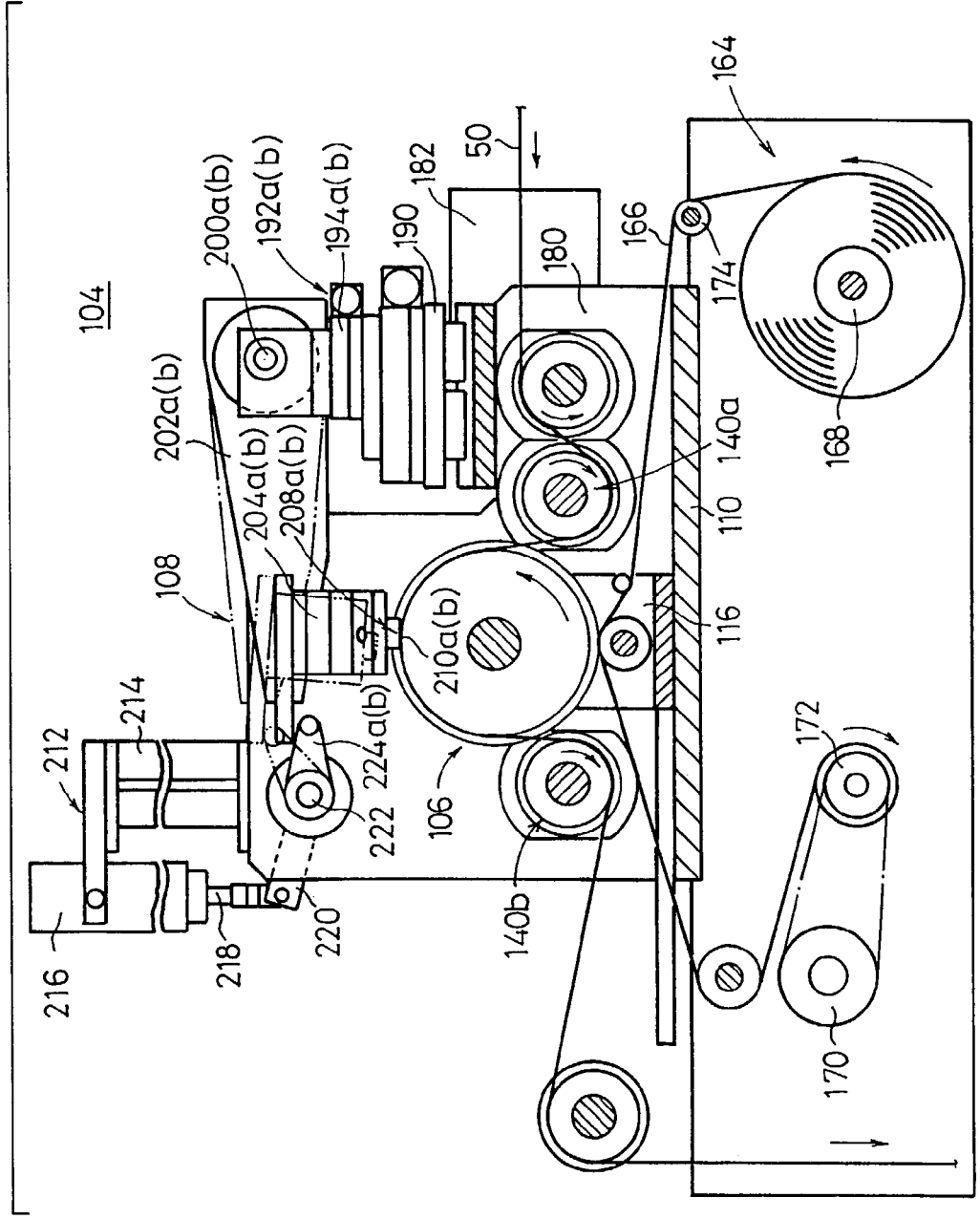
FIG. 9 is a side elevational view, partly in cross section, of the fold forming mechanism.
Figure 10:
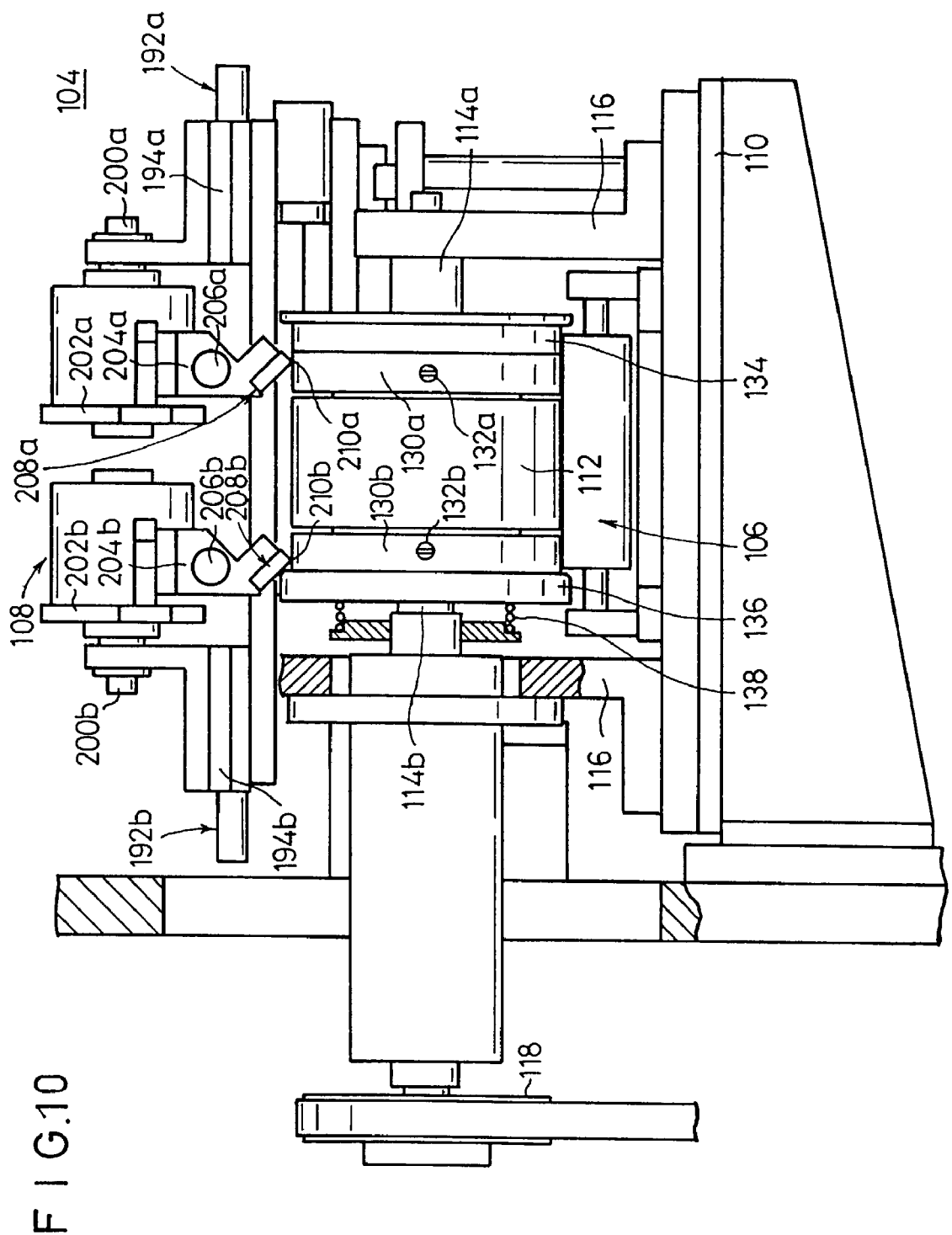
FIG. 10 is a front elevational view, partly in cross section, of the fold forming mechanism.

As shown in FIGS. 8 through 10, the fold forming station 92 has a fold forming mechanism 104 which comprises a placing means 106 for placing the first continuous web 50 under tension and a fold groove forming means 108 for pressing the marginal edges of the first continuous web 50 placed by the placing means 106 under a predetermined load and keeping the marginal edges of the first continuous web 50 at a predetermined temperature.

Figure 11:
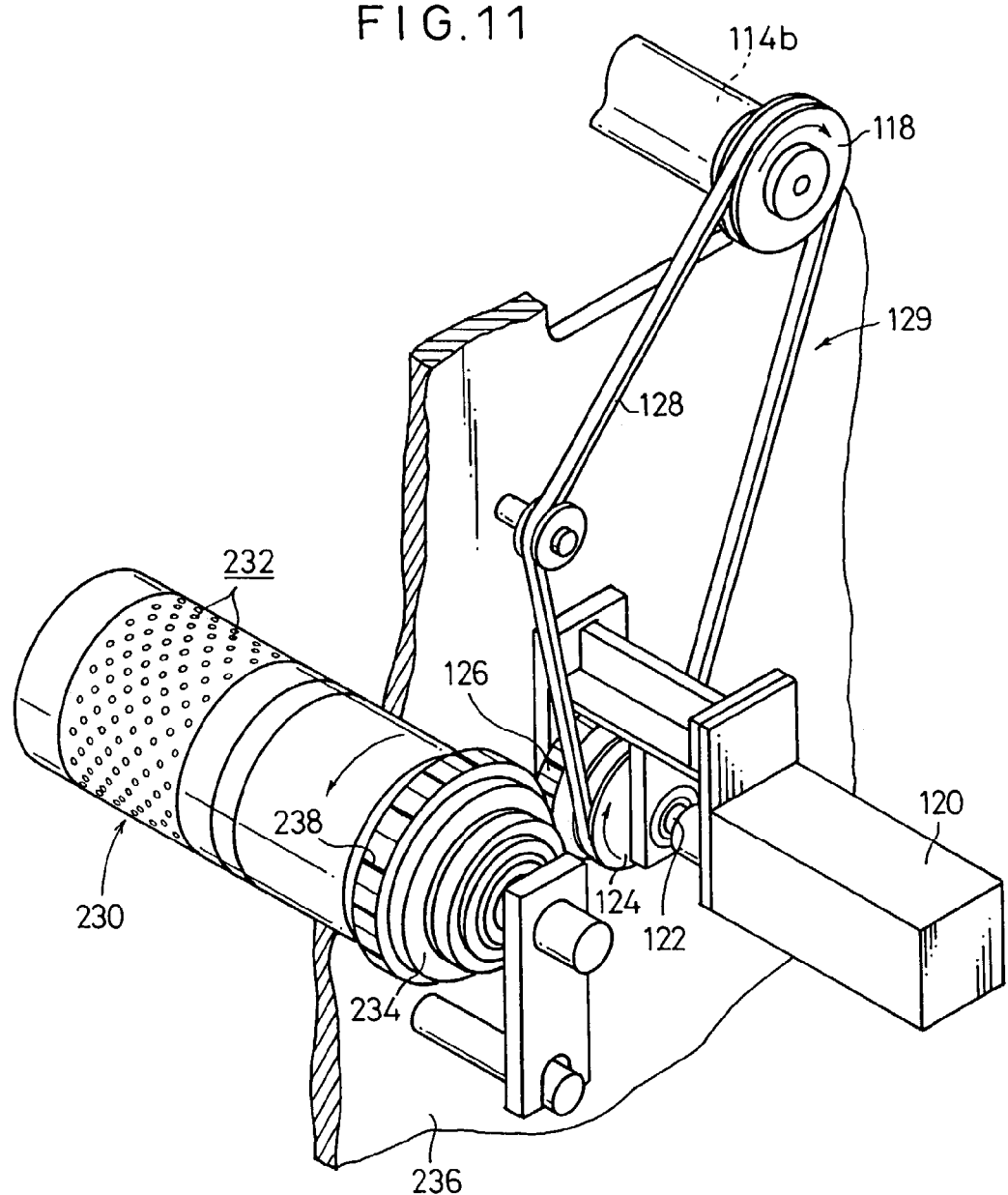
FIG. 11 is a fragmentary perspective view of the fold forming mechanism.

The placing means 106 has a table 110 supporting a pair of support arms 116 on which opposite rotatable shafts 114*a*, 114*b* of a roller 112 are rotatably supported by bearings (not shown). A pulley 118 is fixedly mounted on the rotatable shaft 114*b*. As shown in FIG. 11, a motor 120 has a drive shaft 122 on which there are coaxially fixedly mounted a pulley 124 and a drive gear 126 greater in diameter than the pulley 124. A timing belt 128 is trained around the pulleys 124, 118, thus making up a feed means 129.

As shown in FIG. 10, two axially spaced carbide rings 130*a*, 130*b* are mounted on opposite sides of the roller 112 at respective positions for forming folds in the first continuous web 50. Set screws 132*a*, 132*b* are threaded radially inwardly in the respective carbide rings 130*a*, 130*b*, and have respective radially inner tip ends pressed against the roller 122. By loosening and tightening the set screws 132*a*, 132*b*, it is possible to positionally adjust the carbide rings 130*a*, 130*b* in the axial direction of the roller 112.

A fixed flange 134 and a movable flange 136 are mounted respectively on the opposite sides of the roller 112 axially outwardly of the respective carbide rings 130*a*, 130*b*. The fixed flange 134 serves to support one marginal edge of the first continuous web 50 where traps 42 will be attached, and the movable flange 136 serves to support the other marginal edge of the first continuous web 50 where developing liquid pods 40 will be attached. The movable flange 136 is movable axially of the roller 112 and normally held under the bias of a spring 138.

Figure 12:
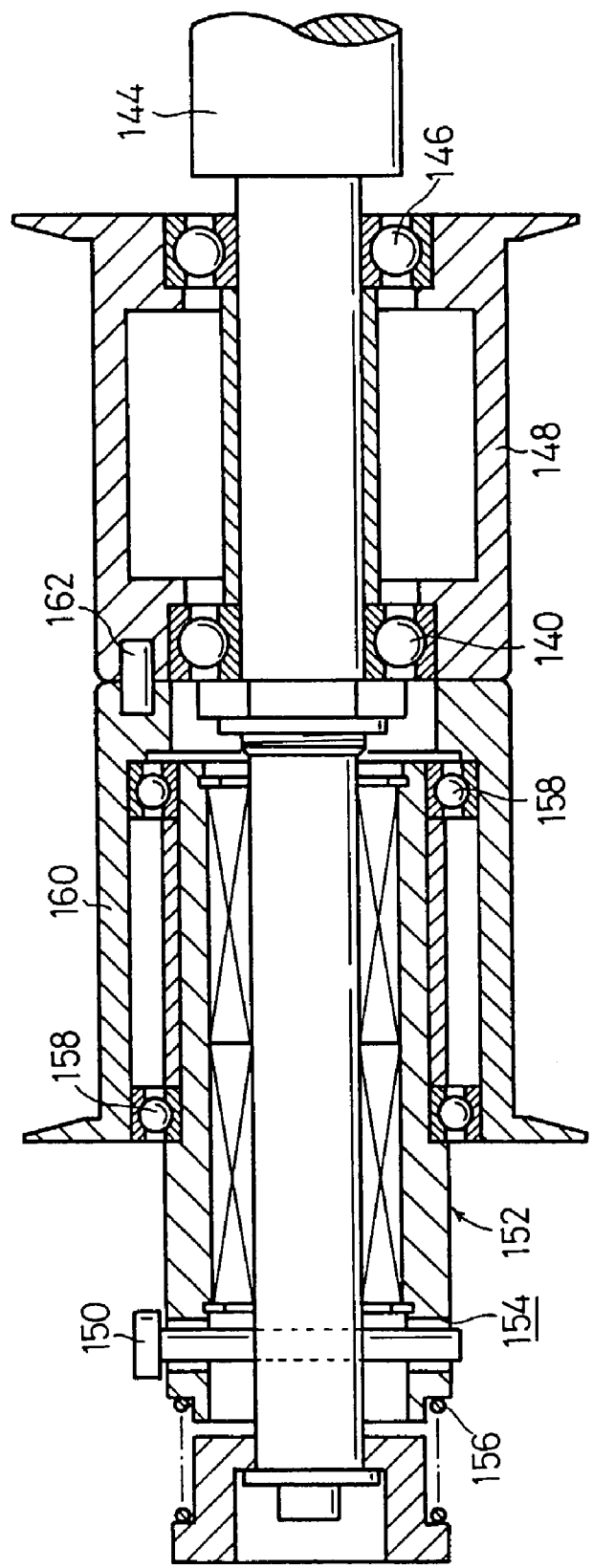
FIG. 12 is a vertical cross-sectional view of a transversely shifting roller of the fold forming mechanism.

A first transversely shifting roller 140*a* is mounted on the table 110 upstream of the roller 112, and a second transversely shifting roller 140*b* is mounted on the table 110 downstream of the roller 112 (see FIG. 9). As shown in FIG. 12, each of the first and second transversely shifting rollers 140*a*, 140*b* has a shaft 144 fixed to a wall (not shown) and a flanged reference roller 148 rotatably supported on the shaft 144 by bearings 146.

A pin 150 is diametrically fixed to the distal end of the shaft 144 and inserted in an axially elongate slot 154 defined in a linear bushing 152. The linear bushing 152 is normally urged toward the reference roller 148 by a spring 156 disposed around the distal end of the shaft 144. A flanged movable roller 160 is rotatably supported on the linear bushing 152 by a bearing 158. The movable roller 160 and the reference roller 148 are axially connected end to end for corotation by a joint pin 162.

The rollers for rolling contact with the first continuous web 50, which include the reference roller 148, the movable roller 160, and the roller 112, have outer circumferential surfaces coated with a film made of a composite material of nickel—phosphorus alloy and fluoroplastics for increased wear resistance. A cleaner means 164 for preventing the outer circumferential surfaces of the carbide rings 130*a*, 130*b* from being smeared is disposed below the roller 112.

As shown in FIGS. 8 and 9, the cleaner means 164 has an unreeling shaft 168 supporting two rolls of nonwoven fabric tapes 166. While the rolled nonwoven fabric tape 166 on the unreeling shaft 168 is being wound by a takeup shaft 172 that is rotated at a low speed by a motor 170, the nonwoven fabric tapes 166 are held in contact with the outer circumferential surfaces of the carbide rings 130*a*, 130*b*. A plurality of guide rollers 174 are disposed for the guide nonwoven fabric tape 166 between the unreeling shaft 168 and the takeup shaft 172.

Figure 13:
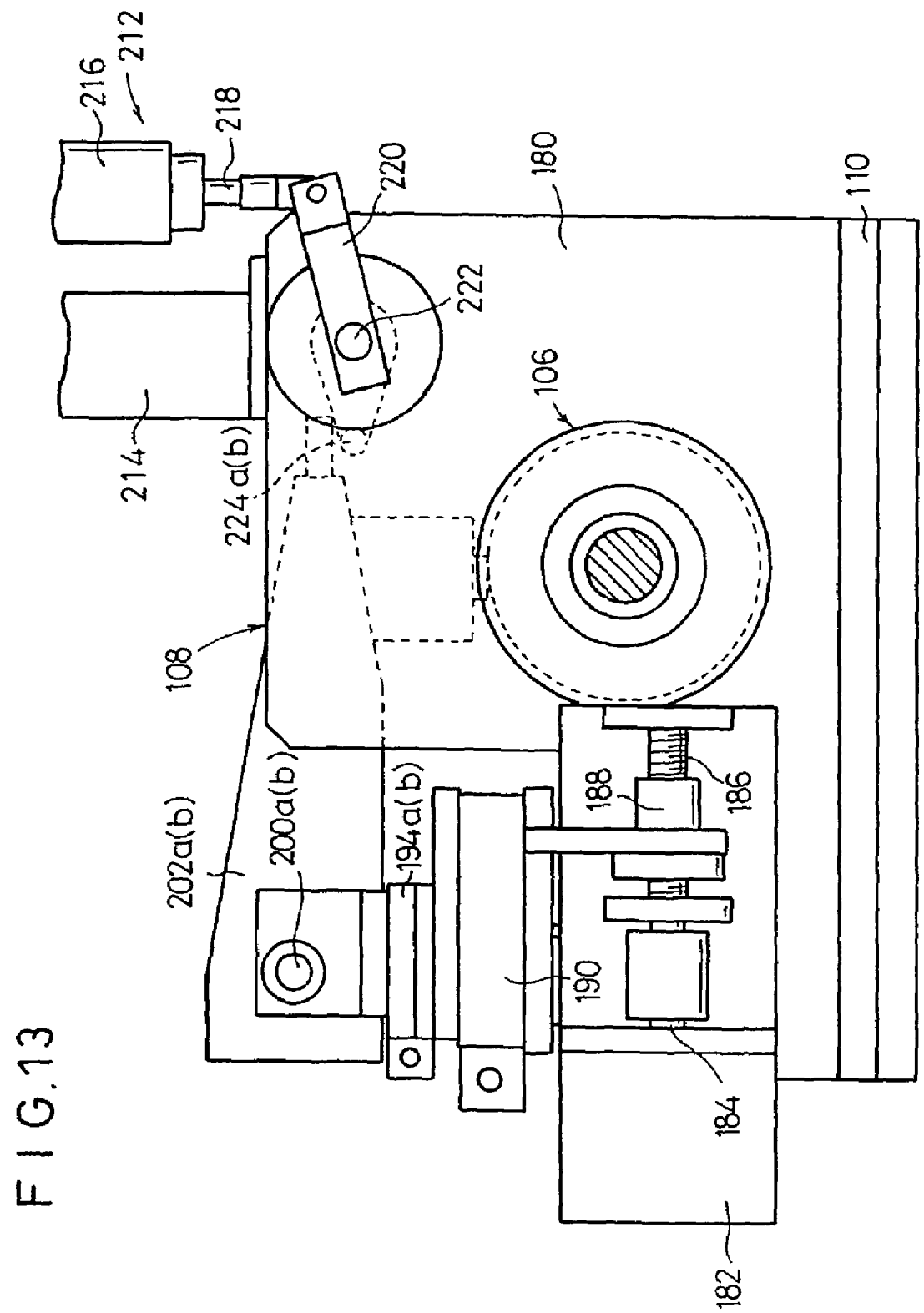
FIG. 13 is a rear elevational view of the fold forming mechanism.

The fold groove forming means 108 has a base 180 mounted on the table 110 and a motor 182 fixed to an end of the base 180. As shown in FIG. 13, the motor 182 has a drive shaft 184 to which a ball screw 186 is coaxially coupled. The ball screw 186 is threaded through a nut 188 fixed to an end of a movable base 190 which is elongate in a direction transverse to the direction in which the first continuous web 50 is fed.

As shown in FIG. 8, movable tables 194*a*, 194*b* on the movable base 190 are movable back and forth by respective moving means 192*a*, 192*b* in directions transverse to the direction in which the first continuous web 50 is fed. The moving means 192*a*, 192*b* have respective screws 196*a*, 196*b* that are rotatable manually or by motors and threaded through respective nuts 198*a*, 198*b* on the movable tables 1941, 194*b*. Horizontal rotatable shafts 200*a*, 200*b* are rotatably supported respectively on the movable tables 194*a*, 194*b*, and swing arms 202*a*, 202*b* have ends fixed respectively to the horizontal rotatable shafts 200*a*, 200*b*.

Moving blocks 204*a*, 204*b* are fixed to respective swingable distal ends of the swing arms 202*a*, 202*b*. As shown in FIGS. 8 through 10, heaters 206*a*, 206*b* are fixedly mounted in the respective moving blocks 204*a*, 204*b*, and carbide tips 208*a*, 208*b* are fixed as groove forming blades to respective lower ends of the moving blocks 204*a*, 204*b*. The carbide tips 208*a*, 208*b* are substantially rectangular in shape and have cutting edges 210*a*, 210*b* on their lower ends. The cutting edges 210*a*, 210*b* have a blade edge angle of about 90° and are of a straight shape having a predetermined horizontal length.

An actuator means 212 for moving the moving blocks 204*a*, 204*b* toward and away from the placing means 106 is mounted on the table 110. As shown in FIGS. 9 and 13, the actuator means 212 comprises a motor-actuated cylinder 216 supported downwardly on an end of the table 110 by an attachment 214 and having a downwardly projecting rod 218 to which a shaft 222 is coupled by a link 220. Swing members 224*a*, 224*b* are mounted on the shaft 222 in alignment with the distal ends of the swing arms 202*a*, 202*b* (see FIG. 8).

As shown in FIG. 7, an electrostatic charge removing means 226 is positioned downstream of the fold forming station 52, and a suction roller 230 of a main feed means 228 is positioned downstream of the electrostatic charge removing means 226. The first continuous web 50 passes alongside of the electrostatic charge removing means 226 and around the suction roller 230. As shown in FIG. 11, the suction roller 230 has a plurality of suction holes 232 defined in an outer circumferential wall thereof and connected to a vacuum source (not shown). The suction roller 230 has a shaft 234 projecting from one end thereof and rotatably supported in a cantilevered fashion on a wall 236 by a bearing (not shown). A driven gear 238 is fixedly mounted on the shaft 234 in mesh with the drive gear 126. The suction holes 232 have a total opening area which is at least 10% of the area of the outer circumferential wall of the suction roller 230, and are positioned in a staggered pattern.

As shown in FIG. 7, the suction roller 230 is associated with a presser 240 for preventing the first continuous web 50 from being positionally displaced when the first continuous web 50 is not attracted to the suction roller 230 under vacuum. The presser 240 is upwardly retractable by a cylinder 242, and normally urged toward the suction roller 230 under the bias of a spring (not shown). The outer circumferential surface of the suction roller 230 is buffed, and, if necessary, plated with a hard chromium layer.

The suction roller 230 serves to continuously transport the first continuous web 50, which forms a first free loop 244 downstream of the suction roller 230 for releasing the first continuous web 50 from the tension. The first free loop 244 is formed because the first continuous web 50 is continuously transported in the mask sheet supply unit 96 for forming the folds 38a, 38b effectively, and intermittently transported in and after the mark forming station 55a. The first free loop 244 is formed in a first suction box 246 having opposite inner walls that are spaced from each other by a distance which is equal to the sum of the width of the first continuous web 50 and up to 0.5 mm. The opposite inner walls of the first suction box 246 extend parallel to each other with a parallelism error of up to 0.5 mm. These opposite inner walls of the first suction box 246 are coated with a film made of a composite material of nickel—phosphorus alloy and fluoroplastics.

The first suction box 246 houses therein a plurality of detachable rollers 248. The first suction box 246 has an outlet positioned underneath flanged path rollers 250. Each of the flanged path rollers 250 has a pair of axially opposite flanges which are spaced from each other by a minimum distance which is equal to the width of the first continuous web 50 with a tolerance of up to 0.5 mm.

The first free loop 244 in the first suction box 246 is detected in four positions including a lower limit position, a constant-speed lower limit position, a constant-speed upper limit position, and an upper limit position. The suction roller 230 is controlled to rotate at a low speed when the first free loop 244 is positioned between the lower limit position and the constant-speed lower limit position, at a constant speed when the first free loop 244 is positioned between the constant-speed lower limit position and the constant-speed upper limit position, and at a high speed when the first free loop 244 is positioned between the constant-speed upper limit position and the upper limit position, for thereby continuously feeding the first continuous web 50.

Figure 14:
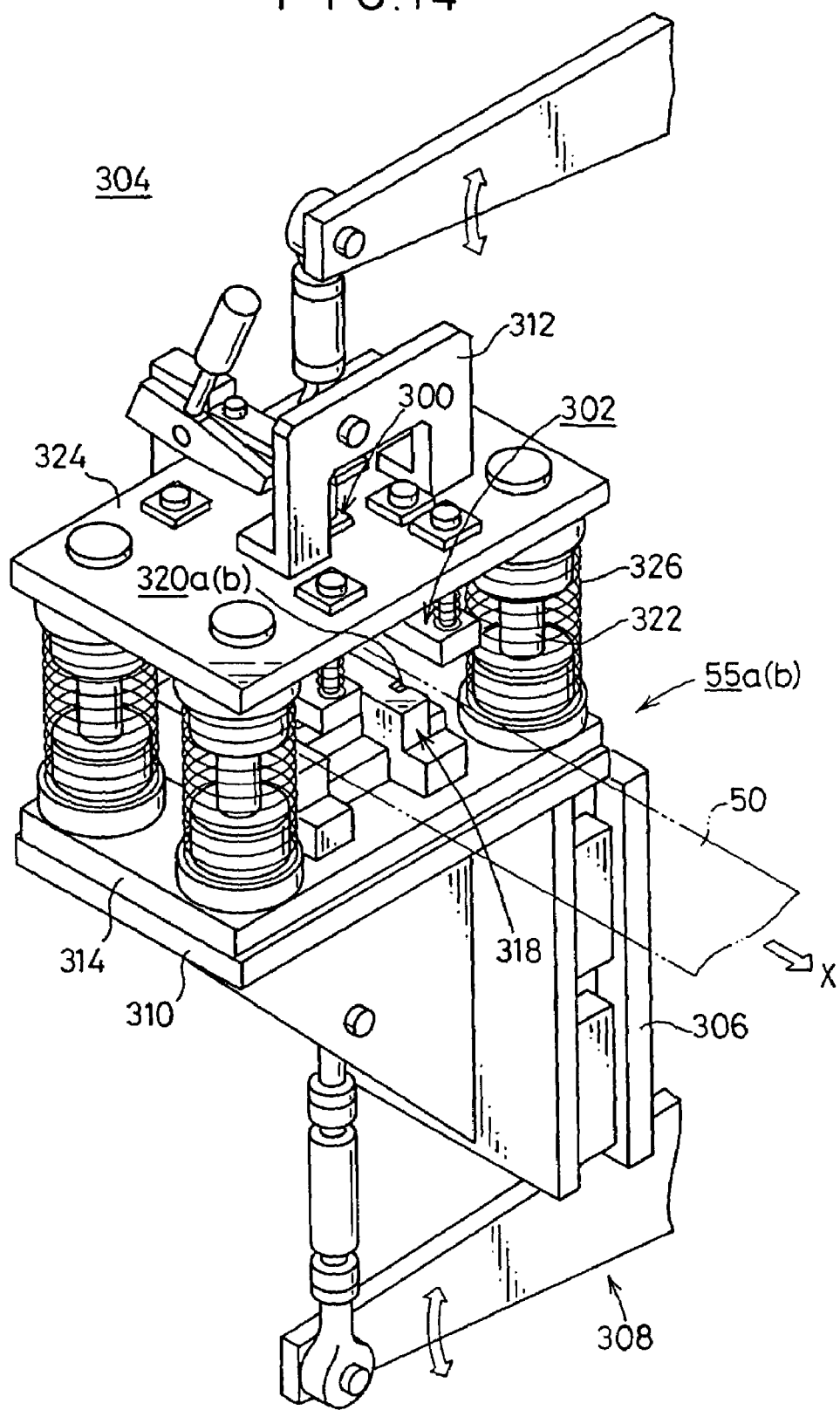
FIG. 14 is a perspective view of a forming machine incorporating a mark forming mechanism and a recess forming mechanism of the manufacturing system.
Figure 15:
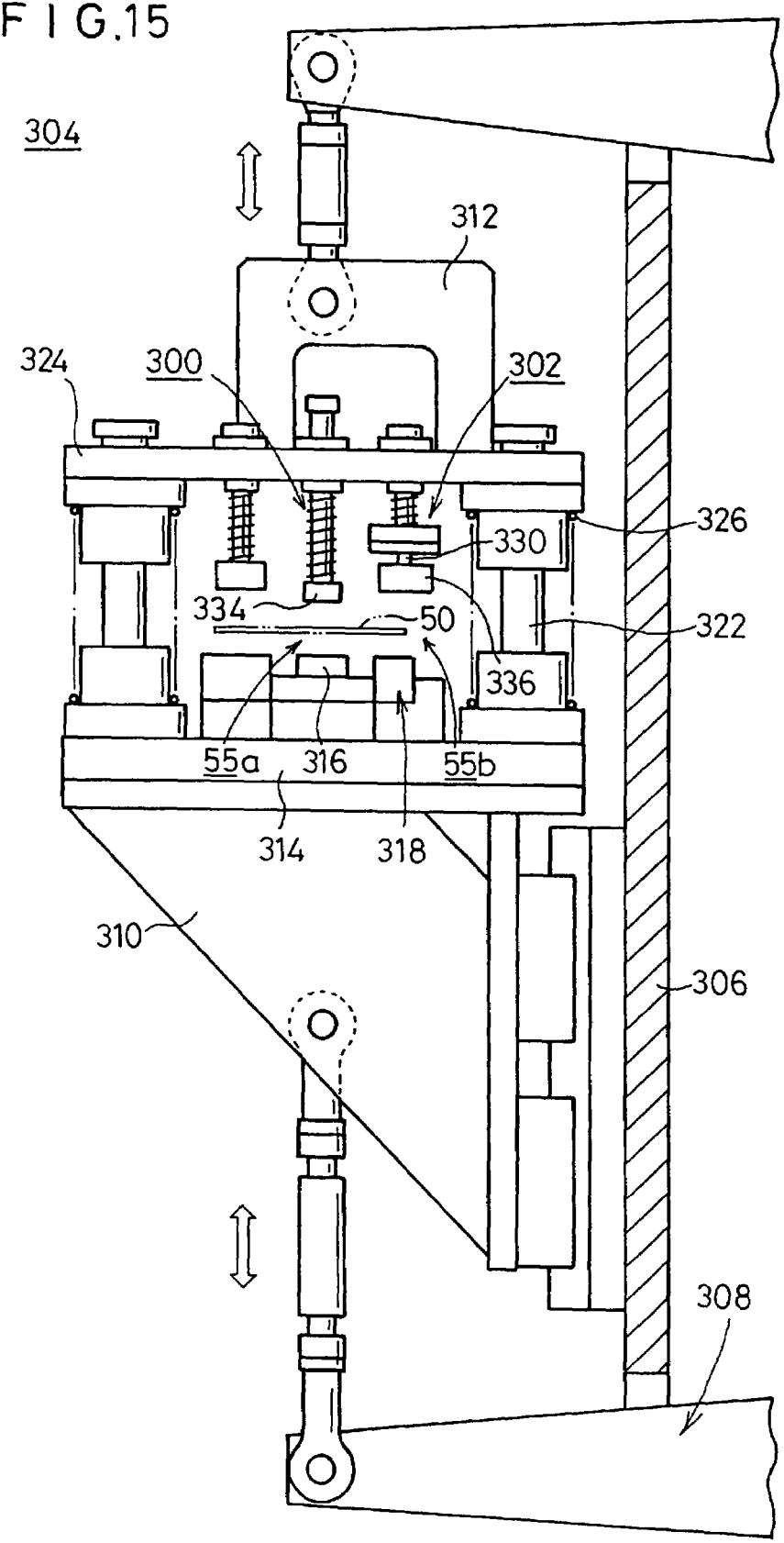
FIG. 15 is a front elevational view, partly in cross section, of the forming machine.
Figure 16:
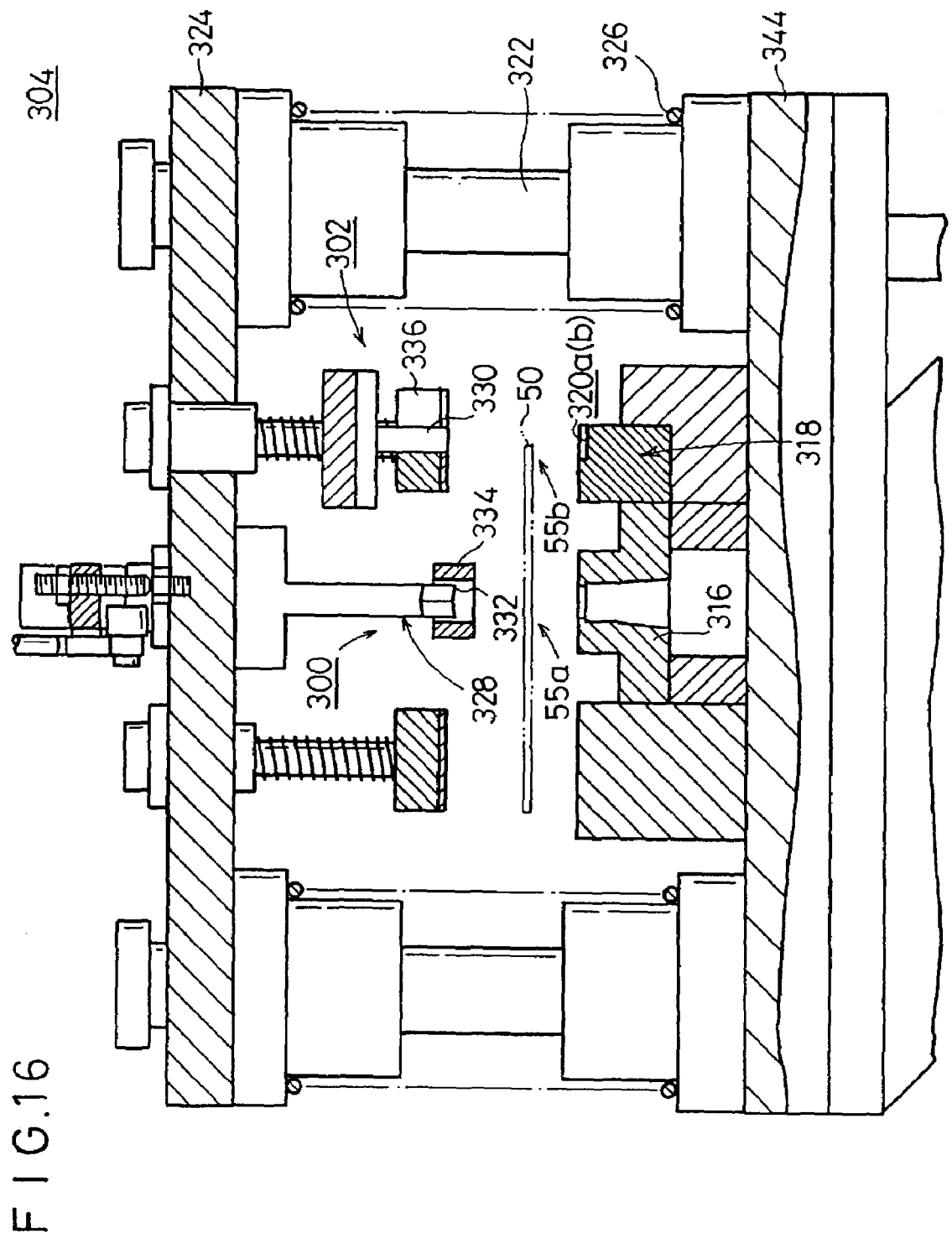
FIG. 16 is a side elevational view, partly in cross section, of the forming machine.

As shown in FIGS. 14 through 16, the mark forming station 55a has a mark forming mechanism 300 for forming the mark 53 on the first continuous web 50 in every other image frame 22. The air hole forming station 55b has a recess forming mechanism 302 for forming the recess 45a. The mark forming mechanism 300 and the recess forming mechanism 302 are combined together in a single forming machine 304.

The forming machine 304 comprises a lower movable base 310 supported on a support base 306 and vertically movable by a drive cam means 308, and an upper movable base 312 vertically movably mounted on the lower movable base 310 and vertically movable with the lower movable base 310 by the drive cam means 308. The lower movable base 310 supports thereon a lower die block 314 which in turn supports thereon a die 316 of the mark forming mechanism 300 and a bearing block 318 of the recess forming mechanism 302 (see FIGS. 17 and 18). The die 316 and the bearing block 318 are fastened in position by screws (not shown). The bearing block 318 includes a blazed carbide tip having grooves 320a, 320b defined therein that are spaced from each other by a distance which is the same as the interval between adjacent recesses 45a.

A plurality of vertical guide bars 322 are fixedly mounted on the lower die block 314 and slidably supported by an upper die block 324. Helical springs 326 are disposed around the respective guide bars 322 between the lower die block 314 and the upper die block 324 (see FIGS. 14 through 16).

Figure 17:
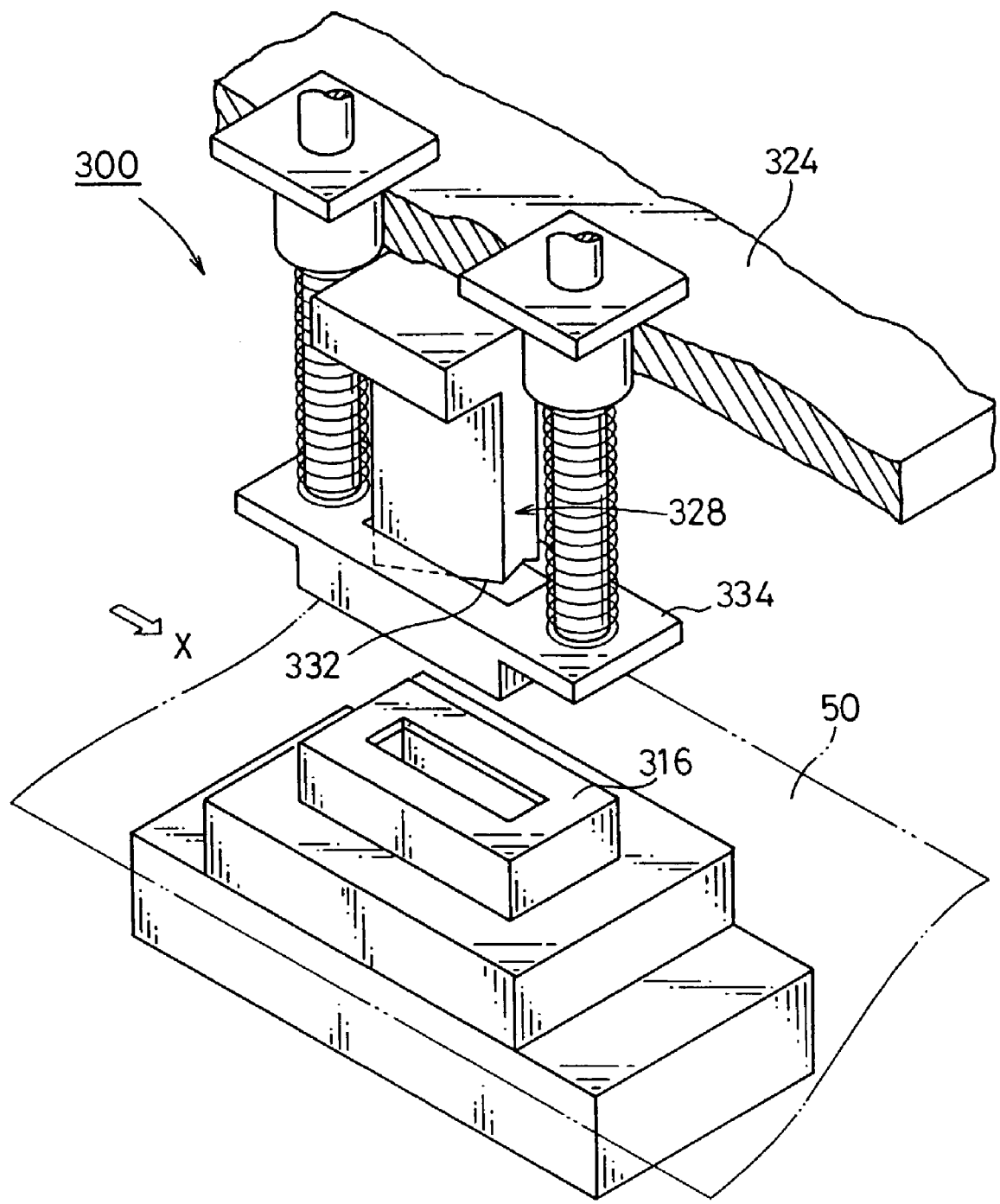
FIG. 17 is a fragmentary perspective view of the mark forming mechanism.

The mark forming mechanism 300 has a mark punch 328 mounted on the upper die block 324, and the recess forming mechanism 302 has air hole punches 330 mounted on the upper die block 324. As shown in FIGS. 17 and 19, the mark punch 328 has a cutting blade 332 with a brazed carbide tip on its lower end. The cutting blade 332 provides an inclined cutting edge that is inclined upwardly in the direction in which the first continuous web 50 is fed. A portion of the inclined cutting edge ranging from the lower end to an intermediate point thereof is actually used to cut into the first continuous web 50. The mark punch 328 is surrounded by a stripper 334 vertically movably mounted on the upper die block 324.

Figure 18:
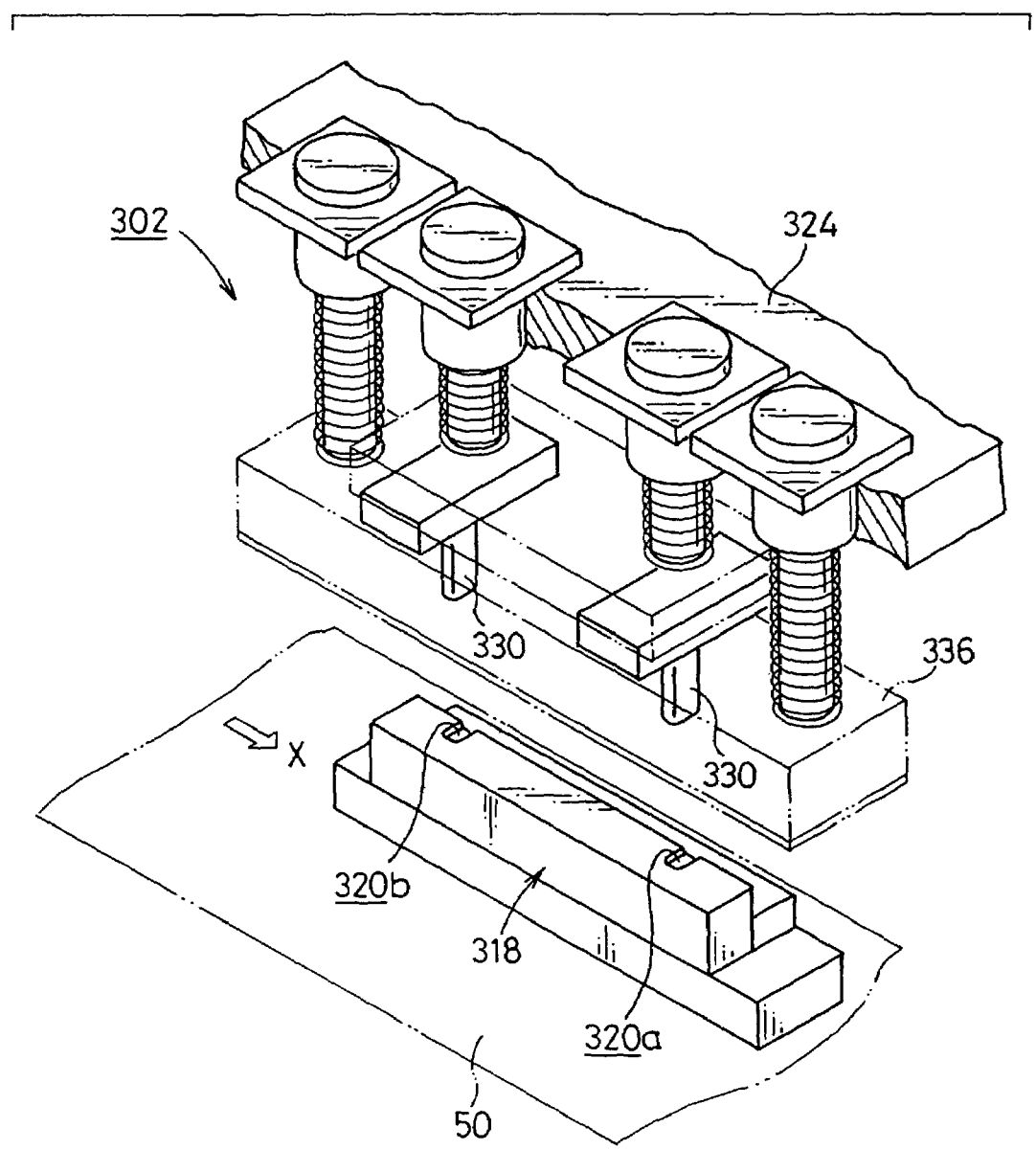
FIG. 18 is a fragmentary perspective view of the recess forming mechanism.

As shown in FIG. 18, the air hole punches 330 are positioned in vertical alignment with the respective grooves 320a, 320b in the bearing block 318. Each of the air hole punches 330 has a tip end whose width is smaller than the width of one of the grooves 320a, 320b by a clearance of about 0.2 mm. A stripper 336 is vertically movably mounted on the upper die block 324 in surrounding relation to the air hole punches 330.

As shown in FIG. 4, the trap attaching station 54 has two rolls of trap webs 42a, 42b positioned in juxtaposed relation to each other. The trap webs 42a, 42b unreeled from the rolls are cut to respective two traps 42 of a predetermined length by an excessive developing liquid holding member supply mechanism 402.

Figure 20:
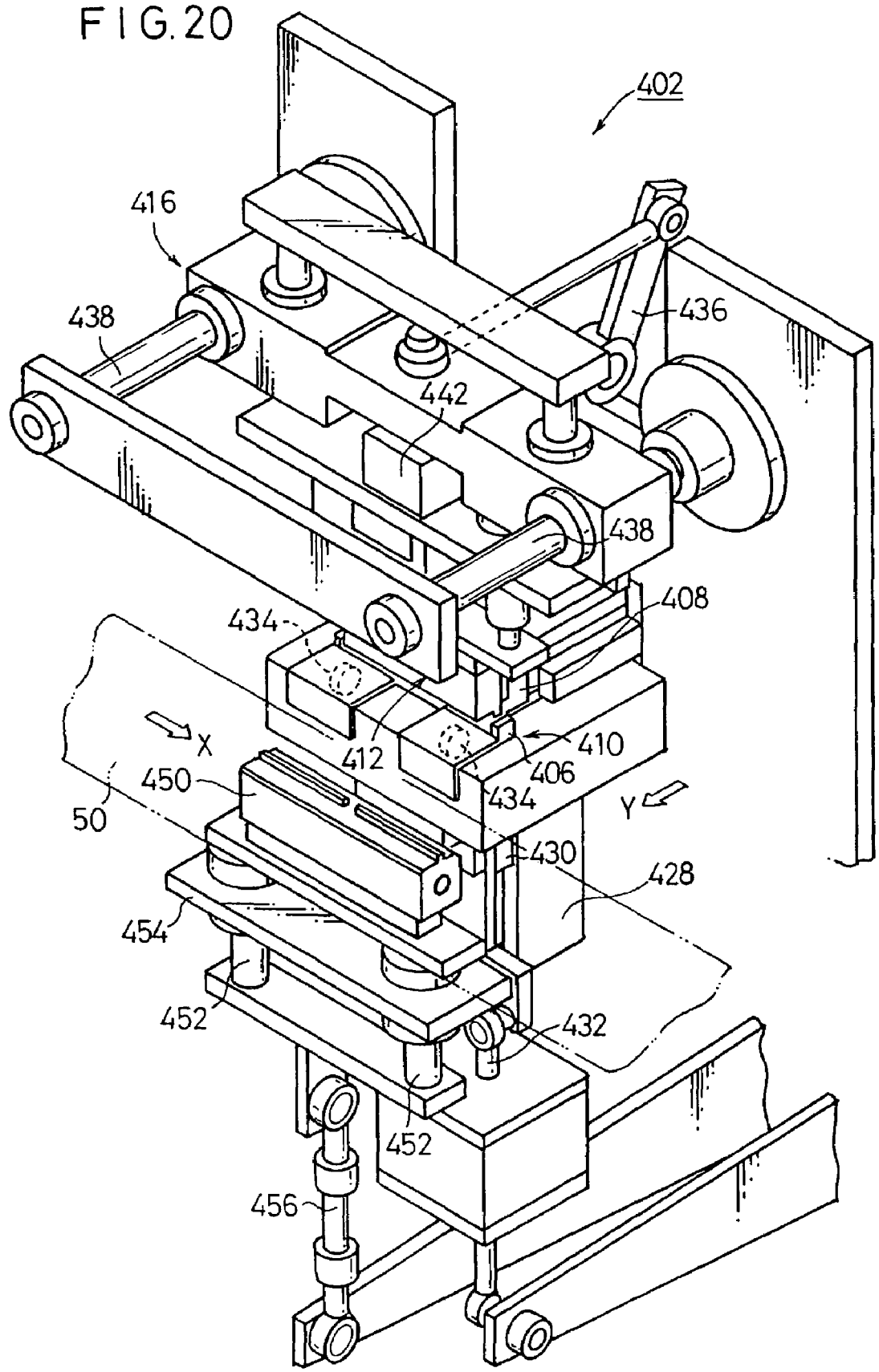
FIG. 20 is a fragmentary perspective view of an excessive developing liquid trap supply mechanism of the manufacturing system.
Figure 21:
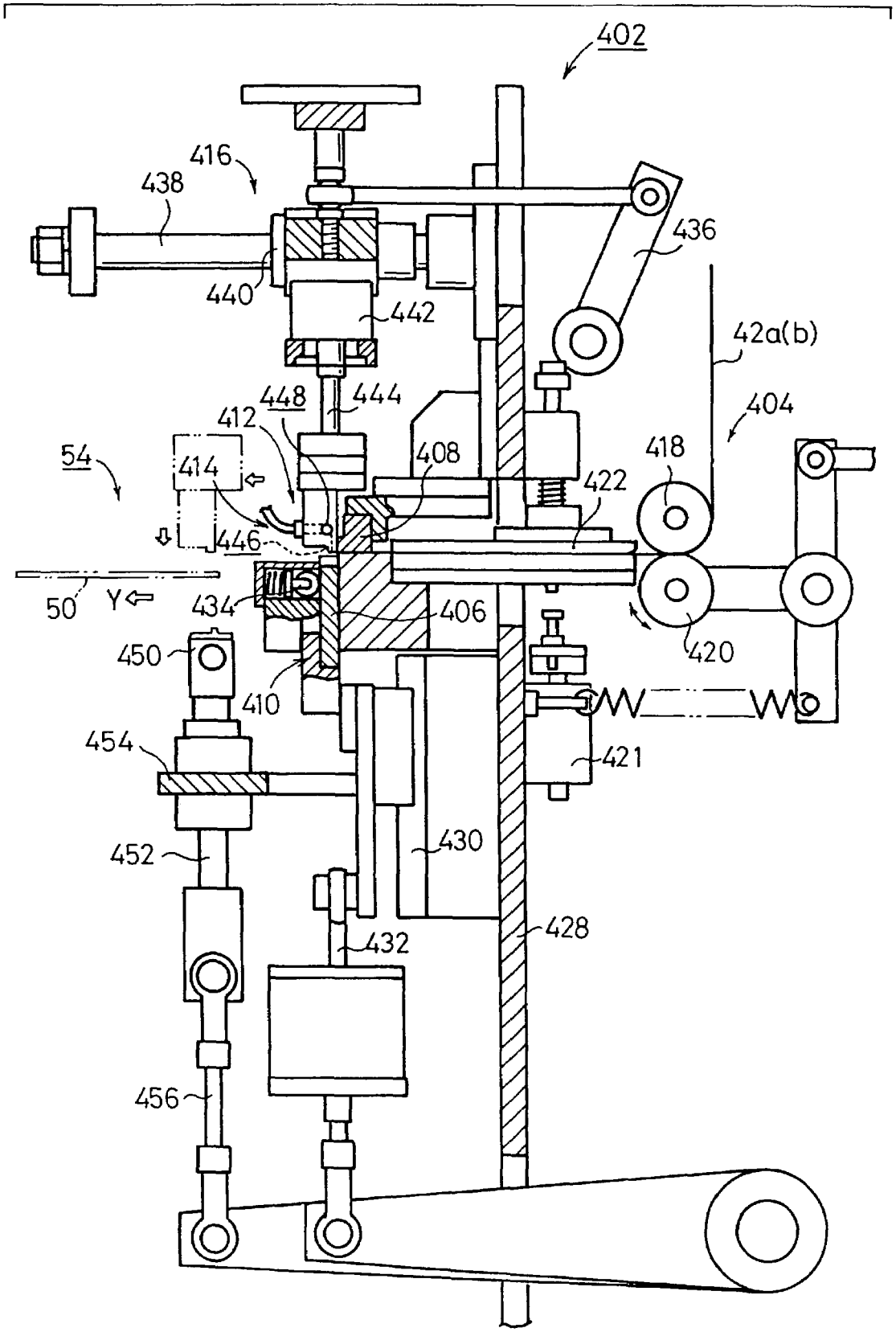
FIG. 21 is a side elevational view, partly in cross section, of the excessive developing liquid trap supply mechanism.
Figure 22:
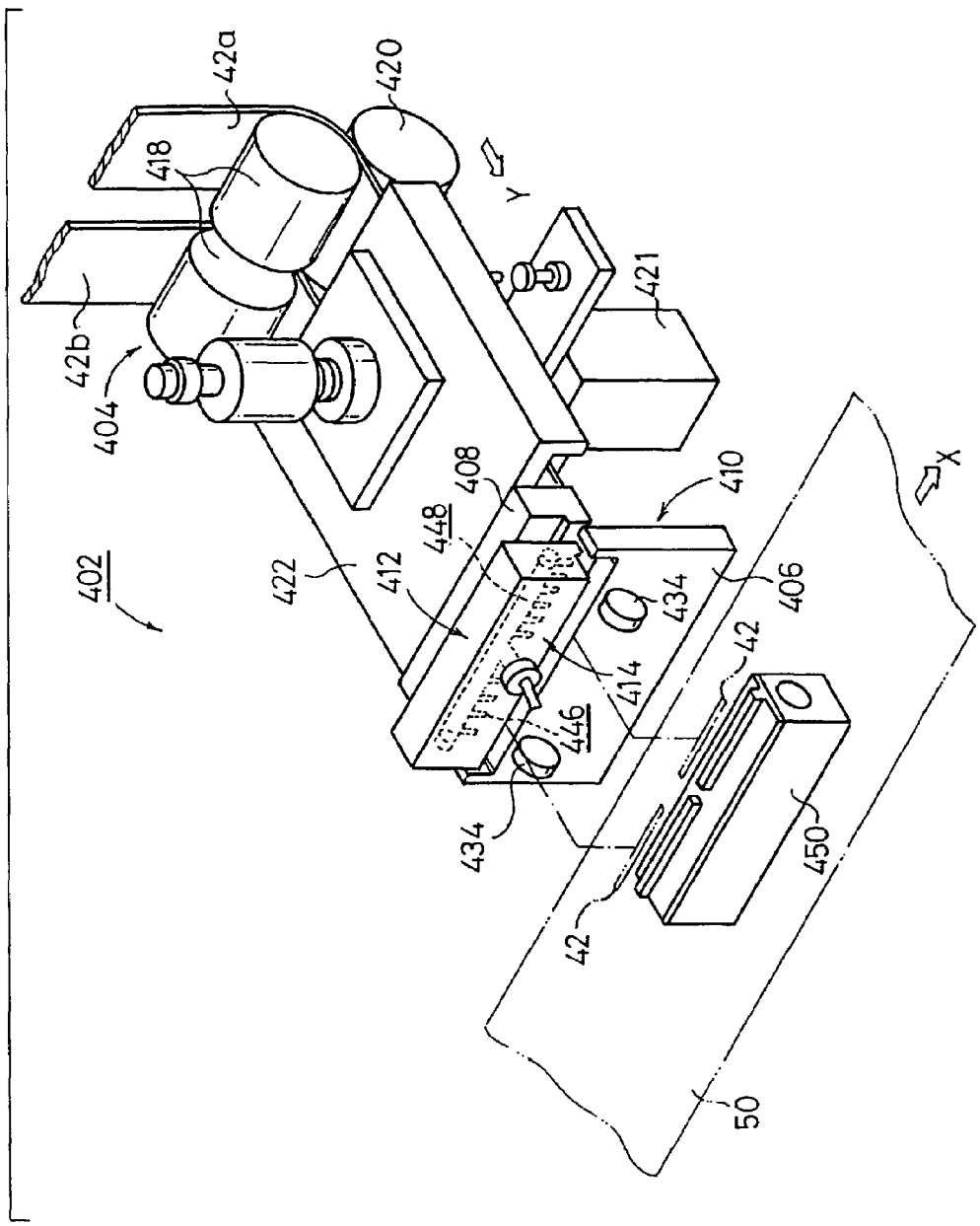
FIG. 22 is a fragmentary perspective view of the excessive developing liquid trap supply mechanism.

As shown in FIGS. 20 through 22, the excessive developing liquid holding member supply mechanism 402 comprises a feed means 404 for feeding the trap webs 42a, 42b unreeled from the rolls to a cutting position, a cutting means 410 having a movable blade 406 and a fixed blade 408 for cutting the trap webs 42a, 42b into respective traps 42, an attracting means 414 formed in a bearing block 412 on the fixed blade 408 and serving as a holding means for holding the cut traps 42, and a moving means 416 for positioning the traps 42 held by the bearing block 412 over the first continuous web 50.

Each of the trap webs 42a, 42b comprises a nonwoven fabric having a thickness of about 700 μm and cut to a desired dimension in the direction indicated by the arrow X, and is wound into a roll. The feed means 404 has a pair of intermittent feed rollers 418 for intermittently feeding the respective trap webs 42a, 42b in the direction indicated by the arrow Y by a distance equal to a length to which the trap webs 42a, 42b are to be cut off, and a nip roller 420 movable toward and away from the feed rollers 418.

The feed means 404 also has a flat guide or stripper 422 disposed downstream of the intermittent feed rollers 418 for flattening the trap webs 42a, 42b, the flat guide 422 being vertically movable by a vertically movable cylinder 421, and a positioning guide 424 for positioning the trap webs 42a, 42b transversely in the direction indicated by the arrow X. The positioning guide 424 has a predetermined width in the direction indicated by the arrow X. If the single trap web 42a is to be cut off, then the width of the positioning guide 424 is set to a dimension which is equal to the sum of the width of the trap web 42a and a dimension h (e.g., h=0.2 mm). If the two trap webs 42a, 42b are to be cut off, then the width of the positioning guide 424 is set to a dimension which is equal to the sum of a dimension corresponding to two pitches in the direction indicated by the arrow X and the dimension h.

Figure 23:
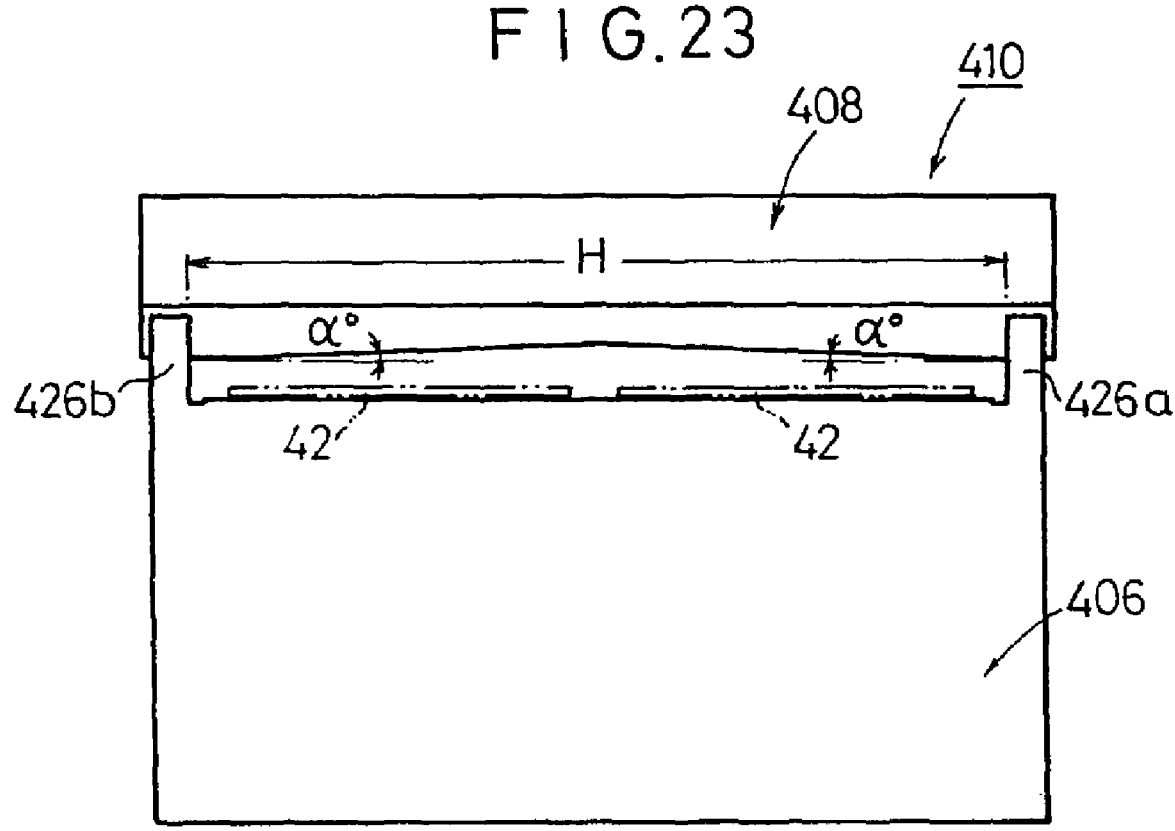
FIG. 23 is a front elevational view of a cutting means.

As shown in FIG. 23, the cutting means 410 is arranged to cut off the trap webs 42a, 42b together, and has a cutting width H which is the same as the width of the positioning guide 424 in the direction indicated by the arrow X. The fixed blade 408 has a shear angle $\alpha°$ (e.g., 2°) by which a lower edge thereof is inclined downwardly from its center toward outer sides thereof, and the movable blade 406 has a pair of spaced guides 426a, 426b projecting upwardly from opposite sides thereof toward the fixed blade 408. As shown in FIG. 21, the movable blade 406 is vertically movable along a linear guide 430 mounted on a support post 428, and is coupled to a cam 432 as an actuator means. Spring-loaded rollers 434 are held against the movable blade 406 for pressing the movable blade 406 against the fixed blade 408.

The moving means 416 has a swing cam 436 operatively coupled to a slide 440 that is movable back and forth along horizontal guide rods 438. To the slide 440, there is fixed a cylinder 442 having a downwardly projecting rod 444 coupled to the bearing block 412. The bearing block 412 has its dimension in the direction indicated by the arrow X, set for attracting and feeding traps 42 over two pitches simultaneously. The attracting means 414 for attracting the trap webs 42a, 42b comprises a plurality of suction holes 446 defined in the bottom of the bearing block 412 and connected to a vacuum source (not shown) via a passage 448 in the bearing block 412.

The trap attaching station 54 has a heater block 450 operable in coaction with the bearing block 412 for bonding the traps 42 attracted to the bearing block 412 to the first continuous web 50 at a given area thereof. The heater block 450 is fixedly mounted on a vertically movable base 454 that is vertically guided by guide bars 452 and coupled to a cam 456 for vertical movement.

Figure 24:
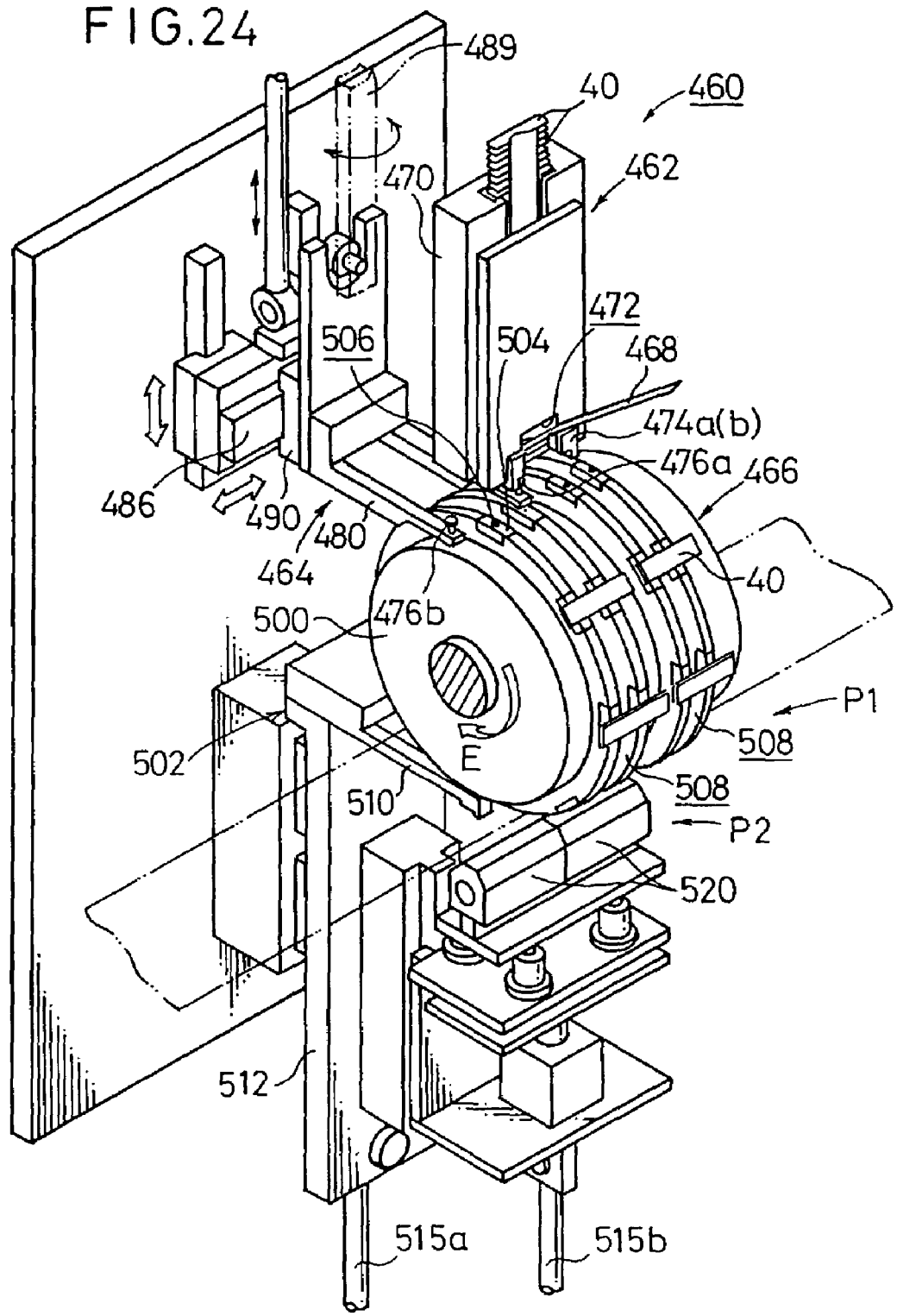
FIG. 24 is a perspective view of a developing liquid container supply mechanism of the manufacturing system.
Figure 25:
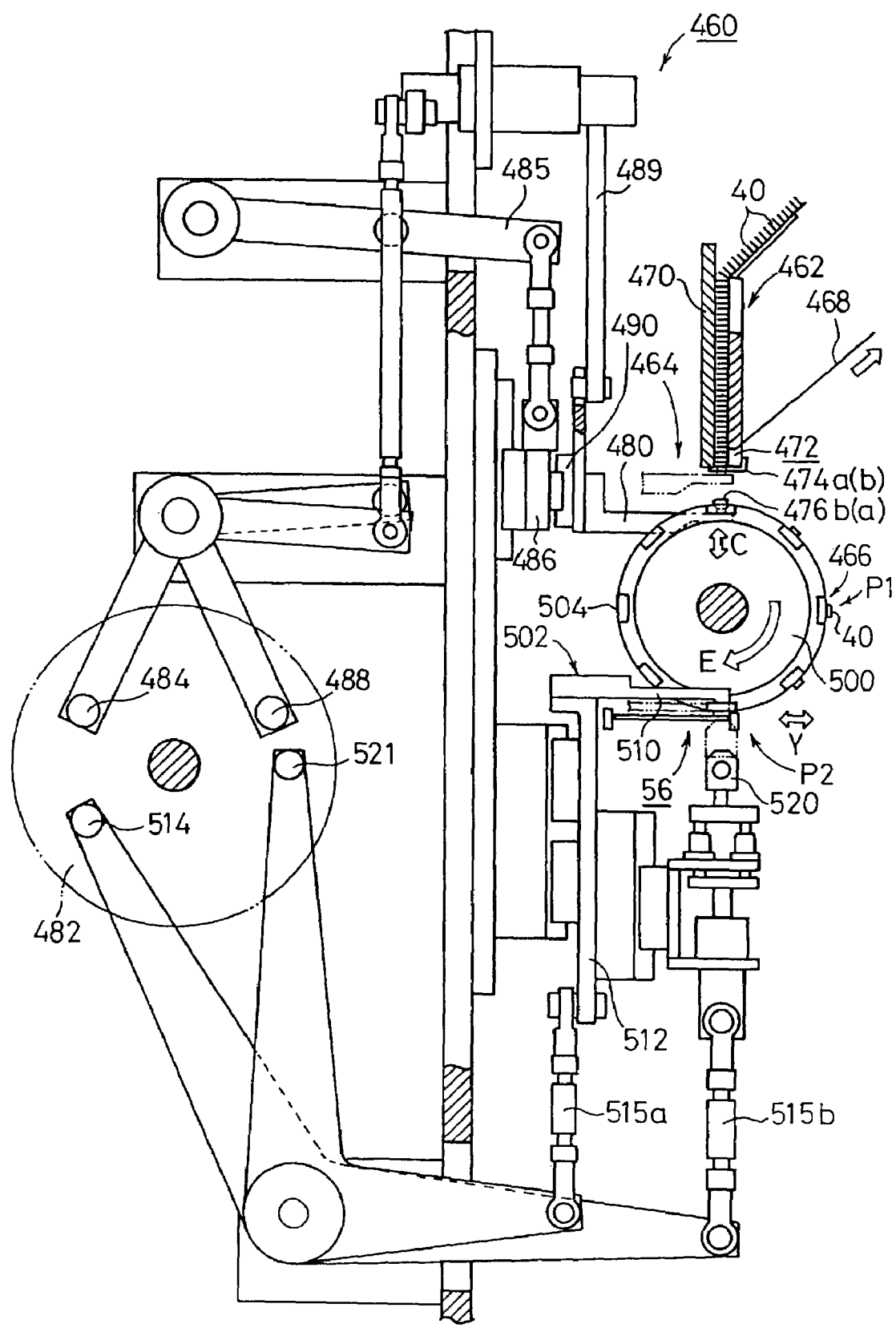
FIG. 25 is a side elevational view of the developing liquid container supply mechanism.
Figure 26:
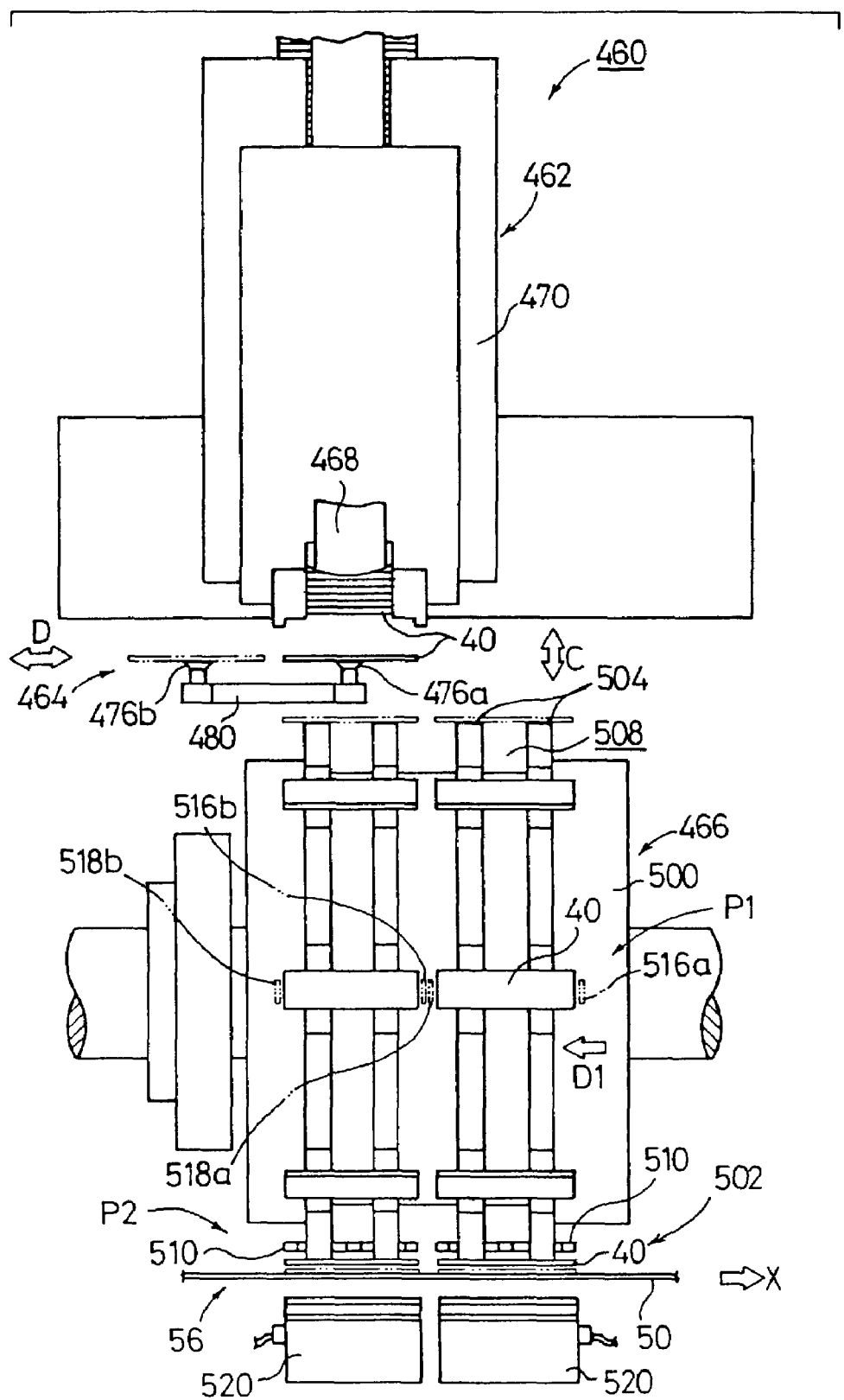
FIG. 26 is a front elevational view of the developing liquid container supply mechanism.

The pod attaching station 56 has a developing liquid container supply mechanism 460 for simultaneously supplying two developing liquid pods 40 at a time to the first continuous web 50. As shown in FIGS. 24 through 26, the developing liquid container supply mechanism 460 comprises a single arraying means 462 for holding a plurality of developing liquid pods 40, a removing means 464 for removing a certain number of developing liquid pods 40 from the arraying means 462, and a supply means 466 for holding a number of developing liquid pods 40 from the removing means 464 and supplying the developing liquid pods 40 to a given area of the first continuous web 50.

The arraying means 462 has a cassette 470 for holding a vertical array of developing liquid pods 40 each having an end bonded to a tape 468, the cassette 470 having an opening 472 defined therein for removing the tape 468 as it is separated from the developing liquid pods 40. The cassette 470 also has a pair of fingers 474a, 474b disposed in a lower portion thereof for preventing the developing liquid pods 40 from dropping out of the cassette 470.

The removing means 464 has a pair of suction cups 476a, 476b for attracting and holding developing liquid pods 40 held by the arraying means 462, and a moving mechanism 478 for moving the suction cups 476a, 476b in unison in the vertical direction indicated by the arrow C and the horizontal direction indicated by the arrow D. The moving mechanism 478 has arms 480 supporting the suction cups 476a, 476b respectively thereon. The arms 480 can be moved vertically by a cam 482, a cam follower 484, a vertically swingable link 485, and a vertically movable base 486, and can also be moved horizontally by the cam 482, a cam follower 488, a horizontally swingable link 489, and a slide base 490.

The supply means 466 comprises a suction drum 500 rotatable about its own horizontal axis with developing liquid pods 40 attracted to its outer circumferential surface, and a remover 502 for feeding developing liquid pods 40 attracted to the outer circumferential surface of the suction drum 500 to the given area of the first continuous web 50. The suction drum 500 is substantially octagonal in cross-sectional shape, and has four parallel outer circumferential surfaces each having eight attracting facets 504. Each of the attracting facets 504 has a plurality of suction holes 506 defined therein which are connected to a vacuum source (not shown).

The suction drum 500 is intermittently rotatable a given angle about its own axis in the direction indicated by the arrow E by a motor (not shown), through five stations from the position in which the suction drum 500 receives developing liquid pods 40 from the arraying means 462 to the position in which the suction drum 500 delivers the developing liquid pods 40 to the first continuous web 50. The attracting facets 504 on the suction drum 500 comprise axially aligned attracting facets 504 which are combined in two pairs, and the attracting facets 504 in each pair are axially spaced from each other, with clearance grooves 508 defined therebetween for inserting therein the arms 480 of the removing means 464.

The remover 502 have scraper bars 510 disposed in sandwiching relation to each of the attracting facets 504 and fixedly mounted on a vertically movable base 512, which is vertically movable by the cam 482, a cam follower 514, and a link 515a, as shown in FIG. 25. As shown in FIG. 26, on a side of the suction drum 500, there are disposed movable positioning pins 516a, 516b, and stoppers 518a, 518b disposed at the other ends of the developing liquid pods 40 for abutting against ends of developing liquid pods 40 attracted to those vertical attracting facets 504 to position the developing liquid pods 40 longitudinally.

Heat sealers 520 operable in coaction with the remover 502 for bonding developing liquid pods 40 to the first continuous web 50 are disposed below the suction drum 500. The heat sealers 520 are vertically movable with respect to the vertically movable base 512 by the cam 482, a cam follower 521, and a link 515b (see FIG. 25). Stoppers (not shown) are disposed on the outer circumference of the suction drum 500 for contacting longitudinal sides of the developing liquid pods 40 attracted to the attracting facets 504 to position the developing liquid pods 40.

As shown in FIG. 5, the dark chamber 94 extends from opposite sides of the bright chamber 92 to a position above the bright chamber 92. A light shielding mechanism 610 for shielding light from the bright chamber 92 against entry into the dark chamber 94 is disposed downstream of the mark detecting station 57a.

Figure 27:
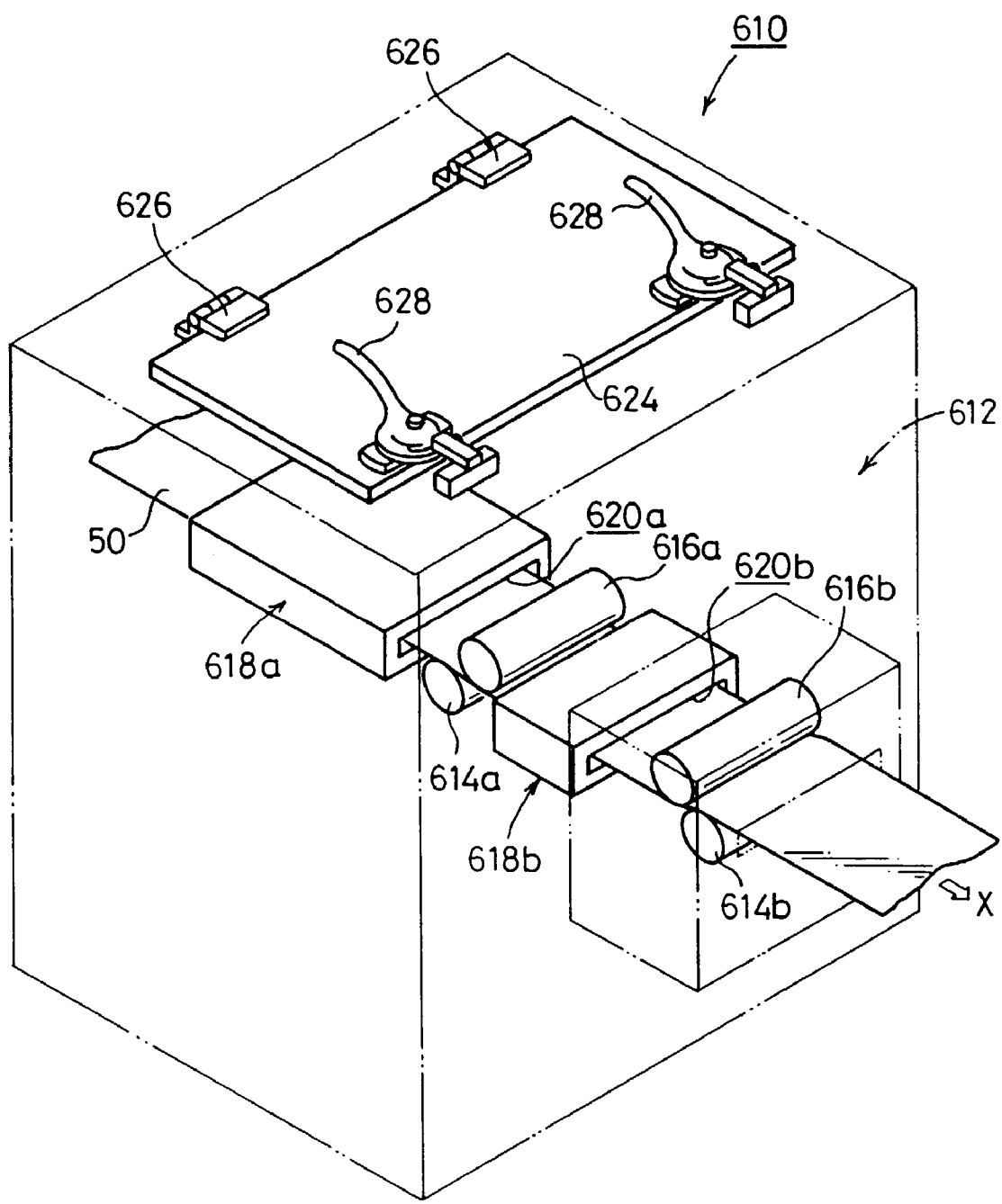
FIG. 27 is a perspective view of a light shielding mechanism of the manufacturing system.
Figure 28:
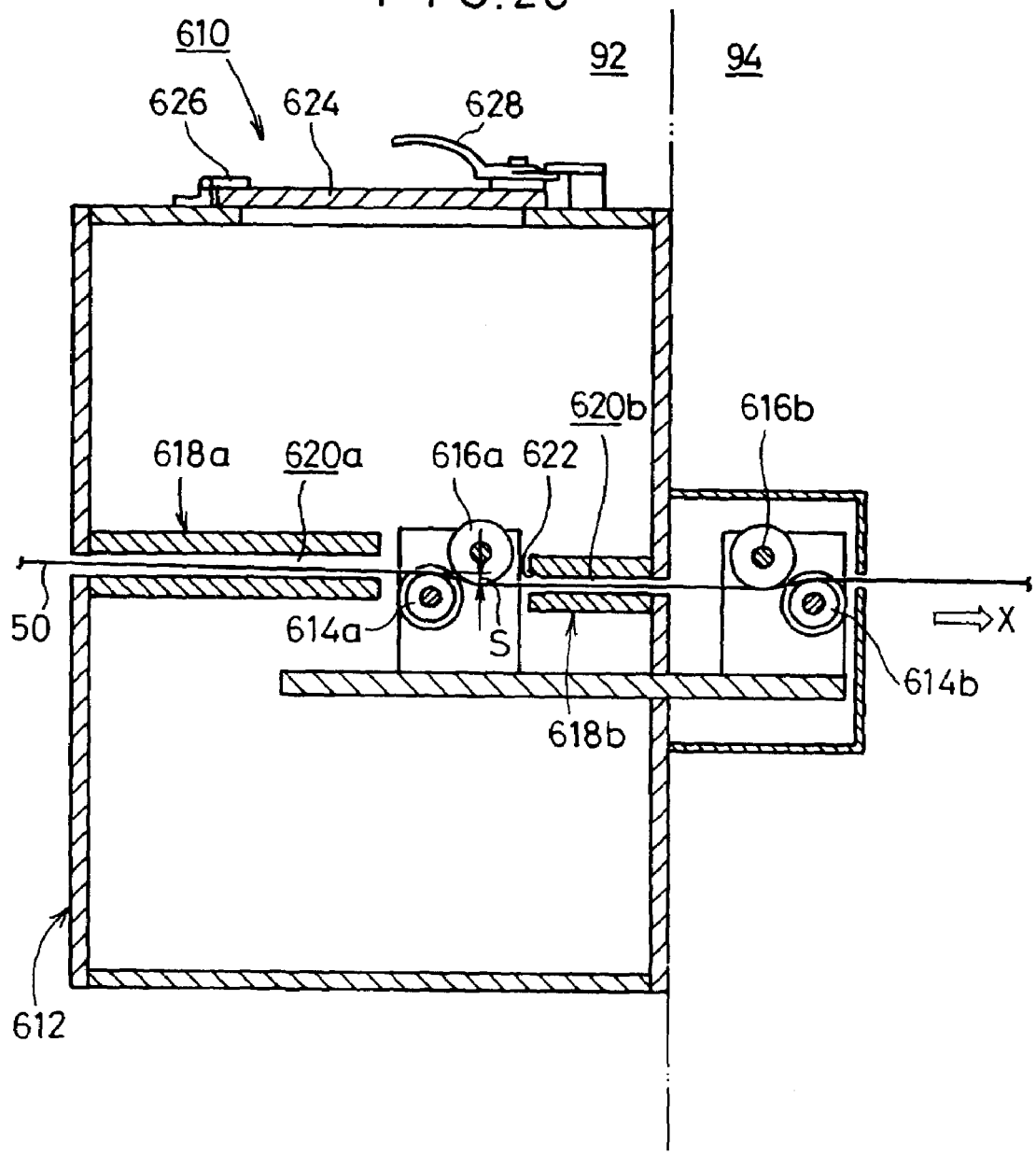
FIG. 28 is a vertical cross-sectional view of the light shielding mechanism.

As shown in FIGS. 27 and 28, the light shielding mechanism 610 has a light shielding box 612 disposed at an inlet of the dark chamber 94. The light shielding box 612 houses therein first path rollers 614*a*, 614*b* supporting the lower side of the first continuous web 50, and second path rollers 616*a*, 616*b* supporting the upper side of the first continuous web 50 in lapping relation to the first path rollers 614*a*, 614*b*.

The first and second path rollers 614*a*, 616*a* have respective circumferential surfaces lapping the opposite surfaces of the first continuous web 50, producing a light shielding step S in the first continuous web 50. The light shielding step S has a height ranging from 3 mm to 7 mm. The first and second path rollers 614*b*, 616*b* are similarly arranged. The light shielding box 612 has a slit web chute 618*a* disposed upstream of the first and second path rollers 614*a*, 616*a* and a slit web chute 618*b* disposed downstream of the first and second path rollers 614*b*, 616*b*. The web chutes 618*a*, 618*b* have respective slit passages 620*a*, 620*b* defined therein. The web chute 618*b* has a guidance tapered surfaces 622 positioned at an inlet of the slit passage 620*b*.

Developing liquid pods 40 and traps 42 have been bonded to the first continuous web 50 that is introduced into the light shielding box 612. The first and second path rollers 614*b*, 616*b* and the first and second path rollers 614*b*, 616*b* are arranged to bend the first continuous web 50 along a small curvature and in a small range for thereby preventing the developing liquid pods 40 and traps 42 from being peeled off the first continuous web 50. The first and second path rollers 614*b*, 616*b* and the first and second path rollers 614*b*, 616*b* have their lengths selected to be spaced from the developing liquid pods 40 and traps 42 on the first continuous web 50. A light shielding door 624 is openably and closably mounted on an upper panel of the light shielding box 612 by a hinge 626. The light shielding door 624 can be locked in a closed position on the light shielding box 612 by a handle 628.

Figure 29:
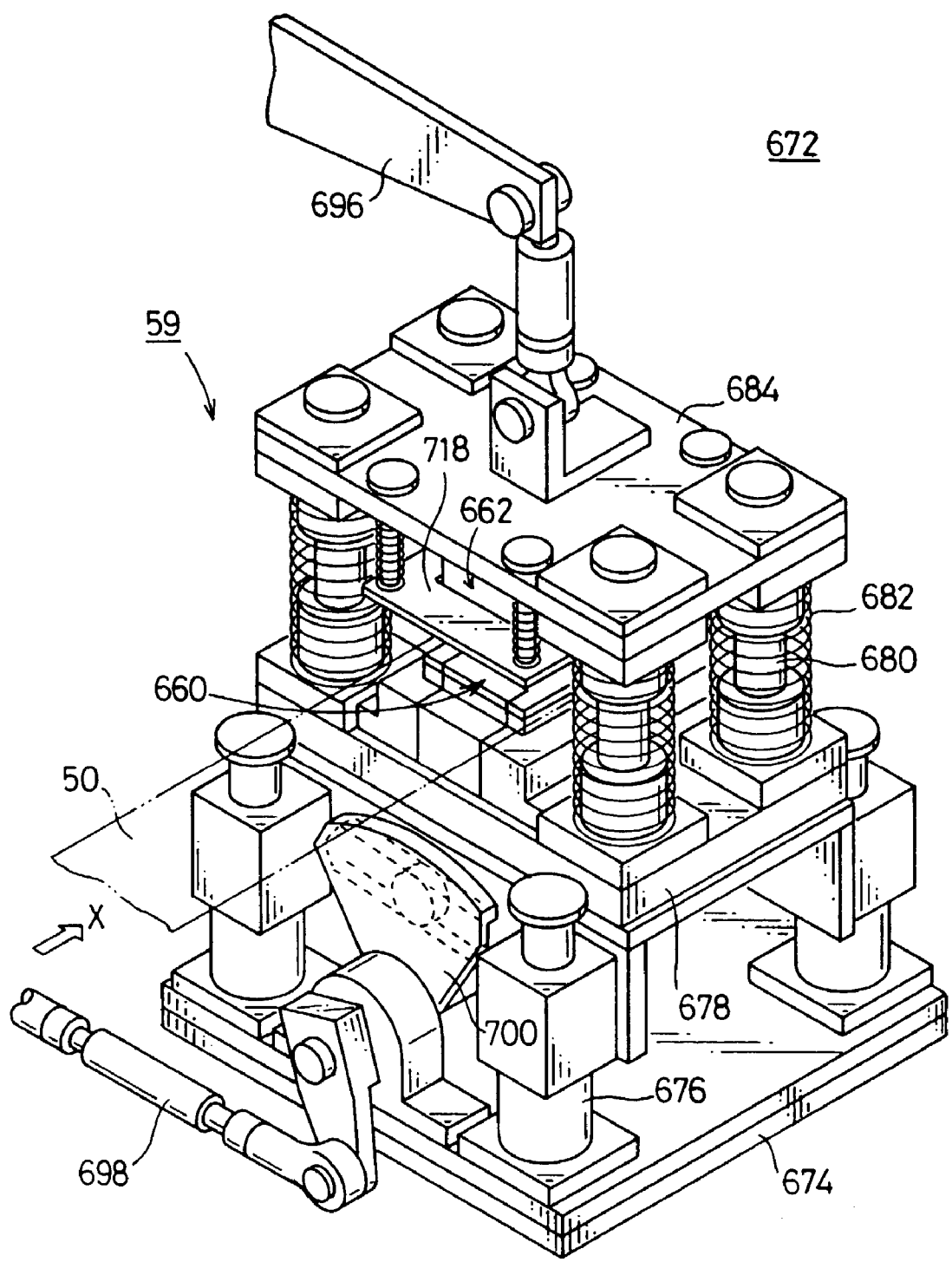
FIG. 29 is a perspective view of an image frame forming machine of the manufacturing system.
Figure 30:
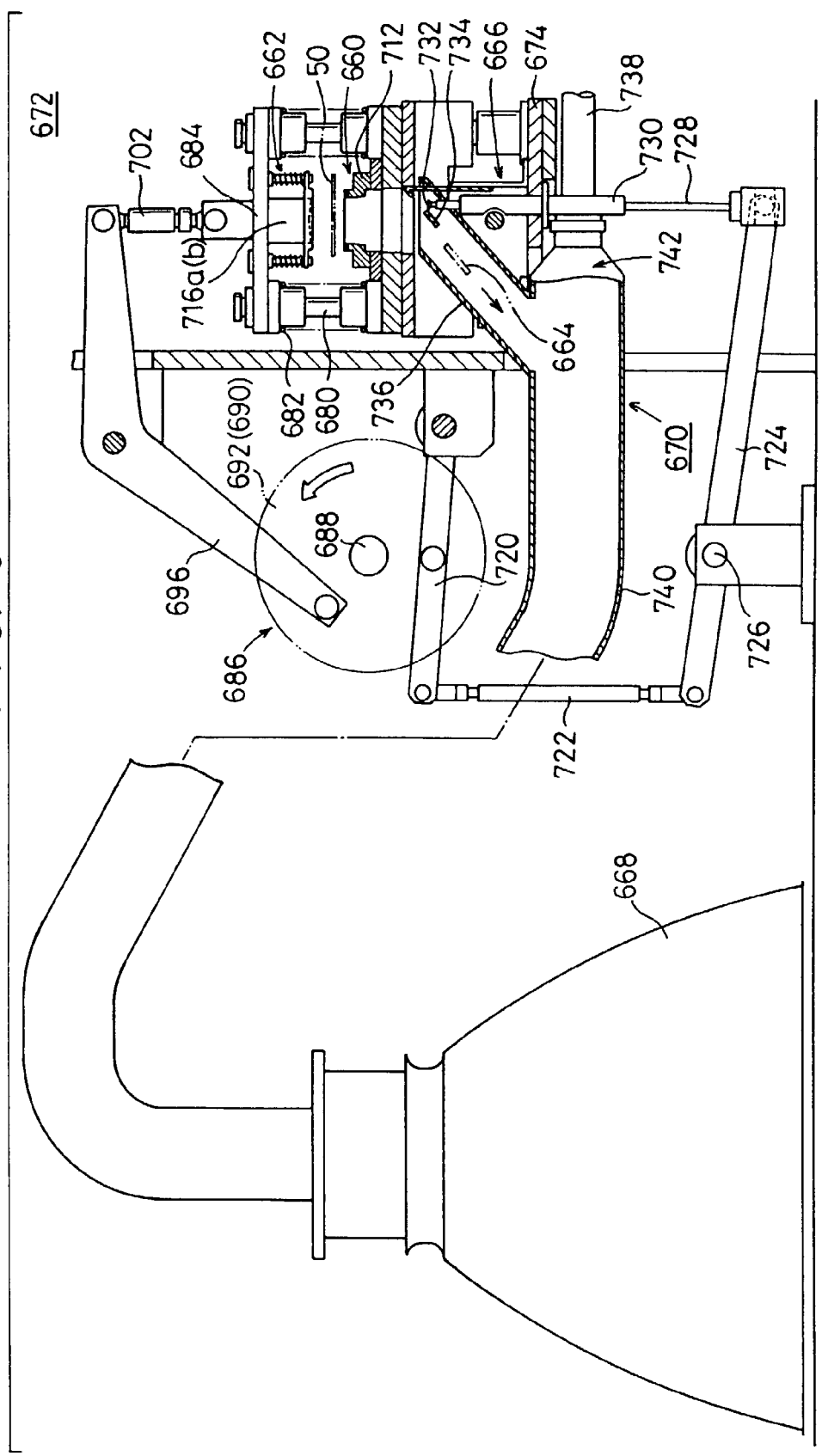
FIG. 30 is a front elevational view, partly in cross section, of the image frame forming machine.

As shown in FIGS. 29 and 30, the punching station 59 comprises a first punching die 660 and a second punching die 662 disposed in confronting relation to each other for simultaneously forming two image frames 22 on the first continuous web 50, an attracting feed mechanism 666 for attracting debris or scrap 664 punched out of the first continuous web 50 and forcibly dropping the debris 664, and a retrieving mechanism 670 for retrieving the debris 664 into a stock chamber 668 with an air flow.

The first and second punching dies 660, 662 are incorporated in an image frame forming machine 672 that includes a table 674 on which a lower die base 678 is vertically movably supported by guides 676. An upper die base 684 is vertically supported on the lower die base 678 by guide bars 680 and springs 682. The lower die base 678 and the upper die base 684 are movable toward and away from each other by an actuating mechanism 686. The actuating mechanism 686 has a drive shaft 688 coupled to an actuator (not shown) and rotatable thereby in the direction indicated by the arrow. Cam plates 690, 692 are fixed to the drive shaft 688.

As shown in FIG. 31, a lower link 694 and an upper link 696 have ends operatively coupled to the cam plate 690, and are swingably supported on the table 674. The lower link 694, which is of a substantially sectorial shape, is coupled to a swing plate 700 by a rod 698 for angularly moving the swing plate 700 about a pivot on the table 674. A cam 701 on the lower die base 678 engages the swing plate 700 near its swingable distal end. The upper link 696 serves as a swing arm and has an end which supports the upper die base 684 via a rod 702.

Figure 32:
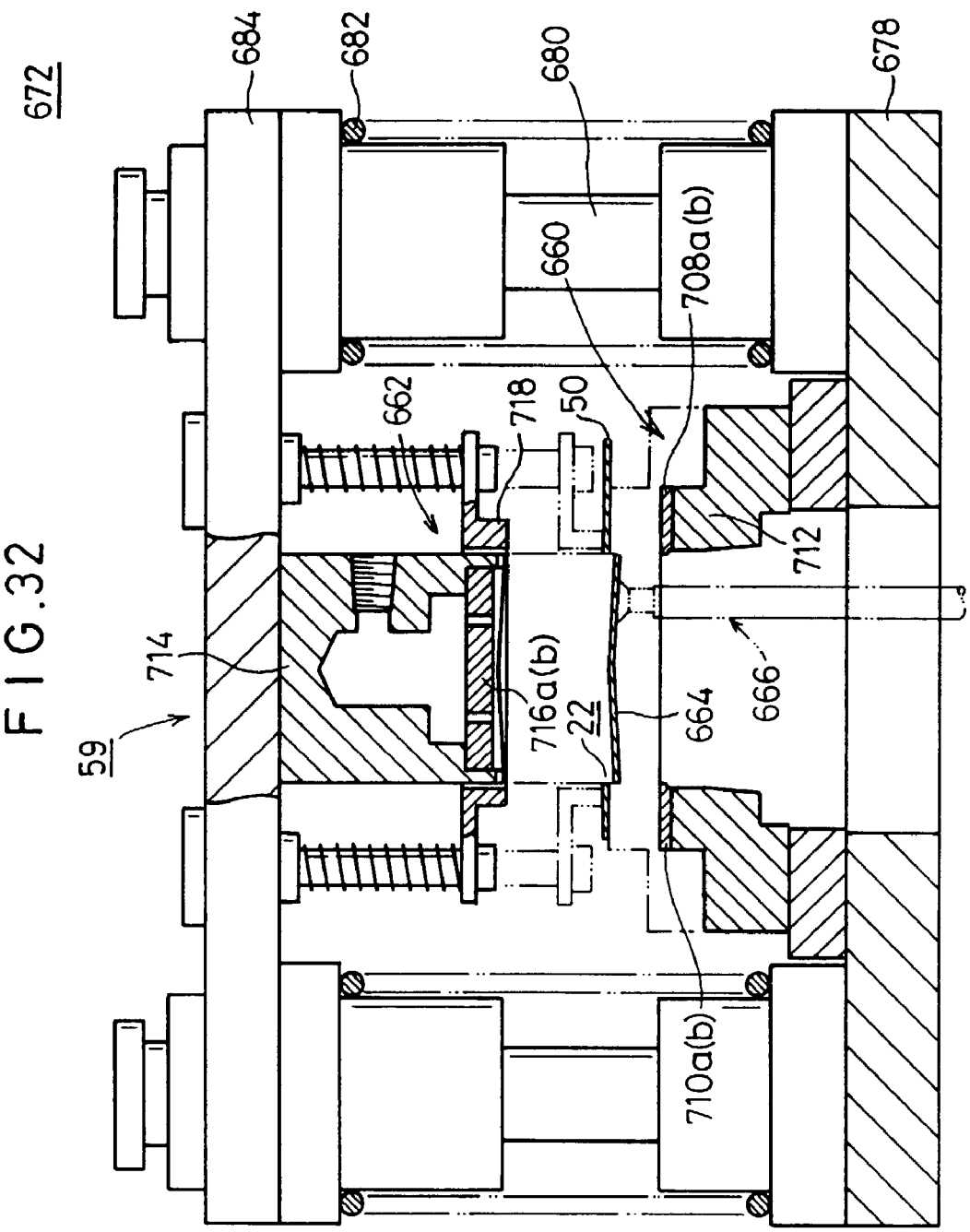
FIG. 32 is a cross-sectional view of a portion of the image frame forming machine.

As shown in FIGS. 32 and 33, the first punching die 660 comprises a first cutting blade 704 of a double-edge structure positioned between two areas corresponding to two adjacent image frames 22, for forming first sides 22*a* of the two image frames 22, second and third cutting blades 706*a*, 706*b* positioned in alignment with areas corresponding to second sides 22*b* that confront the first sides 22*a* of the two image frames 22, fourth and fifth cutting blades 708*a*, 708*b* positioned in alignment with areas corresponding to third sides 22*c* of the two image frames 22 which extend transversely to the first sides 22*a*, and sixth and seventh cutting blades 710*a*, 710*b* positioned in alignment with areas corresponding to fourth sides 22*d* of the two image frames 22 which confront the third sides 22*c*. The first through seventh cutting blades 704, 706*a*, 706*b*, 708*a*, 708*b*, 710*a*, 710*b* are positionally adjustably fastened by screws to a die block 712 that is fixedly mounted on the lower die base 678.

The second punching die 662 is mounted on the upper die base 684 by a die block 714. The second punching die 662 has first and second punches 716*a*, 716*b* of a rectangular shape for simultaneously forming two image frames 22 on the first continuous web 50. The first and second punches 716*a*, 716*b* are surrounded by a stripper 718 vertically movably supported under the upper die base 684.

As shown in FIG. 30, the attracting feed mechanism 666 includes the cam plate 692 of the actuating mechanism 686, and has a first swing link 720 operatively coupled to the cam plate 692. The first swing link 720 has an end supported on the table 674 and an opposite end coupled to an end of a second swing link 724 by a rod 722. The second swing link 724 is swingably supported by a pivot shaft 726 and has its opposite end coupled to lower ends of a pair of vertically movable rods 728 which extend vertically. Each of the vertically movable rods 728 is vertically movably supported on the table 674 by a linear guide 730, and supports on its upper end a suction pad (suction mechanism) 732 connected to a vacuum source (not shown).

Figure 34:
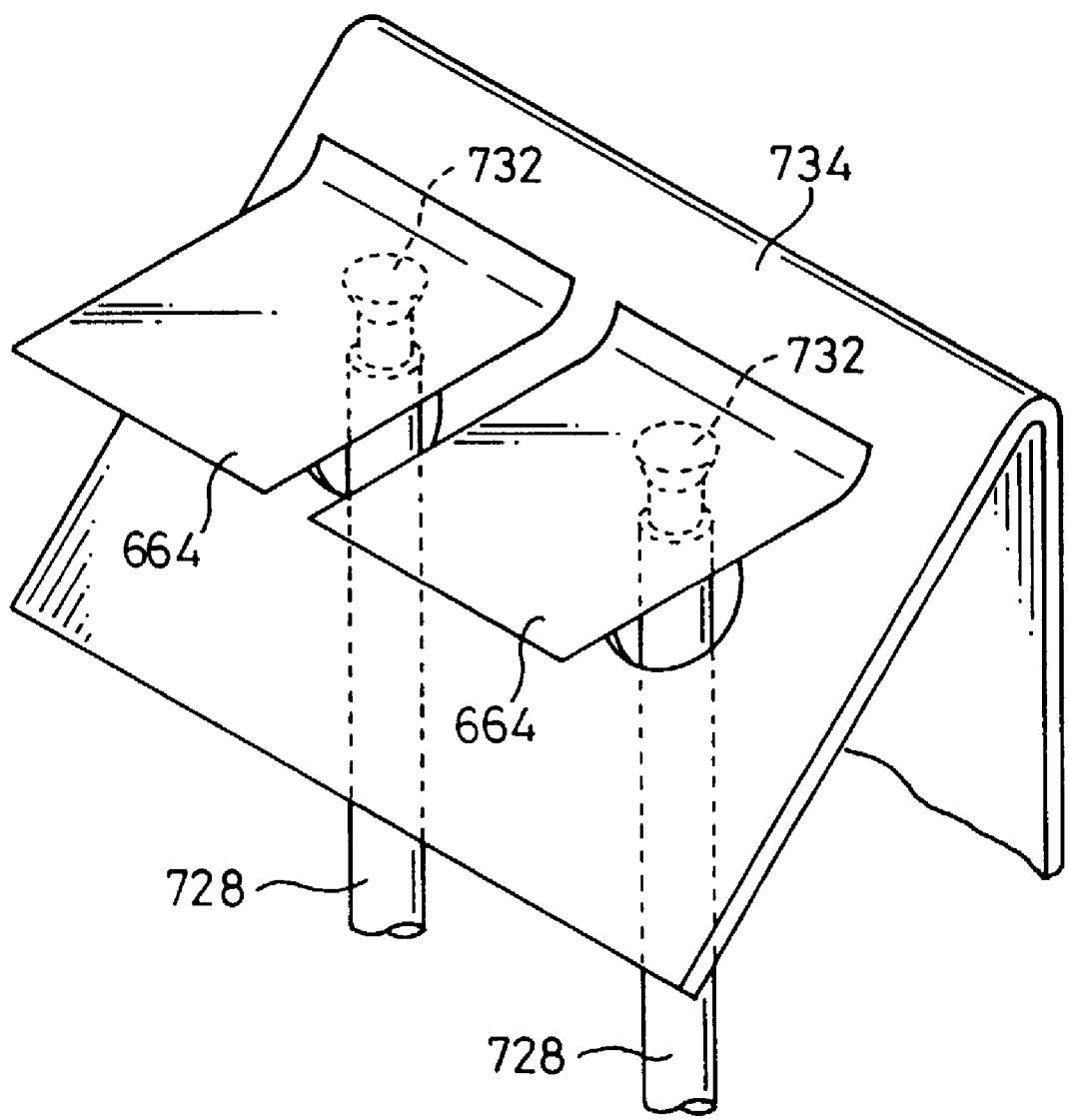
FIG. 34 is a perspective view of an attractive feeding mechanism.

As shown in FIG. 34, the vertically movable rods 728 and hence the suction pads 732 are laterally spaced from each other. The vertically movable rods 728 extend through a stopper 734 which engage the debris 664 attracted to the suction pads 732 and removes the debris 664 from the suction pads 732 upon downward movement of the vertically movable rods 728.

As shown in FIG. 30, the retrieving mechanism 670 comprises a suction pipe 736 in which the stopper 734 is disposed, an air supply pipe 738 connected to a compressed air source (not shown), and a feed pipe 740 extending from the air supply pipe 738 toward the stock chamber 668 and having a diameter greater than the diameter of the air supply pipe 738, the suction pipe 736 being joined to the feed pipe 740. The suction pipe 736, the air supply pipe 738, and the feed pipe 740 jointly make up an ejector means 742.

As shown in FIG. 5, a photosensitive sheet supply unit 809 for unreeling the second continuous web 58 from a roll is disposed in the dark chamber 94 upstream of the bright chamber 92. The second continuous web 58 supplied from the photosensitive sheet supply unit 809 is delivered over the mask sheet supply unit 96 to the first joining station 62. An undersheet supply unit (light unshielded member supply station) 810 for supplying the continuous sheet 60 as a light unshielded member is disposed in the bright chamber 92 above the first joining station 62. A rail supply unit (rail supply mechanism and light unshielded member supply station) 812 for supplying a pair of rails 65 to the second heat-bonding station 66 is disposed downstream of the under-sheet supply unit 810. A cover sheet supply unit (light unshielded member supply station) 814 for supplying a third continuous sheet 268 as a light unshielded member to the second joining station 70 is disposed downstream of the rail supply unit 812.

Figure 35:
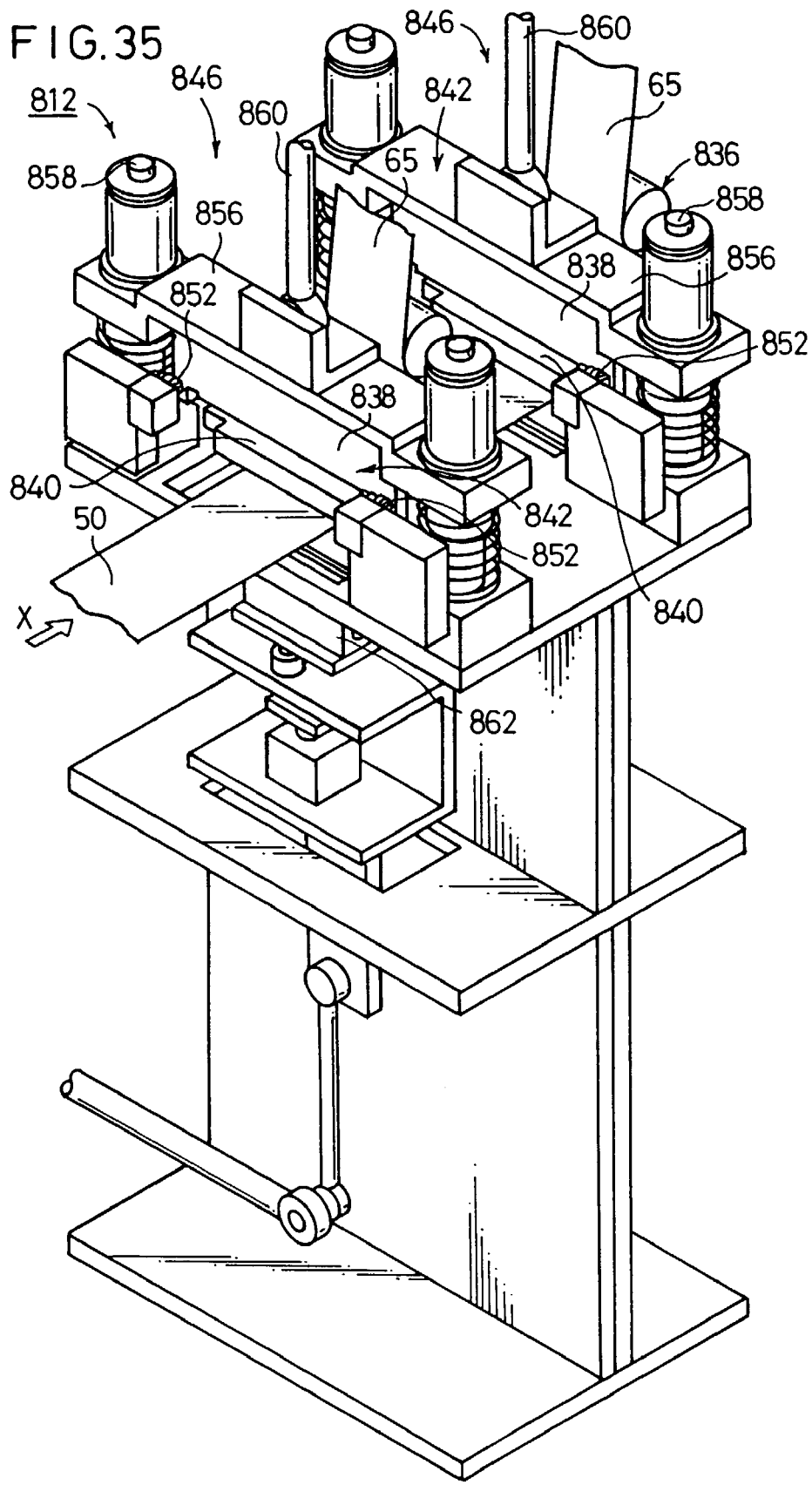
FIG. 35 is a schematic perspective view of a rail supply unit of the manufacturing system.
Figure 36:
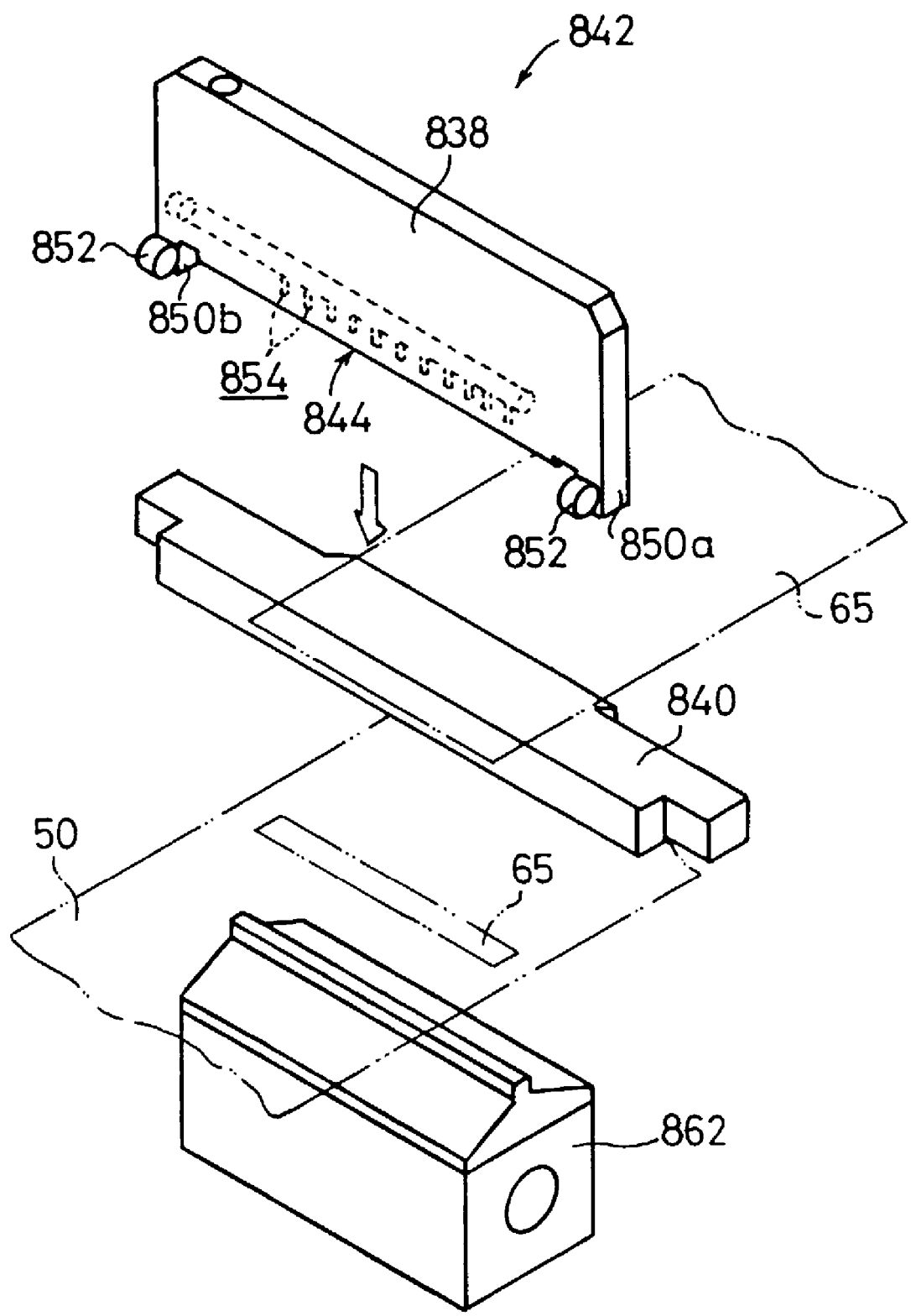
FIG. 36 is an exploded perspective view of a portion of the rail supply unit.
Figure 37:
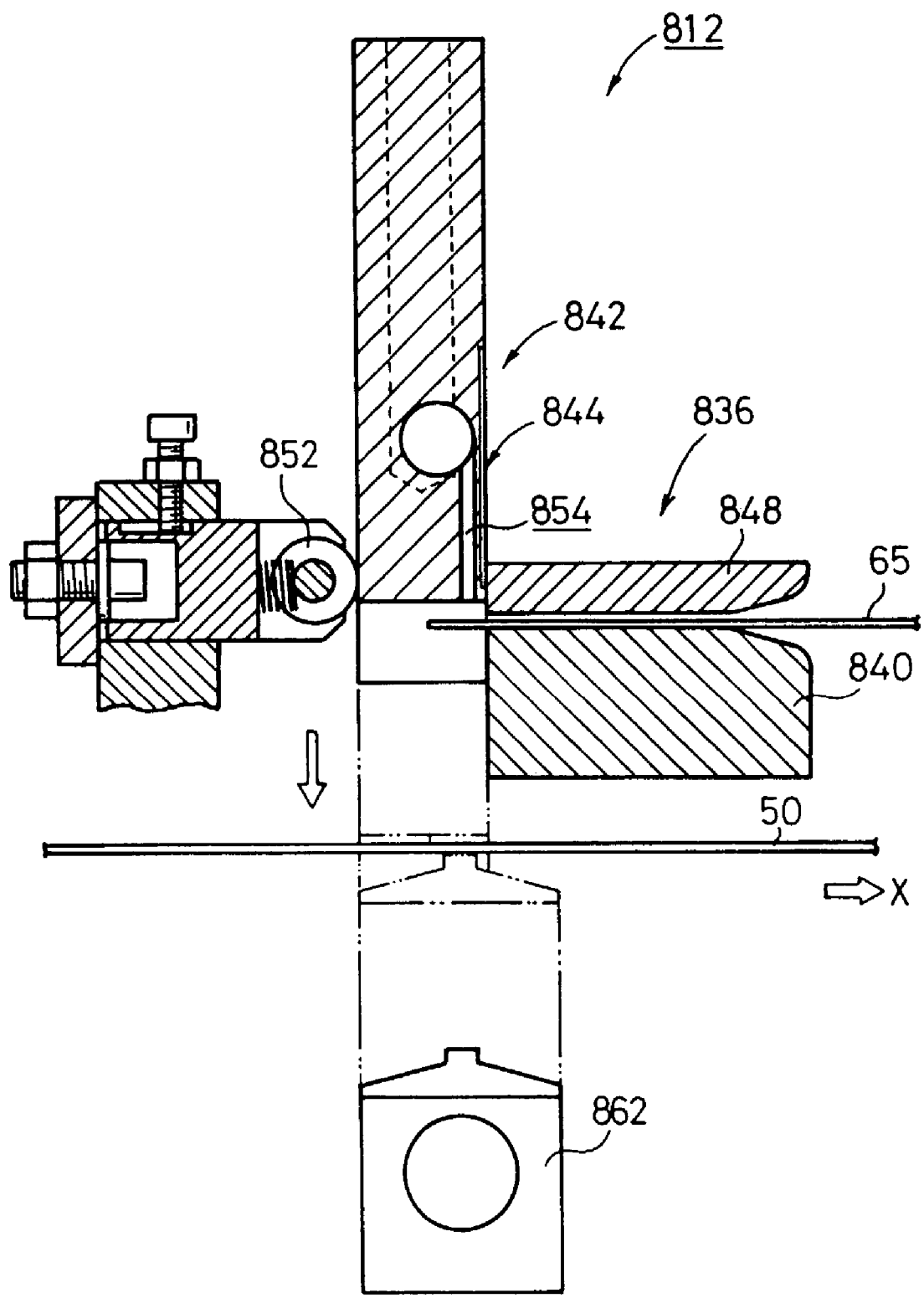
FIG. 37 is a vertical cross-sectional view of a portion of the rail supply unit.

As shown in FIGS. 35 through 37, the rail supply unit 812 comprises two identical rail supply mechanisms. Each of the rail supply mechanisms comprises a rail feed means 836 for feeding a web-shaped rail 65 to a cutting position, a rail cutting means 844 comprising a movable blade 838 and a fixed blade 840 for cutting off the web-shaped rail 65, a rail holding means 842 incorporated in the movable blade 838 for holding a cut rail 65, and a moving means 846 for moving the movable blade 838 toward the first continuous web 50. The rail feed means 836 has an unreeling shaft (not shown) which supports a roll of the web-shaped rail 65 and which is rotatable by a motor (not shown) to unreel the web-shaped rail 65, and a web guide 848 for maintaining the unreeled web-shaped rail 65 in a flat shape.

The movable blade 838 has a pair of laterally spaced guides 850a, 850b projecting toward the fixed blade 840. The fixed blade 840 has a small shear angle by which a cutting edge thereof is inclined. The movable blade 838 is normally urged toward the fixed blade 840 by spring-loaded rollers 852. The movable blade 838 has a plurality of suction holes 854 as the rail holding means 842, which is connected to a vacuum source (not shown).

As shown in FIG. 35, the moving means 846 has a vertically movable table 856 supporting the movable blade 838. The vertically movable table 856 is vertically movable by guide bars 858 and a drive cam 860. A heater block 862 is vertically movably disposed in vertical alignment with the movable blade 838.

Figure 38:
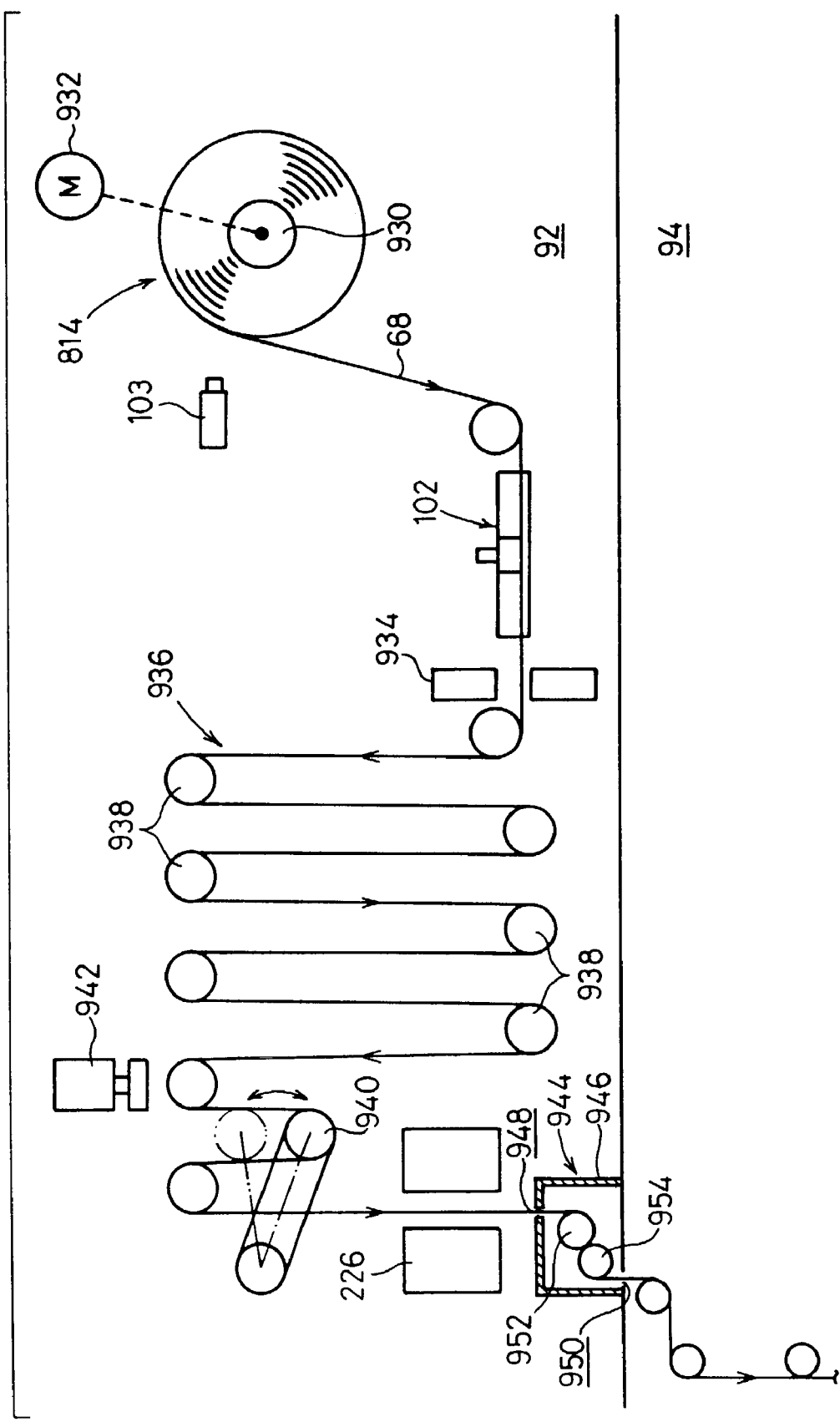
FIG. 38 is a schematic side elevational view of a cover sheet supply unit of the manufacturing system.

FIG. 38 shows details of the cover sheet supply unit 814. Those parts of the cover sheet supply unit 814 which are identical to those of the mask sheet supply unit 96 shown in FIG. 7 are denoted by identical reference numerals, and will not be described in detail below.

The cover sheet supply unit 814 has an unreeling shaft 930 supporting a roll of the third continuous web 68. The unreeling shaft 930 can be rotated by a servomotor 932. A splicing error detecting means 934 is disposed downstream of a splicing unit 102, and a path forming unit 936 for adjusting the path length of the third continuous web 68 is disposed downstream of the splicing error detecting means 934. The path forming unit 936 comprises a plurality of path rollers 938, a dancer roller 940, and a clamp 942.

A light shielding mechanism 944 is disposed downstream of an electrostatic charge removing means 226. The light shielding mechanism 944 has a light shielding box 946 having a slit 948 opening into the bright chamber 92 and a slit 950 opening into the dark chamber 94. The light shielding box 946 houses therein a first path roller 952 and a second path roller 954 which lap the third continuous web 68 to feed the third continuous web 68 along an S-shaped path.

As shown in FIG. 5, an undersheet supply unit 810 is of a structure identical to the cover sheet supply unit 814, and will not be described in detail below.

Figure 39:
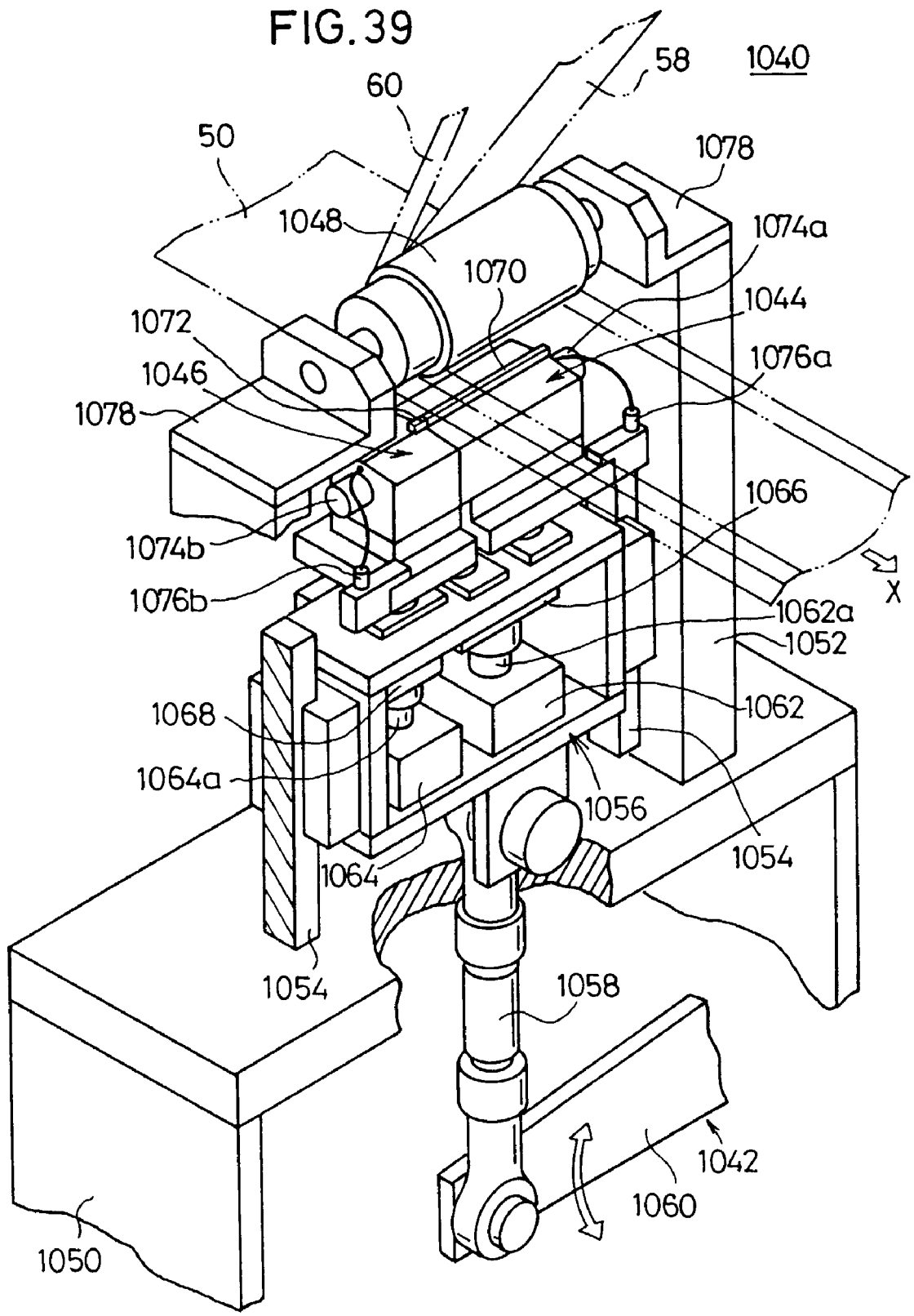
FIG. 39 is a perspective view of a temporary attaching mechanism of the manufacturing system.
Figure 40:
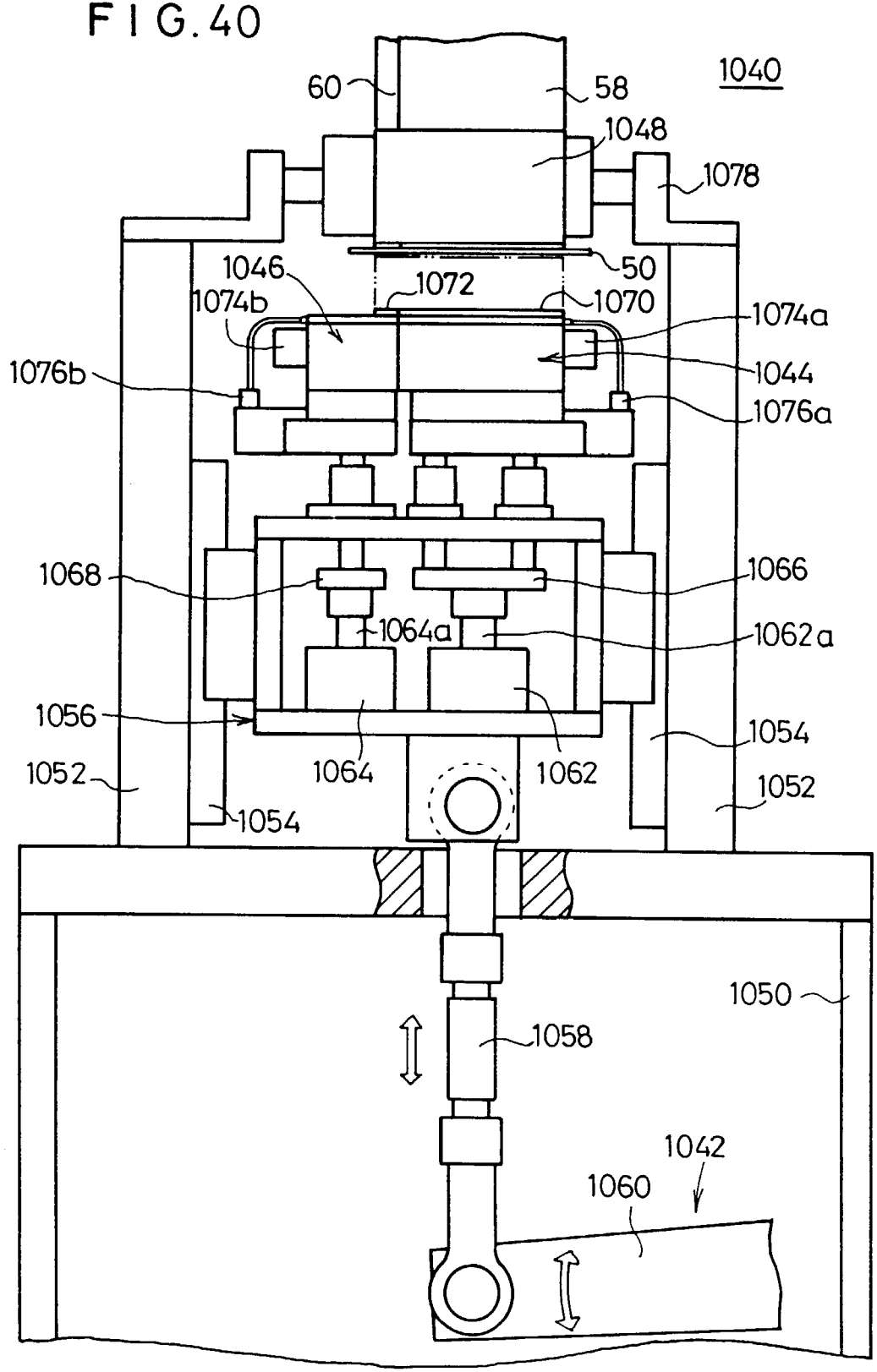
FIG. 40 is a front elevational view of the temporary attaching mechanism.
Figure 41:
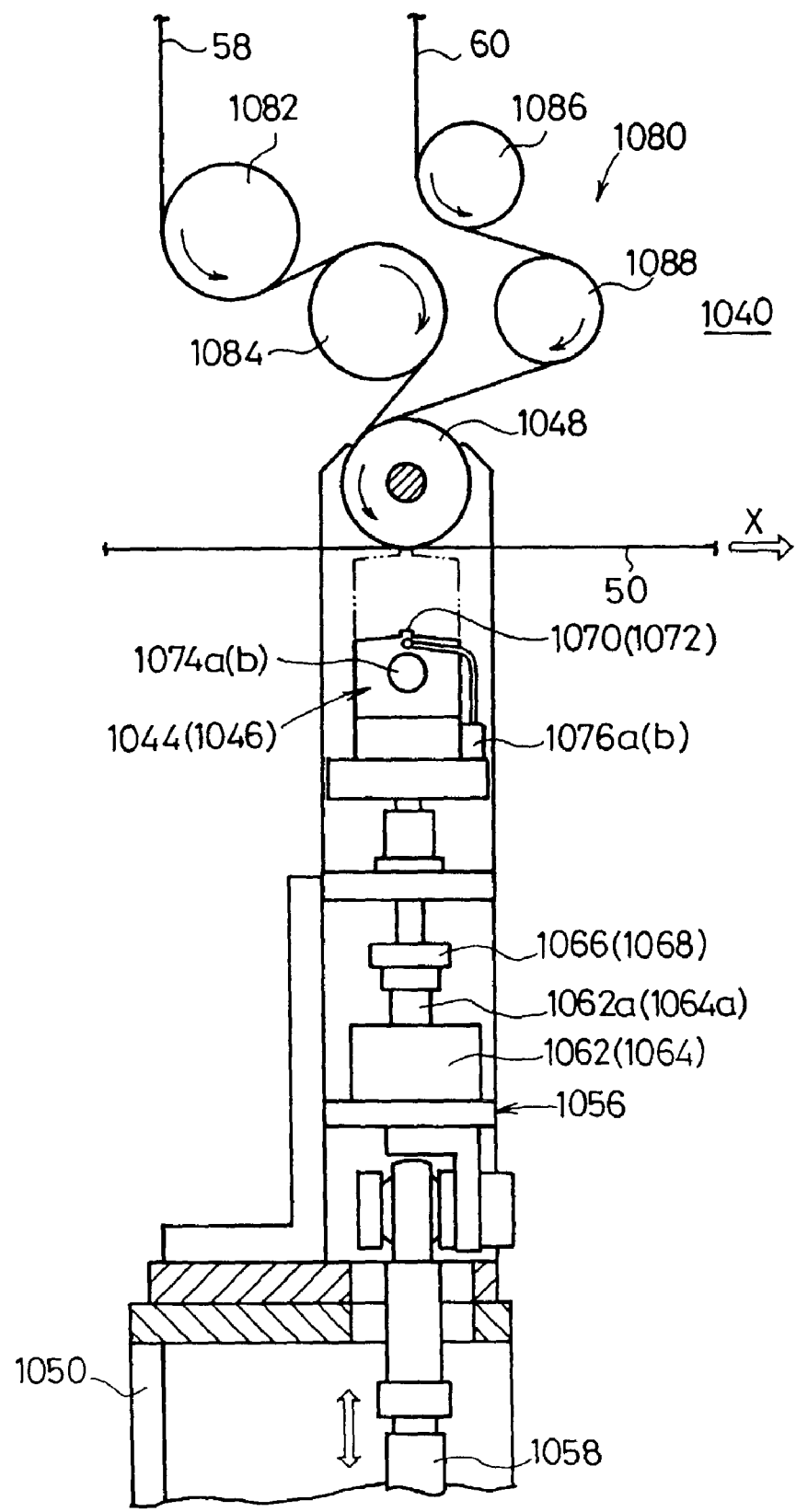
FIG. 41 is a side elevational view of the temporary attaching mechanism.

As shown in FIGS. 39 through 41, the first joining station 62 has a temporarily bonding mechanism 1040 for temporarily bonding the second continuous web 58 and the continuous sheet 60 in superposed relation to the first continuous web 50. The temporarily bonding mechanism 1040 comprises first and second heating blocks 1044, 1046 disposed below the first continuous web 50 and vertically movable toward and away from the first continuous web 50 by an actuator mechanism 1042, and a roller 1048 positioned above the first and second heating blocks 1044, 1046 in vertical alignment therewith for pressing the second continuous web 58 and the continuous sheet 60 against the first continuous web 50.

The temporarily bonding mechanism 1040 has a table 1050 on which a pair of support columns 1052 is vertically mounted. A vertically movable table 1056 is supported on confronting side surfaces of the support columns 1052 by linear guides 1054. The actuator mechanism 1042 has a drive arm 1060 having a swinging end operatively coupled to a lower surface of the vertically movable table 1056 by a connecting rod 1058. The drive arm 1060 is angularly movable by an actuator (not shown).

A first cylinder 1062 and a second cylinder 1064 are fixedly mounted on the vertically movable table 1056. The first cylinder 1062 and the second cylinder 1064 have respective upwardly projecting rods 1062a, 1064a which support the first and second heating blocks 1044, 1046 with first and second support members 1066, 1068 interposed therebetween. The first and second heating blocks 1044, 1046 have respective first and second ridges 1070, 1072 on their upper surfaces which have a predetermined width and extend in the direction perpendicular to the direction in which the first continuous web 50 is fed. The first and second heating blocks 1044, 1046 have respective heaters 1074a, 1074b and respective thermocouples 1076a, 1076b.

The first and second heating blocks 1044, 1046 are separate from each other so as to be associated with the respective thicknesses of the second continuous web 58 and the continuous sheet 60, which can be reliably held in intimate contact with the first and second heating blocks 1044, 1046, respectively, by the roller 1048. If the difference between the thicknesses of the second continuous web 58 and the continuous sheet 60 is 10 μm or less, then the first and second heating blocks 1044, 1046 may be of a unitary structure. If a layer of heat-resistant rubber, i.e., heat-resistant silicone rubber having a hardness of 70, is applied to one of the first and second heating blocks 1044, 1046 or the roller 1048, then the first and second heating blocks 1044, 1046 can be held in better intimate contact with the second continuous web 58 and the continuous sheet 60 for absorbing the difference between the thicknesses of the second continuous web 58 and the continuous sheet 60.

The roller 1048 is rotatably supported on the upper ends of the support columns 1052 by attachment bases 1078. A feed unit 1080 for feeding the second continuous web 58 and the continuous sheet 60 to the temporarily bonding mechanism 1040 is disposed upwardly of the roller 1048. As shown in FIG. 41, the feed unit 1080 comprises a first path roller 1082 and a first transversely shifting roller 1084 for feeding the second continuous web 58 and a second path roller 1086 and a second transversely shifting roller 1088 for feeding the continuous sheet 60.

Figure 42:
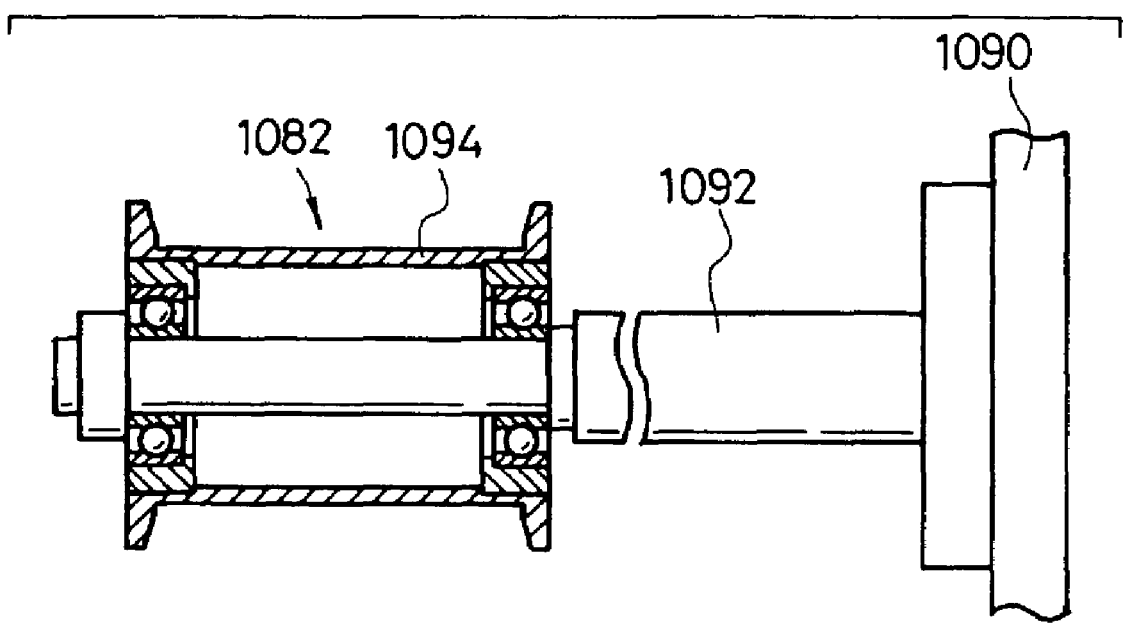
FIG. 42 is a vertical cross-sectional view of a first path roller of a feeder of the temporary attaching mechanism.
Figure 43:
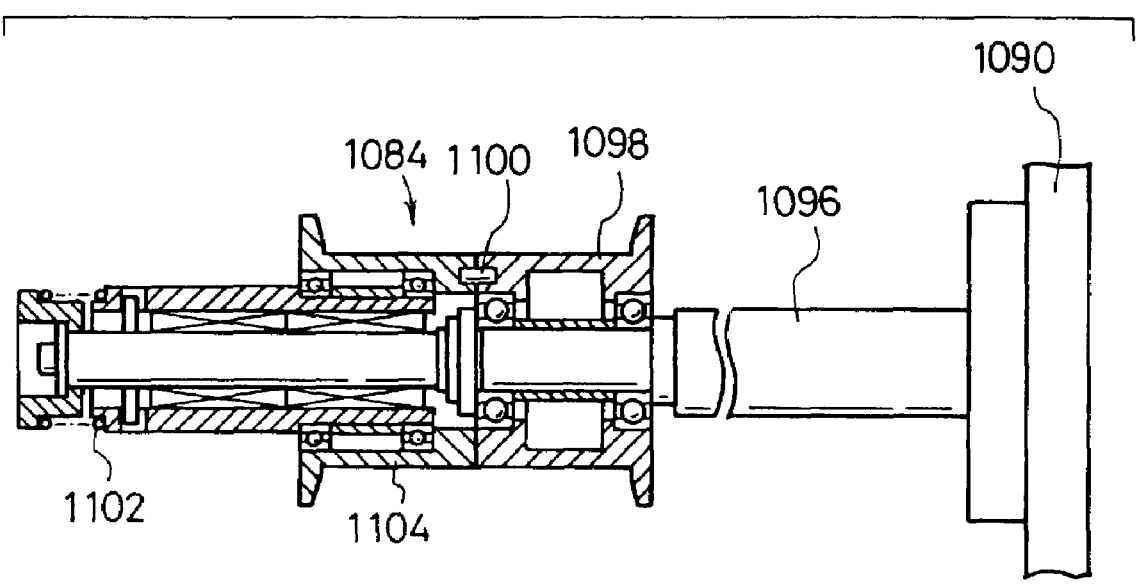
FIG. 43 is a vertical cross-sectional view of a first transversely shifting roller of the feeder.

As shown in FIG. 42, the first path roller 1082 comprises a shaft 1092 having an end fixed to a wall plate 1090 and a flanged roller 1094 rotatably supported on a smaller-diameter distal end portion of the shaft 1092. The flanged roller 1094 has an axial length set to a value commensurate with the width of the second continuous web 58. As shown in FIG. 43, the first transversely shifting roller 1084 comprises a shaft 1096 having an end fixed to the wall plate 1090, a reference flanged roller 1098 rotatably supported on a smaller-diameter portion of the shaft 1096, and a movable flanged roller 1104 axially coupled by a pin 1100 to the reference flanged roller 1098 for rotation therewith and movable axially along the shaft 1096 under the bias of a spring 1102.

Figure 44:
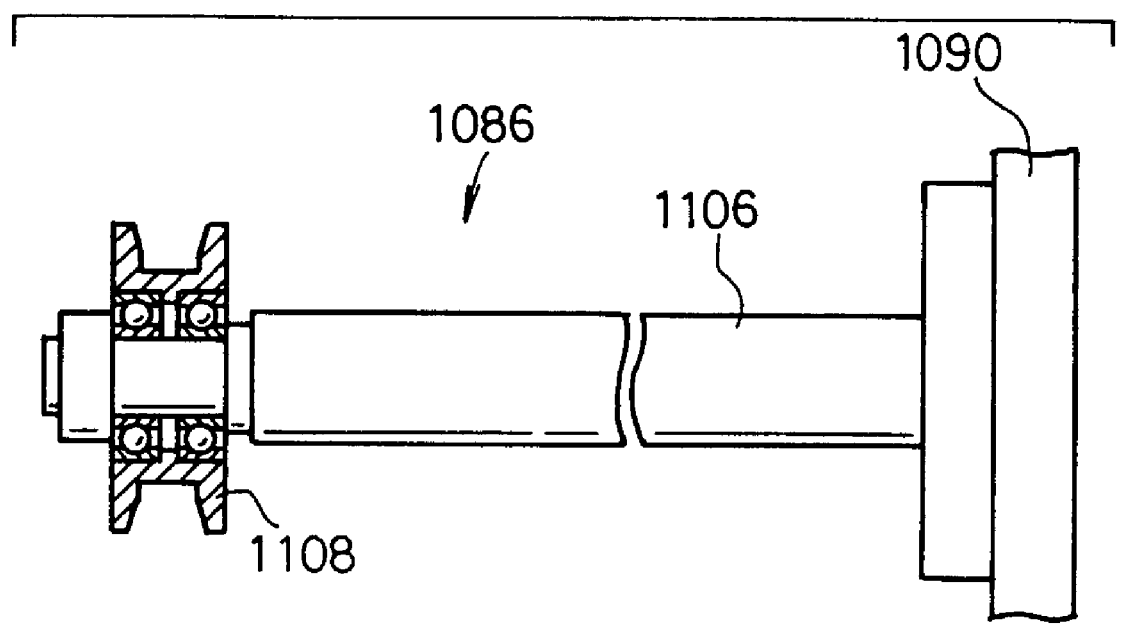
FIG. 44 is a vertical cross-sectional view of a second path roller of the feeder.
Figure 45:
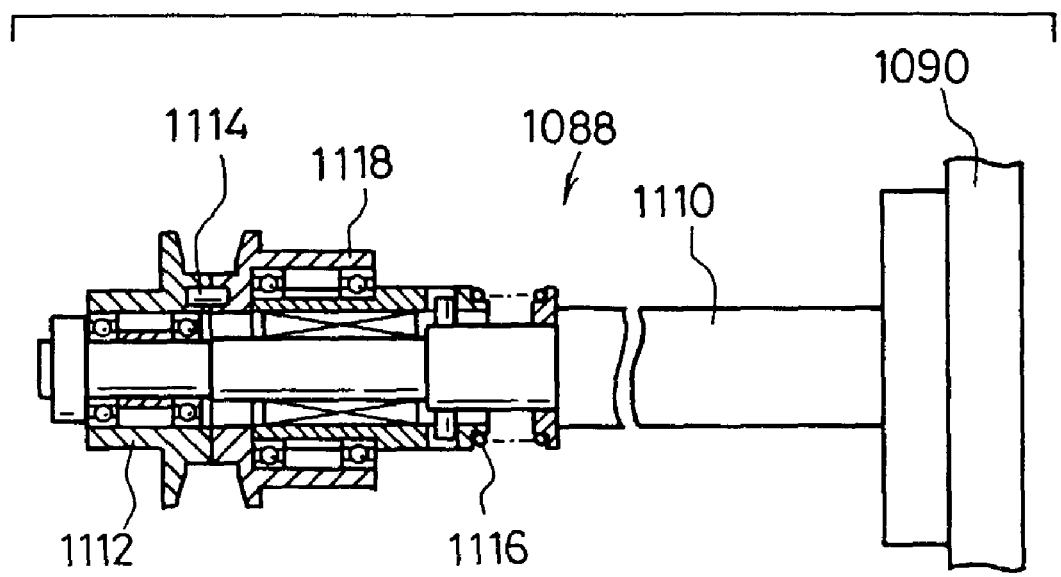
FIG. 45 is a vertical cross-sectional view of a second transversely shifting roller of the feeder.

As shown in FIG. 44, the second path roller 1086 comprises a shaft 1106 having an end fixed to the wall plate 1090 and a flanged roller 1108 rotatably supported on a smaller-diameter distal end portion of the shaft 1106. The flanged roller 1108 has an axial length set to a value commensurate with the width of the continuous sheet 60. As shown in FIG. 45, the second transversely shifting roller 1088 comprises a shaft 1110 having an end fixed to the wall plate 1090, a reference flanged roller 1112 rotatably supported on a smaller-diameter distal end portion of the shaft 1110, and a movable flanged roller 1118 axially coupled by a pin 1114 to an inner side of the reference flanged roller 1112 and normally pressed against the reference flanged roller 1112 under the bias of a spring 1116.

Figure 46:
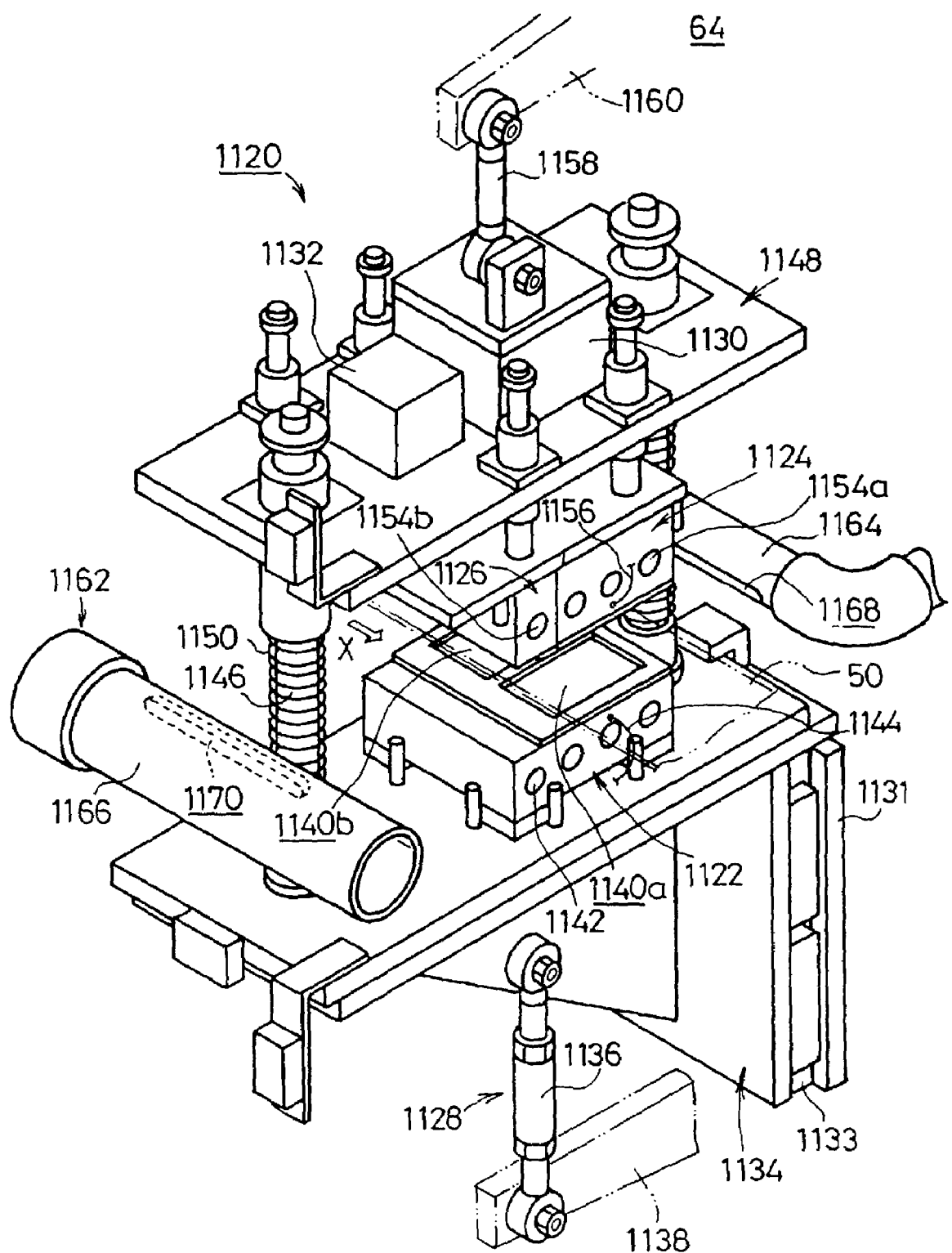
FIG. 46 is a perspective view of a full attaching mechanism of the manufacturing system.
Figure 47:
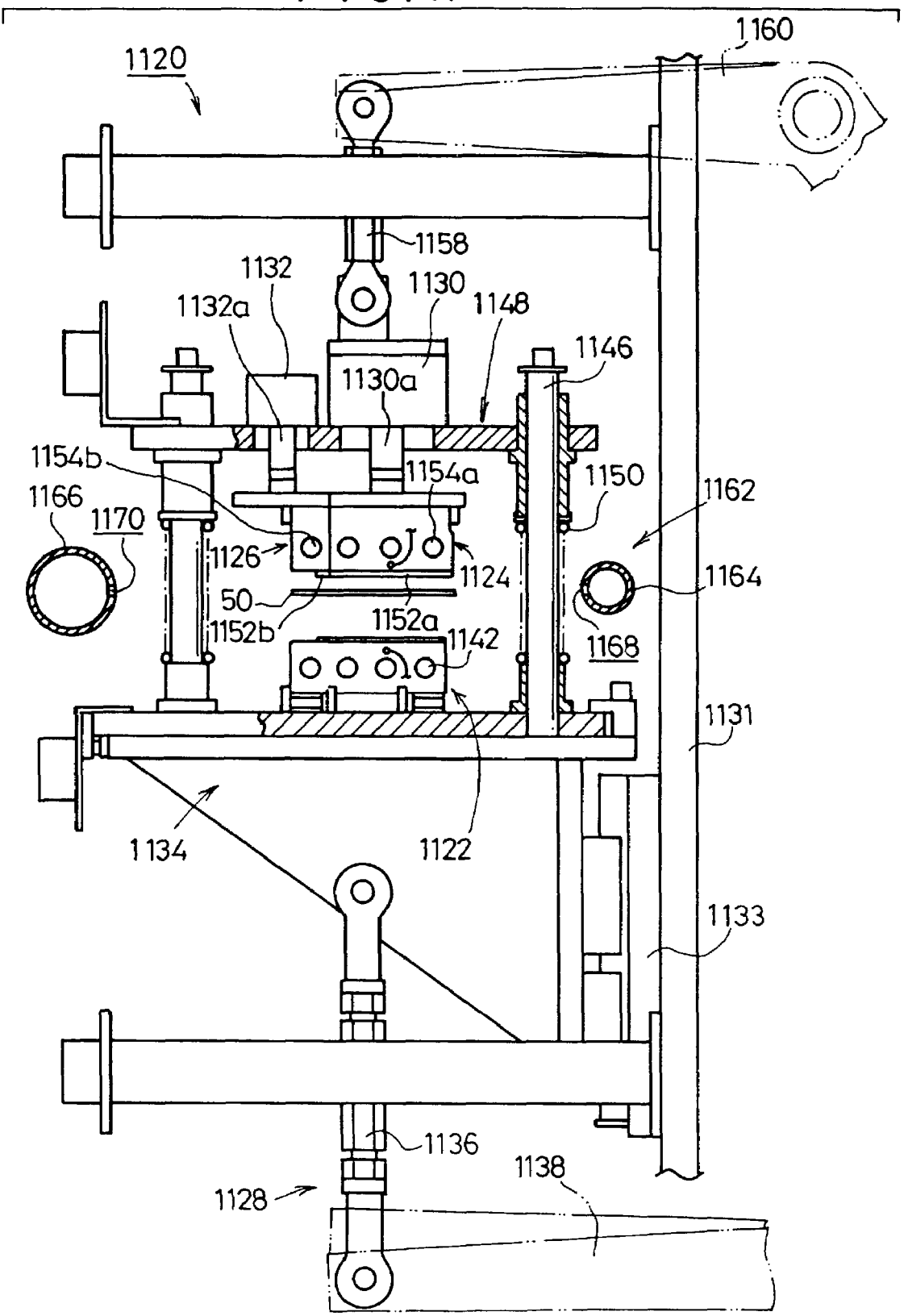
FIG. 47 is a front elevational view of the full attaching mechanism.

As shown in FIGS. 46 and 47, the first heat-bonding station 64 has a finally bonding mechanism 1120. The finally bonding mechanism 1120 comprises a first heating block 1122 and second heating blocks 1124, 1126 which vertically confront each other, an actuator means 1128 for moving the first and second heating blocks 1112 and 1124, 1126 toward and away from each other, and cylinders 1130, 1132 coupled respectively to the second heating blocks 1124, 1126 for setting pressing forces to be applied thereto.

The finally bonding mechanism 1120 also has a lower vertically movable table 1134 vertically movable along a linear guide 1133 mounted on a wall plate 1131. The actuator means 1128 includes a connecting rod 1136 having an end fixed to the lower vertically movable table 1134. The connecting rod 1136 has an opposite end coupled to an end of a swing arm 1138 and can be moved vertically thereby. The first heating block 1122 is fixedly mounted on the lower vertically movable table 1134. The first heating block 1122 has a pair of recesses 1140a, 1140b defined in an upper surface thereof, the recesses 1140a, 1140b corresponding to image frames 22 on the first continuous web 50. The first heating block 1122 has a plurality of, e.g., four, heaters 1142 and a thermocouple 1144.

Two guide bars 1146 are vertically mounted on the lower vertically movable table 1134, and an upper vertically movable table 1148 is vertically movably supported on the guide bars 1146. Springs 1150 are disposed around the respective guide bars 1146 for normally urging the upper vertically movable table 1148 upwardly away from the lower vertically movable table 1134. The cylinders 1130, 1132 are fixedly mounted on the upper vertically movable table 1148 and have respectively downwardly projecting rods 1330a, 1330b which support the second heating blocks 1124, 1126.

Layers of heat-resistant rubber, e.g., silicone rubber layers 1152a, 1152b are fixed to the bottom surfaces of the second heating blocks 1124, 1126. Three heaters 1154a and a heater 1154b are mounted respectively in the second heating blocks 1124, 1126, and thermocouples 1156 are disposed closely to the respective second heating blocks 1124, 1126. The actuator means 1128 includes a connecting rod 1158 having an end coupled to the upper vertically movable table 1148 and an opposite end coupled to an end of a swing arm 1160. The second heating blocks 1124, 1126 are separate from each other so as to be associated with the respective thicknesses of the second continuous web 58 and the continuous sheet 60. If the difference between the thicknesses of the second continuous web 58 and the continuous sheet 60 is 10 μm or less, then the second heating blocks 1124, 1126 may be of a unitary structure.

A cooling means 1162 is disposed in the vicinity of the finally bonding mechanism 1120. The cooling means 1162 comprises first and second tubes 1164, 1166 that are laterally spaced and disposed in respective positions on opposite sides of the path along which the first continuous web 50 is fed in the direction indicated by the arrow X. The first and second tubes 1164, 1166 are connected to a blower (not shown). The first and second tubes 1164, 1166 have respective slits 1168, 1170 defined in confronting sides thereof and elongate in the direction indicated by the arrow X. The slits 1168, 1170 are open toward the first continuous web 50 that is fed in the direction indicated by the arrow X.

Figure 48:
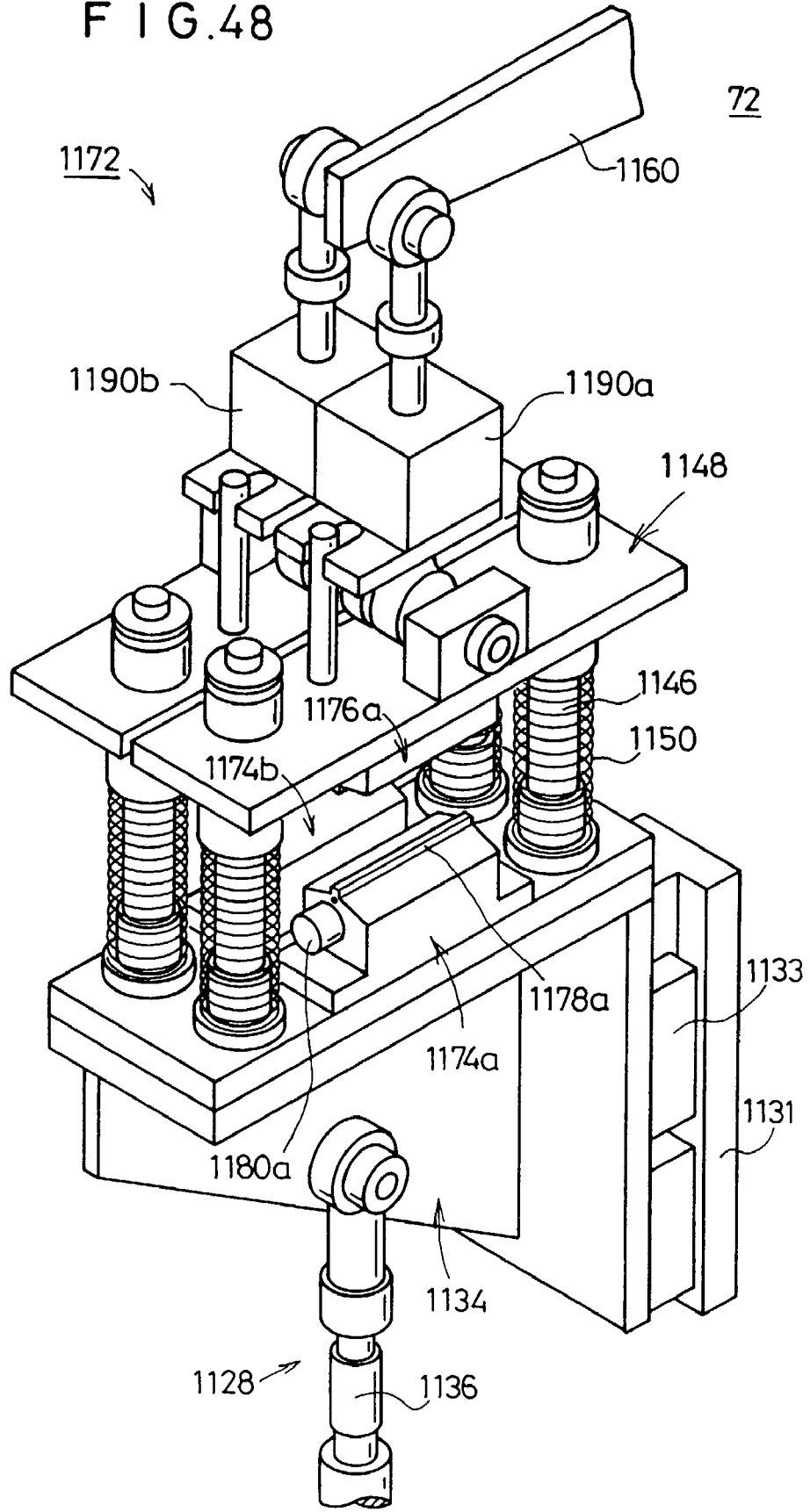
FIG. 48 is a perspective view of a rail bonding mechanism of the manufacturing system.

As shown in FIG. 48, the third heat-bonding station 72 has a rail bonding mechanism 1172 for bonding the third continuous web 68 to the second continuous web 58 with rails 65. Those parts of the rail bonding mechanism 1172 which are identical to those of the finally bonding mechanism 1120 are denoted by identical reference characters, and will not be described in detail below.

Figure 49:
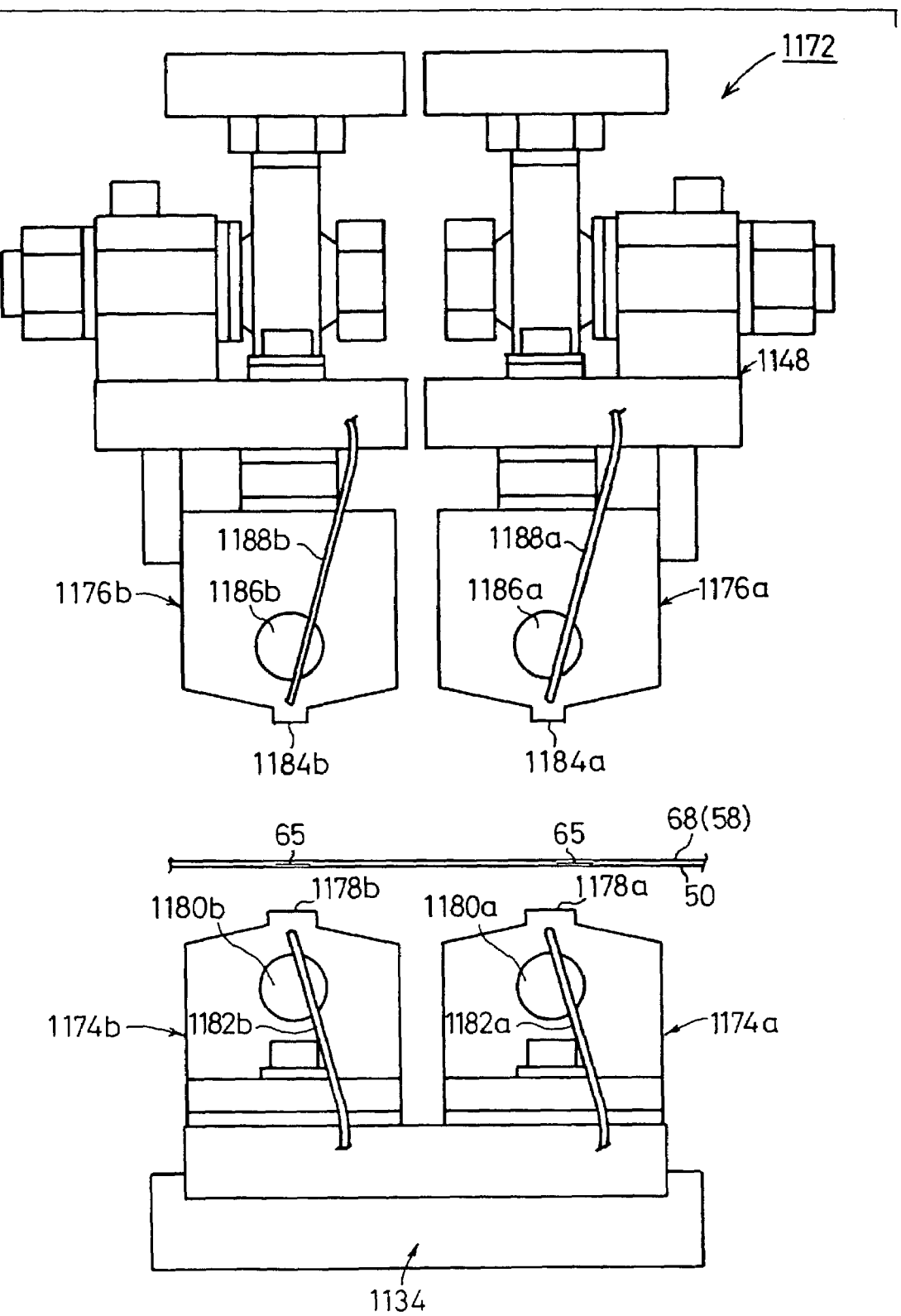
FIG. 49 is a front elevational view of the rail bonding mechanism.

As shown in FIGS. 48 and 49, the rail bonding mechanism 1172 comprises third heating blocks 1174a, 1174b mounted on a lower vertically movable table 1134 and fourth heating blocks 1176a, 1176b mounted on an upper vertically movable table 1148 positioned above the lower vertically movable table 1134. The third heating blocks 1174a, 1174b have respective ridges 1178a, 1178b each having a width greater than the width of each of rails 65 and spaced from each other by a distance corresponding to the distance between two rails 65. The third heating blocks 1174a, 1174b have respective heaters 1180a, 1180b and respective thermocouples 1182a, 1182b.

The fourth heating blocks 1176a, 1176b have respective ridges 1184a, 1184b each having a width equal to the width of each of rails 65. The ridges 1184a, 1184b are held in vertical alignment with the ridges 1178a, 1178b. The fourth heating blocks 1176a, 1176b have respective heaters 1186a, 1186b and respective thermocouples 1188a, 1188b. Cylinders 1190a, 1190b are coupled respectively to the fourth heating blocks 1176a, 1176b for setting pressing forces to be applied thereto.

As shown in FIGS. 50 through 53, the folding station 74 comprises a feed means 1270 for feeding the first continuous web 50 by gripping portions thereof which are positioned outwardly of developing liquid pods 40 and traps 42 that are attached to the first continuous web 50, a folding means 1272 for engaging opposite marginal edges of the first continuous web 50 fed by the feed means 1270 and forcibly folding back the marginal edges of the first continuous web 50 along the folds 38a, 38b, grooved guide rollers 1274a, 1274b for holding opposite ends of the first continuous web 50 whose marginal edges have been folded back, and pressing rollers 1276a, 1276b for supporting the folded areas of the first continuous web 50. The feed means 1270, the folding means 1272, the grooved guide rollers 1274a, 1274b, and the pressing rollers 1276a, 1276b jointly make up a former 1277 (see FIG. 5).

Figure 51:
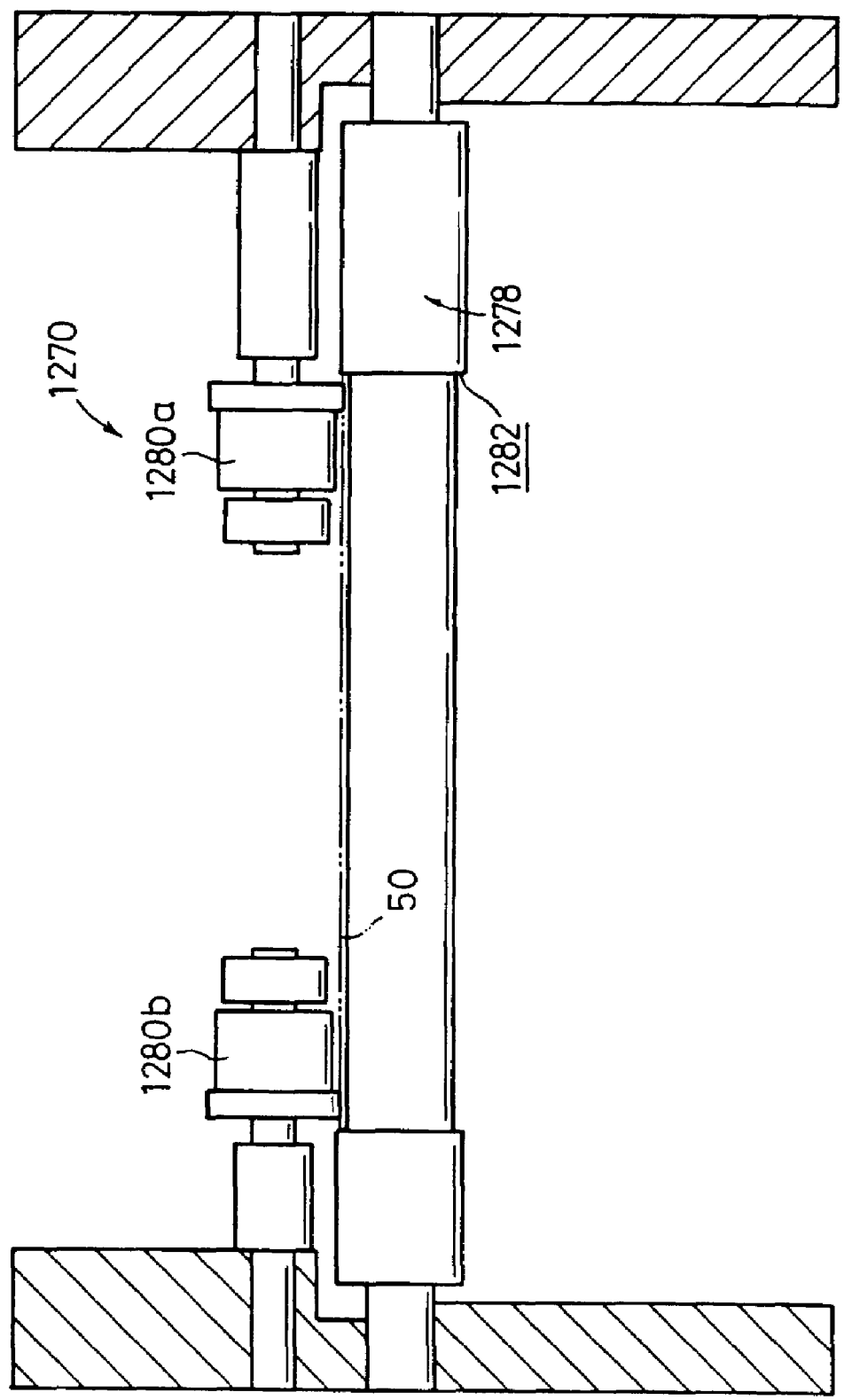
FIG. 51 is an enlarged cross-sectional view taken along line S—S of FIG. 50.

As shown in FIG. 51, the feed means 1270 comprises a lower roller 1278 extending transversely across the first continuous web 50, and a pair of laterally spaced upper rollers 1280a, 1280b disposed above the lower roller 1278. The lower roller 1278 has a groove 1282 defined in an outer circumferential surface thereof and having a width which is equal to the sum of the width of the second continuous web 58 and the continuous sheet 60 and α (α=0.2 mm to 0.4 mm). The upper rollers 1280a, 1280b are positioned to force the second continuous web 58 and the continuous sheet 60 sealed on the first continuous web 50 into the groove 1282.

Figure 52:
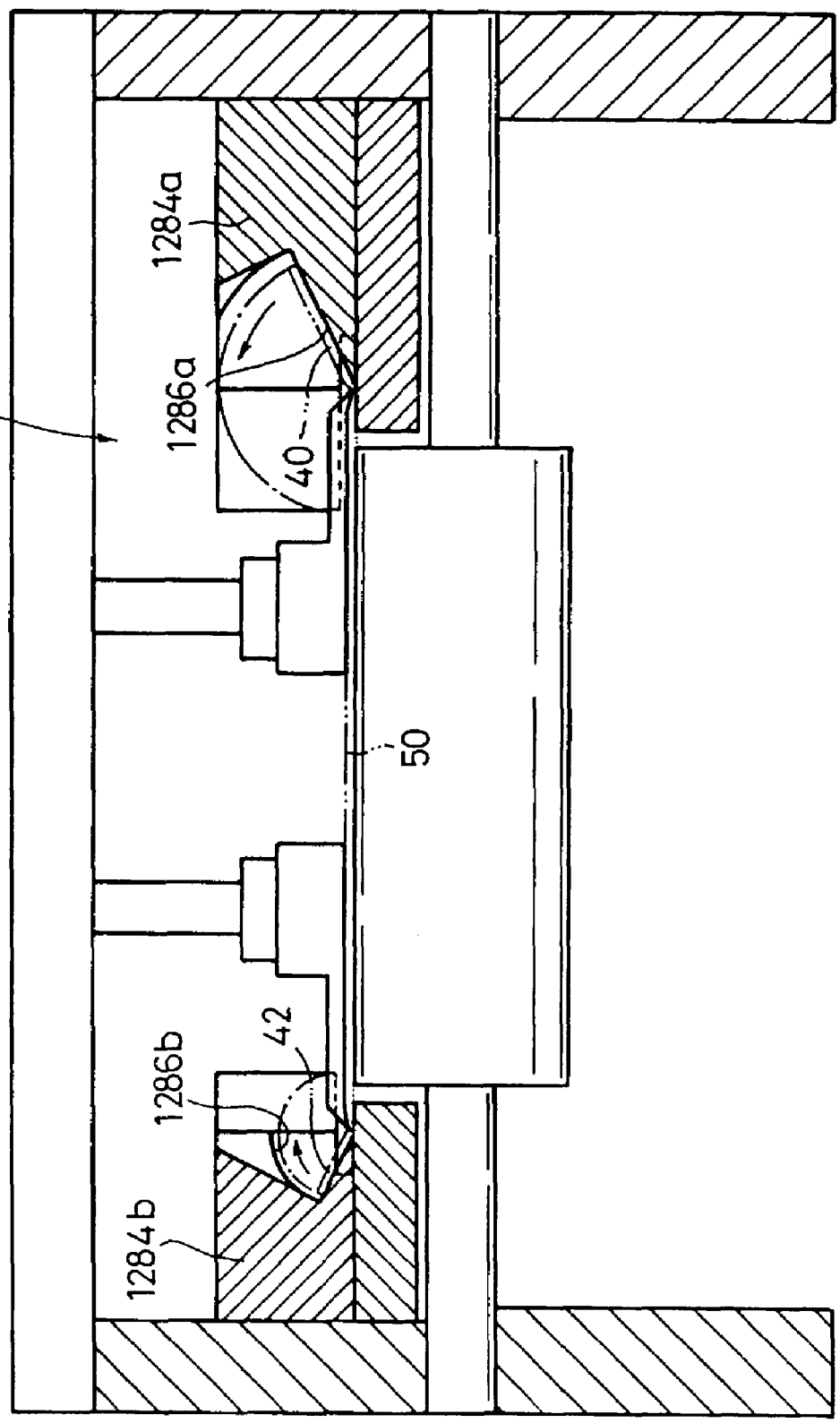
FIG. 52 is an enlarged cross-sectional view taken along line T—T of FIG. 50.

As shown in FIG. 52, the folding means 1272 has a pair of guide rails 1284a, 1284b for engaging the opposite marginal edges of the first continuous web 50 fed by the feed means 1270 in the direction indicated by the arrow X. The guide rails 1284a, 1284b are elongate in the direction indicated by the arrow X and have respective guide surfaces 1286a, 1286b whose cross-sectional shape is continuously changed in the direction indicated by the arrow X for smoothly folding back the opposite marginal edges of the first continuous web 50.

The fourth heat-bonding station 76 has a temporarily flap bonding mechanism 1394 (see FIG. 54) for temporarily bonding flaps 50a, 50b which are the folded opposite marginal edges of the first continuous web 50, a finally flap bonding mechanism 1396 (see FIG. 55) for finally bonding the flaps 50a, 50b, and a flap re-bonding mechanism 1398 (see FIG. 56) for re-bonding an edge of the flap 50a near the trap 42. The temporarily flap bonding mechanism 1394, the finally flap bonding mechanism 1396, and the flap re-bonding mechanism 1398 are successively disposed in the order named in the direction in which the first continuous web 50 is fed, and jointly make up a flap seal 1294 (see FIG. 5).

Figure 54:
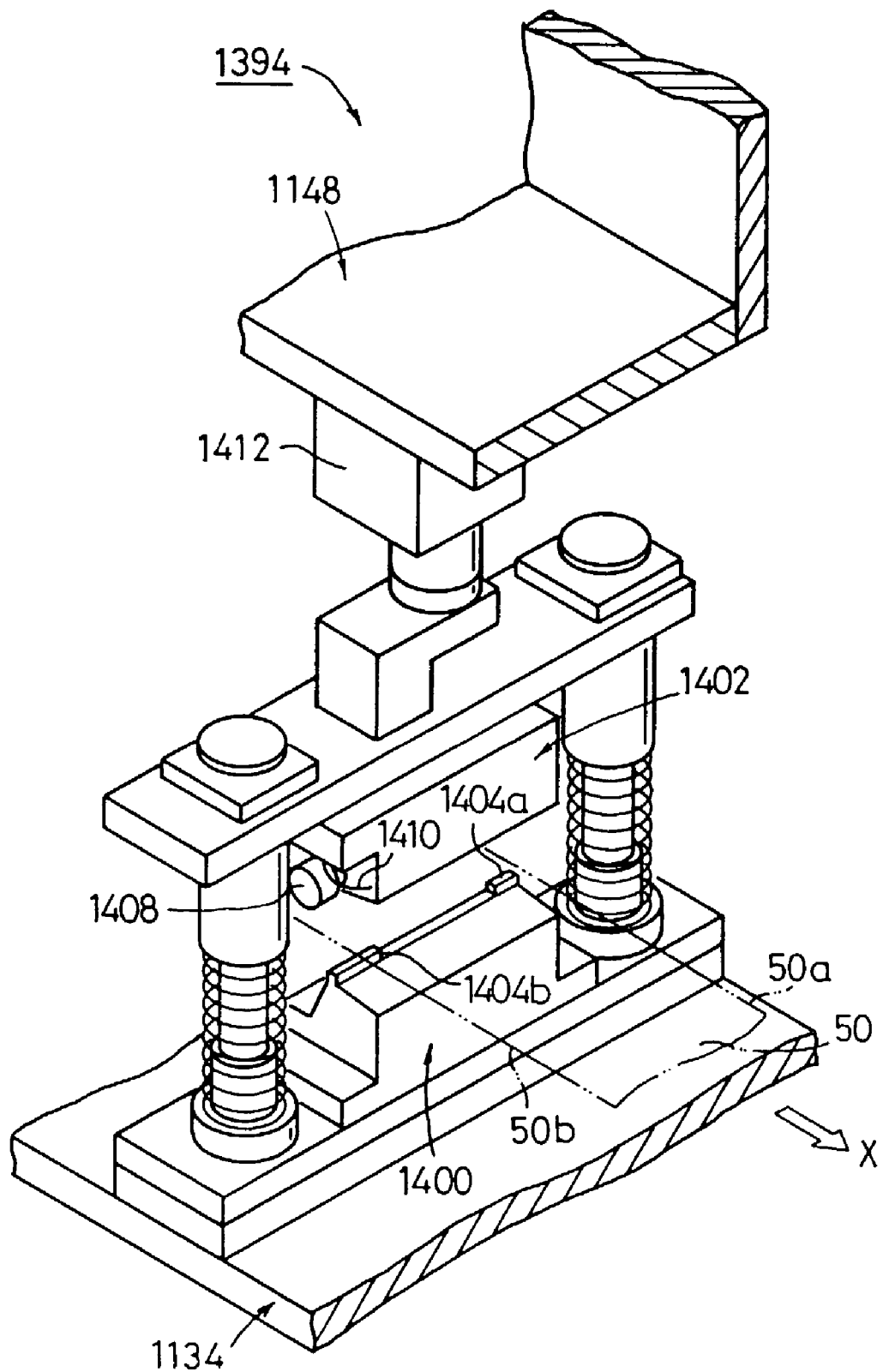
FIG. 54 is a fragmentary perspective view of a temporary flap attaching mechanism of the manufacturing system.

As shown in FIG. 54, the temporarily flap bonding mechanism 1394 comprises a first presser block 1400 fixedly mounted on the lower vertically movable table 1134 and a second presser block 1402 fixedly mounted on the upper vertically movable table 1148. As shown in FIGS. 54 and 57, the first presser block 1400 has a pair of ridges 1404a, 1404b on opposite ends thereof which are laterally spaced transversely across the first continuous web 50. The ridges 1404a, 1404b have respective predetermined widths and project upwardly.

The second presser block 1402 has ridges 1406a, 1406b vertically aligned with the ridges 1404a, 1404b. One of the ridges 1406a, 1406b which is closer to the flap 50a is narrower than the other which is closer to the flap 50b. The second presser block 1402 also has a heater 1408 and a thermocouple 1410, and is supported on a cylinder (actuator means) 1412. The ridges 1404a, 1404b of the first presser block 1400 and the ridges 1406a, 1406b of the second presser block 1402 are positioned for acting on rails 65.

Figure 55:
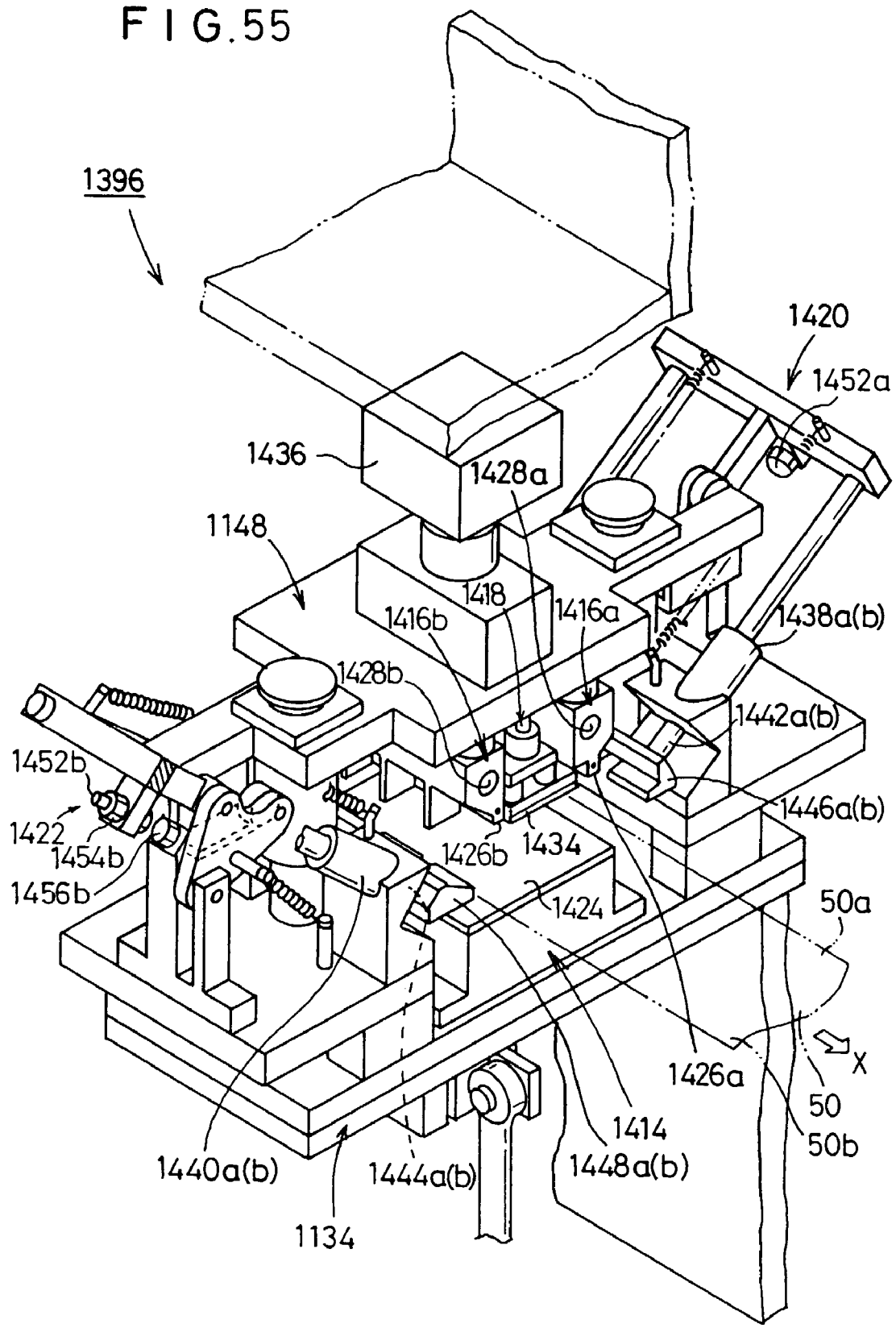
FIG. 55 is a perspective view of a full flap attaching mechanism of the manufacturing system.
Figure 58:
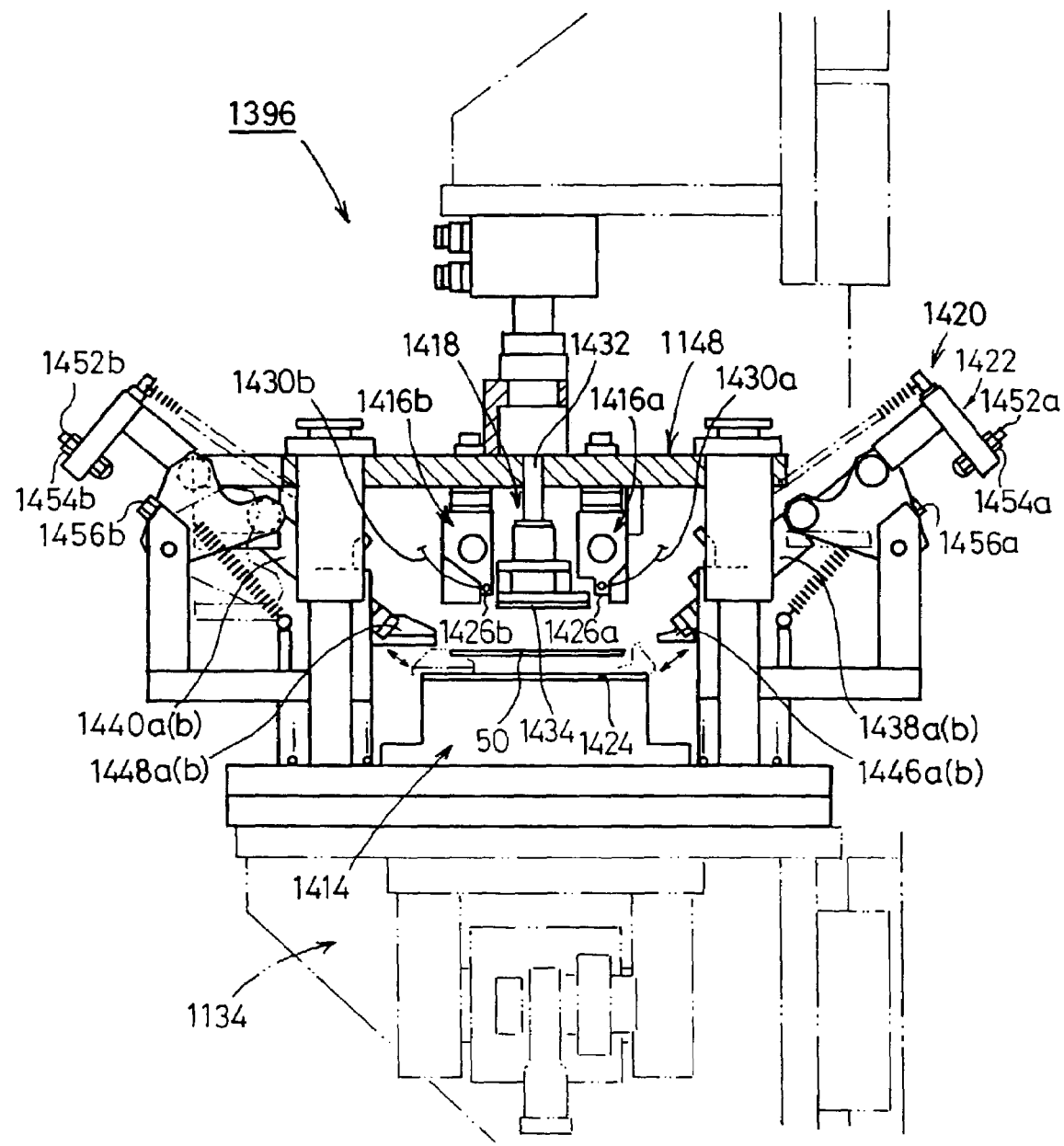
FIG. 58 is a front elevational view of the full flap attaching mechanism.

As shown in FIGS. 55 and 58, the finally flap bonding mechanism 1396 comprises a third presser block 1414 and fourth presser blocks 1416a, 1416b which are disposed in vertically confronting relation to each other, a pressing means 1418 for pressing the third continuous web 68 at an image frame 22, and a holding means 1420 for pressing flaps 50a, 50b toward the image frame 22.

Figure 59:
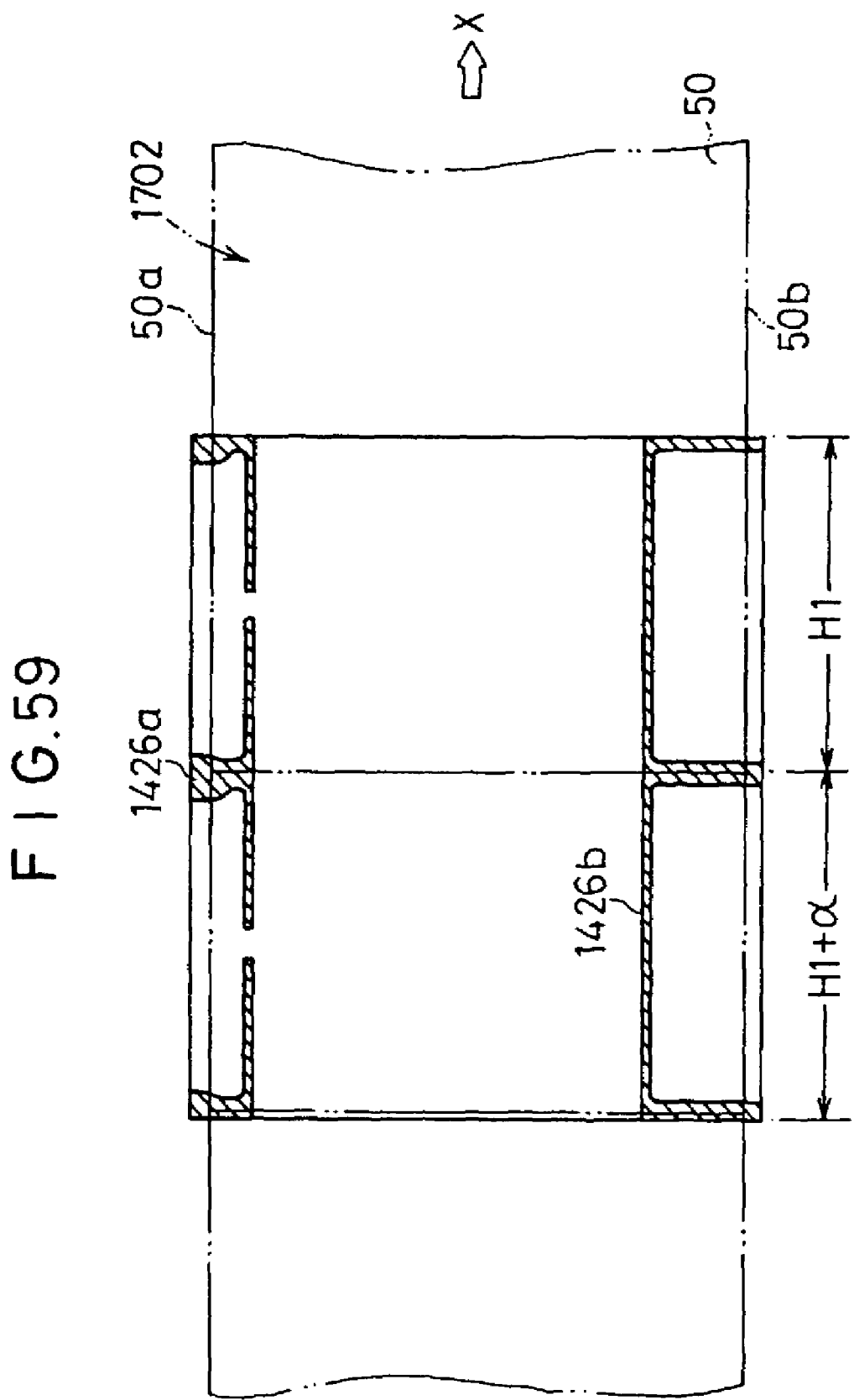
FIG. 59 is a cross-sectional view of ridges of the full flap attaching mechanism.

The third presser block 1414 has a bearing base 1424 of silicone rubber wider than the first continuous web 50 whose opposite marginal edges have been folded back. The fourth presser blocks 1416a, 1416b have respective ridges 1426a, 1426b of predetermined configuration. As shown in FIG. 59, each of the ridges 1426a, 1426b has a portion corresponding to the outer dimension H1 in the transverse direction of the instant photographic film unit 20 and a portion corresponding to the sum of the outer dimension H1 and α (e.g., α=1 mm). In a finally flap bonding process, the flaps 50a, 50b are bonded with a double seal over the distance α.

The fourth presser blocks 1416a, 1416b serve as respective heater blocks having respective heaters 1428a, 1428b and respective thermocouples 1430a, 1430b. A presser means 1418 is mounted on the upper vertically movable table 1148 between the fourth presser blocks 1416a, 1416b. The presser means 1418 has a presser pad 1434 vertically movably supported on a rod 1432 for pressing the first continuous web 68 at an image frame 22 with a relatively small force. The upper vertically movable table 1148 is supported by a cylinder (actuating means) 1346.

The holding means 1420 comprises two pairs of cylinders 1438a, 1348b and 1440a, 1440b inclined at 45° for the respective flaps 50a, 50b, and two pairs of pressers 1446a, 1446b and 1448a, 1448b mounted on respective ends of rods 1442a, 1442b and 1444a, 1444b extending respectively from the cylinders 1438a, 1348b and 1440a, 1440b.

The holding means 1420 also has a positioning means 1422 for keeping the pressers 1446a, 1446b and 1448a, 1448b spaced a constant distance from the bearing base 1424. As shown in FIGS. 55 and 58, the positioning means 1422 comprises positioning bolts 1452a, 1452b mounted on respective plates 1450a, 1450b that are fixed to the other ends of the rods 1442a, 1442b and 1444a, 1444b. The positioning bolts 1452a, 1452b extend in the direction in which the rods 1442a, 1442b and 1444a, 1444b are axially movable back and forth, and are fastened by respective nuts 1454a, 1454b with their tip ends being positionally adjustable. Stoppers 1456a, 1456b are positioned for abutting engagement with the tip ends of the positioning bolts 1452a, 1452b when the positioning bolts 1452a, 1452b are moved by the rods 1442a, 1442b and 1444a, 1444b, for thereby limiting the downward movement of the pressers 1446a, 1446b and 1448a, 1448b.

Figure 56:
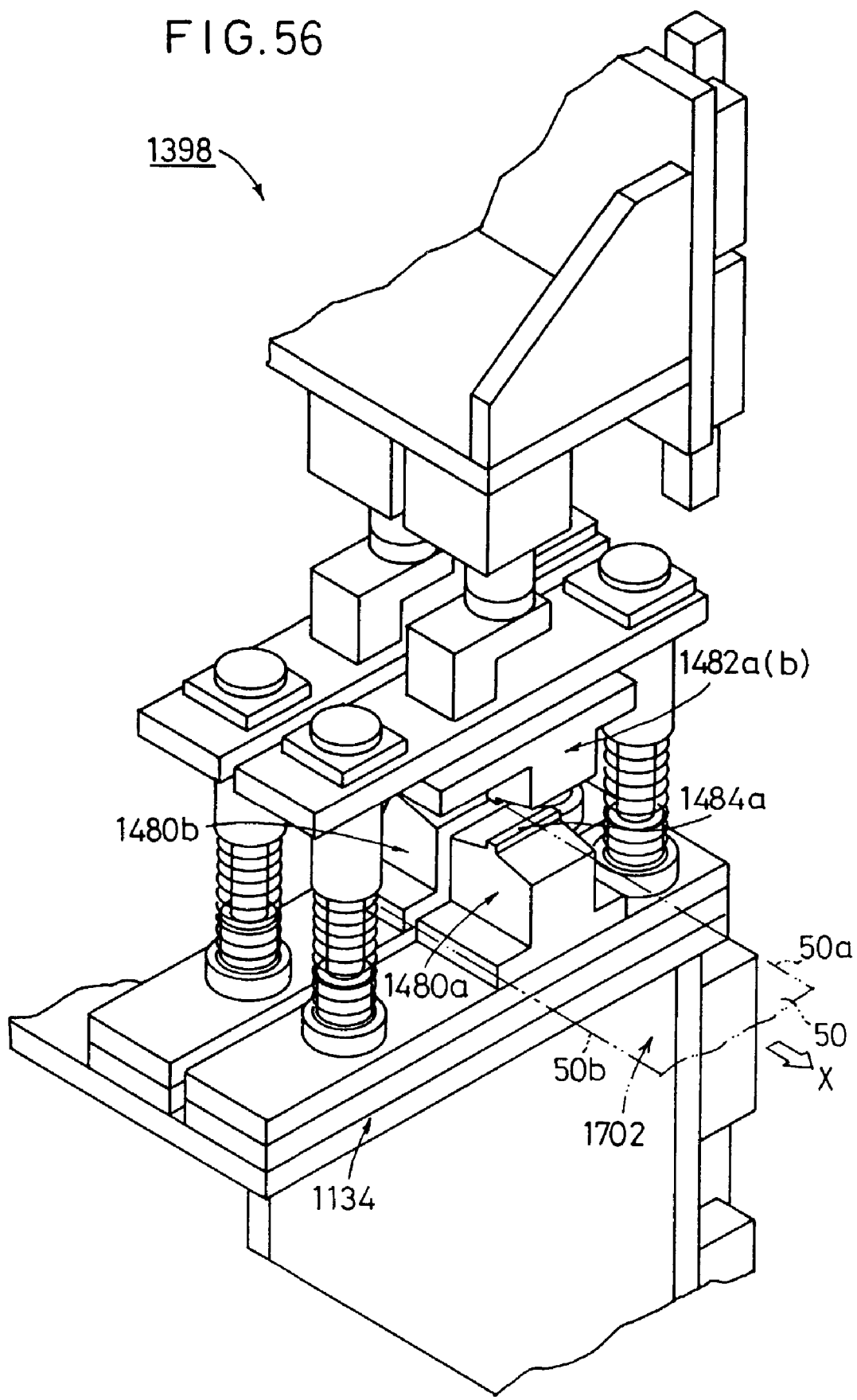
FIG. 56 is a perspective view of a flap re-bonding mechanism of the manufacturing system.
Figure 60:
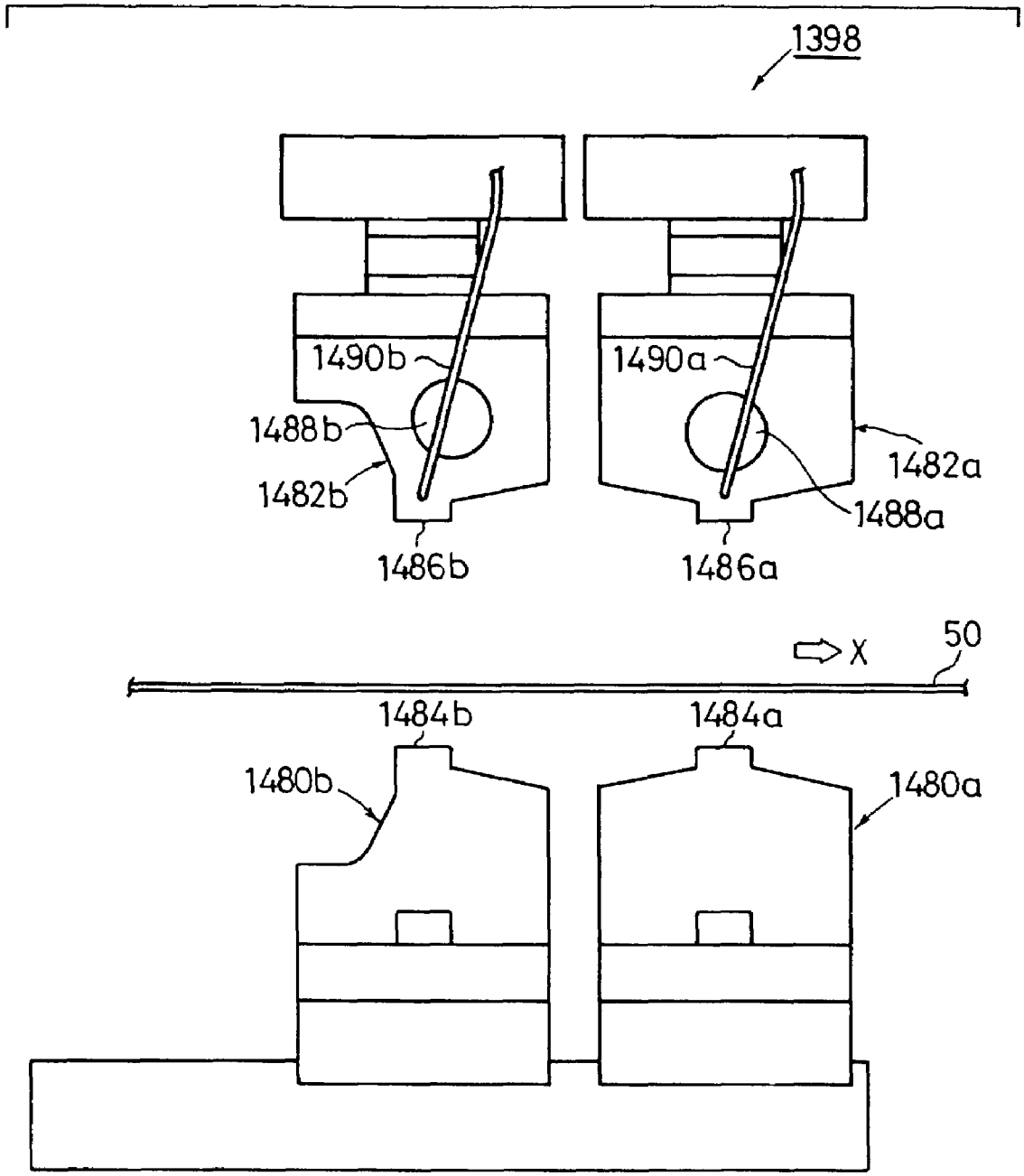
FIG. 60 is a front elevational view of a portion of the flap re-bonding mechanism.

As shown in FIGS. 56 and 60, the flap re-bonding mechanism 1398 comprises fifth presser blocks 1480a, 1480b and sixth presser blocks 1482a, 1482b. The fifth presser blocks 1480a, 1480b are positioned near the flap 50a where the trap 42 is located, for alignment with the rails 65. The fifth presser blocks 1480a, 1480b have respective ridges 1484a, 1484b. The sixth presser blocks 1482a, 1842b have respective ridges 1486a, 1486b held in vertical alignment with the ridges 1484a, 1484b. The sixth presser blocks 1482a, 1842b serve as heater blocks which have respective heaters 1488a, 1488b and respective thermocouples 1490a, 1490b.

As shown in FIGS. 5 and 6, a first feed means 1500 is disposed downstream of the fourth heat-bonding station 76 for intermittently feeding the assembly, which comprises the first continuous web 50 with components mounted thereon, by two pitches at a time from the mark forming station 55a to the fourth heat-bonding station 76.

The first feed means 1500 comprises a main feed drum 1502 which is controlled to change the interval of feed pitches depending on the position of a mark 53 detected by the mark detecting station 57a. A second feed means 1506 which comprises a cutting feed drum 1508 is disposed downstream of the main feed drum 1502 and spaced therefrom with a second free loop 1504 interposed therebetween. The cutting feed drum 1508 is controlled to intermittently feed the assembly one pitch at a time through the cutting station 78. The first free loop 244 is produced in the first suction box 246 as described above. The second free loop 1504 is produced in a second suction box 1512.

The first continuous web 50 loaded in the mask sheet supply unit 96, the second continuous web 58 loaded in the photosensitive sheet supply unit 809, the continuous sheet 60 loaded in the undersheet supply unit 810, and the third continuous sheet 68 loaded in the cover sheet supply unit 814 have their entire lengths to be used, set to equal values or integral multiples, and have their path lengths set such that their spliced regions are positioned in or near one instant photographic film unit 20.

Specifically, the first continuous web 50 and the third continuous sheet 68 have their entire lengths to be used, set to equal values, and have their path lengths set to the same value from the mask sheet supply unit 96 and the cover sheet supply unit 814 to the second joining station 70 where the first continuous web 50 and the third continuous sheet 68 are joined together.

The second free loop 1504 which is produced in the second suction box 1512 has a radius of curvature ranging from 200 mm to 250 mm in order to prevent developing liquid pods 40 and traps 42 from being peeled off. The second suction box 1512 develops a suction pressure ranging from −6 Kpa to−10 Kpa, whereas the first suction box 246 develops a suction pressure ranging from −0.2 Kpa to −0.4 Kpa. Each of the main feed drum 1502 and the cutting feed drum 1508 comprises a suction drum which has a suction angle of 90° and develops a suction pressure ranging from −12 Kpa to −13 Kpa.

Figure 61:
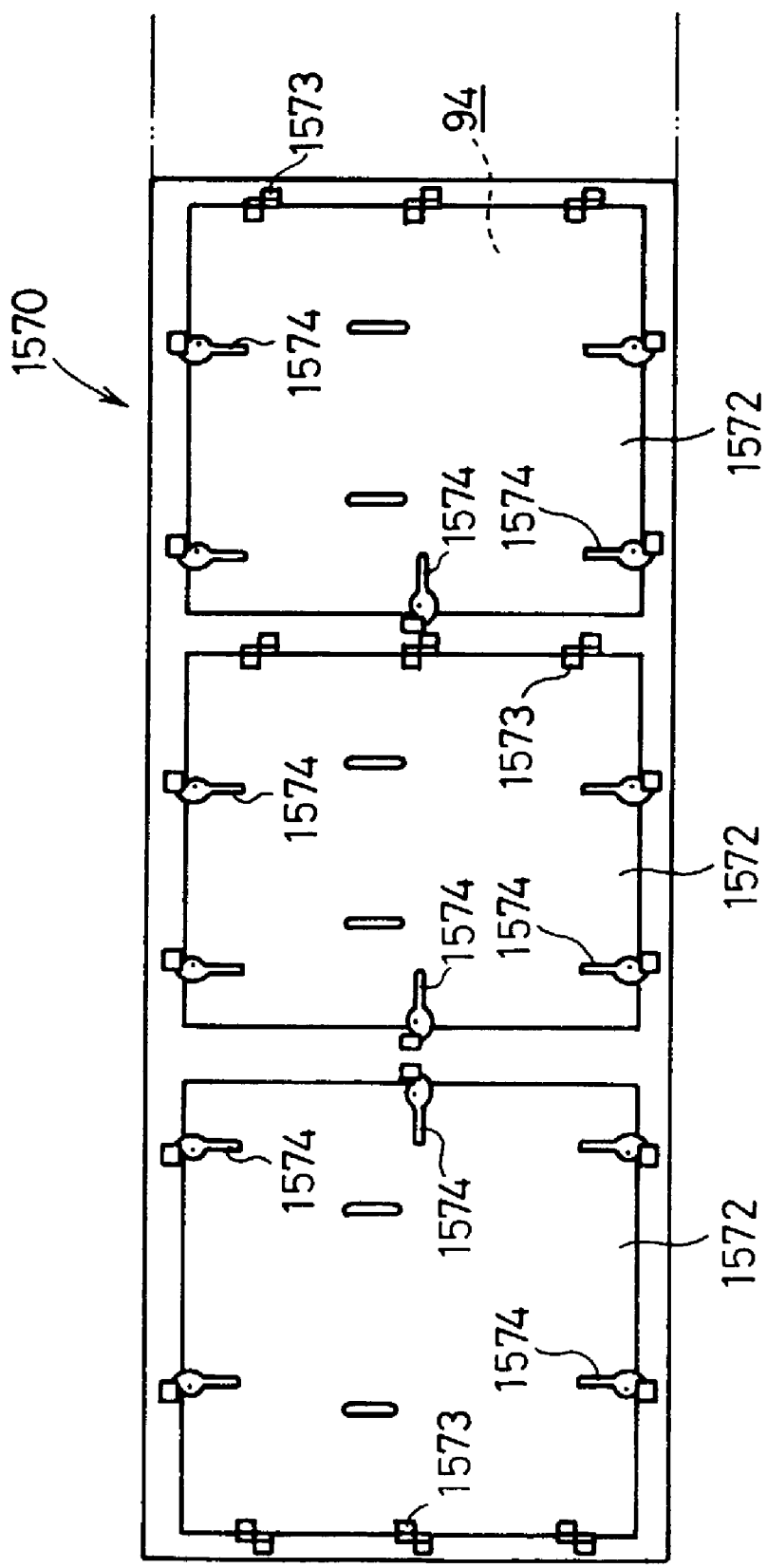
FIG. 61 is a view of a dark box of the manufacturing system.

As shown in FIG. 61, the dark chamber 94 comprises a dark box 1570 having a plurality of light shielding doors 1572 which are openable and closable for inspecting necessary regions in the dark chamber 94. The light shielding doors 1572 are openably and closably mounted on the dark box 1570 by hinges 1573, and can be fixed to the dark box 1570 by a plurality of opening and closing handles 1574.

As shown in FIG. 6, an edge detecting station 57b and a frame detecting station 57c for detecting image frames 22 are disposed immediately upstream of the fourth heat-bonding station 76 and the cutting station 78, respectively. The mark detecting station 57a, the edge detecting station 57b, and the frame detecting station 57c have respective CCD cameras 1610a, 1610b, 1610c. The finally flap bonding mechanism 1396, the main feed drum 1502, and the cutting feed drum 1508 are coupled to respective servomotors 1612, 1614, 1616, which are synchronously controlled by a controller 1624 via respective servo drivers 1618, 1620, 1622. The cutting station 78 is actuated by a servomotor 1626, which is controlled by the controller 1624 via the servo driver 1628.

The trap attaching station 54, the mark forming station 55a, the air hole forming station 55b, the pod attaching station 56, the punching station 59, and the first through fourth heat-bonding stations 64, 66, 72, 76 are synchronously actuated by a cam actuating means 1630 that is controlled by a servomotor 1632. The servomotor 1632 is connected to the controller 1624 via a servo driver 1634. The controller 1624 is supplied with image information from the CCD cameras 1610a, 1610b, 1610c, and performs various control functions in the manufacturing system 90.

Figure 62:
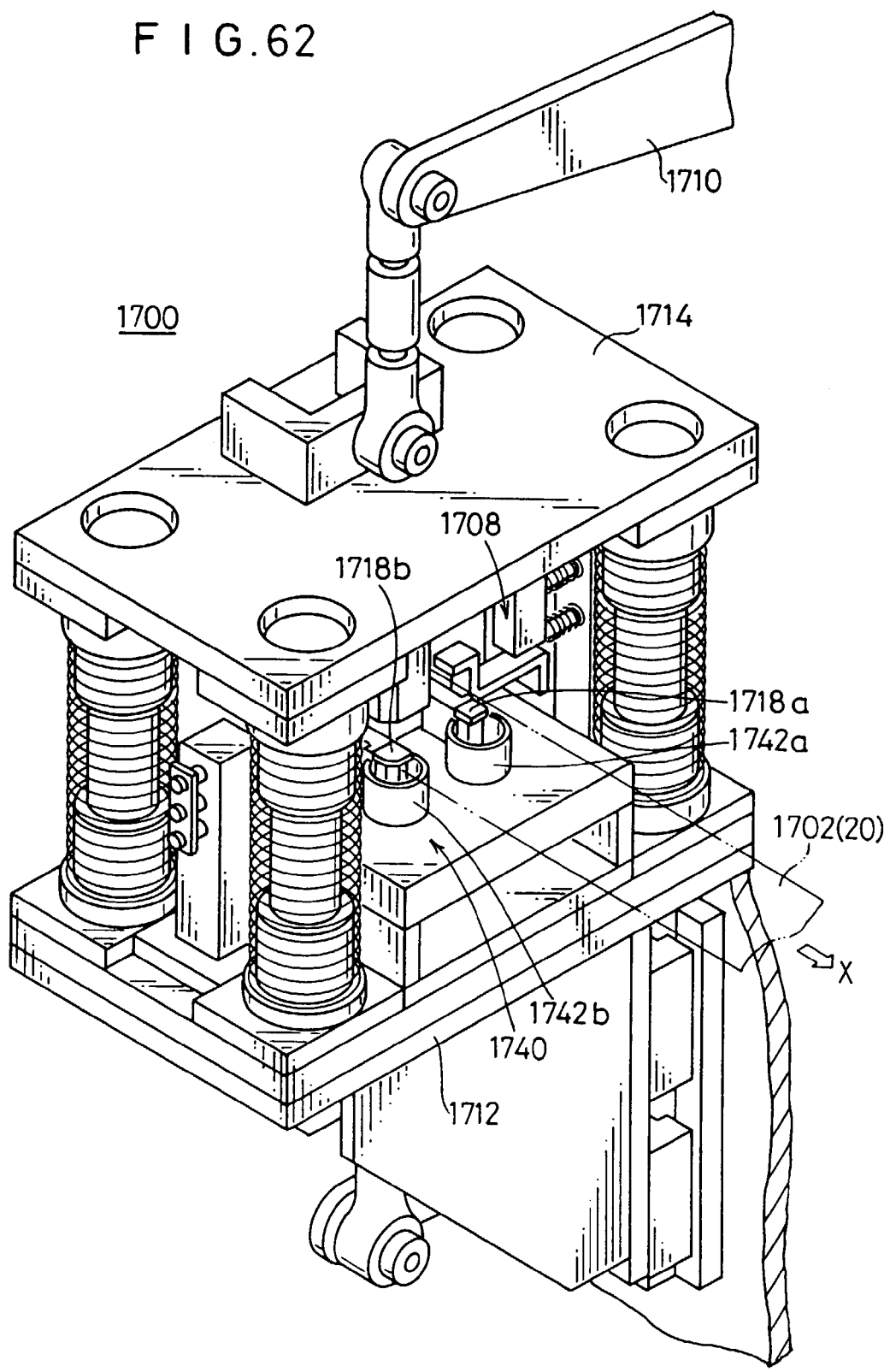
FIG. 62 is a perspective view of a cutting mechanism of the manufacturing system.
Figure 63:
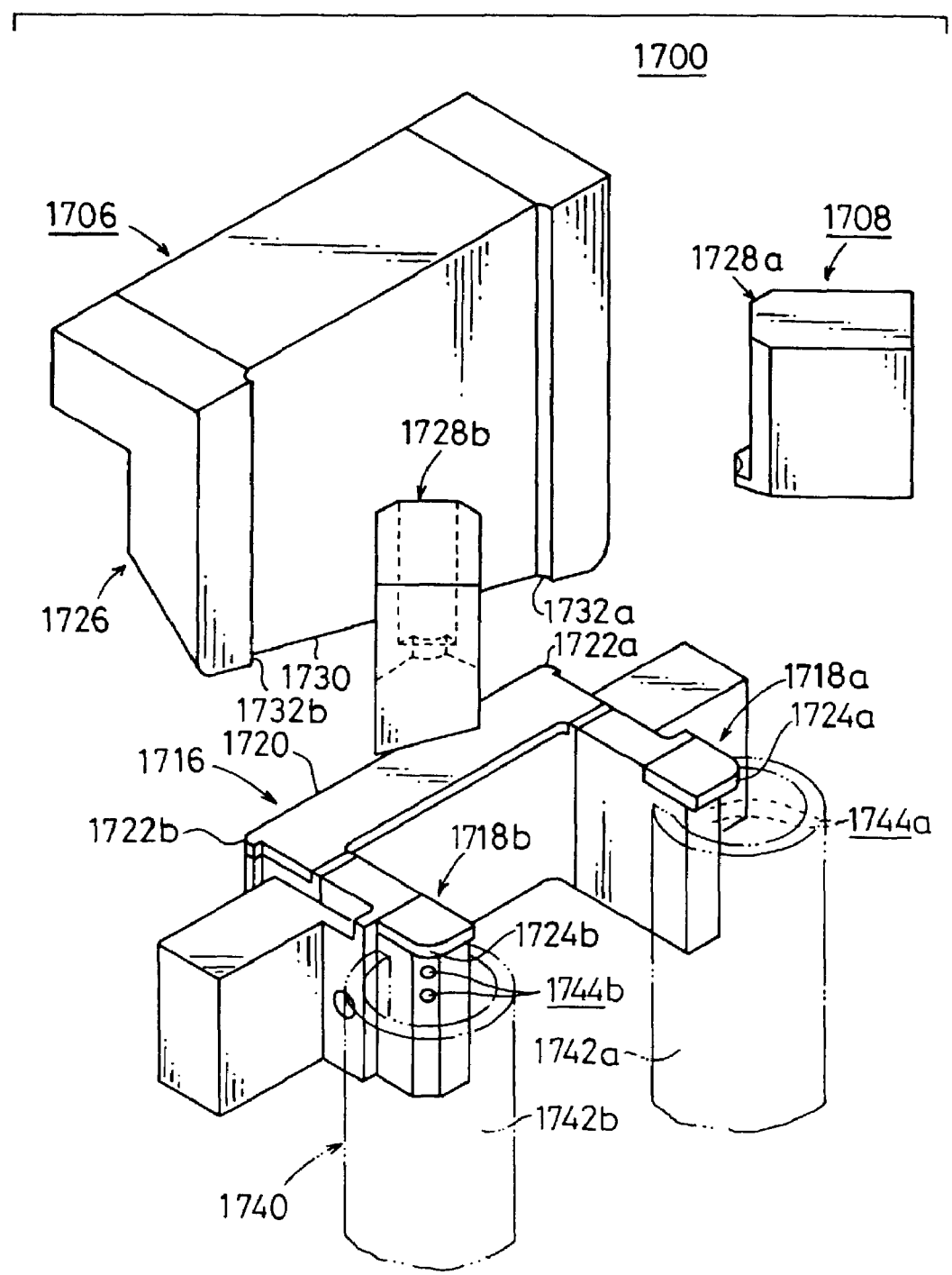
FIG. 63 is a perspective view of first and second machining means of the cutting mechanism.

As shown in FIGS. 62 and 63, the cutting station 78 has a cutting mechanism 1700 for cutting off instant photographic film units 20 one by one. The cutting mechanism 1700 has a first machining means 1706 for cutting a joined body 1702 (see FIG. 64), which comprises the first, second, and third continuous webs 50, 58, 68 bonded together in a stacked state, at substantially intermediate portions of rails 65, and simultaneously beveling opposite corners 1705a of one cut side 1704a, and a second machining means 1708 for beveling opposite corners 1705b of another cut side 1704b opposite to the cut side 1704a after the joined body 1702 is fed a given distance, thereby producing an instant photographic film unit 20 with four beveled corners.

Figure 65:
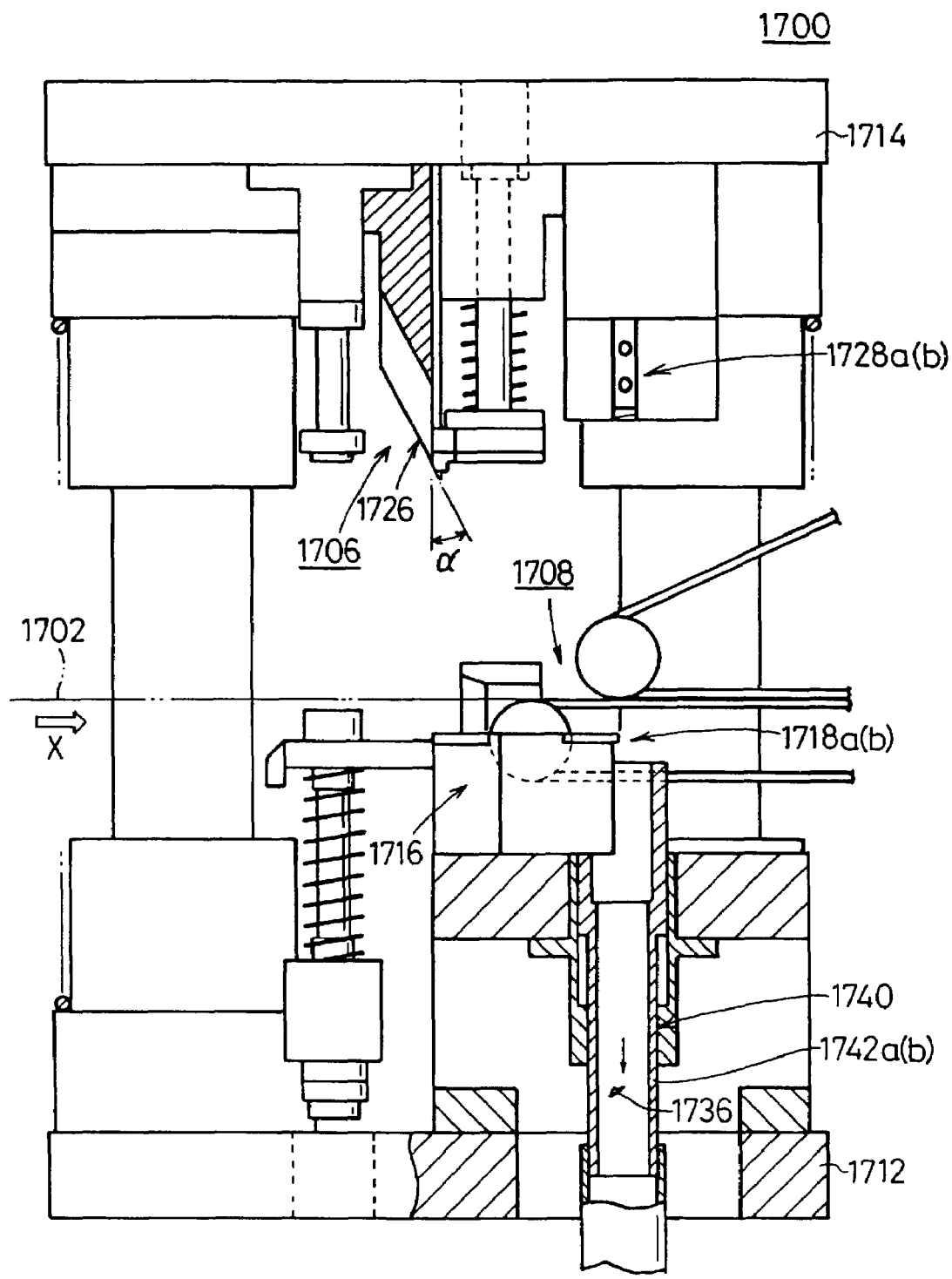
FIG. 65 is a front elevational view, partly in cross section, of the cutting mechanism.

The cutting mechanism 1700 is of a structure which is substantially the same as the structure of the forming machine 304. The cutting mechanism 1700 has a lower die block 1712 and an upper die block 1714 which can be displaced toward and away from each other by a drive cam means 1710. As shown in FIG. 65, the first machining means 1706 has a first lower blade (first blade member) 1716 mounted on the lower die block 1712, and the second machining means 1708 has a pair of second lower blades 1718a, 1718b mounted on the lower die block 1712.

As shown in FIG. 63, the first lower blade 1716 has a carbide edge which comprises a straight edge 1720 for cutting off the joined body 1702 and a pair of curved edges 1722a, 1722b contiguous to and integral with opposite ends of the straight edge 1720. The second lower blades 1718a, 1718b have respective carbide edges which comprise respective curved edges 1724a, 1724b.

The first machining means 1706 has a first upper blade (second blade member) 1726 mounted on the upper die block 1714, and the second machining means 1708 has a pair of second upper blades 1728a, 1728b mounted on the upper die block 1714 (see FIG. 65). As shown in FIG. 63, the first upper blade 1726 has a carbide edge which comprises a straight edge 1730 for cutting off the joined body 1702 and a pair of curved edges 1732a, 1732b contiguous to and integral with opposite ends of the straight edge 1730. The first upper edge 1726 has a blade edge angle a (see FIG. 65) and a shear angle β (see FIG. 66) which are set in predetermined angle ranges. The second upper blades 1728a, 1728b comprise respective curved edges 1734a, 1734b which correspond to the respective curved edges 1724a, 1724b of the second lower blades 1718a, 1718b, and have a shear angle of 10°, for example.

The second machining means 1708 has a retrieving means 1740 for retrieving debris 1736 produced when the corners 1705b of the cut side 1704b of the joined body 1702 are beveled, into a retrieving region (not shown) with an air stream or under a suction. As shown in FIGS. 63 and 65, the retrieving means 1740 comprises tubes 1742a, 1742b disposed in covering relation to the edges of the second lower blades 1718a, 1718b. The tubes 1742a, 1742b are connected to a vacuum source or an air stream source (not shown). The second lower blades 1718a, 1718b have air outlet holes 1744a, 1744b defined near their curved edges 1724a, 1724b.

Figure 66:
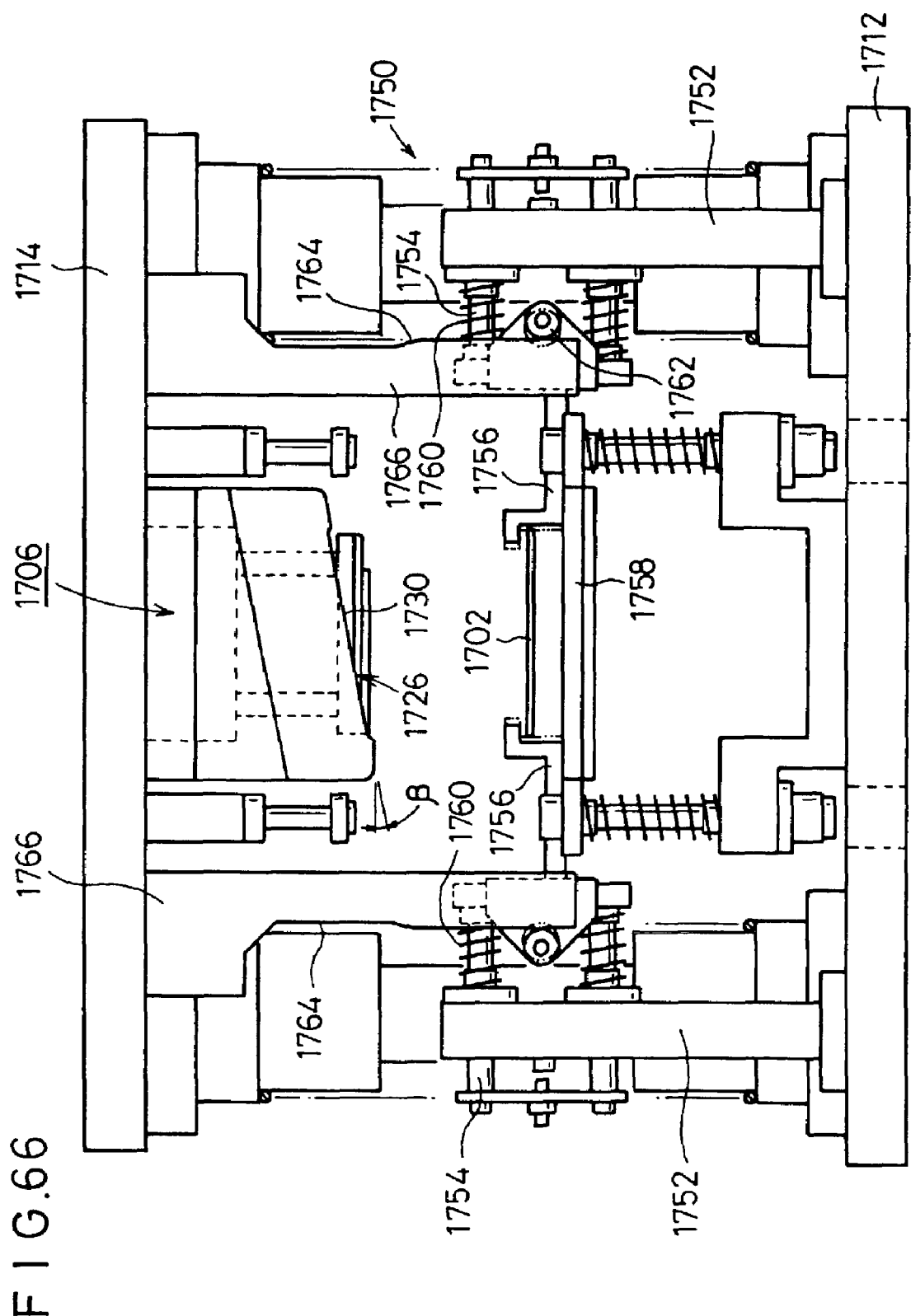
FIG. 66 is a side elevational view of the cutting mechanism.

As shown in FIG. 66, the lower die block 1712 and the upper die block 1714 have a guide means 1750 for holding opposite ends of an instant photographic film unit 20 (joined body 1702) to prevent the instant photographic film unit 20 from being positionally displaced transversely when the instant photographic film unit 20 is cut off by the cutting mechanism 1700. The guide means 1750 has a pair of support columns 1752 vertically mounted on the lower die block 1712, two pairs of rods 1754 horizontally movably mounted on the respective support columns 1752, and a pair of guide members 1756 fixed to the rods 1754.

The guide members 1756 are movably mounted on a holder base 1758 and normally biased toward each other under the bias of springs 1760 disposed around the rods 1754. Cam rollers 1762 are mounted on the respective guide members 1756 and held in rolling contact with respective cam surfaces 1764 of cam members 1766 extending downwardly from and fixed to the upper die block 1714.

As illustrated in FIG. 5, a printing mechanism 1830 is disposed downstream of the cutting station 78. The printing mechanism 1830 has an ink jet printer 1836 for printing unit information on an instant photographic film unit 20, and an air ejecting means (not shown) disposed upstream of the ink jet printer 1836 for applying air to clean the upper surface of the instant photographic film unit 20 before unit information is printed on the instant photographic film unit 20. Another air ejecting means (not shown) disposed downstream of the ink jet printer 1836 for drying an ink applied to the instant photographic film unit 20 by the ink jet printer 1836 while the instant photographic film unit 20 is being fed.

A defective product discharge gate 1838 is disposed downstream of the printing mechanism 1830. The defective product discharge gate 1838 has a first shutter means 1840 for discharging defective films that have been produced upstream of the defective product discharge gate 1838. The first shutter means 1840 is positioned above a removing station 1842. The first shutter means 1840 and the removing station 1842 will be described in detail later on.

Downstream of the stacking station 80, there are disposed a stacking mechanism 1846 for supplying 10 instant photographic film units 20 stacked in the stacking station 80 altogether downwardly into a standby station 1844, and a switching feed mechanism 1850 for selectively feeding the instant photographic film units 20 in the standby station 1844 to the packing station 84 and a discharge station 1848.

Figure 67:
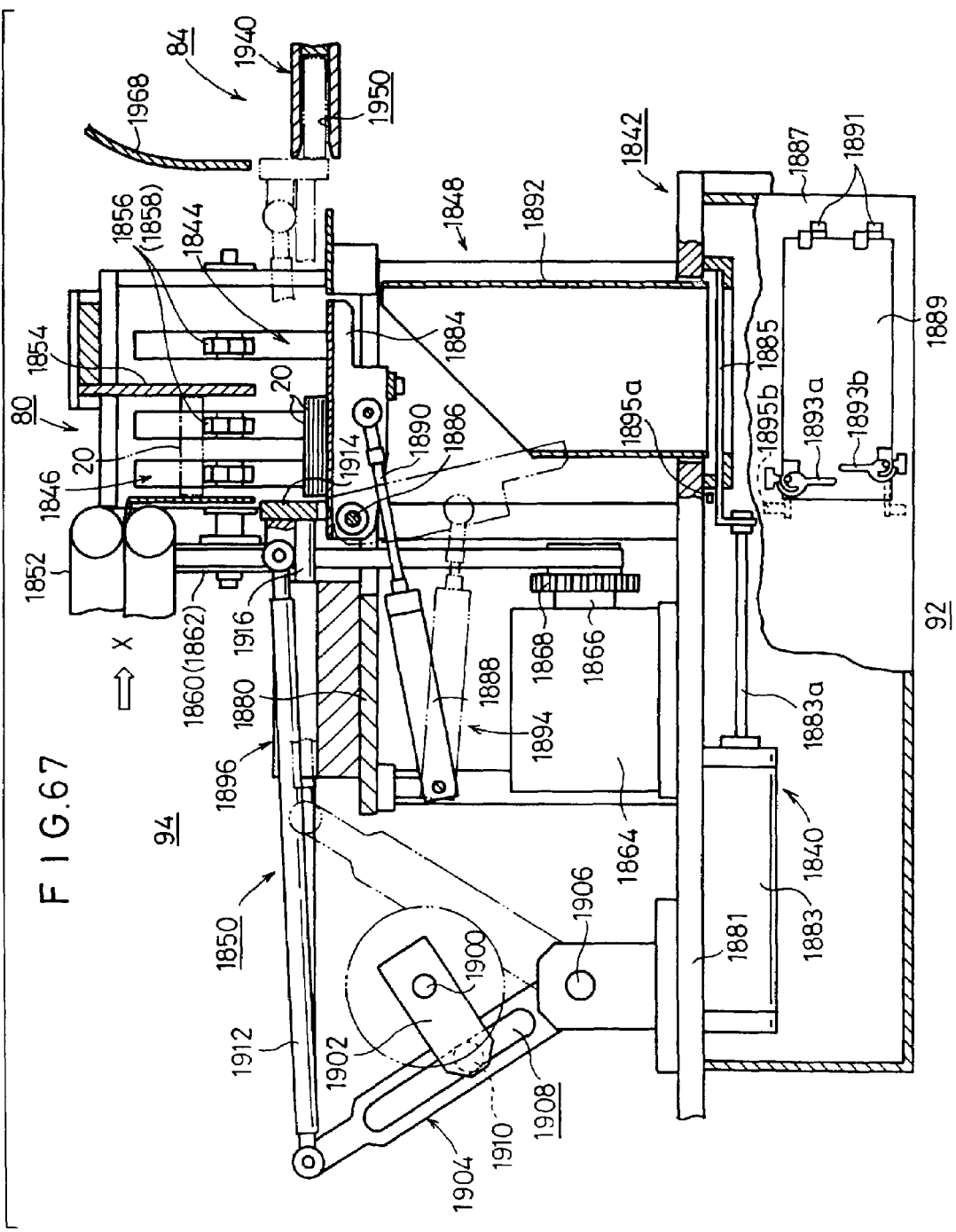
FIG. 67 is a side elevational view, partly in cross section, of a stacking station of the manufacturing system.

As shown in FIG. 67, the stacking mechanism 1846 comprises a stacking box 1854 disposed at the outlet of a conveyor 1852 which feeds one instant photographic film unit 20 at a time in the direction indicated by the arrow X, first and second fingers 1856, 1858 positioned at the bottom of the stacking box 1854 for holding the opposite ends of the instant photographic film unit 20 in the longitudinal direction thereof, i.e., in the direction in which the instant photographic film unit 20 is spread, or stated otherwise, the opposite sides of the instant photographic film unit 20 in the transverse direction thereof, i.e., in the direction in which the instant photographic film unit 20 is fed, and first and second rotors 1860, 1862 rotatable in synchronism with each other, the first and second fingers 1856, 1858 being fixed to the first and second rotors 1860, 1862, respectively.

Figure 68:
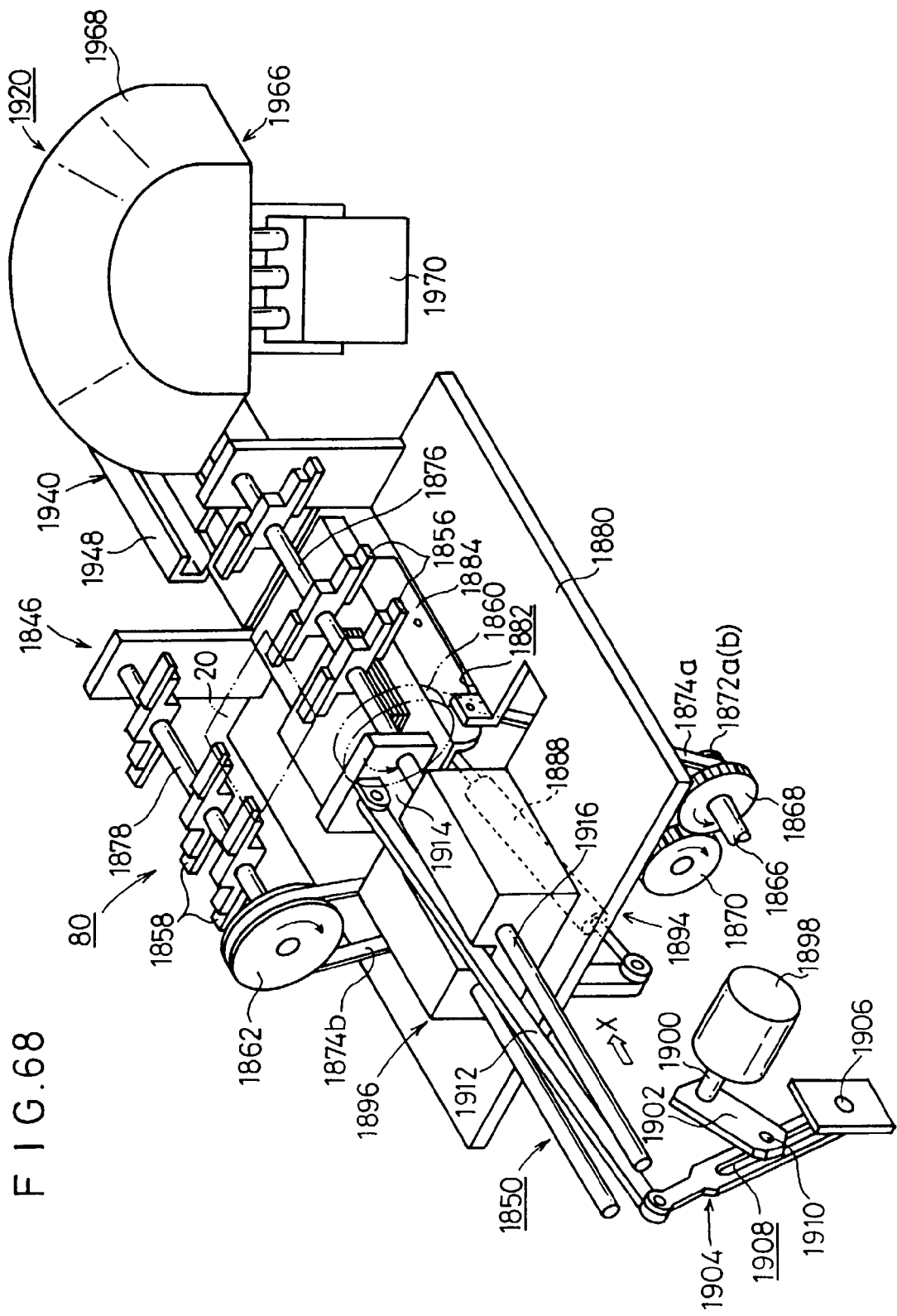
FIG. 68 is a perspective view of the stacking station.

As shown in FIGS. 67 through 69, the stacking mechanism 1846 includes a motor 1864 having a drive shaft 1866 to which there is fixed a first gear 1868 that is held in mesh with a second gear 1870. Belts 1874a, 1874b are trained around respective pulleys 1872a, 1872b mounted coaxially on the respective first and second gears 1868, 1870 and the respective first and second rotors 1860, 1862. The first and second rotors 1860, 1862 comprise pulleys which are fixed at their centers to ends of first and second rotatable shafts 1876, 1878, whose other ends are rotatably supported on a table 1880.

The first and second fingers 1856, 1858, e.g., three first fingers 1856 and three second fingers 1858, are fixedly mounted on the first and second rotatable shafts 1876, 1878 at axially spaced intervals. The first and second fingers 1856, 1858 are provided to handle instant photographic film units 20 of different dimensions. The instant photographic film units 20 in the first embodiment can be supported by two of the first fingers 1856 and two of the second fingers 1858.

The table 1880 has an opening 1882 defined therein for discharging 10 instant photographic film units 20 held by the stacking mechanism 1846 into the discharge station 1848. A swing base 1884 swingably supported on a support shaft 1886 is mounted in the opening 1882, and is coupled to a rod 1890 extending from a cylinder 1888 that is swingably mounted on the table 1880. The swing base 1884 is disposed above a hopper 1892 which serves to discharge 10 instant photographic film units 20 in an unpacked state.

The first shutter means 1840 and the removing station 1842 are disposed below the hopper 1892. The first shutter means 1840 has a cylinder 1883 fixed to the lower surface of a base plate 1881 and having a horizontal rod 1883a to which a plate-like light shielding shutter 1885 is fixed. The light shielding shutter 1885 can be moved between a position in which it closes the outlet of the hopper 1892 and a position away from the outlet of the hopper 1892. The light shielding shutter 1885 as it is opened and closed is detected by a sensor 1895a.

The removing station 1842 has a dark box 1887 connected to the base plate 1881. The dark box 1887 has a door 1889 openably and closably mounted by hinges 1891 as a second shutter means for the removing station 1842. The door 1889 has closing handles 1893a, 1893b, at least one of which is associated with a limit switch 1895b for detecting opening and closing movement thereof.

The switching feed mechanism 1850 comprises a shutter means 1894 having the swing base 1884 and a pusher means 1896 for pushing instant photographic film units 20 toward the packing station 84. The pusher means 1896 includes a motor 1898 having a drive shaft 1900 fixed to an end of a rotatable plate 1902 whose other end engages a swing plate 1904. The swing plate 1904 is swingably supported by a support shaft 1906 and has a longitudinally elongate hole 1908 defined therein which receives a cam 1910 fixed to an end of the rotatable plate 1902. The swing plate 1904 has an end remote from the support shaft 1904 and coupled to an end of a long cam plate 1912 whose other end is connected to a pusher plate 1914. The pusher plate 1914 is slidably supported on the table 1880 by a pair of guide bars 1916.

Figure 70:
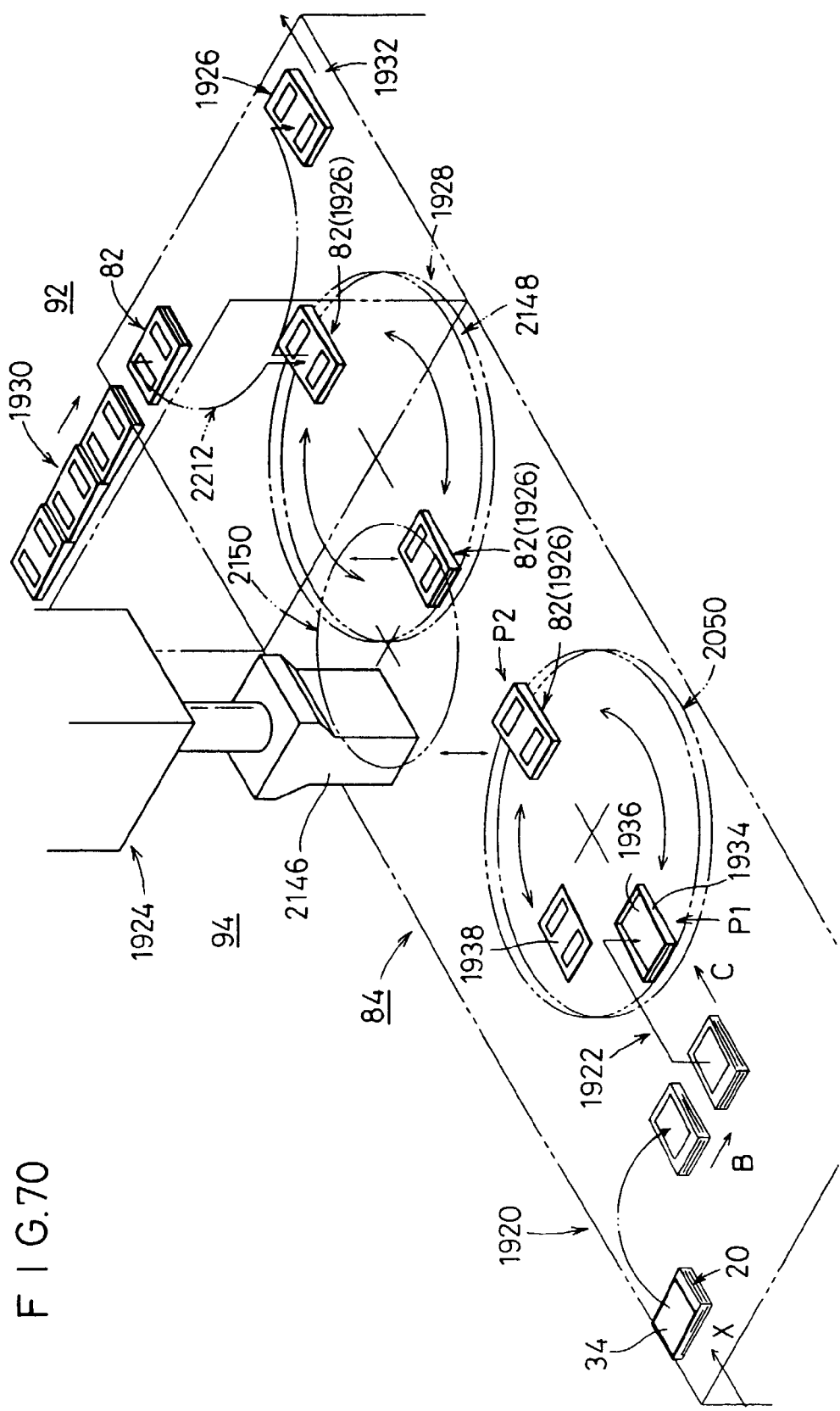
FIG. 70 is a schematic perspective view illustrative of the manner in which a packing station operates.
Figure 71:
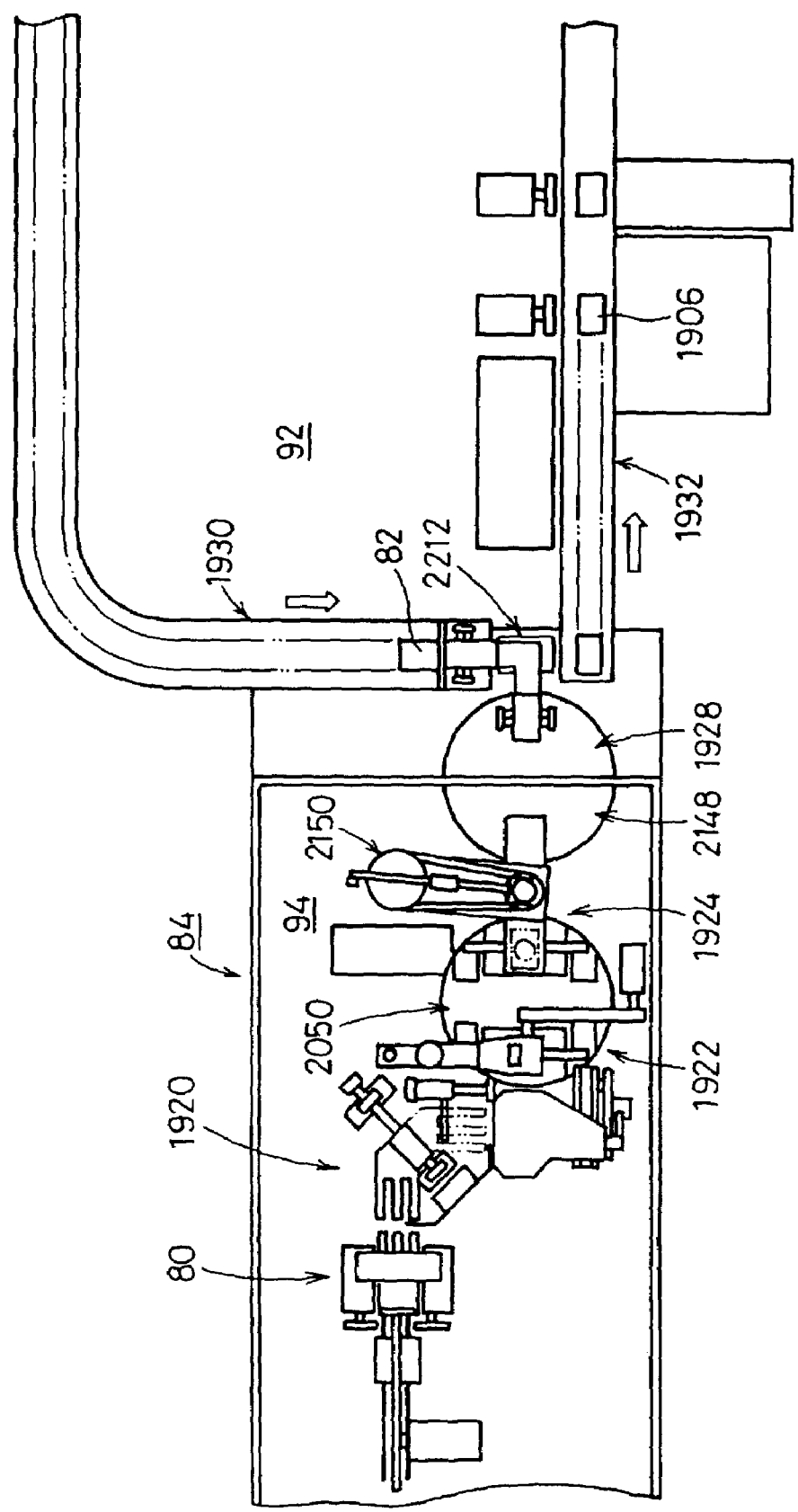
FIG. 71 is a plan view of the packing station.

As shown in FIGS. 70 and 71, the packing station 84 comprises a unit reversing mechanism 1920 for reversing stacked instant photographic film units 20 such that their exposure surfaces 34 face downwardly, a unit loading mechanism 1922 for loading the instant photographic film units 20 into a film pack 82 while holding the instant photographic film units 20 curved as a whole, a fusing mechanism 1924 for ultrasonically fusing a film pack 82 which houses instant photographic film units 20 therein, a light shielding mechanism 1928 for delivering an empty film pack 82 from the bright chamber 92 into the dark chamber 94 and also delivering an ultrasonically fused product 1926 from the dark chamber 94 into the bright chamber 92, an empty pack feeding mechanism 1930 for feeding an empty film pack 82 to the light shielding mechanism 1928, and a product feeding mechanism 1932 for receiving a product 1926 from the light shielding mechanism 1928.

The film pack 82 comprises a pack casing 1934 for accommodating 10 instant photographic film units 20 therein, a light shielding plate 1936 placed in the pack casing 1934 in facing relation to the exposure surfaces 34 of the instant photographic film units 20 in the pack casing 1934, and a lid 1938 fused to the pack casing 1934.

Figure 72:
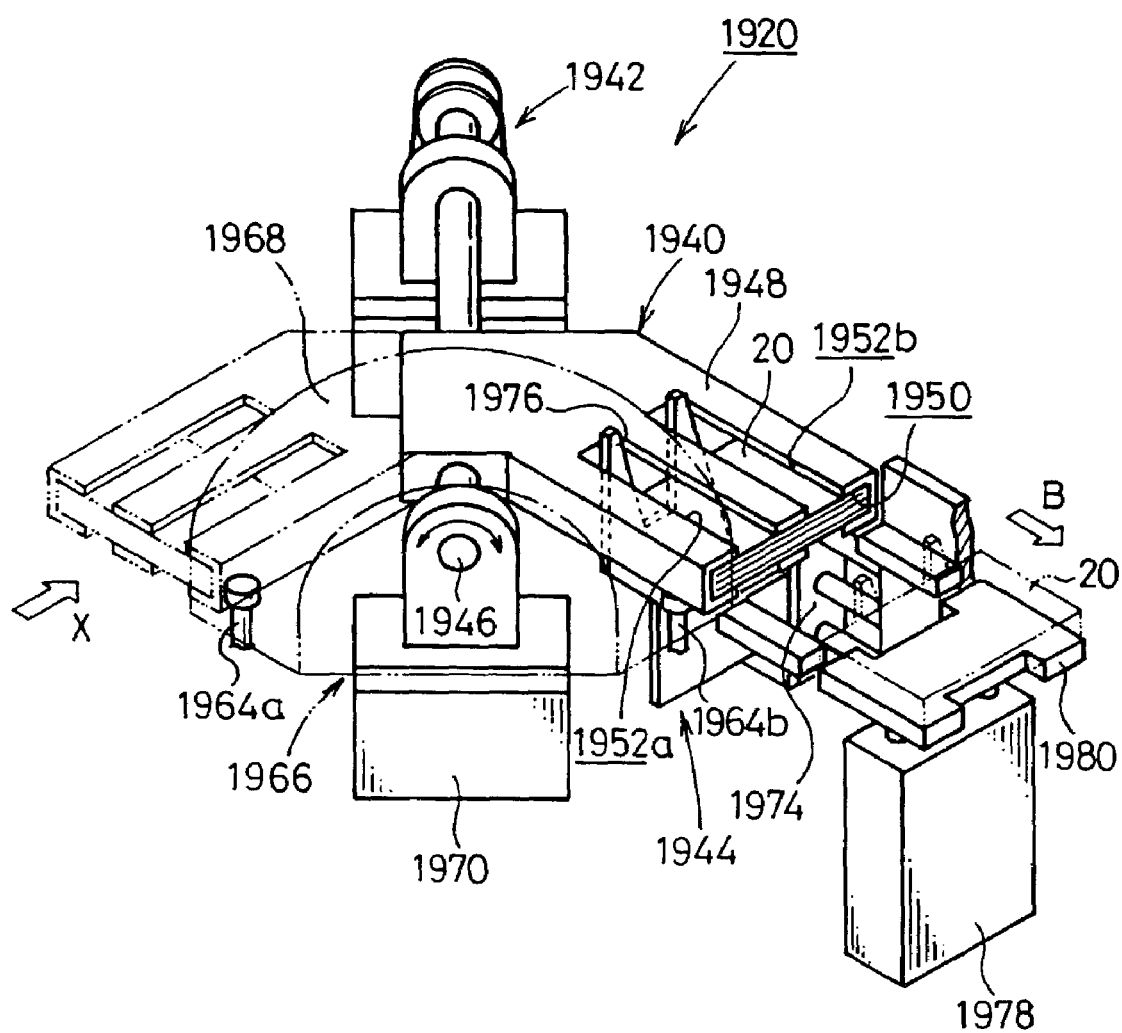
FIG. 72 is a perspective view of a unit reversing mechanism in the packing station.
Figure 73:
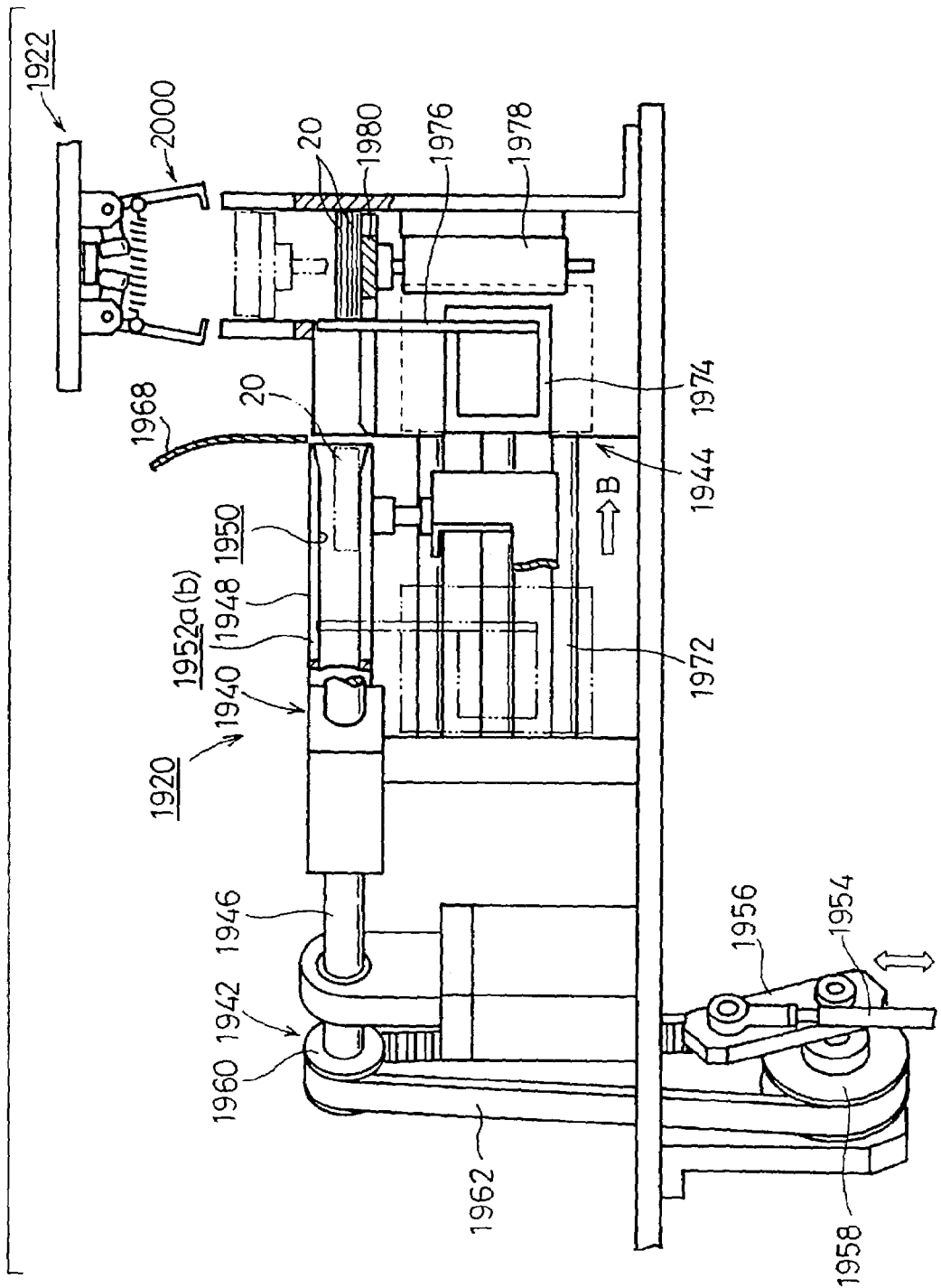
FIG. 73 is a side elevational view of the unit reversing mechanism.

As shown in FIGS. 72 and 73, the unit reversing mechanism 1920 comprises a gripping means 1940 for gripping 10 stacked instant photographic film units 20, a turning means 1942 for turning the gripping means 1940 through an angle of 180°, and a removing means 1944 for removing the instant photographic film units 20 which are turned 180° by the turning means 1942 from the gripping means 1940.

The gripping means 1940 has a casing 1948 fixed to and angularly movable by a rotatable shaft 1946. The casing 1948 has an opening 1950 defined in a distal end thereof for receiving and releasing instant photographic film units 20 therethrough. The casing 1948 also has grooves 1952a, 1952b defined in each of upper and lower walls thereof and extending in the direction indicated by the arrow B in which instant photographic film units 20 are taken out of the casing 1948.

The turning means 1942 has a cam rod 1954 connected by a link 1956 to a first pulley 1958 (see FIG. 73). The first pulley 1958 is operatively coupled to a second pulley 1960 fixed to an end of the rotatable shaft 1946 by an endless belt 1962 that is trained around the first pulley 1958 and the second pulley 1960. The casing 1948 is selectively supported in given turned positions at the ends of the 180° angular range by respective stoppers 1964a, 1964b (see FIG. 72).

A unit dislodgment preventing means 1966 for preventing instant photographic film units 20 from being dislodged out of the casing 1948 is disposed in a position where the casing 1948 is turned. Specifically, as shown in FIGS. 68 and 72, the unit dislodgment preventing means 1966 has a guide wall 1968 curved along the path of the distal end of the casing 1948 as it turns. The guide wall 1968 is vertically movable by a cylinder 1970. Alternatively, the guide wall 1968 may be fixed in a given position.

As shown in FIGS. 72 and 73, the removing means 1944 has a rodless cylinder 1974 movable in the direction indicated by the arrow B along a plurality of guide bars 1972. To the rodless cylinder 1974, there is fixed a forked removal plate 1976 positioned in alignment with the grooves 1952a, 1952b in the casing 1948 which has turned instant photographic film units 20 by 180°. A vertically movable table 1980 coupled to a cylinder 1978 is disposed in a position to which instant photographic film units 20 are removed from the casing 1948 by the removing means 1944 in the direction indicated by the arrow B.

Figure 74:
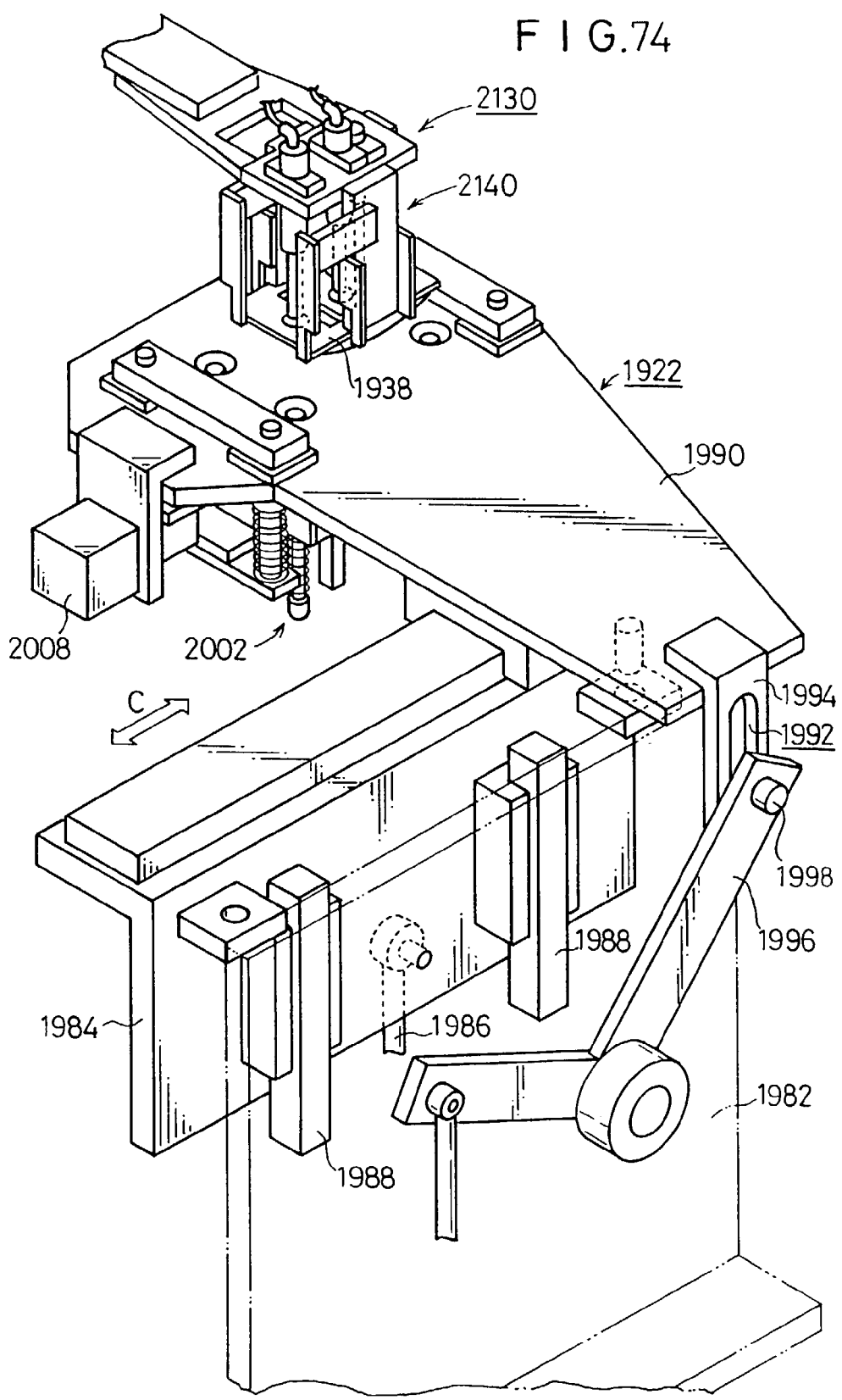
FIG. 74 is a perspective view of a unit loading mechanism.

As shown in FIG. 74, the unit loading mechanism 1922 has a vertically movable base 1984 that is vertically movable with respect to a support plate 1982. The vertically movable base 1984 is coupled to a cam 1998 and vertically movable thereby along a pair of linear guides 1988 extending vertically on the support plate 1982. A slide base 1990 is mounted on the vertically movable base 1984 for horizontal movement in the directions indicated by the arrow C. An attachment plate 1994 with a vertical slot 1992 defined therein is mounted on the slide base 1990. The vertical slot 1992 receives therein a cam 1989 which is mounted on a distal end of a swing cam 1996.

Figure 75:
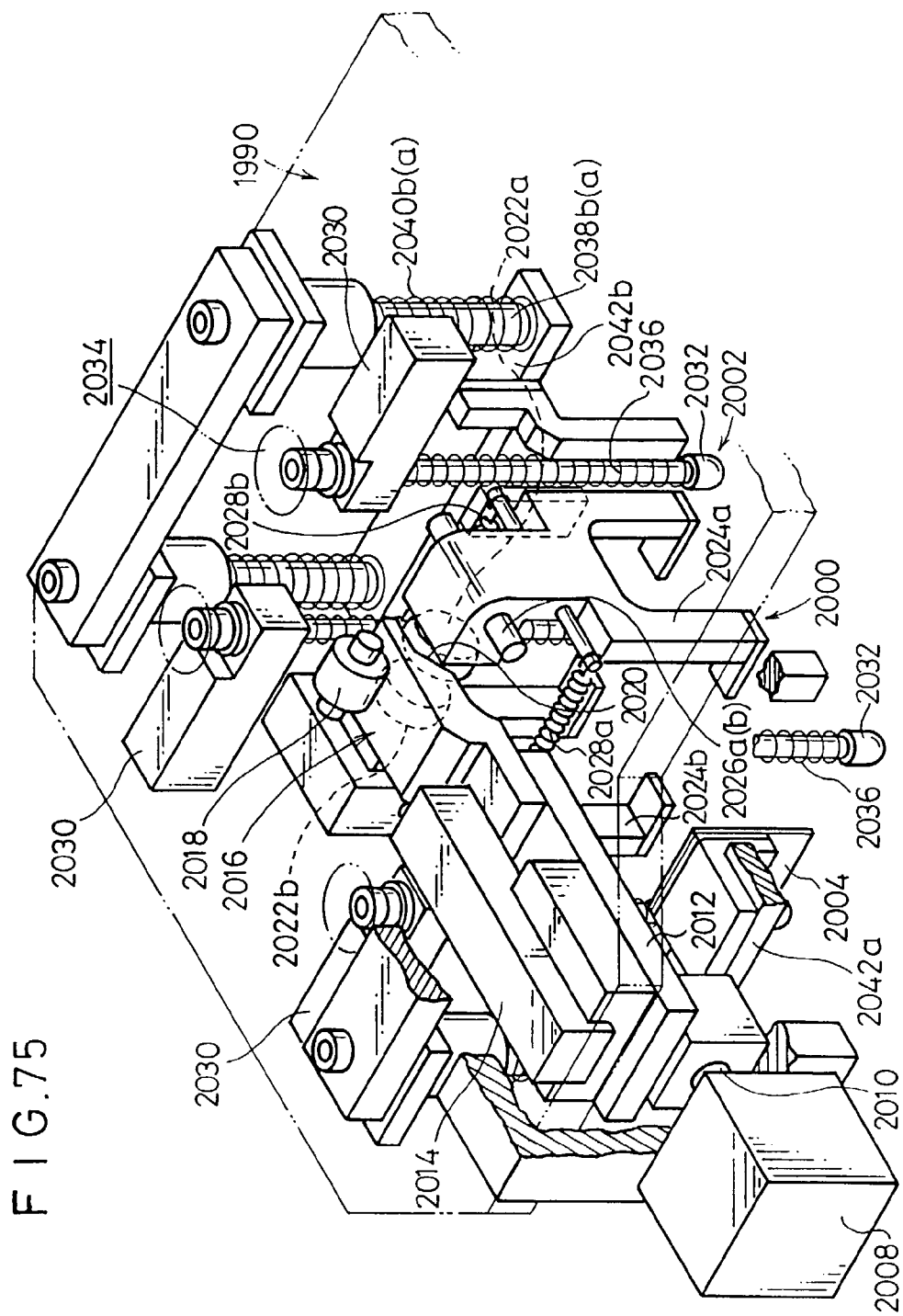
FIG. 75 is a perspective view of a portion of the unit loading mechanism.

As shown in FIGS. 75 and 76, the slide base 1990 supports thereon a holding finger means 2000 which is openable and closable for holding opposite side edges of stacked instant photographic film units 20 which lie perpendicularly to their longitudinal direction, i.e., the direction in which instant photographic film units 20 can be spread, a presser means 2002 for pressing downwardly side edges of developing liquid pods 40 and side edges of traps 42, and a pair of guides 2004, 2006 for guiding the opposite ends of instant photographic film units 20 into the pack casing 1934 of the film pack 82, the guides 2004, 2006 being spaced from each other by a distance shorter than the length of instant photographic film units 20 in their longitudinal direction, i.e., the direction in which instant photographic film units 20 can be spread.

The holding finger means 2000 comprises a cylinder 2008 fixed to the slide base 1990 and a movable table 2012 fixed to a distal end of a rod 2010 which extends horizontally from the cylinder 2008. The movable table 2012 is supported by a linear guide 2014 attached to the lower surface of the slide base 1990 for horizontal movement. A cam 2016 is fixedly mounted on a distal end of the movable table 2012. The cam 2016 has an upper surface supported by a roller 1018 which is rotatably mounted on the slide base 1990, and a lower cam surface 2020 engaging a pair of cam followers 2022a, 2022b.

The cam followers 2022a, 2022b are mounted on respective swing finger members 2024a, 2024b that are swingably mounted on the bottom of the slide base 1990 by respective support shafts 2026a, 2026b. The swing finger members 2024a, 2024b are normally urged to swing toward each other by springs 2028a, 2028b whose opposite ends are supported by the swing finger members 2024a, 2024b.

The presser means 2002 has four vertical pressing rods 2032 vertically movably supported on the bottom of the slide base 1990 by respective blocks 2030. The slide base 1990 has four holes 2034 defined therein which receive upper portions of the respective pressing rods 2032. The pressing rods 2032 are normally urged to move downwardly under the bias of springs 2036 that are interposed between large-diameter lower ends of the pressing rods 2032 and the blocks 2030.

The slide base 1990 supports thereon attachment plates 2042a, 2042b of L-shaped cross section which are disposed near the opposite ends of instant photographic film units 20. The attachment plates 2042a, 2042b are vertically movable by guide rods 2038a, 2038b and springs 2040a, 2040b. The guides 2004, 2006 are fixedly mounted on the attachment plates 2042a, 2042b. The guide 2004 comprises a thin plate positioned near the developing liquid pods 40 of instant photographic film units 20. When instant photographic film units 20 are inserted into a pack casing 1934, the guide 2004 is also inserted into the pack casing 1934. The guide 2006 is positioned near the traps 42 of instant photographic film units 20 for abutment against an upper surface of the pack casing 1934.

Figure 77:
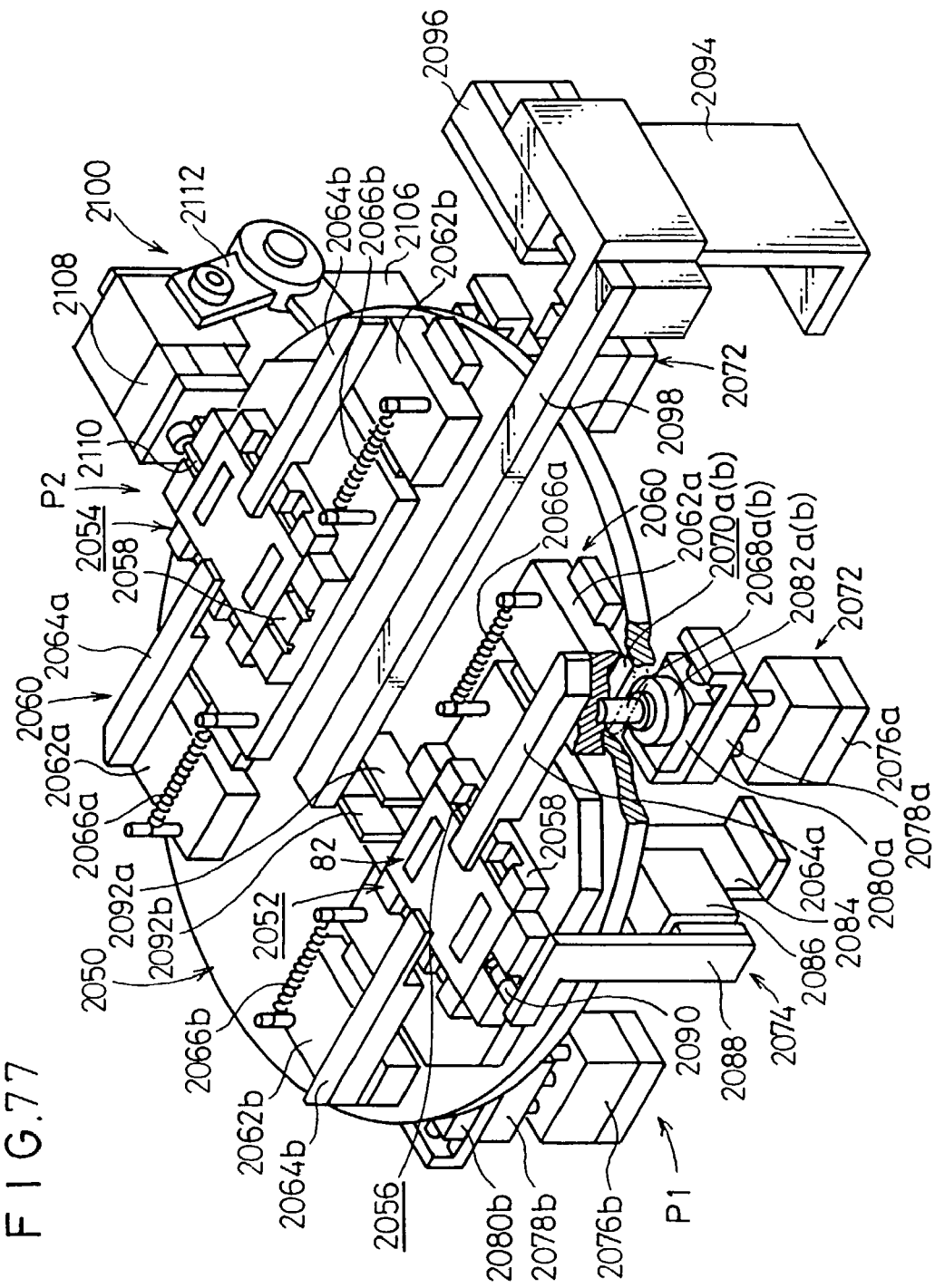
FIG. 77 is a perspective view of a first turntable.
Figure 78:
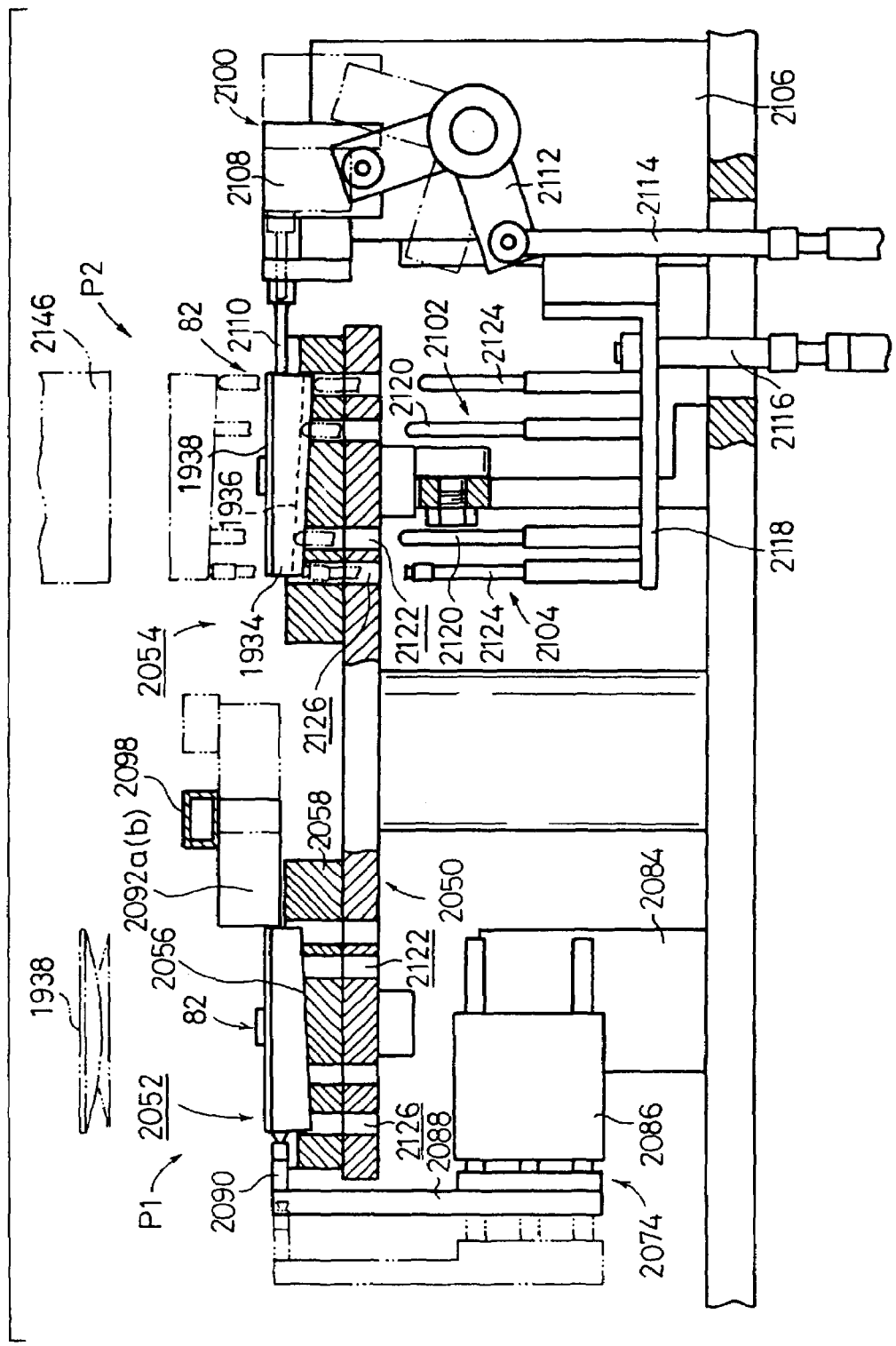
FIG. 78 is a front elevational view, partly in cross section, of the first turntable.
Figure 79:
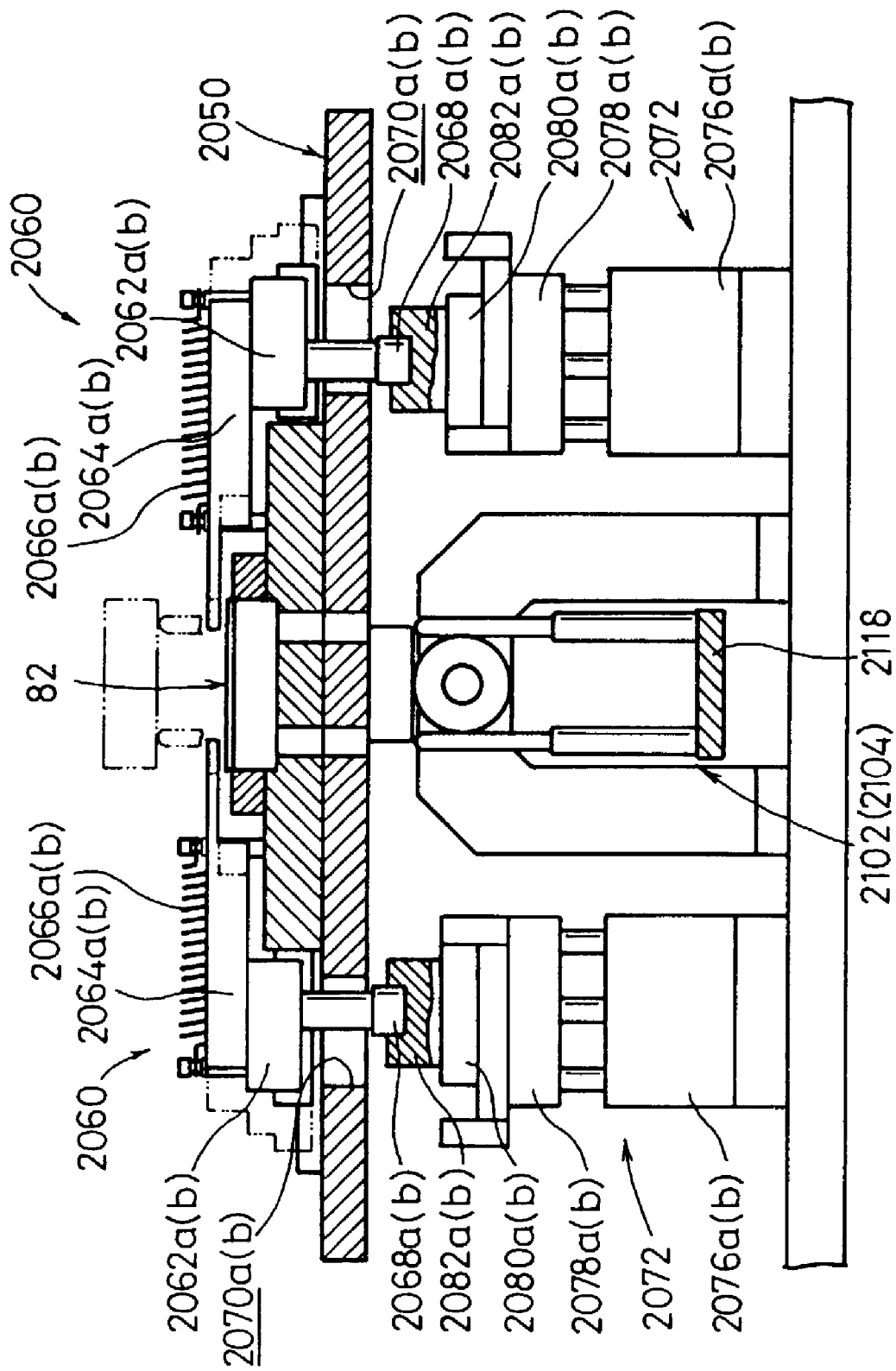
FIG. 79 is a side elevational view, partly in cross section, of the first turntable.

A first turntable 2050 (see FIG. 77) is angularly movably disposed for angular movement through 180° in normal and reverse directions between a unit inserting position P1 for inserting instant photographic film units 20 into a pack casing 1934 and a lid fusing position P2 for fusing a lid 1938 to a pack casing 1934. As shown in FIGS. 77 through 79, the first turntable 2050 has a pair of diametrically opposite pack rests 2052, 2054 for positioning pack casings 1934. The pack rests 2052, 2054 have respective pack holders 2056 for holding pack casings 1934, the pack holders 2056 being constructed of a plurality of blocks 2058. The first turntable 2050 also has a pair of lid holding means 2060 for holding lids 1938 on pack casings 1934 that are placed in the pack holders 2056.

Each of the lid holding means 2060 has a pair of movable bases 2062a, 2062b movable toward and away from respective opposite side edges of a pack casing 1934, and a pair of holder bars 2064a, 2064b projecting toward the pack casing 1034. The holder bars 2064a, 2064b have ends fixed to the respective movable bases 2062a, 2062b and opposite ends shaped into a thinner configuration. The movable bases 2062a, 2062b are normally urged to move each other by springs 2066a, 2066b. Engaging rods 2068a, 2068b are fixed to the bottoms of the movable bases 2062a, 2062b and project downwardly through respective slots 2070a, 2070b that are defined in the first turntable 2050.

In the unit inserting position P1, there are disposed a releasing means 2072 for releasing a lid 1938 from the lid holding means 2060, and a pack holding means 2074 for holding a pack casing 1934. The releasing means 2072 has a pair of vertically movable cylinders 2076a, 2076b associated respectively with the movable bases 2062a, 2062b for vertically moving vertically movable tables 2078a, 2078b which support thereon respective rodless cylinders 2080a, 2080b that are horizontally movable. The engaging rods 2068a, 2068b have lower ends fitted in respective engaging tubes 2082a, 2082b that are fixed to the rodless cylinders 2080a, 2080b.

The pack holding means 2074 has a cylinder 2086 fixed to a support 2084, a vertical arm 2088 horizontally movable by the cylinder 2086, and a rod 2090 fixed to an upper end of the vertical arm 2088 for pressing a pack casing 1934. A pair of presser plates 2092a, 2092b are disposed in confronting relation to the rod 2090 for movement toward and away from the rod 2090. The presser plates 2092a, 2092b are fixed to a distal end of an elongate arm 2098 that is horizontally movable by a cylinder 2096 fixed to a support plate 2094.

In the lid fusing position P2, there are disposed a pack holding means 2100, a light shielding plate holding means 2102 for pushing a light shielding plate 1936 into a pack casing 1934 when a lid 1938 is fused, and a product removing means 2104 for pushing a fused product 1926 upwardly. The pack holding means 2100 has a slide block 2108 horizontally movably supported on a base 2106, and a rod 2110 fixed to a distal end of the slide block 2108. As shown in FIG. 78, the slide block 2108 engages a swing cam 2112 that is angularly movable by a cam rod 2114.

The light shielding plate holding means 2102 has a vertically movable member 2118 that is vertically movable with respect to the base 2106 by a cam rod (actuator) 2116, and four vertical ejector pins 2120 fixedly mounted on the vertically movable member 2118 for pushing a light shielding plate 1936. The first turntable 2050 and the pack rests 2052, 2054 have vertical holes 2122 defined therein for passage therethrough of the four vertical ejector pins 2120.

The product removing means 2104 has four vertical remover rods 2124 fixedly mounted on the vertically movable member 2118. The first turntable 2050 and the pack rests 2052, 2054 have vertical holes 2126 defined therein for passage therethrough of the four vertical remover pins 2124. Suction cups are mounted on upper distal ends of two of the remover rods 2124. While the four ejector pins 2120 are positioned for alignment with certain positions on a light shielding plate 1936, the four remover pins 2124 are positioned for alignment with certain pressing positions on a pack casing 1934.

Figure 80:
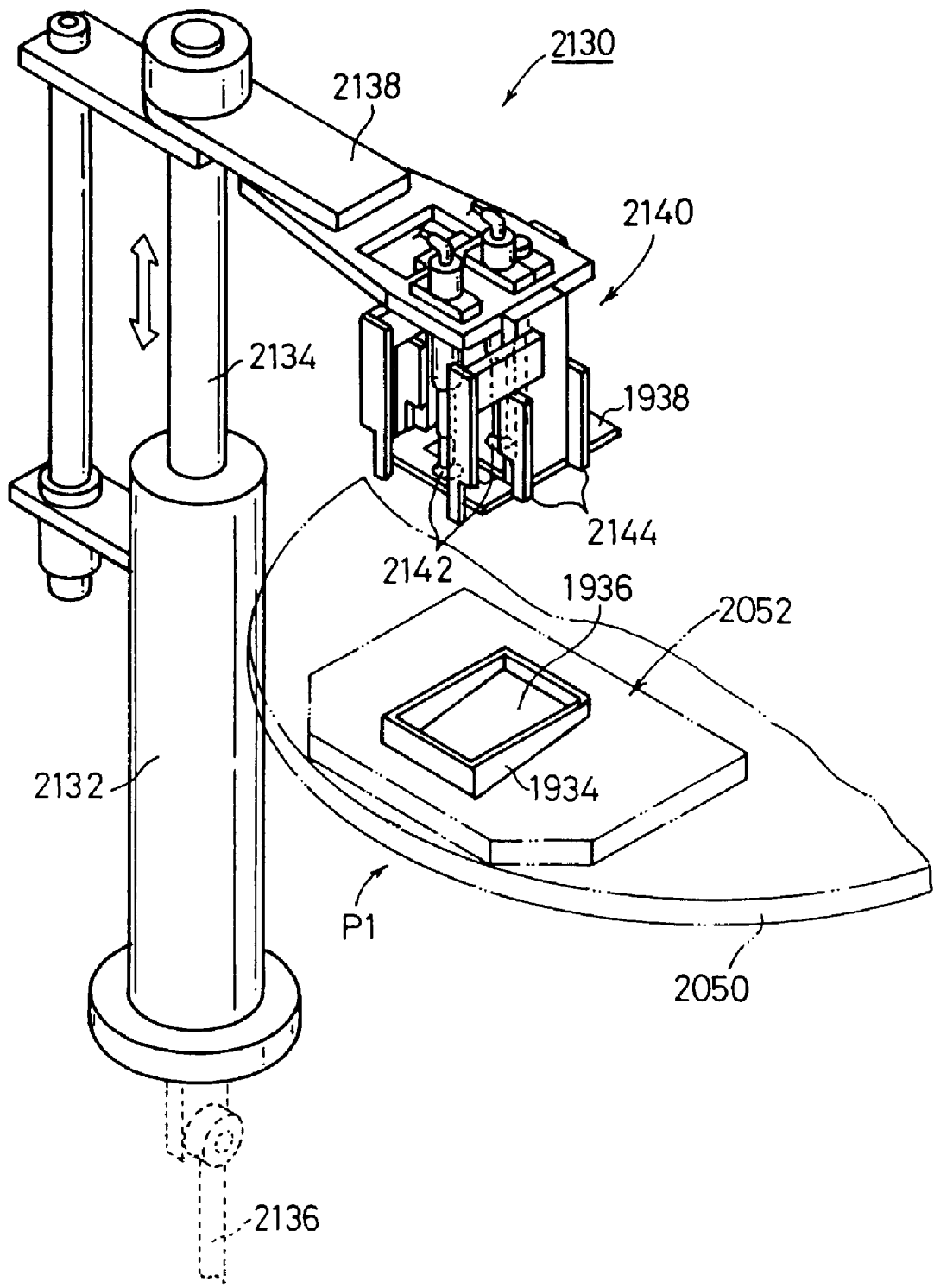
FIG. 80 is a perspective view of a lid attracting means.

A lid attracting means 2130 for attracting a lid 1938 is disposed above the unit inserting position P1. As shown in FIG. 80, the lid attracting means 2130 has a vertical rod 2134 vertically movably disposed in a support column 2132. The vertical rod 2134 is vertically movable by a cam rod 2136, and supports on its upper end an attracting unit 2140 via an attachment plate 2138. The attracting unit 2140 comprises two suction cups 2142 for attracting a lid 1938 under vacuum and a plurality of support plates 2144 for supporting the attracted lid 1938 in a predetermined attitude.

As shown in FIG. 70, the fusing mechanism 1924 for ultrasonically fusing a lid 1938 to a pack casing 1934 comprises an ultrasonic fusing machine 2146 that is vertically movably disposed above the lid fusing position P2. A second turntable 2148 is disposed closely to the first turntable 2050. A first pack delivery mechanism 2150 is disposed for transferring an empty pack 82 and a product 1926 between the first and second turntables 2050, 2148.

Figure 81:
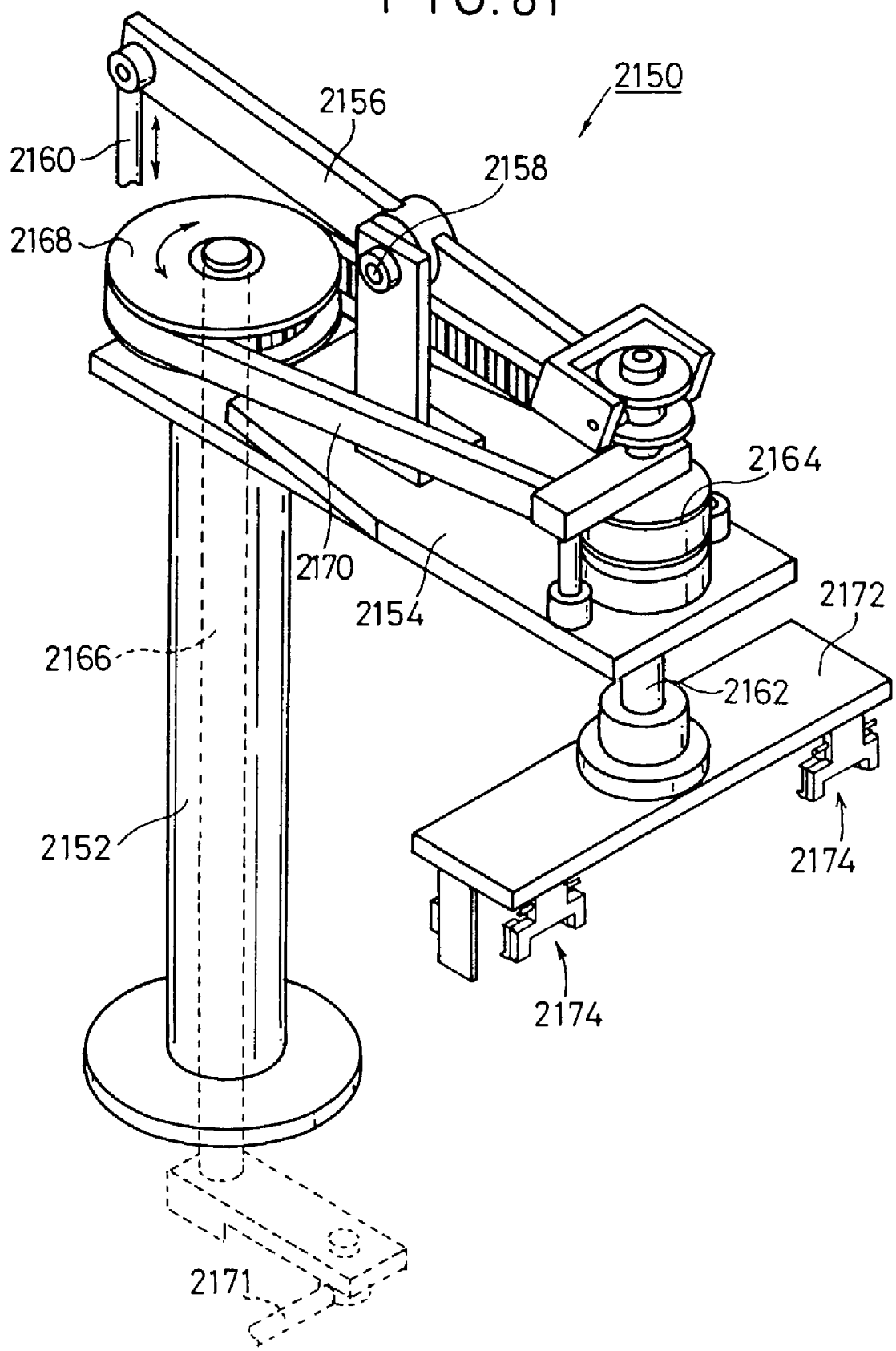
FIG. 81 is a perspective view of a first pack delivery mechanism.

As shown in FIG. 81, the first pack delivery mechanism 2150 has a plate 2154 fixed to an upper portion of a support column 2152 and an arm 2156 supported on the plate 2154 for vertical swinging movement about a pivot shaft 2158. A cam rod 2160 is coupled to an end of the arm 2156, and a turn shaft 2162 is rotatably coupled to the other end of the arm 2156. An endless belt 2170 is trained around a pulley 2164 fixed to the turn shaft 2162 and a pulley 2168 fixed to a rotatable shaft 2166 which extends vertically through the support column 2152. The rotatable shaft 2166 is angularly movable in the directions indicated by the arrows in an angular range of 180° by a cam 2171 operatively connected to the lower end of the rotatable shaft 2166.

Figure 82:
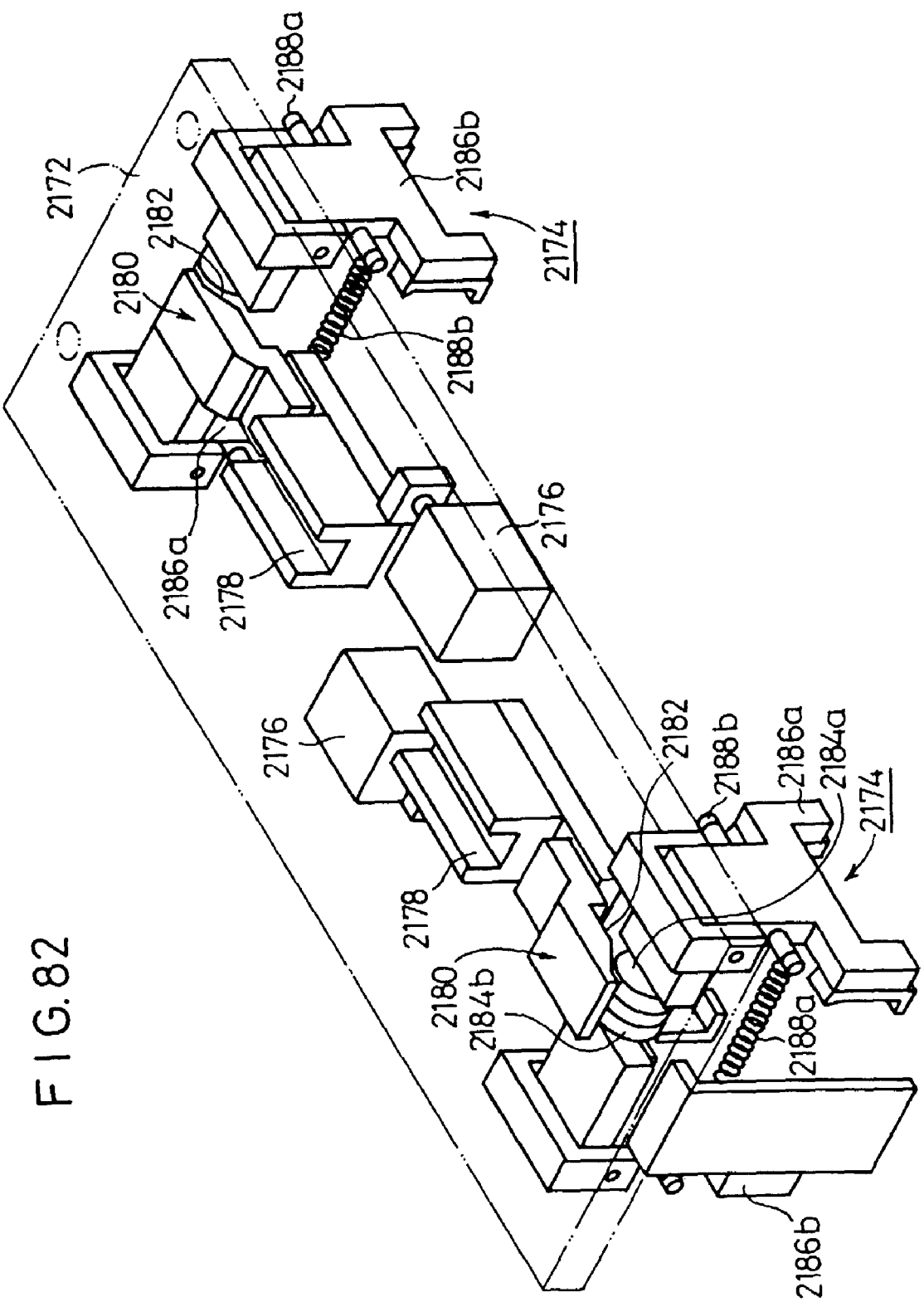
FIG. 82 is a perspective view of a pack gripping means of the first pack delivery mechanism.

A holder plate 2172 is fixed to the lower end of the turn shaft 2162 and supports thereon a pair of pack gripping means 2174. As shown in FIG. 82, each of the pack gripping means 2174 has a movable base 2178 movable back and forth by a cylinder 2176 and a cam 2180 fixed to the movable base 2178. The cam 2180 has a lower cam surface 2182 engaging a pair of cam followers 2184a, 2184b mounted on respective grippers 2186a, 2186b that are swingably supported on the holder plate 2172. The grippers 2186a, 2186b are normally urged to move toward each other by a pair of springs 2188a, 2188b.

Figure 83:
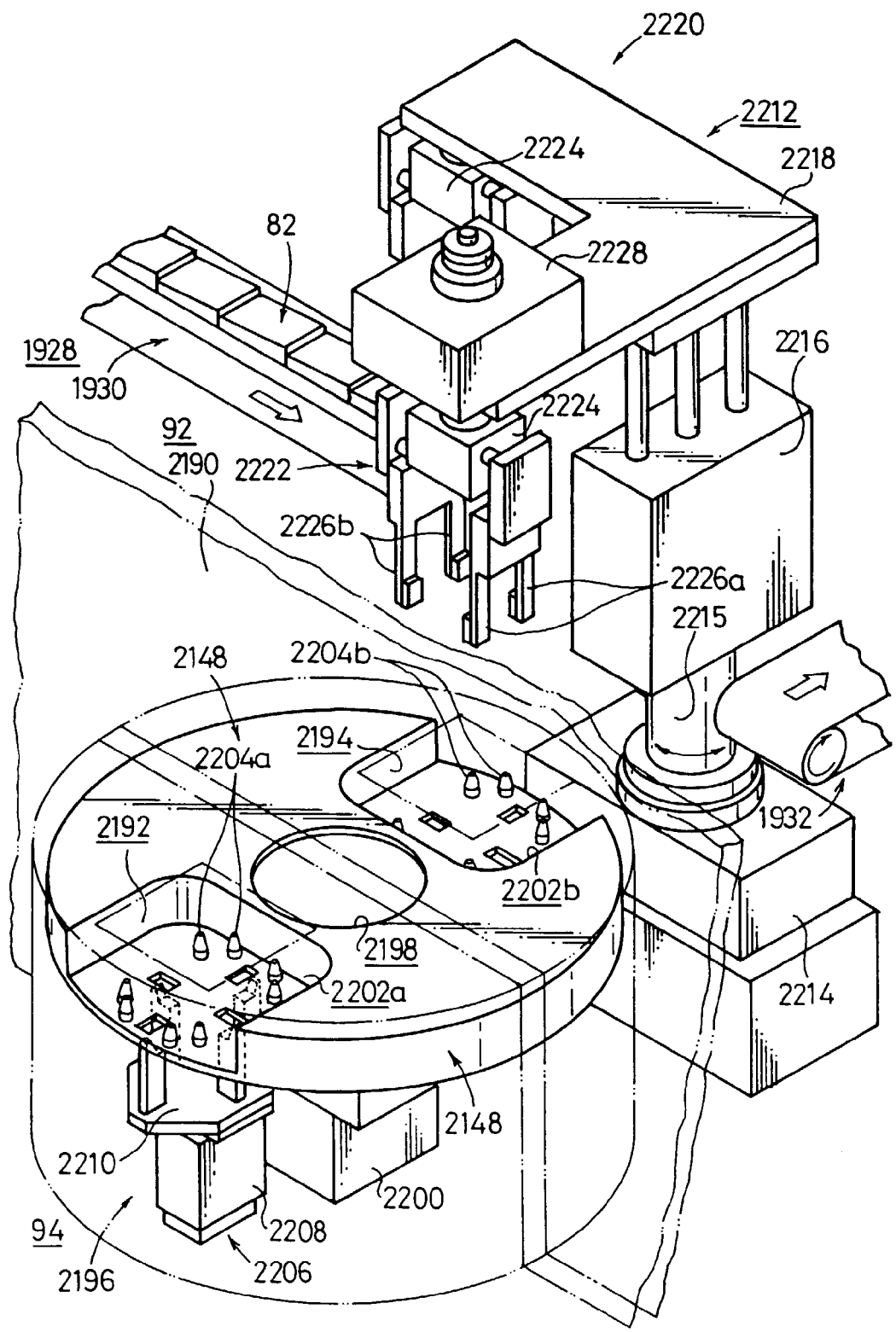
FIG. 83 is a perspective view of the light shielding mechanism.
Figure 84:
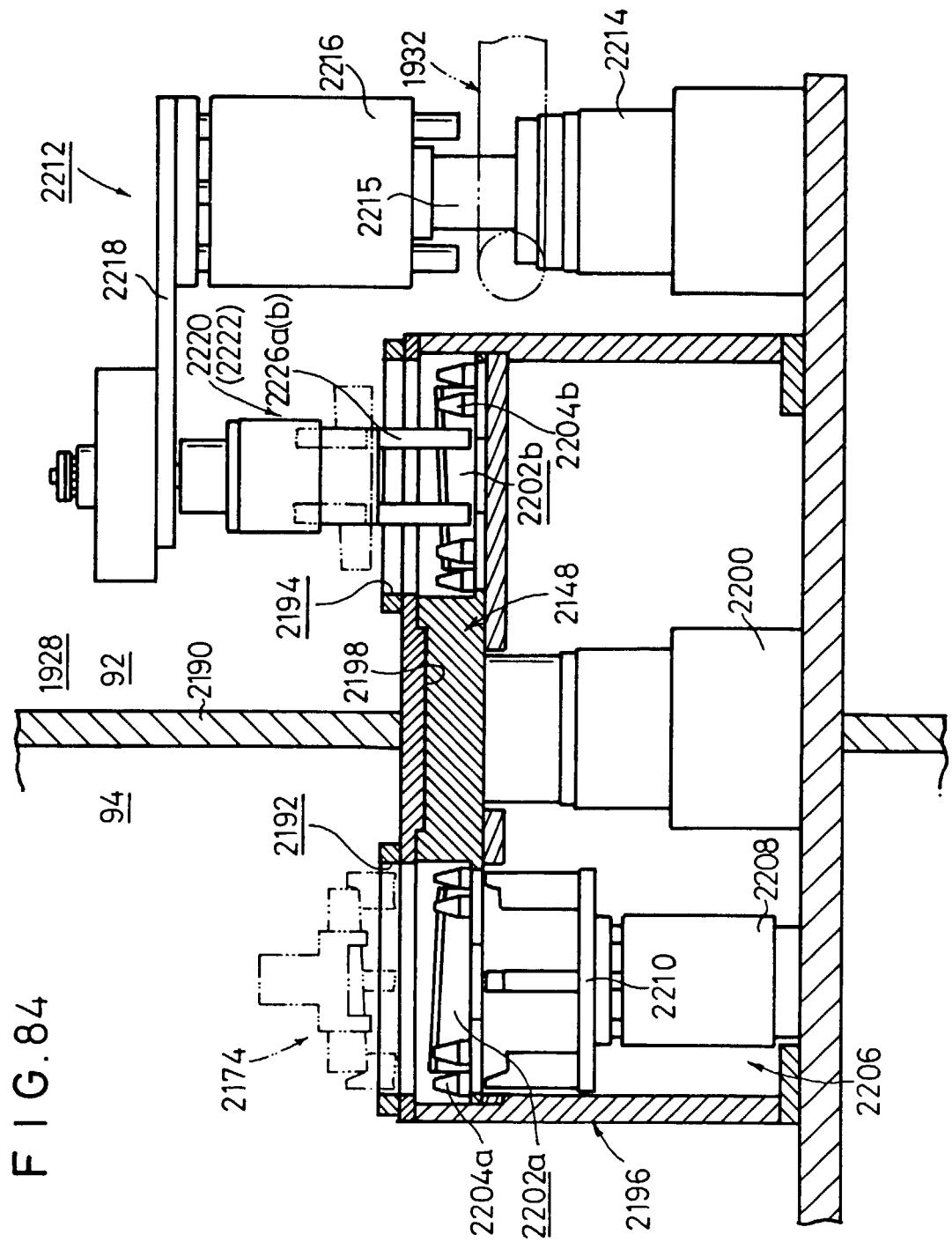
FIG. 84 is a vertical cross-sectional view of the light shielding mechanism.

As shown in FIGS. 83 and 84, the light shielding mechanism 1928 has a light shielding wall 2190 which separates the dark chamber 94 and the bright chamber 92 from each other, a light shielding cover 2196 which extends across the light shielding wall 2190 and has first and second openings 2192, 2194 that are open into the dark chamber 94 and the bright chamber 92, respectively, a second turntable 2148 rotatably disposed in the light shielding cover 2196 for storing a film pack 82 and a product 1926 therein, and a light shielding concave/convex structure 2198 disposed between the light shielding cover 2196 and the second turntable 2148.

The second turntable 2148 is reversibly rotatable in an angular range of 180° by a rotary actuator 2200, and has film pack storage recesses 2202a, 2202b defined in an upper surface thereof. The film pack storage recesses 2202a, 2202b house pack support members 2204a, 2204b respectively therein. A pack lifting/lowering means 2206 is mounted in a space in the light shielding cover 2196 within the dark chamber 94. The pack lifting/lowering means 2206 has a cylinder 2208 and a rest table 2210 coupled to the cylinder 2208 and vertically movable thereby. The rest table 2210 can project upwardly through the first opening 2192 or the second opening 2194 to a position above the first opening 2192 or the second opening 2194.

A second pack delivery mechanism 2212 is disposed in the bright chamber 92 in association with the first opening 2192 or the second opening 2194 which serves as a pack supply/discharge station. The second pack delivery mechanism 2212 has a cylinder 2216 mounted on a rotatable shaft 2215 of a rotary table 2214 and an L-shaped plate 2218 vertically movable by the cylinder 2216 and supporting a pair of pack gripping means 2220, 2222. The pack gripping means 2220, 2222 have respective sets of grip fingers 2226a, 2226b that can be moved toward and away from each other by cylinders 2224. The pack gripping means 2222 has a rotary actuator 2228 for turning the grip fingers 2226a, 2226b.

Figure 85:
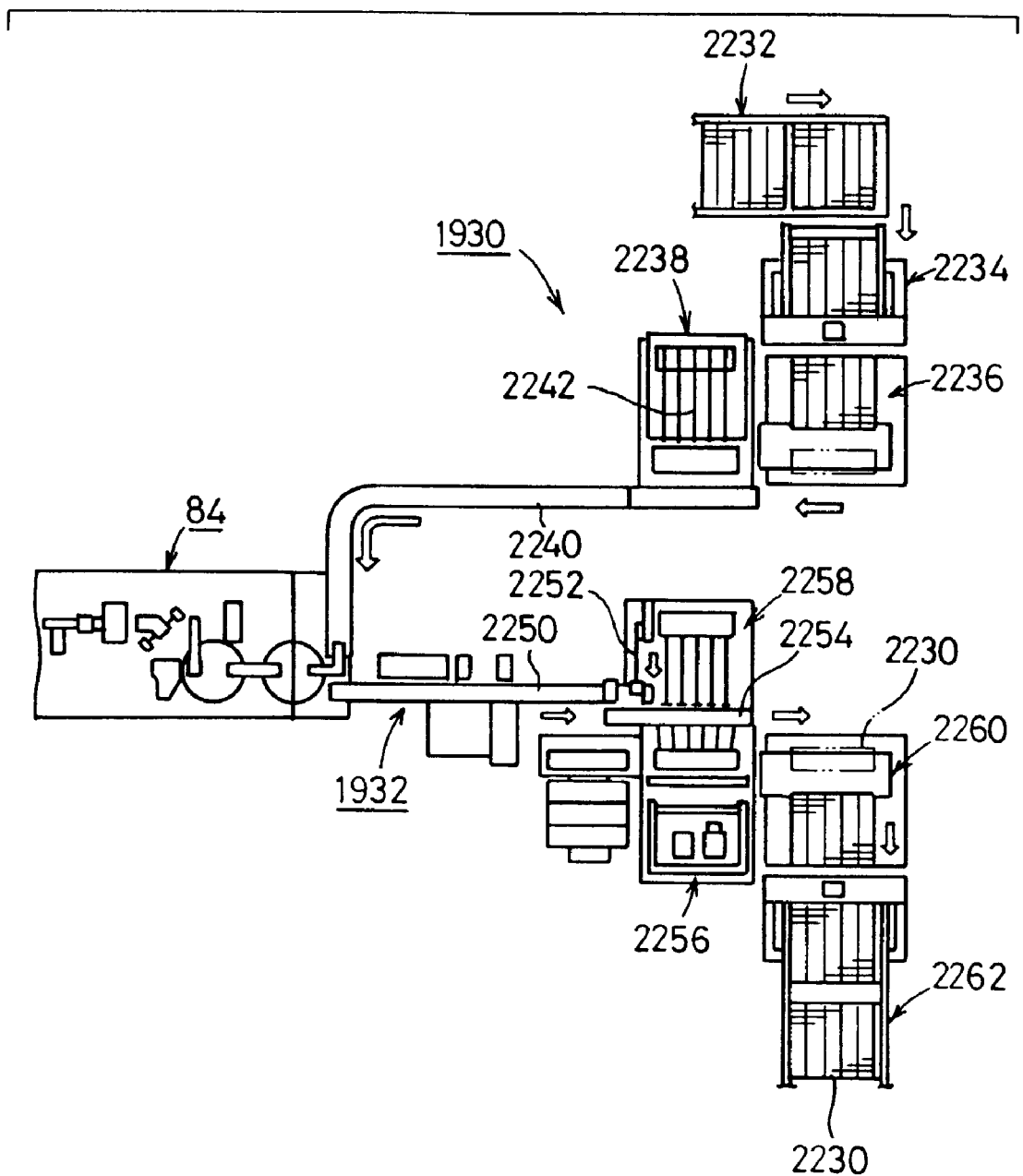
FIG. 85 is a plan view of an empty pack feeding mechanism and a product feeding mechanism.
Figure 86:
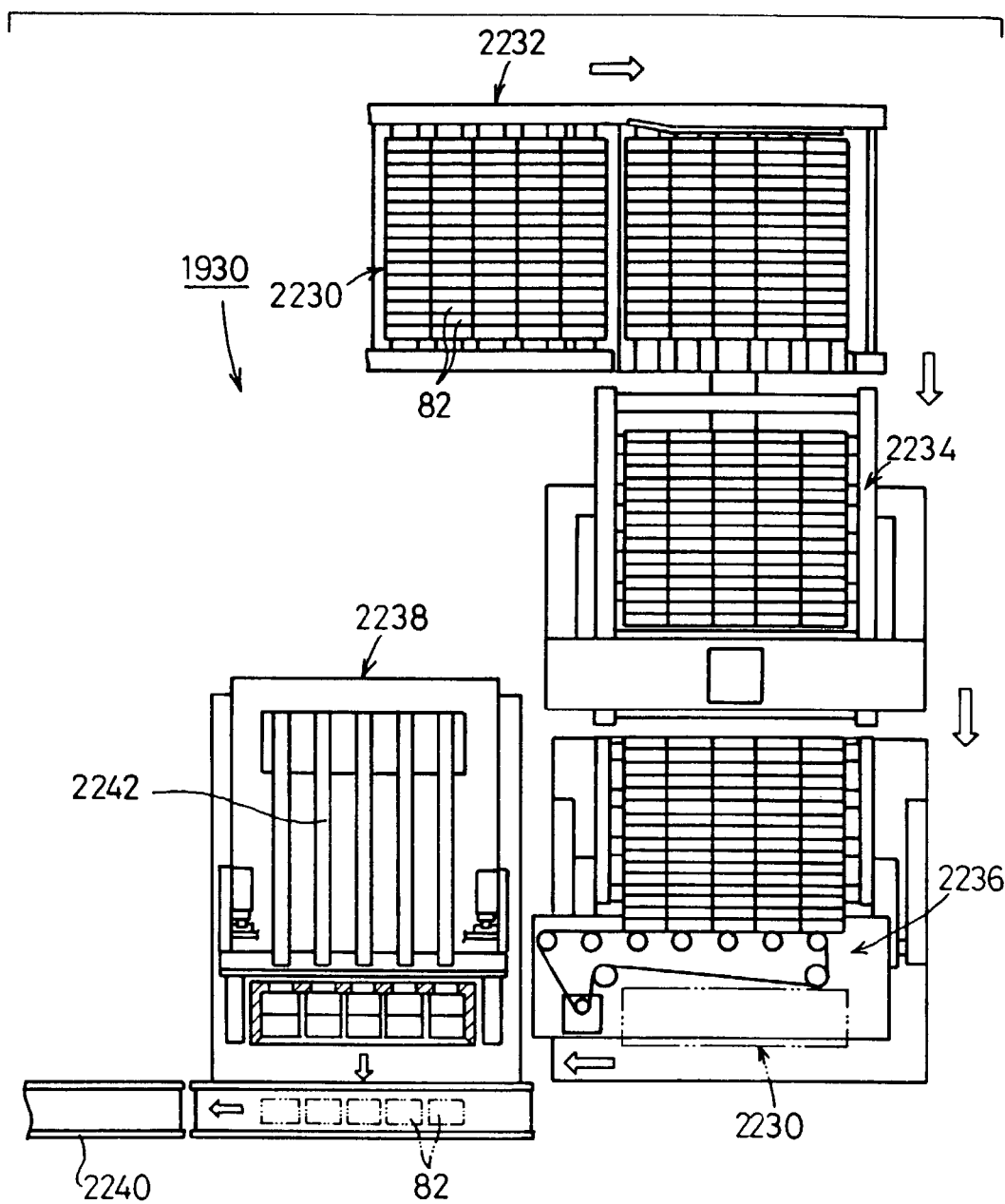
FIG. 86 is a plan view of the empty pack feeding mechanism.

As shown in FIGS. 85 and 86, the empty pack feeding mechanism 1930 has an empty container stack feed means 2232 for feeding a horizontal stack of containers 2230 each storing a plurality of empty film packs 82. Containers 2230 that are fed in the directions indicated by the arrows by the empty container stack feed means 2232 are separated one by one by an empty container separating means 2234, and then sent to an empty container erecting means 2236. The empty container erecting means 2236 serves to erect containers 2230, and is followed by an empty pack supply means 2238 disposed downstream thereof. The empty pack supply means 2238 has a pusher 2242 for simultaneously delivering a plurality of, e.g., five, film packs 82 onto a supply conveyor 2240.

Figure 87:
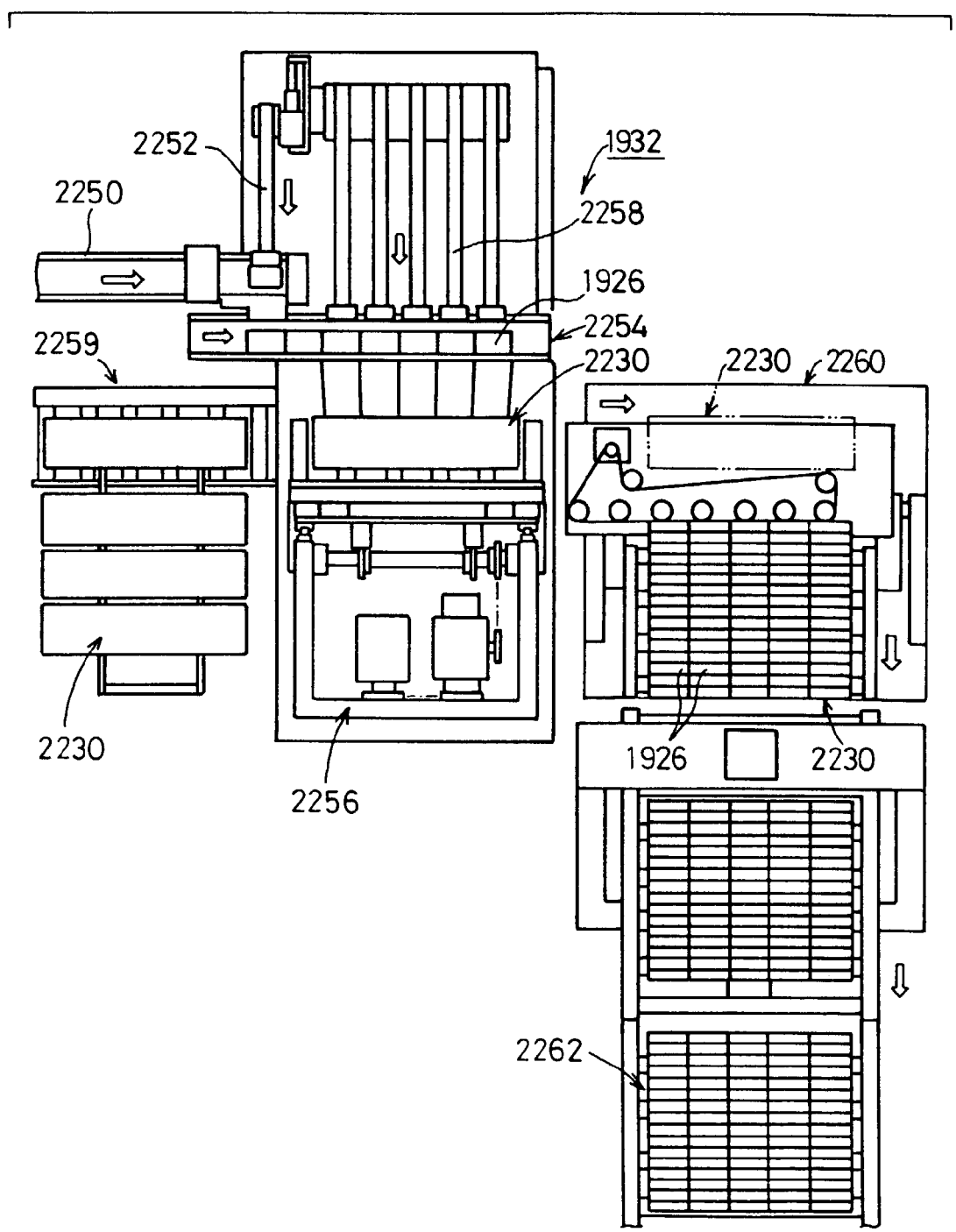
FIG. 87 is a plan view of the product feeding mechanism.

As shown in FIG. 87, the product feeding mechanism 1932 has a discharge conveyor 2250 with a pusher 2252 disposed at a distal end thereof. The pusher 2252 transfers products 1926 one by one onto an intermittent bucket conveyor 2254 that extends parallel to the discharge conveyor 2250. A pack container loading means 2256 is disposed in confronting relation to the intermittent bucket conveyor 2254, and holds a container 2230 in an erected position. The pack container loading means 2256 has a pusher 2258 for transferring five products 1926 simultaneously into the erected container 2230.

An empty container supply means 2259 and a loaded container turning means 2260 are disposed parallel to the pack container loading means 2256. The loaded container turning means 2260 is capable of turning a container 2230 with products 1926 loaded therein by 90° from the erected position. The loaded container turning means 2260 is followed by an automatic stacking means 2262 that is disposed downstream thereof for automatically stacking containers 2230 in a plurality of tiers.

Figure 88:
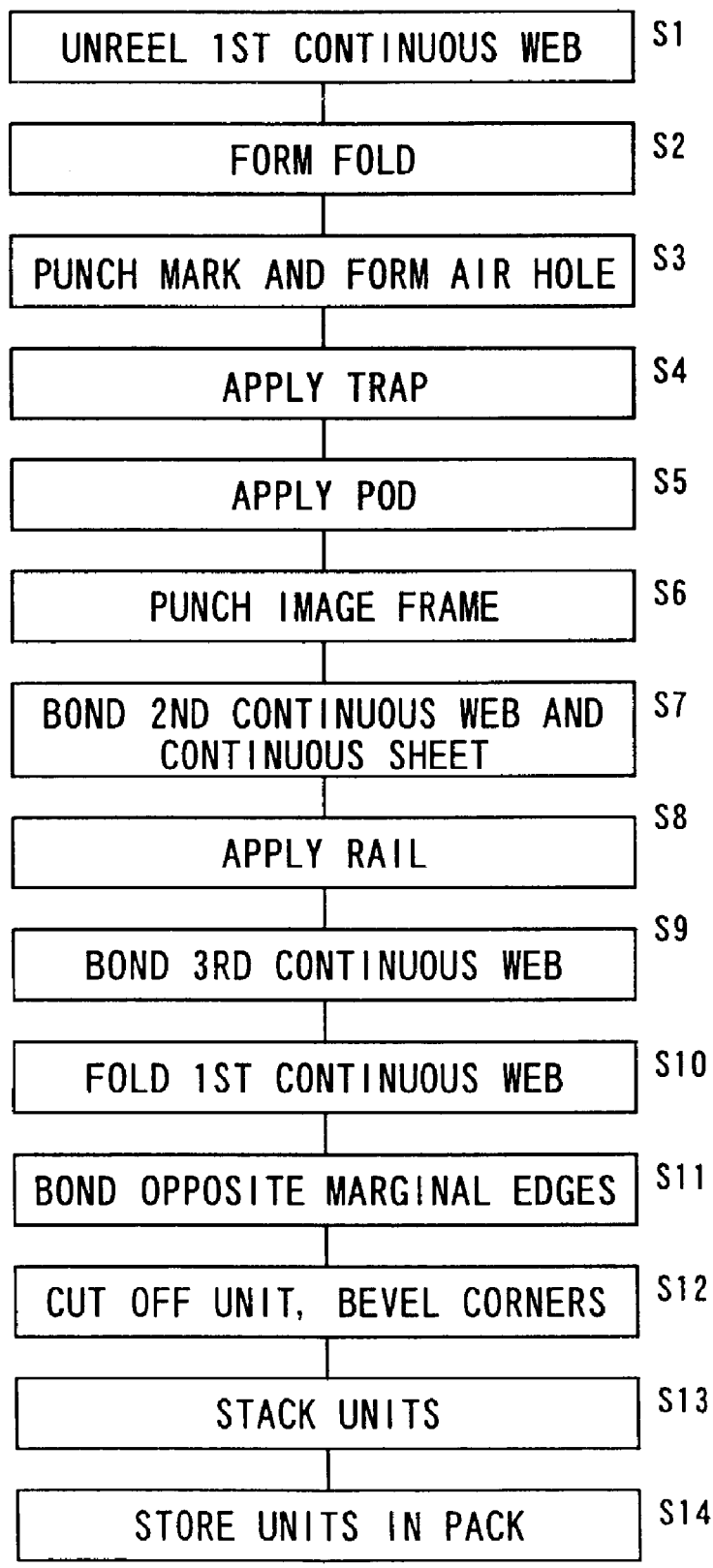
FIG. 88 is a flowchart of a processing sequence of the manufacturing method.

Operation of the manufacturing system 90 in connection with the manufacturing method according to the first embodiment of the present invention will be described below with reference to FIG. 88.

The manufacturing system 90 is controlled for its operation by the controller 1624. The first continuous web 50 in a rolled form set in the mask sheet supply unit 96 is unreeled in step S1 shown in FIG. 88. In the fold forming station 52, folds 38a, 38b are formed in respective marginal edges of the first continuous web 50 while the first continuous web 50 is being continuously transported in step S2.

Specifically, as shown in FIG. 11, the motor 120 is energized to rotate the drive shaft 122, thereby rotating the pulley 124 and the drive gear 126 that are coaxially connected to the drive shaft 122. Since the driven gear 238 is held in mesh with the drive gear 126, the suction roller 230 rotates with the shaft 234 on which the driven gear 238 is fixedly mounted. At the same time, the suction holes 232 of the suction roller 230 exert a suction force to draw and continuously unwind the first continuous web 50 from the unreeling shaft 100, as shown in FIG. 7.

The roller 112 of the placing means 106 is rotated at a given speed. Specifically, the roller 112 is rotated by the motor 120 through the pulley 124, the timing belt 128, and the pulley 118, with the first continuous web 50 being held in rolling contact with an outer circumferential surface of the roller 112 over a certain angular interval.

In the fold groove forming means 108, as shown in FIG. 9, before the first continuous web 50 starts to be fed, the motor-actuated cylinder 216 of the actuator means 212 is operated to angularly move the swing members 224a, 224b upwardly about the shaft 222. The swing members 224a, 224b now lift the swing arms 202a, 202b, placing the carbide tips 208a, 208b in a position spaced from the carbide rings 130a, 130b, as indicated by the two-dot-and-dash lines in FIG. 9.

When the motor 120 is energized to start rotating the suction roller 230, the motor-actuated cylinder 216 is operated to move the rod 218 upwardly so that the swing members 224a, 224b swing downwardly about the shaft 222. The swing arms 202a, 202b supported by the swing members 224a, 224b are then lowered. After the swing arms 202a, 202b are spaced from the swing members 224a, 224b, they are further lowered.

At this time, the carbide tips 208a, 208b mounted on the moving blocks 204a, 204b fixed to the swing arms 202a, 202b are brought into abutment against the opposite marginal edges of the first continuous web 50. The cutting edges 210a, 210b of the carbide tips 208a, 208b engage the respective opposite marginal edges of the first continuous web 50, forming respective folds 38a, 38b therein.

In the first embodiment, the carbide tips 208a, 208b engage the first continuous web 50 at a constant temperature under a constant load to form the folds 38a, 38b therein while the first continuous web 50 is being kept under a constant tension. Specifically, as shown in FIG. 11, the ratio of the diameters of the pulley 124 and the drive gear 126 which are coupled to the motor 120 is set to such a value that the peripheral speed of the suction roller 230 is higher than the peripheral speed of the roller 112 by 0.1% to 1%. The difference between the peripheral speeds of the suction roller 230 and the roller 112 applies a certain tension, e.g., a tension ranging from 10 N to 20 N, to the first continuous web 50. The weights of the carbide tips 208a, 208b and the weights of the moving blocks 204a, 204b are set to such values that the load applied from the carbide tips 208a, 208b to the first continuous web 50 ranges from 100 g to 500 g. The heaters 206a, 206b are controlled to keep the temperature of the carbide tips 208a, 208b in a range from 150° C. to 200° C.

An experiment was conducted to check how folds 38a, 38b are formed under different loads from the carbide tips 208a, 208b and at different temperatures. FIG. 89 shows the results of the experiment. In FIG. 89, the mark "x" indicates that folds 38a, 38b were not formed to a desired depth and folds 38a, 38b were formed too deeply, cutting off the first continuous web 50. A review of the experimental results indicates that when the first continuous web 50 held under a constant tension is engaged by the carbide tips 208a, 208b at a certain temperature and under a certain load, desired folds 38a, 38b can be formed reliably to a nicety in the first continuous web 50.

Figure 90:
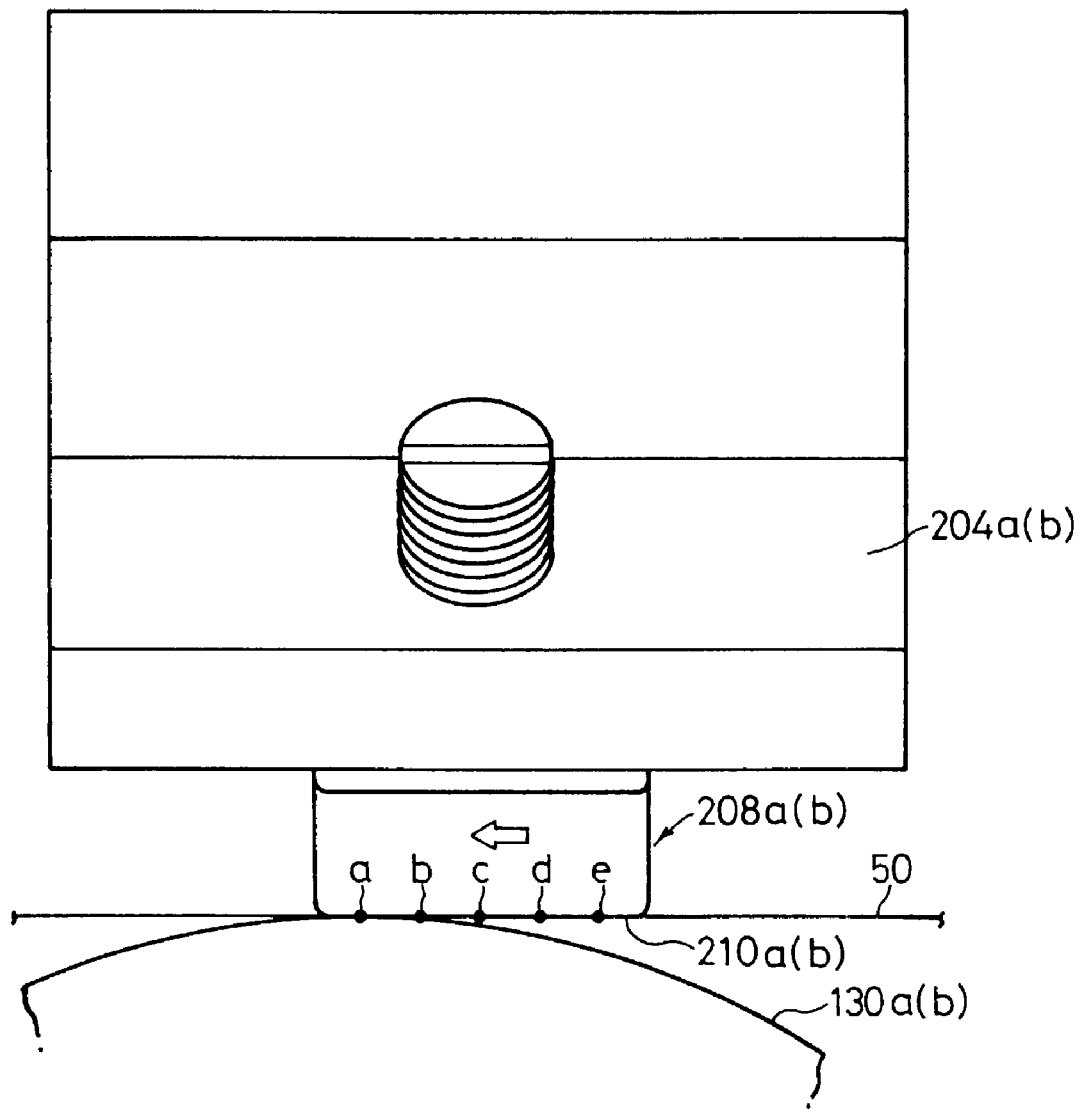
FIG. 90 is a view illustrative of the manner in which the carbide tip operates.

In the fold groove forming means 108, furthermore, the moving means 192a, 192b, which may comprise micrometer heads, for example, are operated to move the movable tables 194a, 194b toward or away from each other to adjust the distance between the carbide tips 208a, 208b for thereby forming folds 38a, 38b at exact positions. When the motor 182 is energized, the movable base 190 moves in unison with the nut 188 in the direction in which the first continuous web 50 is fed, for thereby changing the relative position between the cutting edges 210a, 210b of the carbide tips 208a, 208b and the carbide rings 130a, 130b to one of five positions a, b, c, d, e (see FIG. 90), for example.

If folds 38a, 38b are formed in the first continuous web 50 by the cutting edges 210a, 210b when the cutting edges 210a, 210b are in a first position, e.g., the position a, and any cut debris is attached to the cutting edges 210a, 210b in the position a, then the cutting edges 210a, 210b are shifted to a second position, e.g., the position b, after which folds 38a, 38b are formed in the first continuous web 50 by the cutting edges 210a, 210b in the position b. By thus positionally adjusting the cutting edges 210a, 210b selectively to the five positions, any cleaning process required on the carbide tips 208a, 208b is greatly minimized, thereby increasing the availability of the carbide tips 208a, 208b for fold forming operation.

In the placing means 106, the carbide rings 130a, 130b are mounted only on the opposite sides of the roller 112 at respective positions corresponding to the carbide tips 208a, 208b. With this arrangement, the roller 112 can be manufactured highly inexpensively. The carbide rings 130a, 130b can be positionally adjusted in the axial direction of the roller 112 by the set screws 132a, 132b. If present fold forming surfaces of the carbide rings 130a, 130b are damaged, then the carbide rings 130a, 130b can be axially adjusted in position to locate new fold forming surfaces in alignment with the carbide tips 208a, 208b. Therefore, the positionally adjustable carbide rings 130a, 130b are highly economical.

The fixed flange 134, which serves to support one marginal edge of the first continuous web 50 where traps 42 will be attached, is mounted on one of the opposite sides of the roller 112, and the movable flange 136, which serves to support the other marginal edge of the first continuous web 50 where developing liquid pods 40 will be attached, is mounted on the other of the opposite sides of the roller 112. It is thus possible to form folds 38a, 38b efficiently in the first continuous web 50 at highly accurate positions near the traps 42.

The first and second transversely shifting rollers 140a, 140b are disposed respectively upstream and downstream of the roller 112. Folds 38a, 38b are formed efficiently in the first continuous web 50 while one marginal edge of the first continuous web 50 is being limited by the flange of the reference roller 148 to position the first continuous web 50 highly accurately.

The nonwoven fabric tapes 166 of the cleaner means 164 are held in contact with the carbide rings 130a, 130b, and wound on the takeup shaft 172 at a very low speed by the motor 170. The nonwoven fabric tapes 166 are effective to prevent cut debris from being attached to the fold forming surfaces of the carbide rings 130a, 130b. Therefore, the accuracy with which the fold groove forming means 108 forms folds in the first continuous web 50 is effectively prevented from being lowered.

The outer circumferential surfaces of the rollers for rolling contact with the first continuous web 50 are coated with a film made of a composite material of nickel—phosphorus alloy and fluoroplastics. The coated film is effective to prevent these rollers from being damaged by the titanium white that is coated on one surface of the first continuous web 50.

The electrostatic charge removing means 226 is positioned between the fold forming mechanism 104 and the suction box 246. The electrostatic charge removing means 226 is capable of preventing the first continuous web 50 from being electrostatically charged and hence attracting dust particles, and allowing the first continuous web 50 from being fed under a constant tension.

As shown in FIGS. 5 and 6, the first continuous web 50 is intermittently fed a preset distance (two pitches) at a time successively through the mark forming station 55a, the air hole forming station 55b, the trap attaching station 54, and the pod attaching station 56. As shown in FIGS. 14 and 15, in the mark forming station 55a and the air hole forming station 55b, the drive cam means 308 is operated to move the lower movable base 310 and the upper movable base 312 toward and away from each other.

The mark forming mechanism 300 and the recess forming mechanism 302 are mounted respectively on the lower movable base 310 and the upper movable base 312 respectively by the lower die block 314 and the upper die block 324. In the mark forming mechanism 300, as shown in FIG. 19, the die 316 and the mark punch 328 are displaced toward each other, and the cutting blade 332 of the mark punch 328 cuts into the first continuous web 50 to form a substantially channel-shaped mark 53 on the first continuous web 50 in every other image frame 22.

In the recess forming mechanism 302, as shown in FIG. 18, the air hole punches 330 engage respectively in the grooves 320a, 320b of the bearing block 318, simultaneously forming two recesses 45a centrally in trap attaching marginal edges of the first continuous web 50 in step S3.

In the trap attaching station 54, as shown in FIG. 4, the trap webs 42a, 42b are unreeled and cut to respective two traps 42 of a predetermined length, which are then attached substantially simultaneously to one marginal edge of the first continuous web 50 at a given spaced interval when the first continuous web 50 is stopped in step S4.

Specifically, as shown in FIGS. 20 through 22, the trap webs 42a, 42b are intermittently fed in the direction indicated by the arrow Y by the intermittent feed rollers 418 and the nip roller 420, and thereafter kept flat by the flat guide 422. In the cutting means 410, the movable blade 406 is pressed against the fixed blade 408 by the spring-loaded rollers 434 to reduce a clearance between the movable blade 406 and the fixed blade 408, and the guides 426a, 426b on the opposite sides of the movable blade 406 are pressed against the fixed blade 408 at all times.

When the movable blade 406 is displaced upwardly by the cam 432, the movable blade 406 and the fixed blade 408 coact to cut off the trap webs 42a, 42b into traps 42. At this time, the suction holes 446 defined in the bearing block 412 and connected to the vacuum source (not shown) develop a suction pressure to attract the traps 42 against the bearing block 412 when the traps 42 are pressed against the bearing block 412 by the movable blade 406.

Then, the swing cam 436 of the moving means 416 operates to move the bearing block 412 in unison with the slide 440 toward the first continuous web 50, after which the bearing block 412 is lowered by the cylinder 442. The heater block 450 disposed below the first continuous web 50 is elevated by the cam 456. The heater block 450 and the bearing block 412 jointly hold the first continuous web 50 and the two traps 42 together. The two traps 42 are thus substantially simultaneously bonded to one marginal edge of the first continuous web 50. The suction pressure developed via the suction holes 446 defined in the bearing block 412 is in the range from −10.0 KPa through −15.0 KPa.

In the first embodiment, therefore, the accuracy with which the traps 45 cut off from the trap webs 42a, 42b by the cutting means 410 are positioned is in agreement with the accuracy with which the traps 45 are bonded to the first continuous web 50. When the trap webs 42a, 42b are positioned in the direction indicated by the arrow X by the positioning guide 424, the two traps 42 cut off by the cutting means 410 can be bonded to the first continuous web 50 with high accuracy.

As shown in FIG. 23, the shear angle $\alpha°$ of the fixed blade 408 is set to 2°. Therefore, the resistance imposed when the cutting means 410 cuts off the trap webs 42a, 42b is reduced for thereby effectively preventing the trap webs 42a, 42b from being transversely displaced when they are cut off. It is thus possible with a simple arrangement to apply two traps 42 accurately and quickly to desired areas of the first continuous web 50 for increased efficiency.

In the pod attaching station 56, two developing liquid pods 40 are attached simultaneously to the other marginal edge of the first continuous web 50 at a spaced interval when the first continuous web 50 is stopped in step S5. As shown in FIGS. 24 through 26, in the developing liquid container supply mechanism 460 of the pod attaching station 56, the arraying means 462 is loaded with a plurality of developing liquid pods 40 held on the tape 468. When the tape 468 is pulled out of the opening 472 in the cassette 470 of the arraying means 462, the developing liquid pods 40 are vertically arrayed in the cassette 470, with the lowermost developing liquid pod 40 being held by the fingers 474a, 474b.

Figure 91A:
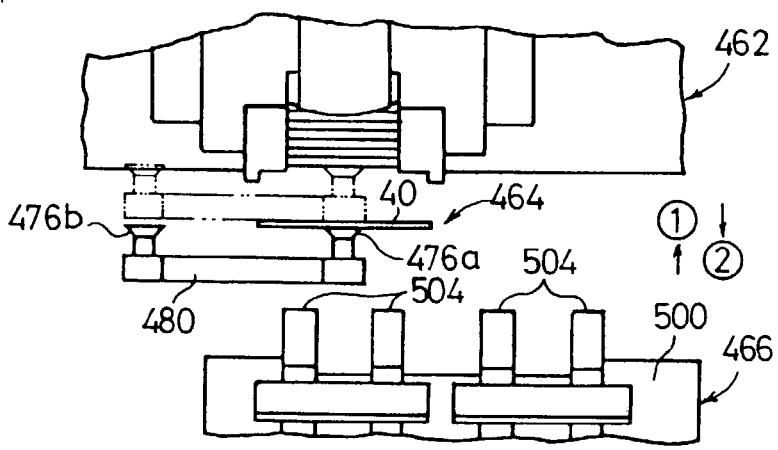
FIGS. 91A through 91C are views illustrative of the manner in which the developing liquid container supply mechanism operates.

The moving mechanism 478 of the moving means 464 is actuated to lift the arms 480 to elevate one of the suction cups 476a toward the lowermost developing liquid pod 40 placed in the arraying means 462, as indicated by ① in FIG. 91A. After the developing liquid pod 40 is attracted by the suction cup 476a, the arms 480 are lowered, as indicated by ② in FIG. 91A, and then horizontally moved, as indicated by ③ in FIG. 91B.

Figure 91B:
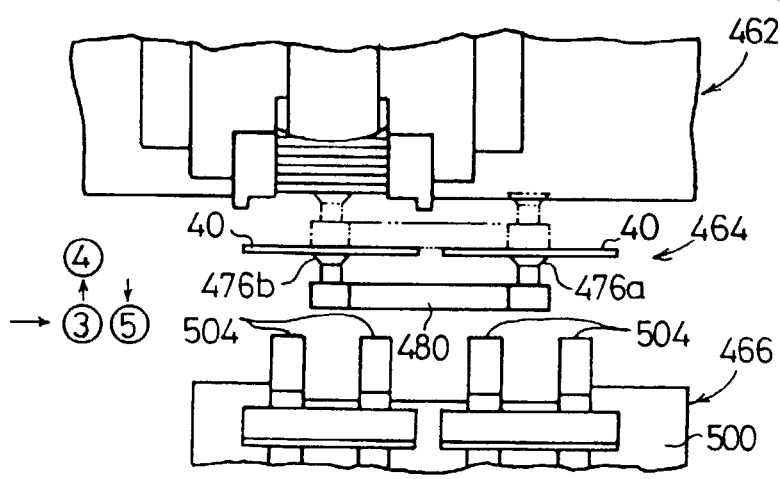
Figure 91C:
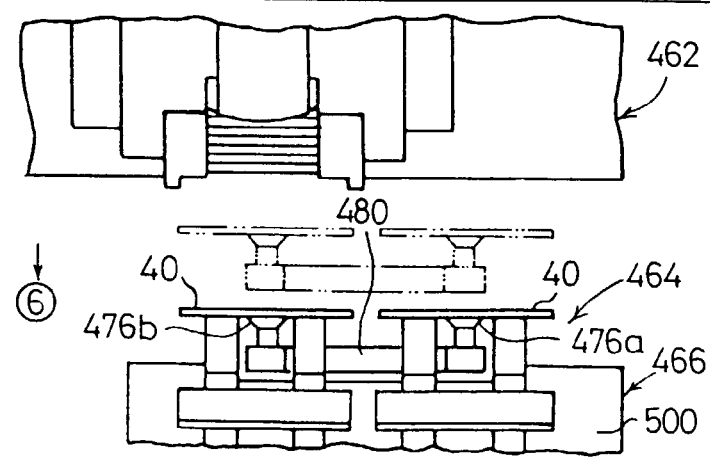

The arms 480 are then lifted, as indicated by ④ in FIG. 91B, and the suction cup 476b attracts the second developing liquid pod 40, after which the arms 480 are lowered to a certain height, as indicated by ⑤ in FIG. 91B. Now, the developing liquid pods 40 are attracted respectively by the suction cups 476a, 476b. The arms 480 are further lowered by the cam 482 and the cam follower 484, and enters the respective clearance grooves 508 in the suction drum 500, transferring the two developing liquid pods 40 to the attracting facets 504, as indicated by ⑥ in FIG. 91C.

After having attracted the two developing liquid pods 40, the suction drum 500 is indexed in the direction indicated by the arrow E and stopped in the third station, i.e., the position P1 in FIG. 25. Then, as shown in FIG. 26, the movable positioning pins 516a, 516b are displaced in the direction indicated by the arrow D1, positioning the two developing liquid pods 40 in the direction indicated by the arrow X in coaction with the stoppers 518a, 518b.

After the developing liquid pods 40 have been positioned in the direction indicated by the arrow X, the suction drum 500 is indexed and stopped in the fifth station, i.e., the position P2 in FIG. 25. The longitudinal sides of the developing liquid pods 40 are brought into contact with the stoppers (not shown), and then the suction drum 500 is angularly moved a distance ranging from 0 to 1.0 mm in a direction along the transverse sides of the developing liquid pods 40, thus highly accurately positioning the developing liquid pods 40 in the direction indicated by the arrow Y.

Then, the scraper bars 510 of the remover 502 are moved downwardly along the grooves 508 and the outer circumference of the suction drum 500 by the cam 482 and the cam follower 514, thereby supplying the two developing liquid pods 40 from the suction drum 500 to the other marginal edge of the first continuous web 50. At this time, the heat sealers 520 are lifted to bond the two developing liquid pods 40 substantially simultaneously to the first continuous web 50 in coaction with the scraper bars 510.

In the developing liquid container supply mechanism 460, as described above, the single arraying means 462 holds a plurality of developing liquid pods 40. After a certain number of, e.g., two, developing liquid pods 40 are removed from the arraying means 462 by the removing means 464, the developing liquid pods 40 are transferred to the suction drum 500 of the supply means 466, and bonded substantially simultaneously to the other marginal edge of the first continuous web 50 by the remover 502. In this manner, a desired number of developing liquid pods 40 can efficiently and quickly be bonded to the first continuous web 50.

As shown in FIG. 5, the first continuous web 50 is intermittently fed two pitches at a time in the direction indicated by the arrow X by the main feed drum 1502. The first continuous web 50 is introduced from the bright chamber 92 into the dark chamber 94 through the light shielding mechanism 610. In the light shielding mechanism 610, the first path rollers 614a, 614b and the second path rollers 616a, 616b bend the first continuous web 50 at two locations thereon for thereby effectively shielding the interior of the dark chamber 94 against entry of light.

The first continuous web 50 which is introduced from the light shielding box 612 into the dark chamber 94 is fed to the punching station 59. In the image frame forming machine 672 placed in the punching station 59, as shown in FIG. 31, when the cam plate 690 is rotated by the actuating mechanism 686, the lower link 694 and the upper link 696 are angularly moved to lift the lower die base 678 and lower the upper die base 684. The first punching die 660 on the lower die base 678 and the second punching die 662 on the upper die base 684 simultaneously form two image frames 22 on the first continuous web 50 when the first continuous web 50 is stopped in step S6.

As shown in FIG. 33, the first punching die 660 has the first through seventh cutting blades 704, 706a, 706b, 708a, 708b, 710a, 710b which are independently arranged so as to correspond to the first through fourth sides 22a–22d of the image frame 22. This cutting blade arrangement allows two image frames 22 to be simultaneously formed, and can form the four corners of each of the image frames 22 sharply at right angles without producing blunt corners which would otherwise be formed using a single cutting blade. Accordingly, highly accurate image frames 22 can be formed efficiently and reliably on the first continuous web 50.

When the sharpness of the second cutting blade 706a is reduced, then the second cutting blade 706a is removed, ground, and then attached again to the first punching die 660. The opposite sides of the second cutting blade 706a are supported respectively by the fourth and sixth cutting blades 708a, 710a. Therefore, the clearance between the first cutting blade 704 and the second cutting blade 706a can easily and accurately be adjusted simply by positionally adjusting the second cutting blade 706a with respect to the first cutting blade 704.

When image frames 22 are formed on the first continuous web 50 by the coaction of the first cutting blade 704 and the second cutting blade 706a that are actuated by the actuating mechanism 686, as shown in FIG. 30, the pair of vertically movable rods 728 is vertically moved by the first swing link 720 engaging the cam plate 692, the rod 722, and the second swing link 724. As shown in FIG. 32, substantially at the same time that image frames 22 are formed by the first cutting blade 704 and the second cutting blade 706a, debris 664 punched out of the first continuous web 50 is attracted by the suction pads 732 of the attracting feed mechanism 666.

When the vertically movable rods 728 are moved downwardly, the debris 664 is also moved downwardly. Since the stopper 734 is disposed on the path of the vertically movable rods 728, the debris 664 attracted by the suction pads 732 is engaged by the stopper 734 and released from the suction pads 732. Therefore, as shown in FIG. 30, when the debris 664 falls in the suction pipe 736 of the retrieving mechanism 670, an air flow ejected from the air supply pipe 738 of the ejector means 742 draws the debris 664 from the suction pipe 736 into the feed pipe 740. The debris 664 is collected in the stock chamber 668.

In the first embodiment, as described above, substantially at the same time that the first punching die 660 and the second punching die 662 punch image frames 22 in the first continuous web 50, debris 664 is attracted by the suction pads 732 of the attracting feed mechanism 666. Then, upon descent of the suction pads 732, the debris 664 is forcibly lowered, engaged by the stopper 734, delivered to the retrieving mechanism 670, and fed to the stock chamber 668 by the ejector means 742.

Since the debris 664 punched out of the first continuous web 50 is reliably retrieved in the stock chamber 668, the debris 664 is prevented from being attached to the first continuous web 50 and other members under electrostatic forces, so that image frames 22 can be formed on the first continuous web 50 efficiently and accurately. The image frame forming machine 672 is highly efficient in operation because it forms two image frames 22 simultaneously at a time.

As shown in FIG. 5, in the first joining station 62, the second continuous web 58 and the continuous sheet 60 are unreeled from the photosensitive sheet supply unit 809 and the undersheet supply unit 810, and temporarily bonded to the first continuous web 50 in step S7.

As shown in FIG. 41, the second continuous web 58 is delivered to the roller 1048 of the temporarily bonding mechanism 1040 by the first path roller 1082 and the first transversely shifting roller 1084 of the feed unit 1080, whereas the continuous sheet 60 is delivered to the roller 1048 by the second path roller 1086 and the second transversely shifting roller 1088 of the feed unit 1080. Thus, the second continuous web 58 and the continuous sheet 60 are delivered highly accurately to a desired position on the first continuous web 50 under the guidance of the feed unit 1080.

As shown in FIGS. 39 through 41, the first continuous web 50 is intermittently fed between the roller 1048 and the first and second heating blocks 1044, 1046. While the first continuous web 50 is at rest, the drive arm 1060 is angularly moved by the actuator mechanism 1042. The vertically movable table 1056 which is coupled to the swinging end of the drive arm 1060 by the connecting rod 1058 is vertically moved along the linear guide 1054 mounted on the table 1050.

The first and second heating blocks 1044, 1046 mounted on the vertically movable table 1056 press the first continuous web 50 against the roller 1048, temporarily bonding the second continuous web 58 and the continuous sheet 60 to the first continuous web 50. Since the first and second heating blocks 1044, 1046 are heated to a certain temperature ranging from 80° C. to 120° C., for example, by the heaters 1074a, 1074b, the second continuous web 58 and the continuous sheet 60 are reliably temporarily bonded to the first continuous web 50 between image frames 22 by the first and second ridges 1070, 1072 on the first and second heating blocks 1044, 1046.

After the second continuous web 58 and the continuous sheet 60 are temporarily bonded to the first continuous web 50, the first and second heating blocks 1044, 1046 are lowered in unison with the vertically movable table 1056, and the first continuous web 50 is intermittently fed in the direction indicated by the arrow X until the temporarily bonded region is positioned at the finally bonding mechanism 1120. As shown in FIGS. 46 and 47, in the finally bonding mechanism 1120, the first heating block 1122 and the second heating blocks 1124, 1126 are heated to respective certain temperatures ranging from 50° C. to 80° C. and from 80° C. to 140° C. by the heater 1142 and the heaters 1154a, 1154b, and the swing arms 1138, 1160 of the actuator means 1128 are angularly moved in synchronism with each other.

The lower vertically movable table 1134 and the upper vertically movable table 1148 are coupled respectively to the swing arms 1138, 1160 by the respective connecting rods 1158, 1160. The first heating block 1122 and the second heating blocks 1124, 1126 are movable toward and away from each other in unison with the lower vertically movable table 1134 and the upper vertically movable table 1148. The first heating block 1122 has the recesses 1140a, 1140b defined in its pressing surface, the recesses 1140a, 1140b corresponding to two image frames 22. The recesses 1140a, 1140b have longitudinal and transverse dimensions smaller than the image frames 22 by a length ranging from 0.5 mm to 2 mm, and a depth ranging from 1 mm to 3 mm. The silicone rubber layers 1152a, 1152b are fixed to the pressing surfaces of the second heating blocks 1124, 1126. Therefore, the second continuous web 58 and the continuous sheet 60 are bonded to the first continuous web 50 in surrounding relation to the two image frames 22, and the second continuous web 58 is not thermally affected or damaged.

The cooling means 1162 is disposed in the vicinity of the finally bonding mechanism 1120 and has the first and second tubes 1164, 1166 supplied with air. The air is supplied from the slits 1168, 1170 defined in the confronting sides of the first and second tubes 1164, 1166 toward the first continuous web 50 for effectively lowering the temperature of the atmosphere around the finally bonding mechanism 1120 and also effectively preventing the second continuous web 58 from thermally blushed when the system is stopped.

In the first embodiment, as described above, the second continuous web 58 and the continuous sheet 60 that are accurately aligned and fed by the feed unit 1080 are bonded to the first continuous web 50 by the temporarily bonding mechanism 1040, and thereafter fed to the finally bonding mechanism 1120 by which the second continuous web 58 and the continuous sheet 60 are finally bonded to the first continuous web 50 in surrounding relation to two image frames 22.

Therefore, the time required to perform one process is effectively reduced compared with the conventional arrangement in which the second continuous web 58 and the continuous sheet 60 are bonded to the first continuous web 50 in a single process. The first embodiment thus offers an advantage in that the overall process of manufacturing instant photographic film units 20 is performed at a time.

In the temporarily bonding mechanism 1040, the second continuous web 58 and the continuous sheet 60 are temporarily bonded to the first continuous web 50 between image frames 22 by the first heating blocks 1044, 1046 and the roller 1048, and the sealing pressure imposed by the first heating blocks 1044, 1046 is accurately established by the first and second cylinders 1062, 1064. Consequently, the second continuous web 58 and the continuous sheet 60 are reliably temporarily bonded to the first continuous web 50, and the first continuous web 50, the second continuous web 58, and the continuous sheet 60 can reliably and firmly be held while being intermittently fed from the temporarily bonding mechanism 1040 to the finally bonding mechanism 1120, and hence can be smoothly fed.

Two rails 65 are unreeled in the form of webs from the rail supply unit 812, and cut to a predetermined length. The cut rails 65 are thermally bonded to the second continuous web 58 and the continuous sheet 60 on opposite sides of each image frame 22 in the second heat-bonding station 66 in step S8.

As shown in FIGS. 35 through 37, in the rail supply unit 812, while the rails 65 are being held by the fixed blades 840 and the web guides 848, the movable blades 838 are moved downwardly by the moving means 846 and cut off the rails 65 in coaction with the fixed blades 840. At this time, a vacuum is developed in the suction holes 854 of the rail holding means 842 incorporated in the movable blades 838 to attract the rails 65 cut by the movable blades 838 and the fixed blades 840 against the bottoms of the movable blades 838. The rails 65 thus attracted by the movable blades 838 are lowered and placed in given positions on the second continuous web 58 and the continuous sheet 60.

The heater blocks 862 are disposed in confronting relation to the movable blades 838. The heater blocks 862 move upwardly in timed relation to the downward movement of the movable blades 838. The rails 65 attracted by the movable blades 838 are therefore thermally bonded to the second continuous web 58 and the continuous sheet 60.

As described above, the rail holding means 842 are incorporated in the movable blades 838, and when the rails 65 are cut by the movable blades 838 and the fixed blades 840, the cut rails 65 are directly attracted by the movable blades 838 and supplied to given positions on the second continuous web 58 and the continuous sheet 60. Accordingly, the rail supply unit 812 is of a simplified construction and is capable of supplying the rails 65 quickly and highly accurately to desired bonding positions.

The movable blades 838 are pressed against the fixed blades 840 by the spring-loaded rollers 852, and have the guides 850*a*, 850*b*. Thus, the movable blades 838 can be pressed against the fixed blades 840 at all times in a desired state, and can cut the rails 65, which are of a flexible material, smoothly and highly accurately. Furthermore, the fixed blades 840 have a small shear angle to reduce the resistance imposed when the rails 65 are cut off.

The third continuous web 68 is disposed as a roll in the cover sheet supply unit 814. After the third continuous web 68 is joined to the second continuous web 58 in the second joining station 70, the second and third continuous webs 58, 68 are thermally bonded to each other with the rails 65 in the third heat-bonding station 72 in step S9.

Specifically, as shown in FIGS. 48 and 49, in the rail bonding mechanism 1172, the first continuous web 50, the second continuous web 58, and the continuous sheet 60 which are bonded to the rails 65 with the third continuous web 68 placed thereon are intermittently fed as a laminated assembly. The lower vertically movable table 1134 and the upper vertically movable table 1148 are moved toward and away from each other by the actuator means 1128, causing the third heating blocks 1174*a*, 1174*b* and the fourth heating blocks 1176*a*, 1176*b* to sandwich the laminated assembly. At this time, the third heating blocks 1174*a*, 1174*b* are heated to a temperature ranging from 50° C. to 80° C., whereas the fourth heating blocks 1176*a*, 1176*b* are heated to a temperature ranging from 80° C. to 140° C.

The third heating blocks 1174*a*, 1174*b* have the respective ridges 1178*a*, 1178*b*, and the fourth heating blocks 1176*a*, 1176*b* have the respective ridges 1184*a*, 1184*b*. The rails 65 and the third continuous web 68 are simultaneously sealed at two locations by the ridges 1178*a*, 1178*b* and the ridges 1184*a*, 1184*b*.

Figure 50:
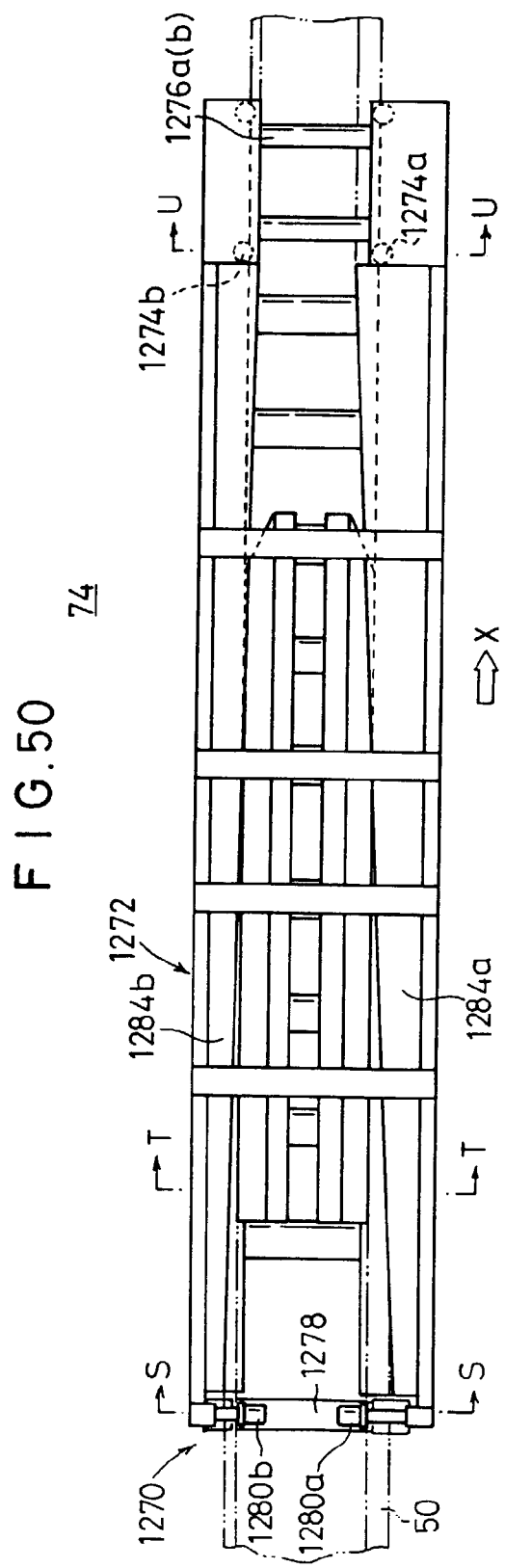
FIG. 50 is a plan view of a folding station of the manufacturing system.

In the folding station 74, the opposite marginal edges of the first continuous web 50 are folded back inwardly along the folds 38*a*, 38*b*, wrapping the trap 42 and the developing liquid pod 40 in step S10. In the folding station 74, as shown in FIGS. 50 and 51, the first continuous web 50 is gripped by the lower roller 1278 and the upper rollers 1280*a*, 1280*b* of the feed means 1270 and fed in the direction indicated by the arrow X.

The lower roller 1278 has the groove 1282 having a width which corresponds to the widths of the second continuous web 58 and the continuous sheet 60. The upper rollers 1280*a*, 1280*b* press the second continuous web 58 and the continuous sheet 60 sealed on the first continuous web 50 into the groove 1282 against movement in the transverse direction of the first continuous web 50.

Figure 53:
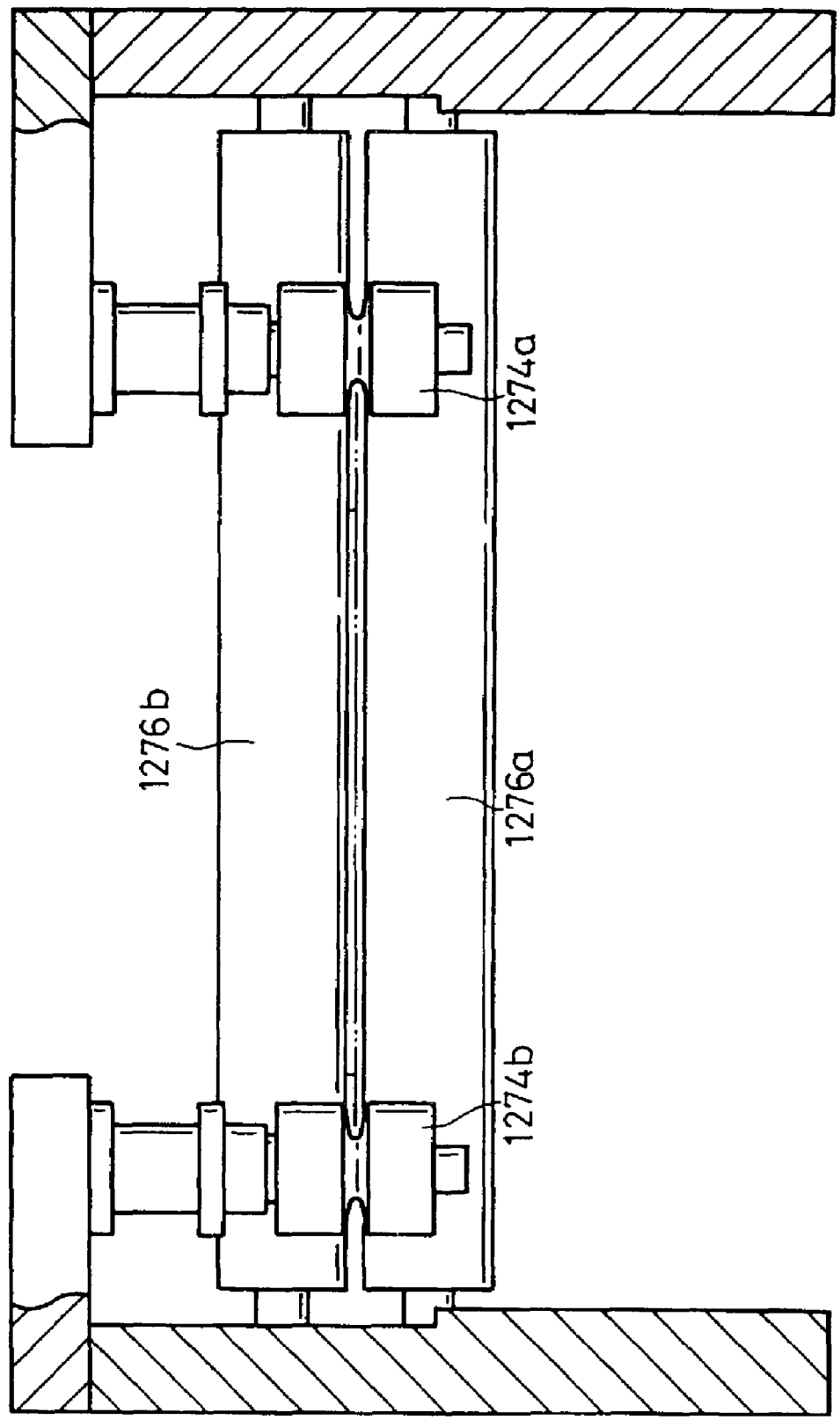
FIG. 53 is an enlarged cross-sectional view taken along line U—U of FIG. 50.

The opposite marginal edges of the first continuous web 50 are continuously folded while they are moving along the guide surfaces 1286*a*, 1286*b* of the guide rails 1284*a*, 1284*b* of the folding means 1272, until finally the opposite marginal edges of the first continuous web 50 are folded back over the upper surface of the first continuous web 50 (see FIG. 52). The opposite marginal edges of the first continuous web 50 are thus folded back to wrap the trap 42 and the developing liquid pod 40. As shown in FIG. 53, the opposite edges of the first continuous web 50 are supported by the respective guide rollers 1274*a*, 1274*b* and sandwiched by the pressing rollers 1276*a*, 1276*b* as the first continuous web 50 is moved in the direction indicated by the arrow X. In the fourth heat-bonding station 76, the folded marginal edges of the first continuous web 50 are thermally bonded by the flap seal 1294 in step S11.

In the folding station 74, as described above, the first continuous web 50 is fed in the direction indicated by the arrow X by the feed means 1270 while the first continuous web 50 is prevented from being positionally displaced in the transverse direction. While the first continuous web 50 is being such fed, the opposite marginal edges thereof are continuously and smoothly folded back inwardly along the folds 38*a*, 38*b* by the folding means 1272. Therefore, the opposite marginal edges of the first continuous web 50 are folded back highly accurately and efficiently. The flap seal 1294 is capable of sealing the folded marginal edges of the first continuous web 50 at a given position that is constantly positioned with respect to the image frame 22 when the edge detecting station 57*b* detects an edge and controls movement of the first continuous web 50.

In the fourth heat-bonding station 76, as shown in FIGS. 54 and 57, the temporarily flap bonding mechanism 1394 is actuated. In the temporarily flap bonding mechanism 1394, the second presser block 1402 is heated to a certain temperature, e.g., in the range from 80° C. to 140° C., by the heater 1408, and the first presser block 1400 and the second presser block 1402 are displaced toward and away from each other. The first presser block 1400 has the ridges 1404*a*, 1404*b*, and the second presser block 1402 has the ridges 1406*a*, 1406*b*. When the first presser block 1400 and the second presser block 1402 sandwich the laminated assembly, the flaps 50*a*, 50*b* are temporarily bonded along the rails 65.

In the finally flap bonding mechanism 1396, as shown in FIGS. 55 and 58, the presser pad 1434 of the presser means 1418 is lowered to lightly press the third continuous web 68 at an image frame 22, and the holding means 1420 is actuated. The cylinders 1438*a*, 1438*b* of the holding means 1420 are operated to cause the pressers 1446*a*, 1446*b* to press the flap 50*a* toward the image frame 22, and the cylinders 1440*a*, 1440*b* of the holding means 1420 are operated to cause the pressers 1448*a*, 1448*b* to press the flap 50*b* toward the image frame 22.

With the flaps 50*a*, 50*b* being spread without sagging, the first through third continuous webs 50, 58, 68 and the rail 60 are finally bonded by the third presser block 1414 and the fourth presser blocks 1416*a*, 1416*b*, and at the same time the flaps 50*a*, 50*b* and the third continuous web 68 are finally bonded. At this time, the fourth presser blocks 1416*a*, 1416*b* are heated to a temperature ranging from 80° C. to 140° C.

The joined body 1702 thus bonded is intermittently fed to the flap re-bonding mechanism 1398. In the flap re-bonding mechanism 1398, as shown in FIGS. 56 and 60, the sealed portion of the flap 50*a* near the trap 42 is re-sealed by the fifth presser blocks 1480*a*, 1480*b* and the sixth presser blocks 1482*a*, 1482*b* which are heated to a temperature ranging from 80° C. to 140° C. Therefore, it is possible to prevent the liquid from leaking and to increase the rigidity of the unit corners. In the fourth heat-bonding station 76, since the ends of the flaps 50a, 50b of the laminated assembly are held by the grooved guide rollers (not shown), the laminated assembly can accurately be maintained only in the transverse direction, i.e. the direction indicated by the arrow A.

In the first embodiment, the fourth heat-bonding station 76 has the temporarily flap bonding mechanism 1394, the finally flap bonding mechanism 1396, and the flap re-bonding mechanism 1398 that are successively disposed in the order named in the direction in which the first continuous web 50 is fed. With this arrangement, the processing time can be distributed compared with the conventional arrangement in which the flaps 50a, 50b folded by the former 1277 are bonded in a single bonding process, so that the entire process of manufacturing instant photographic film units 20 is easily made efficient.

After flaps are temporarily bonded to the laminated assembly at the rails 65 by the temporarily flap bonding mechanism 1394, the laminated assembly is accurately and neatly held by the pressing means 1418 and the holding means 1420 in the finally flap bonding mechanism 1396, and the flaps are finally bonded highly accurately and reliably by the third presser block 1414 and the fourth presser blocks 1416a, 1416b.

The flap re-bonding mechanism 1398 re-bonds the flap 50a near the trap 42. Accordingly, the liquid is reliably prevented from leaking when the instant photographic film unit 20 is in use, and the corners of the instant photographic film unit 20 are increased in rigidity.

In the finally flap bonding mechanism 1396, the edge detecting station 57b detects an image frame 22 to control movement of the laminated assembly for thereby sealing the folded marginal edges of the first continuous web 50 at a given position that is constantly positioned with respect to the image frame 22.

The joined body 1720 which is constructed of the first through third continuous webs 50, 58, 68 that are bonded in a given laminated state is then transferred from the main feed drum 1502 via the second free loop 1504 to the cutting feed drum 1508, which is controlled to intermittently feed the joined body 1720 by each pitch at a time in the direction indicated by the arrow X. In the cutting station 78, as shown in FIG. 62, the lower die block 1712 and the upper die block 1714 are displaced toward and away from each other by the drive cam means 1710.

The first machining means 1706 and the second machining means 1708 are mounted respectively on the lower die block 1712 and the upper die block 1714. As shown in FIGS. 63 and 64, substantially at the same time that the first lower blade 1716 and the first upper blade 1726 of the first machining means 1706 cut off the joined body 1702 in the direction perpendicular to the direction in which the joined body 1702 is fed, the opposite corners 1705a of one cut side 1704a are beveled. After the joined body 1702 is fed a constant distance, i.e., one pitch, in the direction indicated by the arrow X, the second lower blades 1718a, 1718b and second upper blades 1728a, 1728b of the second machining means 1708 bevel the opposite corners 1705b of the other cut side 1704b which confronts the cut side 1704a in step S12.

In the first embodiment, therefore, it is possible to produce an instant photographic film unit 20 with beveled four corners efficiently and highly accurately in a simple process with a simple arrangement.

The first lower blade 1716 and the first upper blade 1726 are of a simple structure in that they have the curved edges 1722a, 1722b and 1732a, 1732b on the opposite ends of the straight edges 1720, 1730. The blade edge angle of the first lower blade 1716 is set to 90°, and the blade edge angle α and the shear angle β of the first upper angle 1726 are set to values based on the sharpness, service life, etc. as shown in FIGS. 92 and 93.

Specifically, the blade edge angle α is set to values in the range from 20° to 45°, preferably in the range from 25° to 35°, and the shear angle β is set to values in the range from 8° to 20°, preferably in the range from 11° to 15°. These blades can thus cut off the joined body 1702 which is composed of the first through third continuous webs 50, 58, 68 that are laminated and joined by a hot-melt adhesive, so that high-quality instant photographic film units 20 can be manufactured efficiently.

When the joined body 1702 is cut off by the first and second machining means 1706, 1708, the guide means 1750 is actuated as shown in FIG. 66. Specifically, the cam rollers 1762 move along the cam surfaces 1764 of the cam members 1766 on the upper die block 1714, displacing the guide members 1756 which support the cam rollers 1762 toward each other. The joined body 1702 has its opposite sides held by the guide members 1756, and hence can be cut off highly accurately without being positionally displaced transversely.

The retrieving means 1740 is disposed below the second lower blades 1718a, 1718b. Debris 1736 that is produced when the corners 1705b of the cut side 1704b of the joined body 1702 are beveled is blown downwardly into the tubes 1742a, 1742b by an air stream ejected from the air outlet holes 1744a, 1744b defined in upper portions of the second lower blades 1718a, 1718b, and thereafter reliably retrieved in a retrieving region by a suction means (not shown). Therefore, the debris 1736 is prevented from being attached to instant photographic film units 20 or other members.

In the first embodiment, the mask sheet 24, the photosensitive sheet 30, and the cover sheet 36 are bonded as the first through third continuous webs 50, 58, 68 in a laminated state, and then cut off into instant photographic film units 20. As a consequence, the manufacturing system 90 is simplified in structure and control, and the cost with which to manufacture instant photographic film units 20 is effectively reduced.

In the first embodiment, the mask sheet 24, the photosensitive sheet 30, and the cover sheet 36 are bonded as the first through third continuous webs 50, 58, 68 in a laminated state, and then cut off into instant photographic film units 20 in the cutting station 78. Thus, any complex and expensive control device is not required for positioning and bonding sheets, e.g., the photosensitive sheet 30 and the cover sheet 36, which have been cut off in the process on a continuous web, e.g., the first continuous web 50. Accordingly, the manufacturing system 90 is simplified in structure, and the cost with which to manufacture instant photographic film units 20 is effectively reduced, compared with the conventional system.

In normal operation except for malfunctions such as machine shutdowns, the relative positions in the pitch-fed direction of the image frames 22 and other members, e.g., the developing liquid pods 40 and the traps 42, are varied in a gradual wavy pattern due to shrinkage of the first continuous web 50, etc. Depending on such wavy variations, the rates at which the first continuous web 50 and the second and third continuous webs 58, 68 to be stacked thereon are fed are controlled by the rate at which the laminated assembly is fed by the main feed rum 1502. Thus, it is possible to appropriately adjust the relative positions in the pitch-fed direction of the image frames 22 of the first continuous web 50 and other members.

Specifically, when the first continuous web 50 shrinks, any variations in the rate at which the first continuous web 50 is fed are corrected to achieve a preset feeding pitch for thereby controlling the feed of the first continuous web 50, in a most upstream region where the first continuous web 50 needs to be positioned, i.e., from the mark forming station 55a and the air hole forming station 55b to the trap attaching station 54 and from the pod attaching station 56 to the punching station 59.

More specifically, the mark detecting station 57a detects the position of a mark 53, and the rate at which the laminated assembly is fed by the main feed rum 1502 is controlled based on a deviation of the detected position in order to feed the first continuous web 50 at a preset constant pitch. The farther downstream from the mark forming station 55a, the lower the response to the constant-pitch control process. For this reason, the mark 53 is detected at a position which is capable for accurately detecting a deviation of the detected mark 53. Therefore, the relative positions of the marks 53, the developing liquid pods 40, and the traps 42, i.e., the relative positions of the image frames 22, the developing liquid pods 40, and the traps 42, and the relative position of the image frames 22 and the spacers 32, can be adjusted to desired accuracy ranges.

The finally flap bonding mechanism 1396 that is spaced from the first through third heat-bonding stations 64, 66, 72, which cause thermal shrinkage of the various members, by the corresponding numbers of pitches tends to produce a sealing failure due to a slight sealing position variation, causing jamming, if the main feed drum 1502 does not fully constrain the webs. To solve this problem, the frame detecting station 57c detects an image frame 22 for controlling the finally flap bonding mechanism 1396 to move in the direction indicated by the arrow X in order to make constant the relative position of the image frame 22 and the sealing position. The former 1277 is coupled upstream of the finally flap bonding mechanism 1396. If a loop were formed immediately upstream of the former 1277 for controlling the position of the webs, then the distance over which the webs are fed would be unduly increased.

In the cutting station 78, for the same reasons as with the finally flap bonding mechanism 1396, and also because the cutting mechanism is capable of high-speed operation and hence may be a single mechanism, the second free loop 1504 is formed, and an image frame 22 is detected at the cutting feed drum 1508 to control the position of the webs and feed the webs.

Upon machine shutdowns, amounts of thermal shrinkage are particularly large in the first through third heat-bonding stations 64, 66, 72, tending to produce large deviations of the relative positions of the image frames 22 and other members. To overcome this drawback, before the webs start being fed at the time of starting the system, the main feed drum 1502 is controlled to return until any deviation of the position of the mark 53 detected in the mark detecting station 57a becomes nil. In this fashion, the relative positions of the image frames 22 and other members can be adjusted to appropriate ranges upon machine shutdowns.

In the first embodiment, when the first continuous web 50, which is a light unshielded member, is delivered from the bright chamber 92 into the dark chamber 94, the first continuous web 50 passes through the light shielding mechanism 610. As shown in FIG. 28, in the light shielding mechanism 610, when the first continuous web 50 is inserted via the slit passage 620a of the web chute 618a into the light shielding box 612, the first continuous web 50 passes between the first and second path rollers 614a, 616a whose circumferential surfaces lap each other, producing a step S therein. Furthermore, after the first continuous web 50 is guided by the tapered surface 622 and inserted into the slit passage 620b of the web chute 618b, the first continuous web 50 is lapped again by the first and second path rollers 614b, 616b, and then introduced into the dark chamber 94.

In this manner, the light shielding mechanism 610 forms two steps S in the first continuous web 50 with the first path rollers 614a, 614b and the second path rollers 616a, 616b, and effectively blocks straight rays of light with the slits 620a, 620b in the web chutes 618a, 618b for thereby preventing external light from being introduced from the bright chamber 92 into the dark chamber 94.

The light shielding mechanism 610 provides a desired light shielding function with a simple arrangement, allowing the first continuous web 50 to be placed in the bright chamber 92. Thus, the first continuous web 50 can be handled highly easily and efficiently. The continuous sheet 60, the rails 65, and the third continuous web 68, which are light unshielded members, are disposed as rolls in the bright chamber 92, and hence can also be handled highly easily and efficiently.

As shown in FIG. 38, the light shielding mechanism 944 is disposed in the region where the third continuous web 68 unreeled from the cover sheet supply unit 814 is introduced from the bright chamber 92 into the dark chamber 94. When the third continuous web 68 is inserted through the slit 948 into the light shielding box 946, it travels along an S-shaped path provided by the first and second path rollers 952, 954, and then introduced via the slit 950 into the dark chamber 94. The light shielding mechanism 944 provides a desired light shielding function with a simple arrangement.

In the first embodiment, the first continuous web 50, the second continuous web 58, the continuous sheet 60, and the third continuous sheet 68 have their entire lengths to be used, set to equal values or integral multiples, and have their path lengths set such that their spliced regions are positioned in one instant photographic film unit 20.

For example, the mask sheet supply unit 96 and the cover sheet supply unit 814 will be described in specific detail below. As shown in FIG. 7, when the first continuous web 50 is continuously unreeled from the unreeling shaft 100 by the suction roller 230, the fold forming mechanism 104 forms folds 38a, 38b in the opposite marginal edges of the first continuous web 50. After electrostatic charges are removed from the first continuous web 50 by the electrostatic charge removing means 226, the first continuous web 50 is intermittently fed downstream of the first free loop 244. If the remaining length detecting means 103, which detects the diameter of the roll of the first continuous web 50, detects when a preset length of the first continuous web 50 has been unreeled, then the unreeling of the first continuous web 50 with the suction roller 230 is stopped.

Then, a new roll of the first continuous web 50 is mounted on the unreeling shaft 100, and leading and trailing ends of the new and old rolls are spliced by the splicing unit 102. The suction roller 230 is actuated again to unreel the new roll of the first continuous web 50.

As shown in FIG. 38, the unreeling shaft 930 of the cover sheet supply unit 814 is rotated to unreel the third continuous web 68 rolled thereon. The third continuous web 68 is fed over a path length by the path forming unit 936. Thereafter, electrostatic charges are removed from the third continuous web 68 by the electrostatic charge removing means 226, and the third continuous web 68 is then introduced into the dark chamber 94. If the remaining length detecting means 103 detects a certain remaining length of the third continuous web 68, then a new roll of the third continuous web 68 is mounted on the unreeling shaft 930, and leading and trailing ends of the new and old rolls are spliced by the splicing unit 102. The unreeling shaft 930 is rotated to unreel the new third continuous web 68 rolled thereon. The splicing error detecting means 934 determines whether the spliced ends are acceptable or not.

The path lengths of the first and third continuous webs 50, 68 up to the second joining station 70 are equal to each other. Therefore, the spliced ends of the first and third continuous webs 50, 68 are positioned in one instant photographic film unit 20 within the dark chamber 94. Because the spliced ends of the first continuous web 50, the second continuous web 58, the continuous sheet 60, and the third continuous sheet 68 are positioned in or near one instant photographic film unit 20, any number of instant photographic film units 20 that are discarded is effectively reduced, making the manufacturing process highly economical.

Inasmuch as the first continuous web 50, the second continuous web 58, the continuous sheet 60, and the third continuous sheet 68 have their entire lengths to be used, set to equal values or integral multiples, they are replaced at the same time. Therefore, their rolls are replaced substantially at the same time, allowing the manufacturing system 90 to operate efficiently and quickly.

In the first embodiment, as shown in FIGS. 27 and 28, the dark chamber 94 has at least one light shielding door 624. When the interior of the light shielding box 612 of the light shielding mechanism 610 needs to be inspected, the light shielding door 624 may be opened by the handle 628. Since only the light shielding door 624 may be opened by the handle 628 for inspecting the interior of the light shielding box 612, the interior of the light shielding box 612 can easily be inspected.

In the first embodiment, the photosensitive sheet 30 is composed of the second continuous web 58. However, the photosensitive sheet 30 may be composed of the third continuous web 68.

As shown in FIG. 5, instant photographic film units 20 are fed one by one on the conveyor 1852. Unit information is printed on each of the instant photographic film units 20 with the ink jet printer 1836. Any instant photographic film units 20 which are produced upstream and rejected as being defective are discharged into the removing station 1842 by the first shutter means 1840, and accepted instant photographic film units 20 are fed to the stacking station 80.

In the stacking station 80, as shown in FIG. 67, instant photographic film units 20 fed on the conveyor 1852 are introduced into the stacking box 1854 of the stacking mechanism 1846. As shown in FIGS. 67 through 69, the instant photographic film units 20 are stacked on the first and second fingers 1856, 1858 in step S13. After a certain number of instant photographic film units 20, i.e., 10 instant photographic film units 20, have been stacked in the stacking mechanism 1846, the motor 1864 is energized to rotate the first and second gears 1868, 1870 in opposite directions in synchronism with each other, causing the pulleys 1872a, 1872b and the belts 1874a, 1874b to turn the first and second rotors 1860, 1862 by 180° in the respective directions indicated by the arrows.

The first and second fingers 1856, 1858 are then turned in unison with the first and second rotors 1860, 1862, allowing the 10 instant photographic film units 20 to drop into the standby station 1844. In the standby station 1844, the shutter means 1894 is actuated. The cylinder 1888 is actuated to turn the swing base 1884 from the solid-line position to the two-dot-and-dash-line position in FIG. 67, placing the 10 stacked instant photographic film units 20 via the hopper 1982 in the discharge station 1848 into the removing station 1842. Then, as described later, the 10 stacked instant photographic film units 20 are automatically placed in the film pack 82 in step S14.

A process of removing instant photographic film units 20 as samples or products from the removing station 1842 will be described below with reference to FIG. 94.

In the dark box 1887 in the removing station 1982, when the door 1889 is closed, the light shielding shutter 1885 of the first shutter means 1840 remains open. When the operator in the bright chamber 92 turns the handles 1893a, 1893b in an opening direction in step S1a, the limit switch 1895b is actuated in step S2a (YES). A command is outputted to close the first shutter means 1840 in step S3a, actuating the cylinder 1883 of the first shutter means 1840. The light shielding shutter 1885 is displaced to a position underneath the hopper 1892 by the cylinder 1883, shielding the dark box 1887 from the light of the bright chamber 92 in step S4a (YES).

Then, the operator opens the door 1889 about the hinges 1891 in step S5a, and removes the instant photographic film units 20 from the dark box 1887 into the bright chamber 92 in step S6a. The operator closes the door 1889 in step S7a, and turns the handles 1893a, 1893b in a closing direction in step S8a.

If the turning movement in the closing direction of the handles 1893a, 1893b is detected by the limit switch 1895b in step S9a (YES), then a command is outputted to open the first shutter means 1840 in step S10a. The cylinder 1883 is actuated to retract the light shielding shutter 1885 from the position underneath the hopper 1892, opening the dark box 1887 into the dark chamber 94 in step S11a. The opening of the first shutter means 1840 is detected by the sensor 1895a (YES). The process of removing instant photographic film units 20 is now finished. Rejected instant photographic film units 20 are also removed in the same manner as described above.

In the first embodiment, as described above, the operator can remove rejected instant photographic film units 20 or accepted instant photographic film units 20 as samples or products into the bright chamber 92. While the operator is removing those rejected or accepted instant photographic film units 20, the manufacturing system 90 does not need to be stopped, and hence can efficiently produce instant photographic film units 20. The opening and closing movement of the first shutter means 1840 and the door 1889 as the second shutter means is controlled by the limit switch 1895b or the like to reliably prevent external light from being introduced from the dark box 1887 into the dark chamber 94.

Figure 94:
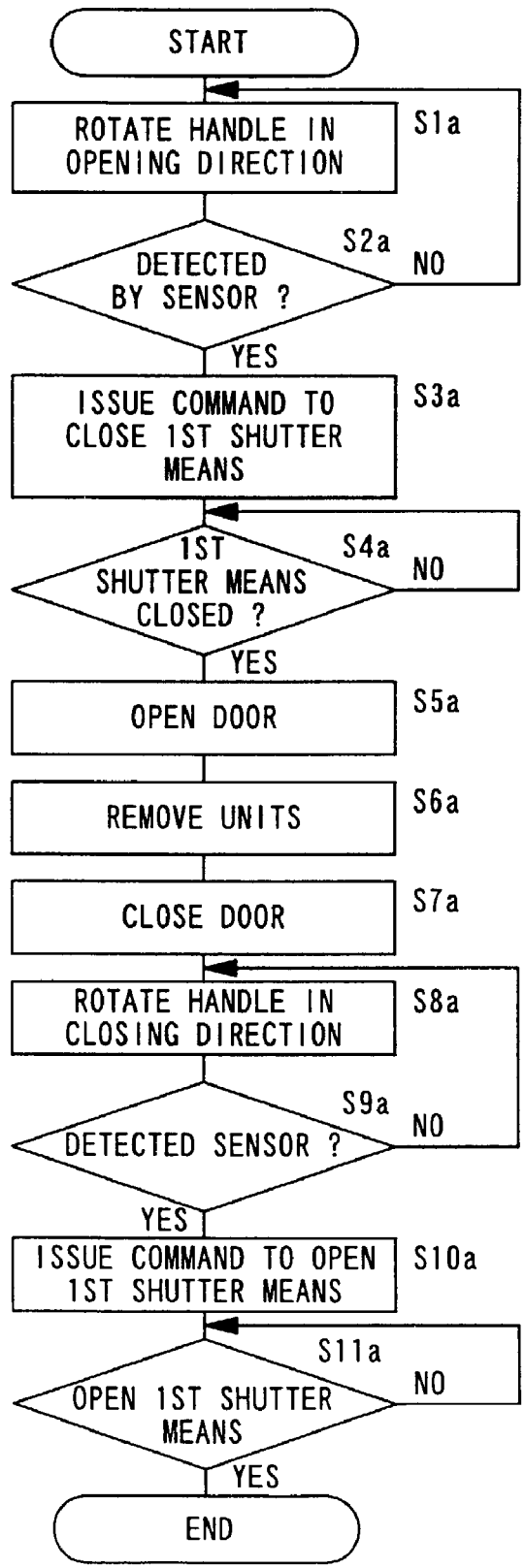
FIG. 94 is a flowchart of an operation sequence at the time an instant photographic film unit is taken out of a bright chamber.

Instant photographic film units 20 may be removed by a process which is different from the sequence shown in FIG. 94.

Such an alternative process will be described below. First, the first shutter means 1840 is closed by a removal command. After a closed state achieved by the light shielding shutter 1885 is detected by the sensor 1895a, the door 1889 is opened. Then, the instant photographic film units 20 are removed, after which the door 1889 is closed by a removal completion command. After the closing of the door 1889 is confirmed by a sensor (not shown), the light shielding shutter 1885 is opened by the first shutter means 1840.

Alternatively, there may be provided an interlock switch for allowing the door 1889 to be opened when the closing of the first shutter means 1840 is confirmed by the sensor 1895a, and an interlock switch for allowing the first shutter means 1840 to be opened when the closing of the door 1889 is confirmed by a sensor (not shown), and the first shutter means 1840 and the door 1889 may be opened and closed by these interlock switches.

For delivering the 10 instant photographic film units 20 from the standby station 1844 to the packing station 84, the motor 1898 of the switching feed mechanism 1850 is energized to rotate the rotatable plate 1902 in unison with the drive shaft 1900. The swing plate 1904 with the elongate hole 1908 receiving the cam 1910 on the rotatable plate 1902 is angularly moved about the support shaft 1906, causing the cam plate 1912 to move the pusher plate 1914 in the direction indicated by the arrow X.

The pusher plate 1914 is guided by the guide bar 1916 to push the 10 instant photographic film units 20 on the swing base 1884 in the direction indicated by the arrow X into the casing 1948 of the gripping means 1940 of the unit reversing mechanism 1920. In the unit reversing mechanism 1920, the cylinder 1970 of the unit dislodgment preventing means 1966 is actuated to lower the guide plate 1968 into a position covering part of the opening 1590 in the casing 1948.

As shown in FIG. 73, the cam rod 1954 of the turning means 1942 is actuated to cause the first pulley 1958, the belt 1962, and the second pulley 1960 to turn the rotatable shaft 1946 by 180° from the two-dot-and-dash-line position to the solid-line position in FIG. 72. The 10 instant photographic film units 20 inserted in the casing 1948 are now reversed 180° while being prevented from being dislodged by the unit dislodgment preventing means 1966, such that their exposure surfaces 34 face downwardly. Then, the unit dislodgment preventing means 1966 is actuated to retract the guide plate 1968 upwardly, after which the rodless cylinder 1974 of the removing means 1944 is actuated.

As shown in FIGS. 72 and 73, the removal plate 1976 fixed to the rodless cylinder 1974, which is inserted in the grooves 1952a, 1952b defined in the casing 1948, is moved in the direction indicated by the arrow B. The 10 instant photographic film units 20 inserted in the casing 1948 are now transferred onto the movable vertically movable table 1980 by the removal plate 1976. The movable table 1980 is displaced upwardly by the cylinder 1978, lifting the instant photographic film units 20 thereon. The instant photographic film units 20 are then gripped by the unit loading mechanism 1922.

In the unit loading mechanism 1922, as shown in FIG. 74, the swing cam 1996 is turned to cause the cam 1998 received in the vertical slot 1992 to move the slide base 1990 in the direction indicated by the arrow C to a position over the movable table 1980. Then, the cam 1986 is operated to lower the vertically movable base 1984 along the support plate 1982, and the cylinder 2008 of the holding finger means 2000 is actuated to move the cam 2016 forward. As shown in FIGS. 75 and 76, the cam surface 2020 of the cam 2016 lowers the cam followers 2022a, 2022b, angularly moving the swing finger members 2024a, 2024b away from each other.

As shown in FIG. 76, the instant photographic film units 20 on the movable table 1980 are sandwiched by the guides 2004, 2006 disposed respectively at the opposite longitudinal ends of the instant photographic film units 20. The distance by which the guides 2004, 2006 are spaced from each other is shorter than the length of the instant photographic film units 20. Therefore, the instant photographic film units 20 sandwiched by the guides 2004, 2006 are flexed upwardly.

The cylinder 2008 of the holding finger means 2000 is actuated to move the cam 2016 backward. The swing finger members 2024a, 2024b with the cam followers 2022a, 2022b engaging the cam surface 2020 are angularly moved toward each other under the resiliency of the springs 2028a, 2028b, gripping the opposite transverse edges of the instant photographic film units 20.

After the 10 instant photographic film units 20 have been held by the holding finger means 2000, the vertically movable base 1984 is moved upwardly by the cam 1986, and the holding finger means 2000 mounted on the slide base 1990 which ascends in unison with the vertically movable base 1984 is lifted while holding the instant photographic film units 20. The swing cam 1996 moves the slide base 1990 in the direction indicated by the arrow C into a position above the unit inserting position P1 on the first turntable 2050.

A pack casing 1934 with a lid 1938 attracted in position thereabove is disposed in the unit inserting position P1. Specifically, empty film packs 82 are successively fed by the empty pack feeding mechanism 1930 (see FIG. 70), with the foremost empty film pack 82 gripped by the second pack delivery mechanism 2212. In the second pack delivery mechanism 2212, as shown in FIGS. 83 and 84, the cylinder 2216 is operated to lower the L-shaped plate 2218 to place the pack gripping means 2220 on the film pack 82 on the empty pack feeding mechanism 1930. Then, the cylinder 2224 is operated to move the grip fingers 2226a, 2226b toward each other, gripping the film pack 82.

The pack gripping means 2220 is lifted by the cylinder 2216, and thereafter turned 90° by the rotatable shaft 2215 and placed onto the second turntable 2148 of the light shielding mechanism 1928. The cylinder 2216 is operated to insert the pack gripping means 2220 which is gripping the film pack 82 into the second opening 2194, for example. The cylinder 2224 is operated to move the grip fingers 2226a, 2226b away from each other, releasing the film pack 82. The cylinder 2216 is operated to lift the pack gripping means 2220.

The rotary actuator 2200 is operated to turn the second turntable 2148 by 180° to displace the film pack 82 in the film pack storage recess 2202b in the second turntable 2148 from the bright chamber 92 into the dark chamber 94, where the film pack 82 is placed at the first opening 192. In the dark chamber 94, the cylinder 2208 of the pack lifting/lowering means 2206 is operated to move the rest table 2210 upwardly to displace the film pack 82 upwardly from the film pack storage recess 2202b.

Then, the first pack delivery mechanism 2150 is operated. As shown in FIG. 81, the arm 2156 is angularly moved downwardly by the cam rod 2160 to lower the holder plate 2172 fixed to the turn shaft 2162. As shown in FIG. 82, the grippers 2186a, 2186b of the pack gripping means 2174 on the holder plate 2172 have been turned away from each other by the cylinders 2176 through the cams 2180 and the cam followers 2184a, 2184b. When the pack gripping means 2174 are lowered to a position to grip the film pack 82, the cylinders 2176 retract the cams 2180, allowing the grippers 2186a, 2186b to swing toward each other under the bias of the springs 2188a, 2188b thereby to grip the film pack 82.

As shown in FIG. 81, when the arm 2156 is angularly moved, the pack gripping means 2174 move upwardly in unison with the turn shaft 2162, after which the rotatable shaft 2166 rotates about its own axis. The rotation of the rotatable shaft 2166 is transmitted via the pulley 2168, the belt 2170, and the pulley 2164 to the turn shaft 2162. The pack gripping means 2174 which are holding the film pack 82 are turned 180° from a position above the second turntable 2148 to a position above the first turntable 2050.

In the lid fusing position P2 on the first turntable 2050, the holder bars 2064a, 2064b of the lid holding means 2060 have been spaced away from each other by the releasing means 2072. When the pack gripping means 2174 are lowered, the film pack 82 gripped by the pack gripping means 2174 is placed on the pack rest 2052. Then, the pack gripping means 2174 release the film pack 82. After the pack gripping means 2174 are lifted, the releasing means 2072 is actuated.

In the releasing means 2072, the rodless cylinders 2080*a*, 2080*b* are operated to cause the engaging rods 2068*a*, 2068*b* to move the movable bases 2062*a*, 2062*b* toward each other. The holder bars 2064*a*, 2064*b* are displaced onto the lid 1938 and hold the lid 1938 on the pack casing 1934 (see FIGS. 77 and 79). The vertically movable cylinders 2076*a*, 2076*b* are operated to lower the vertically movable tables 2078*a*, 2078*b*, releasing the engaging rods 2068*a*, 2068*b* from the engaging tubes 2082*a*, 2082*b*. The lid 1938 of the film pack 82 is held by the holder bars 2064*a*, 2064*b* under the bias of the springs 2066*a*, 2066*b*. When the first turntable 2050 is turned 1800, the film pack 82 is brought into the unit inserting position P1.

In the unit inserting position P1, the cylinder 2086 of the pack holding means 2074 is operated to move the rod 2090 in unison with the arm 2088 toward the film pack 82 on the pack rest 2052. The cylinder 2096 on the support plate 2094 is operated to move the presser plates 2092*a*, 2092*b* in unison with the elongate arm 2098 toward the rod 2090. The film pack 82 is thus held on the pack rest 2052. The releasing means 2072 is operated to move the movable bases 2062*a*, 2062*b* and the holder bars 2064*a*, 2064*b* away from the lid 1938.

As shown in FIG. 80, the lid 1938 is attracted by the lid attracting means 2130. Specifically, the rod 2138 in the support column 2132 is moved downwardly to lower the suction cups 2142 and the support plates 2144 in unison with the attachment plate 2138. The suction cups 2042 which are connected to a vacuum source (not shown) attract the lid 1938, and the support plates 2144 abut against and support the lid 1938. Then, the rod 2134 is lifted to remove the lid 1938 from the pack casing 1934 and position the lid 1938 above the pack casing 1934.

Figure 95:
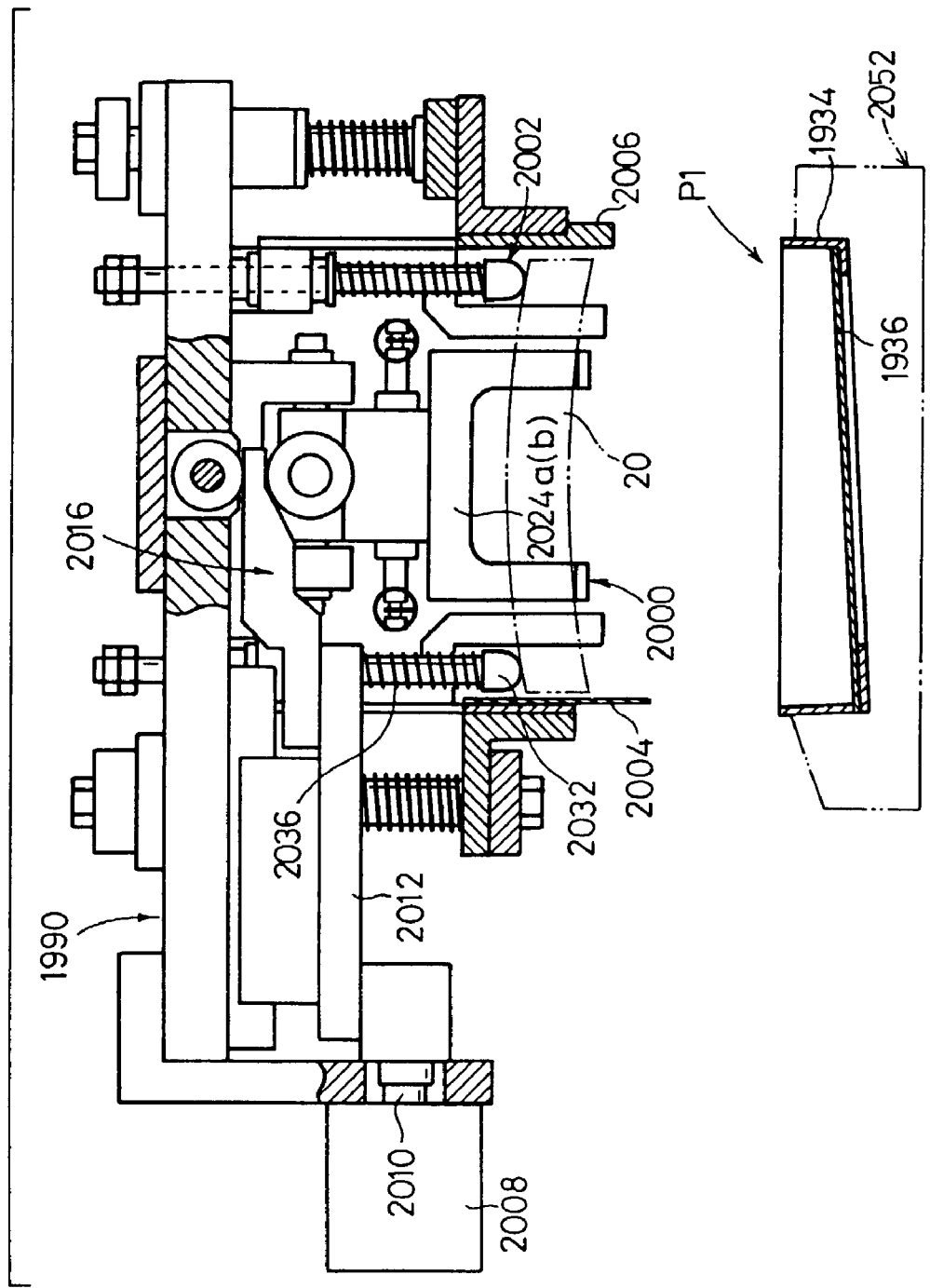
FIG. 95 is an elevational view, partly in cross section, showing the manner in which the instant photographic film unit is placed above a pack body.

The 10 instant photographic film units 20 held by the holding finger means 2000 are positioned above the pack casing 1934. As shown in FIG. 95, the instant photographic film units 20 held by the holding finger means 2000 have their longitudinally opposite ends gripped by the guides 2004, 2006 and their longitudinally opposite end portions pressed downwardly by the pressing rods 2032, and hence are kept in an upwardly convex curved shape.

Figure 96:
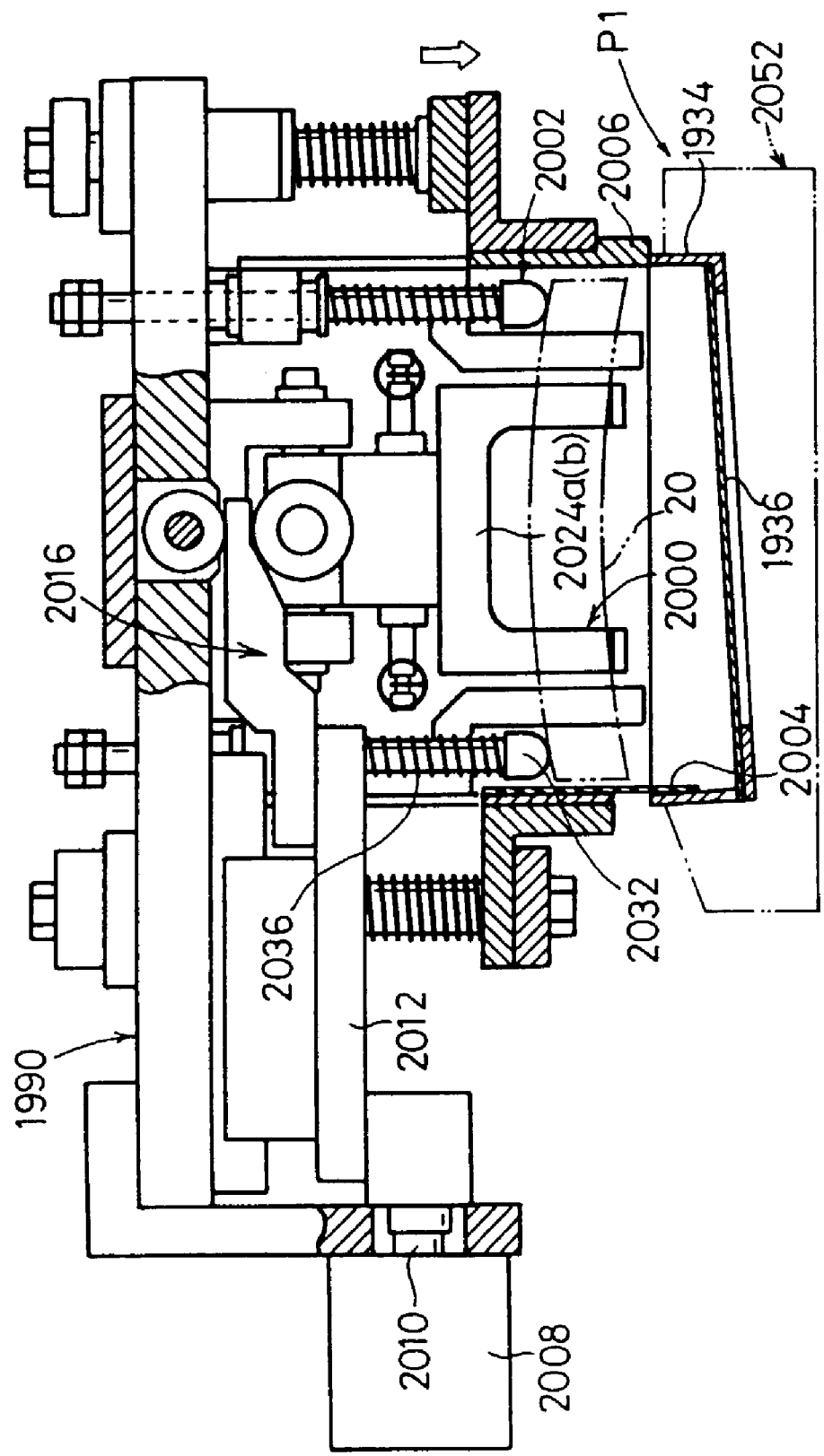
FIG. 96 is an elevational view, partly in cross section, showing the manner in which the instant photographic film unit is pushed into the pack body.
Figure 97:
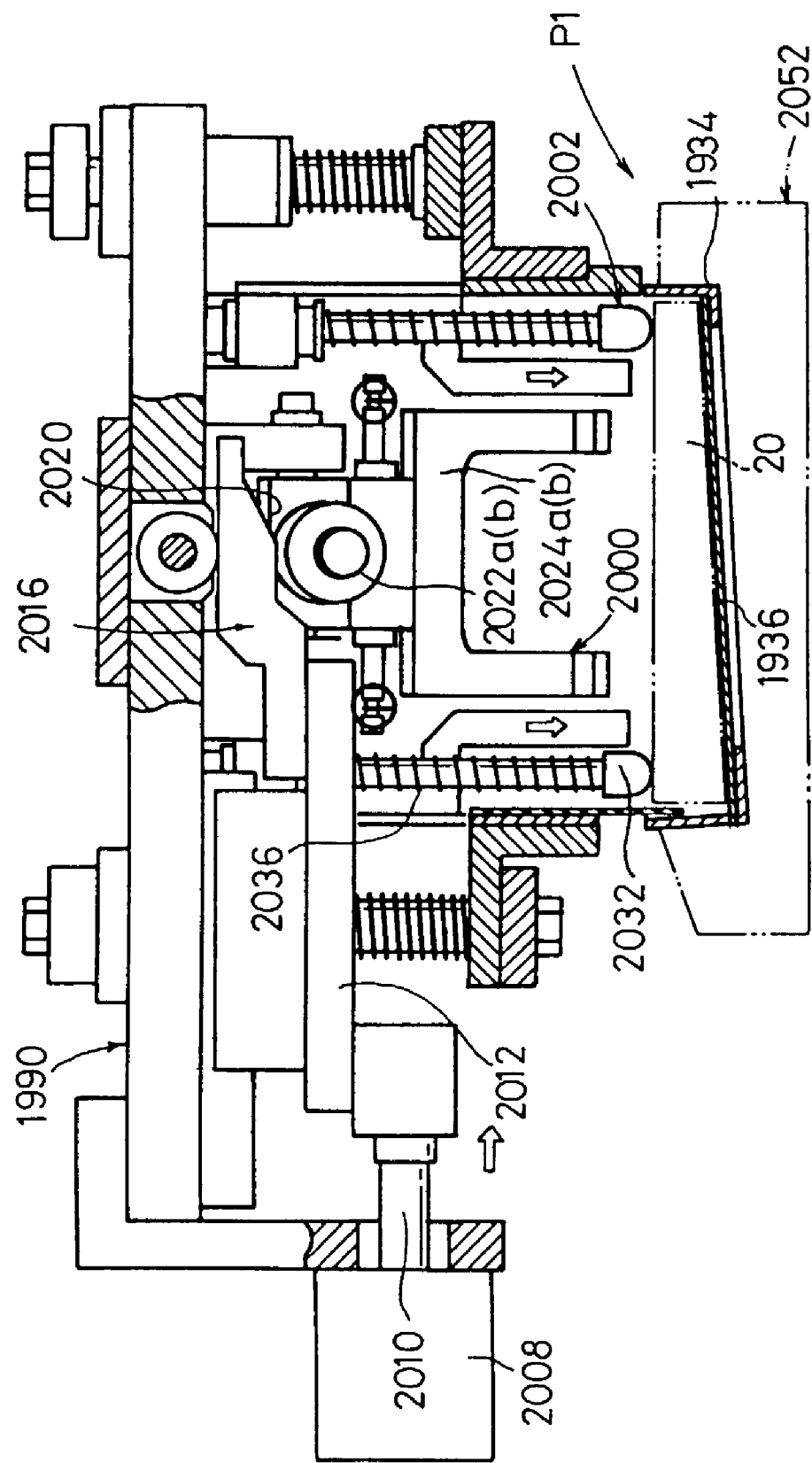
FIG. 97 is an elevational view, partly in cross section, showing the manner in which the instant photographic film unit is placed in the pack body.

When the slide base 1990 is lowered, as shown in FIG. 96, the guide 2004 is inserted into the pack casing 1934, and the guide 2006 abuts against the upper end of the pack casing 1934. The cylinder 2008 of the holding finger means 2000 is operated to move the cam 2016 forward, causing the cam surface 2020 and the cam followers 2022*a*, 2022*b* to turn the swing finger members 2024*a*, 2024*b* away from each other, releasing the instant photographic film units 20. The instant photographic film units 20 are urged downwardly by the presser means 2002 and have their opposite ends inserted smoothly and reliably into the pack casing 1934 while being guided by the guides 2004, 2006 (see FIG. 97).

After the 10 instant photographic film units 20 are placed in the pack casing 1934, the unit loading mechanism 1922 is retracted from the unit inserting position P1, and the lid attracting means 2130 which is attracting the lid 1938 is lowered by the rod 2134. The lid 1938 placed on the pack casing 1938 is released from the suction cups 2142. With the lid 1938 held by the support plates 2144, the releasing means 2072 moves the holder bars 2064*a*, 2064*b* toward the lid 1938 until the holder bars 2064*a*, 2064*b* press and hold the lid 1938.

After the pack holding means 2074 releases the pack casing 1934, the first turntable 2050 is turned 180° to bring the film pack 82 with the 10 instant photographic film units 20 accommodated therein into the lid fusing position P2. In the lid fusing position P2, the slide block 2108 of the pack holding means 2100 is moved from the two-dot-and-dash-line position to the solid-line position in FIG. 78 by the cam rod 2114 and the swing cam 2112, causing the rod 2110 to press and hold the pack casing 1934.

The releasing means 2072 moves the holder bars 2064*a*, 2064*b* away from the lid 1938, and the cam rod (actuator) 2116 of the light shielding plate holding means 2102 is elevated to displace the ejector pins 2120 on the vertically movable member 2118 through the holes 2122 in the first turntable 2050 to lift the light shielding plate 1936 placed in the pack casing 1934 off the bottom of the pack casing 1934 by a distance ranging from 0.2 mm to 2 mm, for example. Then, the ultrasonic fusing machine 2146 is energized to ultrasonically fuse the lid 1938 to the pack casing 1934.

In the first embodiment, the lid 1938 is ultrasonically fused to the pack casing 1934 while the light shielding plate 1936 in the pack casing 1934 is being held at a certain height, e.g., 0.2 mm to 2 mm, in the pack casing 1934 by the light shielding plate holding means 2102. Therefore, the light shielding plate 1936 is prevented from being fused to the pack casing 1934. As a result, the light shielding plate 1936 can reliably be discharged from the instant photographic film unit 20 when a picture is taken by a camera which is loaded with the instant photographic film unit 20.

After the lid 1938 is ultrasonically fused to the pack casing 1934, the ultrasonic fusing machine 2146 is retracted upwardly, and the pack holding means 2100 is displaced away from the pack casing 1934. The remover rods 2124 of the product removing means 2104 are moved upwardly by the vertically movable member 2118 to remove a fused product 1926 upwardly. The product 1926 removed upwardly by the product removing means 2104 is gripped by the pack gripping means 2174 of the first pack delivery mechanism 2150, and transferred to the second turntable 2148 upon turning movement of the turn shaft 2162. An empty film pack 82 placed on the second turntable 2148 is gripped by the pack gripping means 2174 and transferred to the first turntable 2050 in the manner described above.

On the second turntable 2148, as shown in FIGS. 83 and 84, the rest table 2210 of the pack lifting/lowering means 2206 is positioned upwardly and the product 1926 is placed on the rest table 2210. Then, the rest table 2210 is moved downwardly by the pack lifting/lowering means 2206. After the product 1926 is accommodated from the first opening 2192 into the film pack storage recess 2202*a* (or 2202*b*) in the second turntable 2148, the second turntable 2148 is turned 180° by the rotary actuator 2200 to position the product 1926 at the second opening 2149. The second pack delivery mechanism 2212 is actuated to cause the grip fingers 2226*a*, 2226*b* to grip the product 1926, which is turned 90° by the rotary table 2214. The product 1926 is turned back 90° by the rotary actuator 2228 and delivered to the product feeding mechanism 1932, and an empty film pack 82 placed in the empty pack feeding mechanism 1930 is brought from the second opening 2194 onto the second turntable 2148 by the second pack delivery mechanism 2212.

In the first embodiment, the light shielding mechanism 1928 is provided to shield the dark chamber 94 from the bright chamber 92 against entry of light, has the light shielding cover 2196 which extends across the light shielding wall 2190, and the second turntable 2148 angularly movable in the light shielding cover 2196, with the light shielding concave/convex structure 2198 disposed between the light shielding cover 2196 and the second turntable 2148. It is thus possible to shield the dark chamber 94 from the bright chamber 92 against entry of light to prevent external light from being applied to instant photographic film units 20 with a simple structure.

In the first embodiment, after various components including the first through third continuous webs 50, 58, 68 are bonded and processed to produce instant photographic film units 20, a certain number of instant photographic film units 20 are collected and accommodated in a film pack 82. These various steps are automatically carried out. Therefore, it is not necessary for the operator to manually align and place a desired number of instant photographic film units 20 into a film pack 82 in the dark chamber 82, but it is possible to successively and efficiently manufacture products each comprising a desired number of instant photographic film units 20 placed in a film pack 82.

Figure 98:
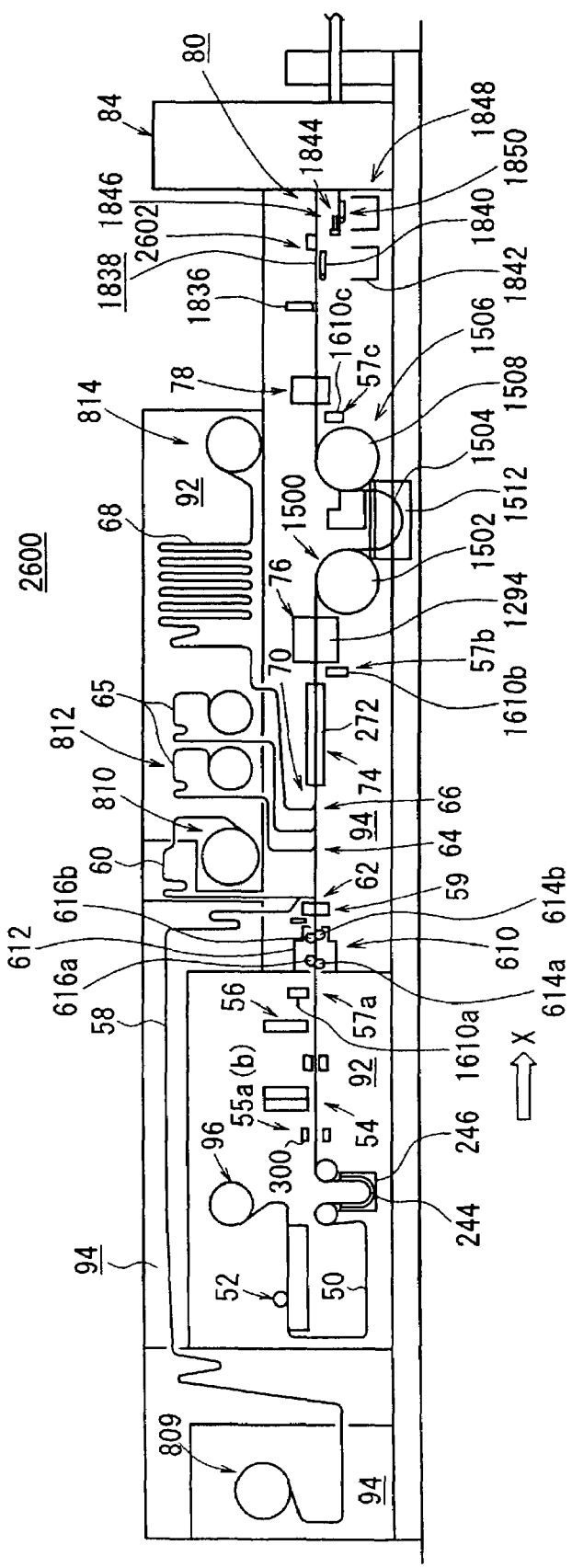
FIG. 98 is a schematic elevational view of a manufacturing system for carrying out a manufacturing method according to a second embodiment of the present invention.
Figure 99:
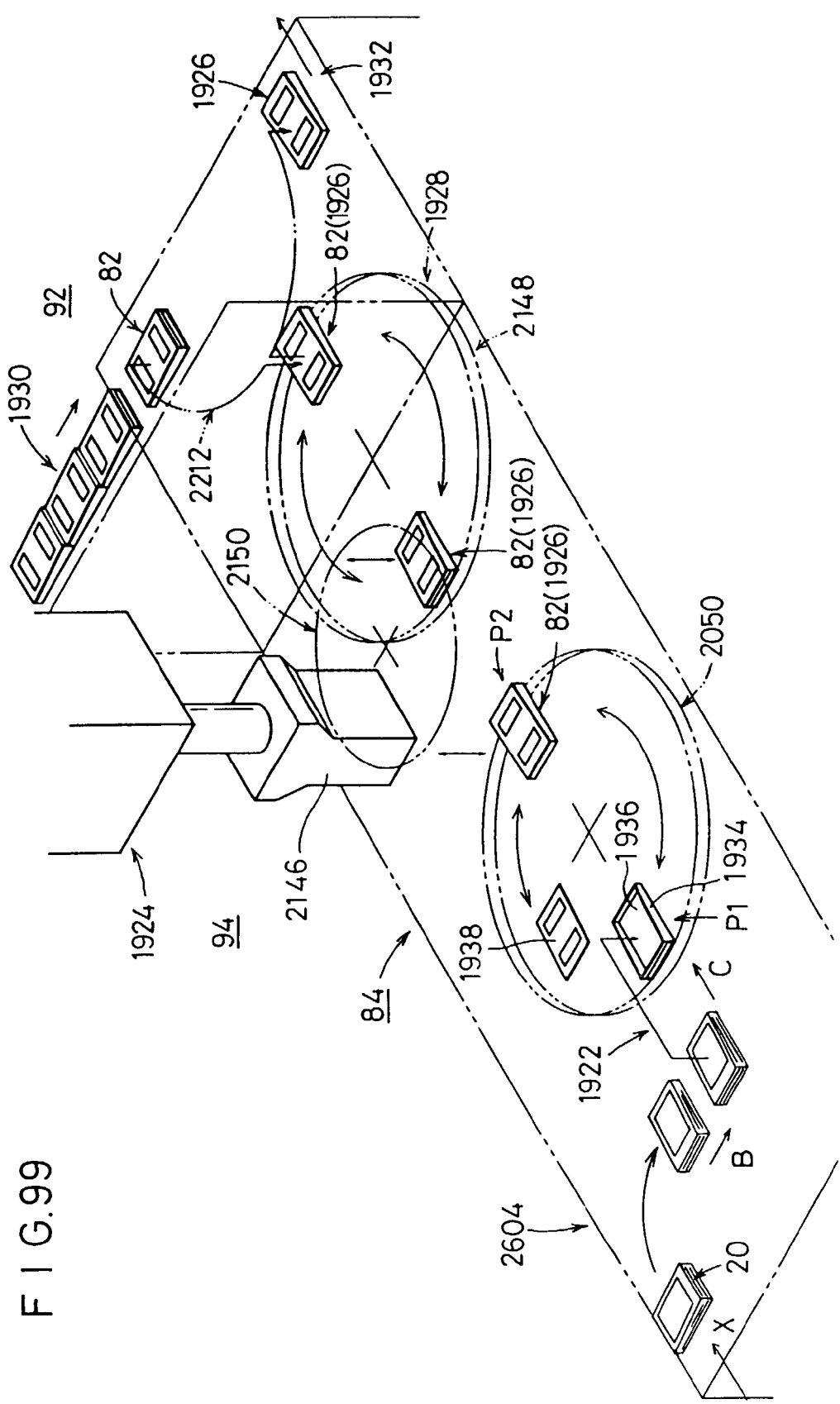
FIG. 99 is a schematic perspective view illustrative of the manner in which a packing station operates.

FIG. 98 schematically shows a manufacturing system 2600 for carrying out a manufacturing method according to a second embodiment of the present invention. FIG. 99 is illustrative of the manner in which a packing station of the manufacturing system 2600 operates. Those parts of the manufacturing system 2600 which are identical to those of the manufacturing system 90 according to the first embodiment are denoted by identical reference characters, and will not be described in detail below.

The manufacturing system 2600 has a unit reversing mechanism 2602 disposed between the defective product discharge gate 1838 and the stacking station 80, for reversing a single instant photographic film unit 20 such that its exposure surface 34 faces downwardly, and a unit feed direction converting mechanism 2604 disposed downstream of the unit loading mechanism 1922, for converting the direction of feed of 10 stacked instant photographic film units 20 from the direction indicated by the arrow X to the direction indicated by the arrow B.

Figure 100:
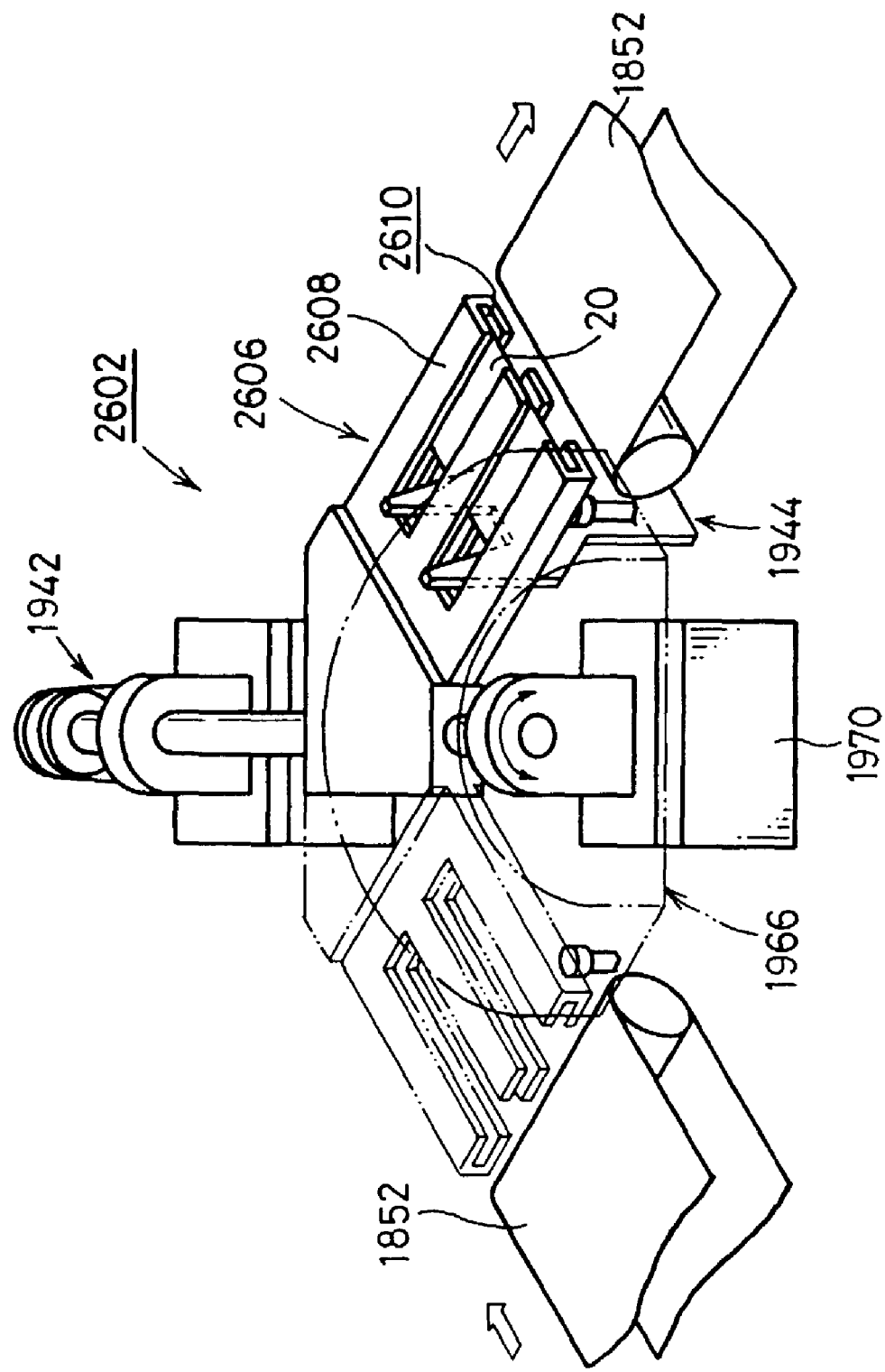
FIG. 100 is a perspective view of a unit reversing mechanism.

As shown in FIG. 100, the unit reversing mechanism 2602 is disposed on the conveyor 1952. Those parts of the unit reversing mechanism 2602 which are identical to those of the unit reversing mechanism 1920 according to the first embodiment are denoted by identical reference characters, and will not be described in detail below. The unit reversing mechanism 2602 has a gripping means 2606 for gripping a single instant photographic film unit 20. The gripping means 2606 has a casing 2608 which has an opening 2610 defined in a distal end thereof for receiving and releasing an instant photographic film unit 20 therethrough.

Figure 101:
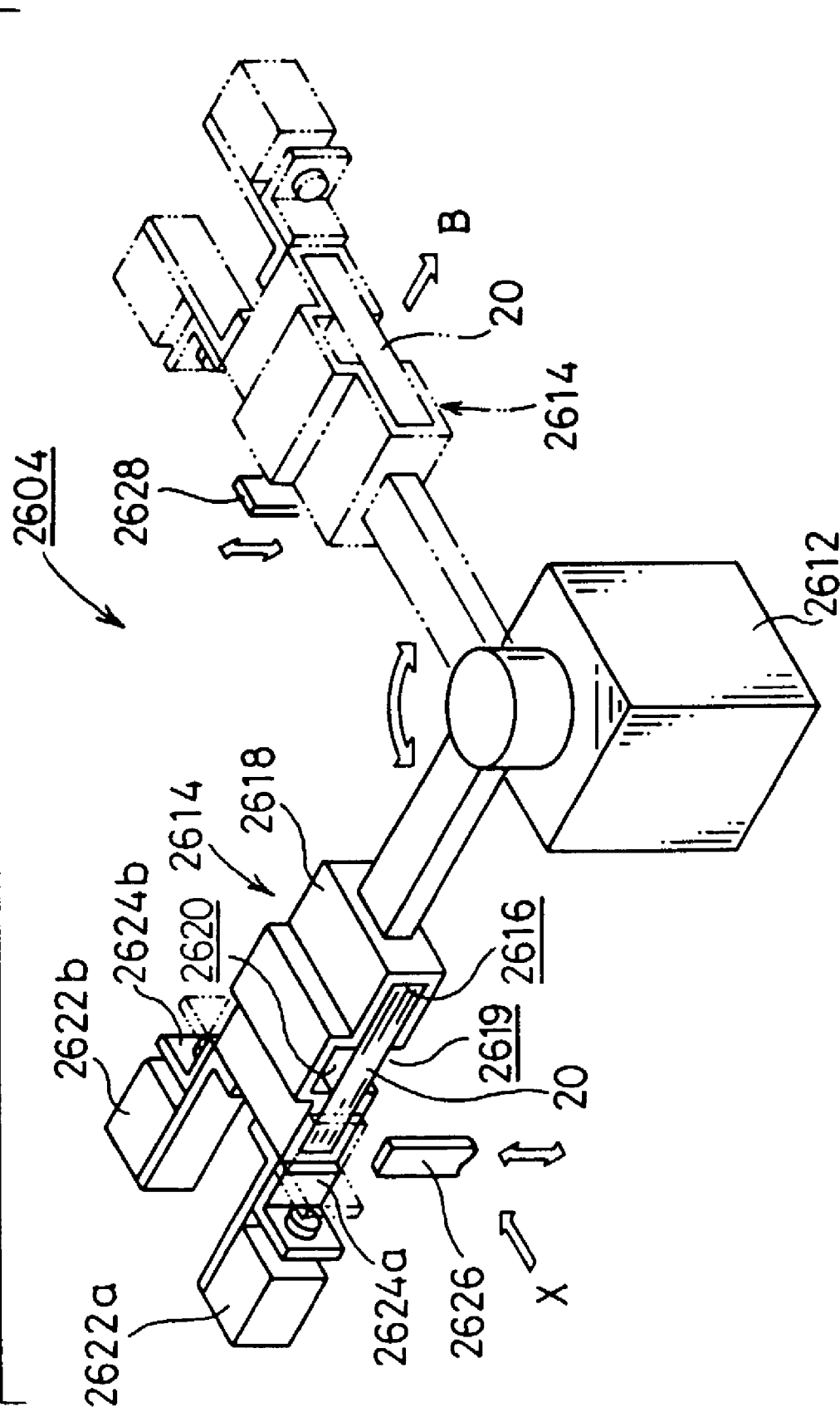
FIG. 101 is a perspective view of a unit feed direction converting mechanism.

As shown in FIG. 101, the unit feed direction converting mechanism 2604 has a unit gripping means 2614 reciprocally angularly movable through 90° in a horizontal plane by a motor 2612. The unit gripping means 2614 has a casing 2618 having an opening 2616 defined therein for accommodating 10 stacked instant photographic film units 20. The opening 2616 extends horizontally, and the casing 2618 also has a recess 2619 defined below and communicating with the opening 2616 and a clearance 2620 defined above and communicating with the opening 2616.

Cylinders 2622a, 2622b are fixed to the casing 2618 at the opposite ends of the opening 2616 respectively, and shutters 2624a, 2624b for preventing instant photographic film units 20 from being dislodged are fixed to the respective cylinders 2622a, 2622b. A pusher plate 2626 which is vertically movable and also movable back and forth in the direction indicated by the arrow X is disposed in a position where 10 stacked instant photographic film units 20 that are fed in the direction indicated by the arrow X are gripped by the unit gripping means 2614 (see the solid lines in FIG. 101). A remover plate 2628 which is vertically movable and also movable back and forth in the direction indicated by the arrow B is disposed in a position where the instant photographic film units 20 are delivered in the direction indicated by the arrow B (see the two-dot-and-dash lines in FIG. 101).

Operation of the manufacturing system 2600 thus constructed will be described below with respect to those aspects inherent in the second embodiment of the present invention.

In the second embodiment, the steps up to the cutting station 78 are successively performed to produce one instant photographic film unit 20 at time. After the instant photographic film unit 20 is printed by the ink jet printer 1836, it is sent to the unit reversing mechanism 2602.

In the unit reversing mechanism 2602, as shown in FIG. 100, a single instant photographic film unit 20 is delivered into the opening 2610 in the casing 2608 of the gripping means 2606 by the conveyor 1852. The turning means 1942 is actuated to turn the casing 2608 through 180° from the two-dot-and-dash-line position to the solid-line position. The single instant photographic film unit 20 in the casing 2608 is now reversed or turned upside down with the exposure surface 34 facing downwardly.

Then, the removing means 1944 is operated to push the single instant photographic film unit 20 out of the casing 2608 onto the conveyor 1852. Instant photographic film units 20 are delivered one at a time to the stacking station 80 where the stacking mechanism 1846 stacks 10 instant photographic film units 20. The stacked 10 instant photographic film units 20 are then delivered to the unit feed direction converting mechanism 2604.

In the unit feed direction converting mechanism 2604, as shown in FIG. 101, the pusher plate 2626 is moved in the direction indicated by the arrow X to bring the 10 instant photographic film units 20 into the opening 2616 in the casing 2618 of the unit gripping means 2614. Thereafter, the cylinders 2622a, 2622b are operated to move the shutters 2624a, 2624b to the respective positions to close the opposite ends of the opening 2616. Then, the motor 2612 is energized to turn the unit gripping means 2614 horizontally by 90° into a unit removing position indicated by the two-dot-and-dash-line position.

The cylinders 2622a, 2622b are operated to displace the shutters 2624a, 2624b away from the opening 2616. After the remover plate 2628 is lifted, it is moved in the direction indicated by the arrow B to remove the 10 instant photographic film units 20 from the opening 2616 in the direction indicated by the arrow B toward the unit loading mechanism 1922.

In the second embodiment, after each of successively produced instant photographic film units 20 is reversed or turned upside down such that the exposure surface 34 thereof faces downwardly, a certain number of, e.g., 10, instant photographic film units 20 are stacked and delivered to the unit loading mechanism 1922. Therefore, the process of manufacturing and packing instant photographic film units 20 can efficiently be performed.

Figure 102:
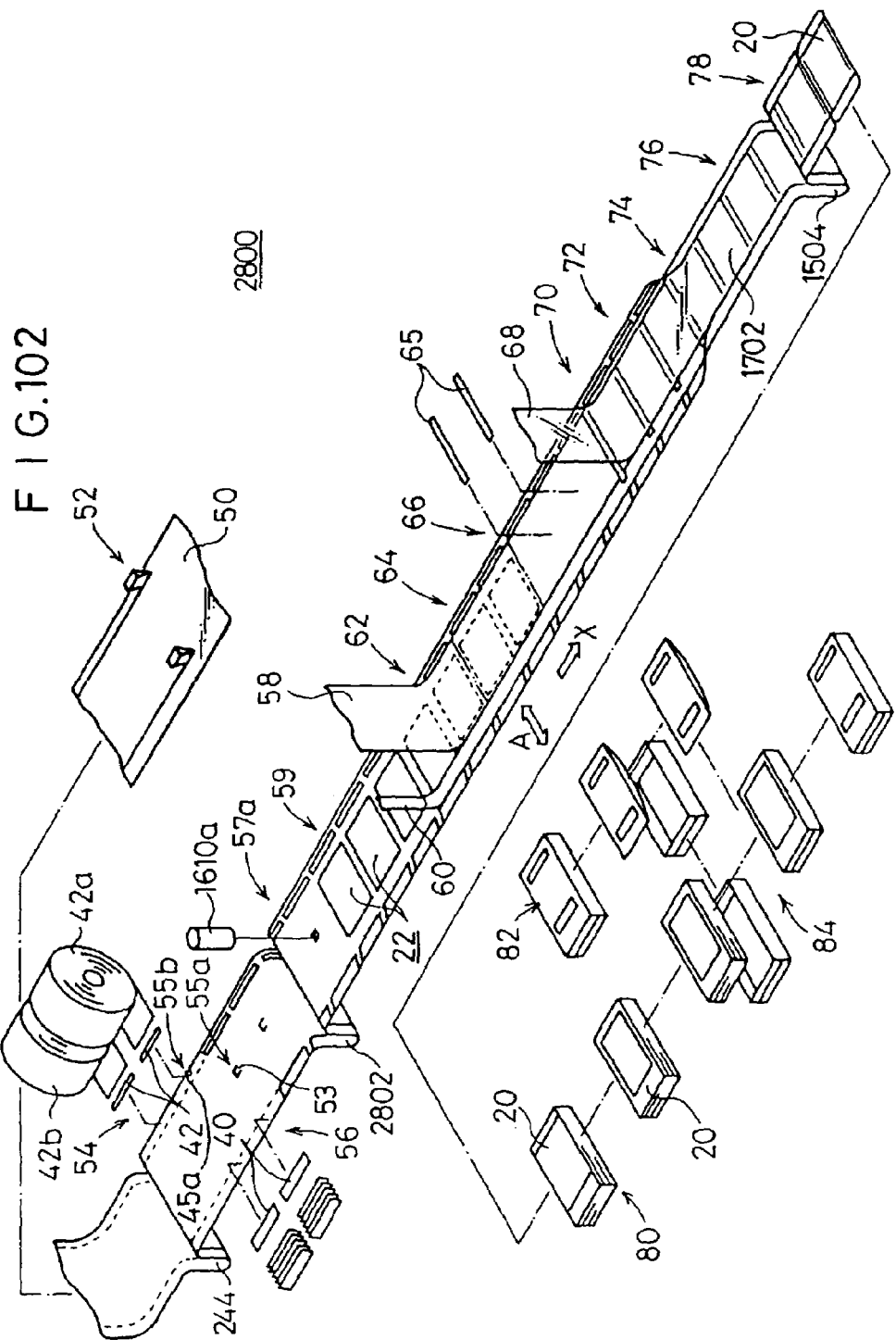
FIG. 102 is a schematic perspective view illustrative of a manufacturing method according to a third embodiment of the present invention.
Figure 103:
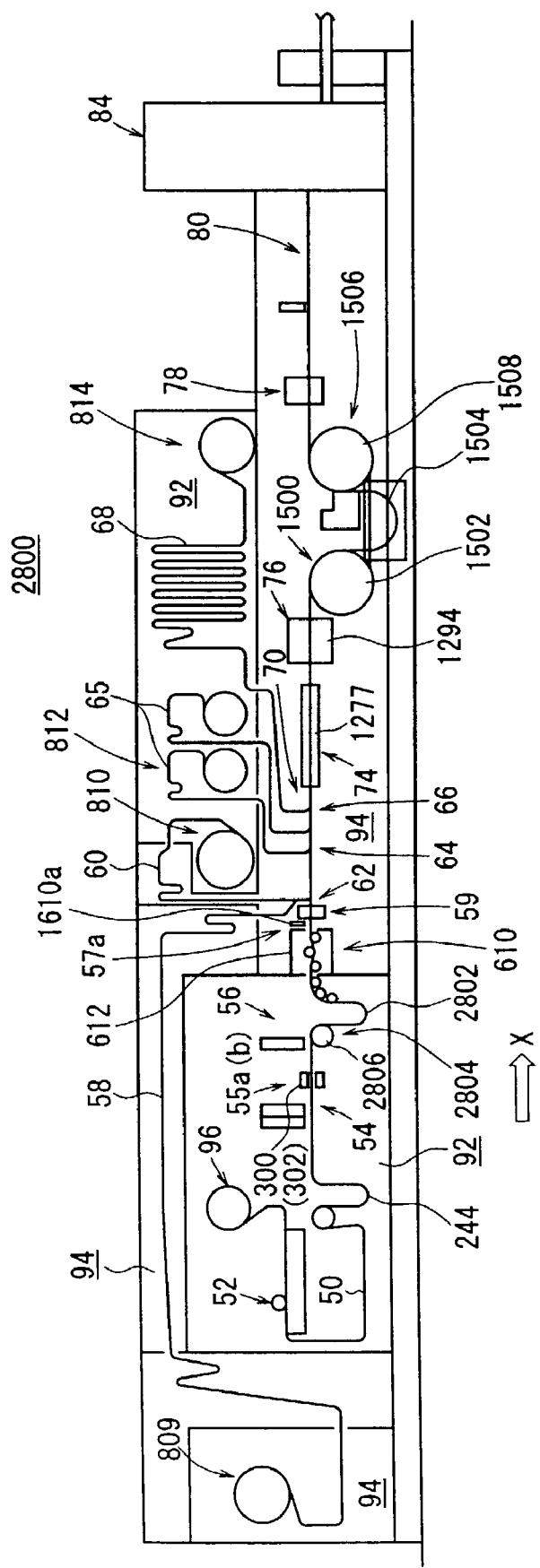
FIG. 103 is a schematic elevational view of a manufacturing system for carrying out the manufacturing method according to the third embodiment of the present invention.
Figure 104:
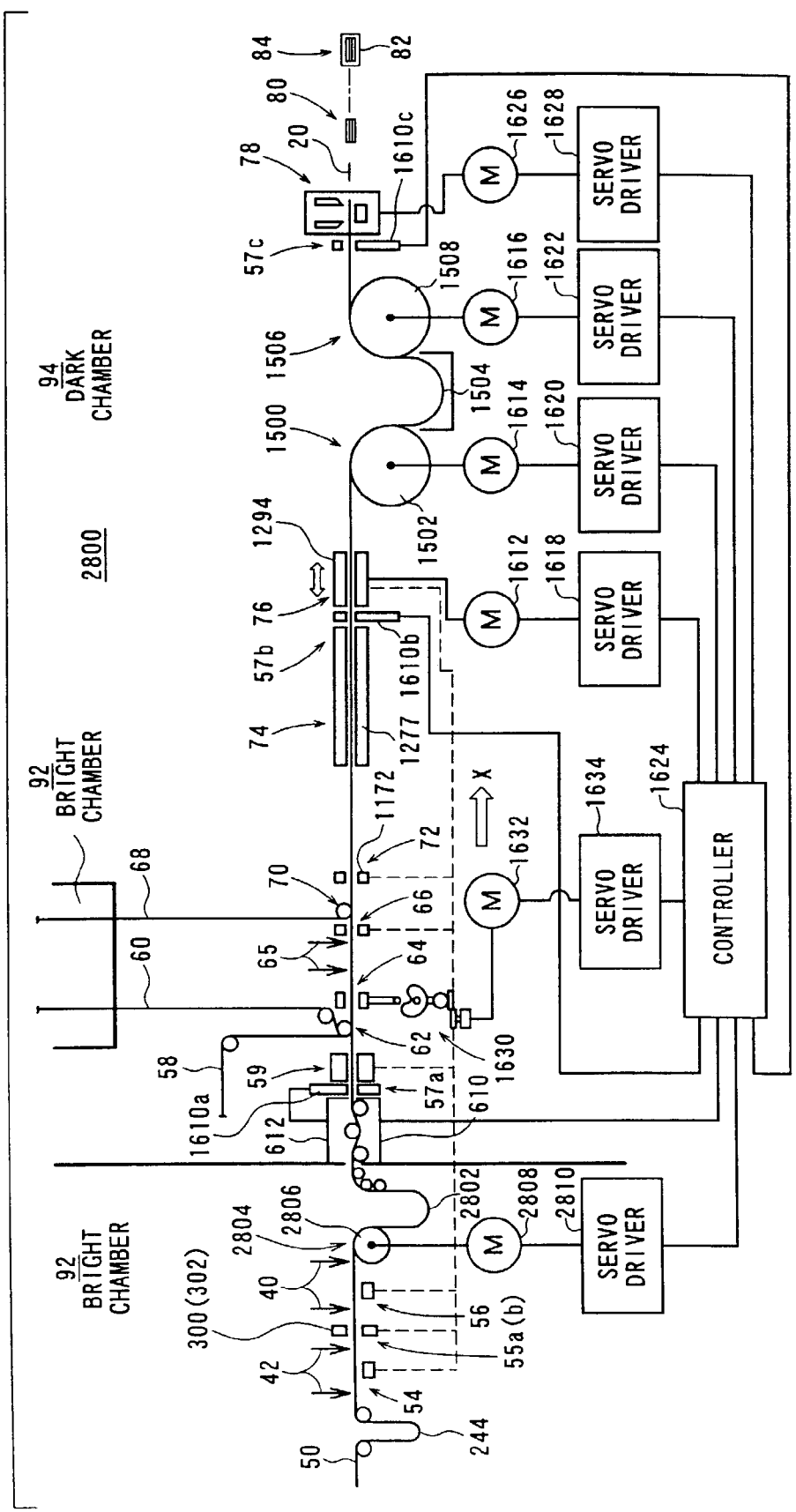
FIG. 104 is a schematic view, partly in block form, of the manufacturing system including a controller.

FIG. 102 schematically illustrates a manufacturing method according to a third embodiment of the present invention. FIGS. 103 and 104 show a manufacturing system (manufacturing apparatus) 2800 for carrying out the manufacturing method according to the third embodiment of the present invention. Those parts of the manufacturing system 2800 which are identical to those of the manufacturing system 90 according to the first embodiment are denoted by identical reference characters, and will not be described in detail below.

Successively downwardly of the fold forming station 52, there are disposed a trap attaching station 54 for attaching two traps 42 substantially simultaneously to one marginal edge of the first continuous web 50 when the first continuous web 50 is stopped, a mark forming station 55a for forming a substantially channel-shaped mark 53 on the first continuous web 50 in every other image frame 22, an air hole forming station 55b for forming a recess (deformed portion) in the first continuous web 50 which will become an air passage when an instant photographic film unit is spread, a pod attaching station 56 for attaching two developing liquid pods 40 simultaneously to the other marginal edge of the first continuous web 50 when the first continuous web 50 is stopped, a mark detecting station 57a for detecting the position of a mark 53, and a punching station 59 for forming two image frames 22 simultaneously on the first continuous web 50 when the first continuous web 50 is stopped.

A first free loop 244 for releasing the first continuous web 50 from the tension between the fold forming station 52 and the trap attaching station 54. A third free loop 2802 is formed between the pod attaching station 56 and the mark detecting station 57a. Upstream of the third free loop 2802, there is disposed a master drum 2806 of a feed means 2804 which is controlled to intermittently feed the first continuous web 50 over a certain number of pitches at a time from the first free loop 244 to the pod attaching station 56. The master drum 2806 is coupled to a servomotor 2808 which is controlled by the controller 1624 via a servo driver 2810 (see FIG. 104).

Figure 105:
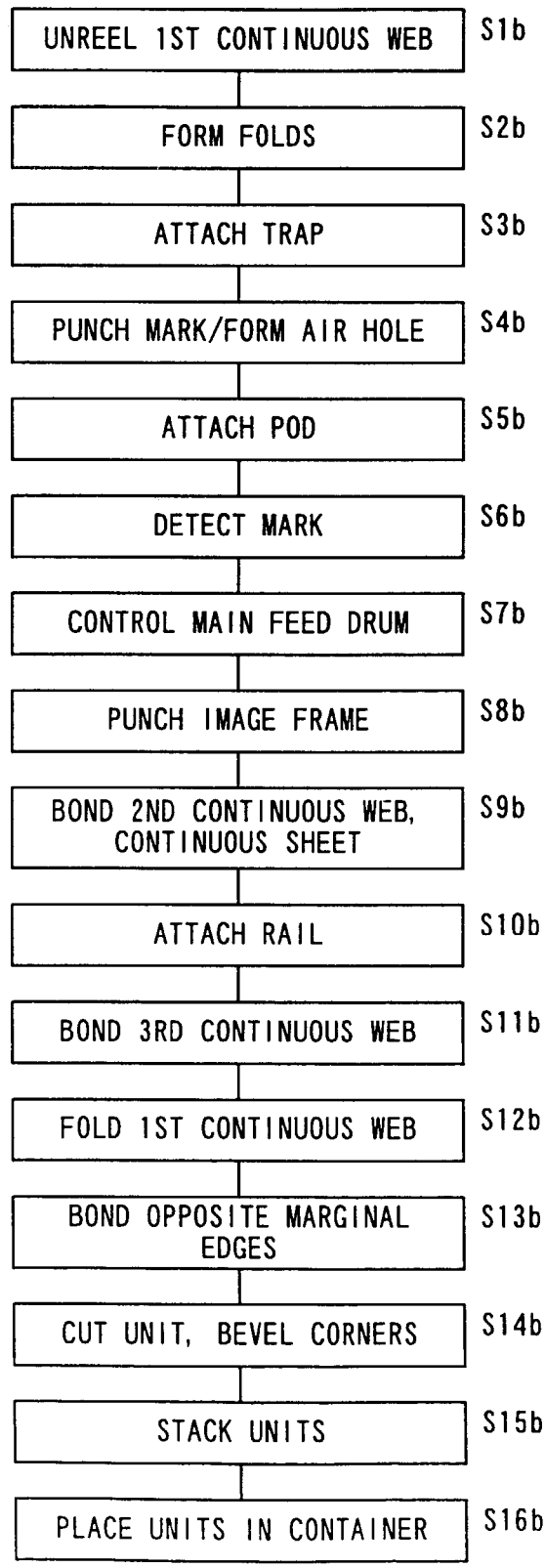
FIG. 105 is a flowchart of a processing sequence of the manufacturing method according to the third embodiment.
Figure 106:
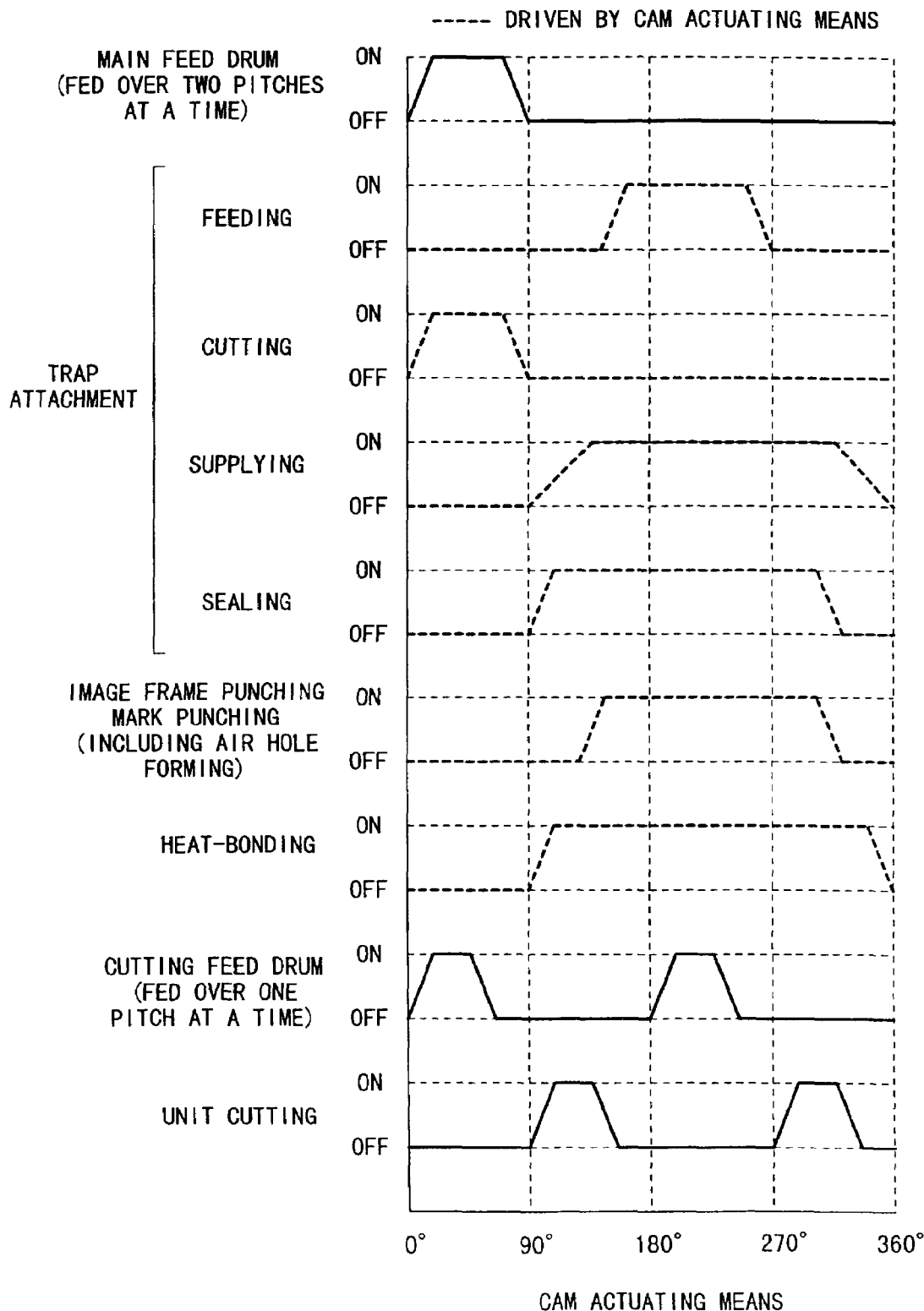
FIG. 106 is a timing chart of the manufacturing method according to the third embodiment.

Operation of the manufacturing system 2800 will be described below with reference to FIGS. 105 and 106.

As with the first embodiment, the manufacturing system 2800 is controlled for its operation by the controller 1624. The first continuous web 50 in a rolled form set in the mask sheet supply unit 96 is unreeled in step S1b shown in FIG. 105. In the fold forming station 52, folds 38a, 38b are formed in respective marginal edges of the first continuous web 50 while the first continuous web 50 is being continuously transported in step S2b. The first continuous web 50 is released from tension by the first free lop 244. The master drum 2806 is operated to feed the first continuous web 50 by two pitches at a time in the direction indicated by the arrow X.

Between the first free loop 244 and the third free loop 2802, the first continuous web 50 is intermittently fed a preset distance (two pitches) at a time successively through the trap attaching station 54, the mark forming station 55a, the air hole forming station 55b, and the pod attaching station 56. In the trap attaching station 54, as shown in FIG. 102, the trap webs 42a, 42b are unreeled and cut to respective two traps 42 of a predetermined length, which are then attached substantially simultaneously to one marginal edge of the first continuous web 50 at a given spaced interval when the first continuous web 50 is stopped in step S3b.

In the mark forming station 55a, the mark forming mechanism 300 forms a substantially channel-shaped mark 53 on the first continuous web 50 in every other image frame 22. In the air hole forming station 55b, the recess forming mechanism 302 forms a recess 45a centrally in trap attaching marginal edge of the first continuous web 50 in step S4b. In the pod attaching station 56, two developing liquid pods 40 are attached simultaneously to the other marginal edge of the first continuous web 50 at a spaced interval when the first continuous web 50 is stopped in step S5b. The traps 42 and the developing liquid pods 40 are sealed by a heat sealer (not shown) held against the lower surface of the first continuous web 50.

Downstream of the master drum 2806, the first continuous web 50 is intermittently fed two pitches at a time in the direction indicated by the arrow X by the main feed drum 1502. The first continuous web 50 is introduced from the bright chamber 92 into the dark chamber 94 via the light shielding mechanism 610.

The first continuous web 50 which is introduced from the light shielding box 612 of the light shielding mechanism 610 into the dark chamber 94 is fed to the mark detecting station 57a in which a mark 53 is detected by the CCD camera 1610a in step S6b. The position of the mark 53 is detected from image information of the mark 53 which is acquired by the CCD camera 1610a. The controller 1624 processes the detected position based on preset information, and controls the servo driver 1620 to energize the servomotor 1614 to adjust the pitch-fed length of the first continuous web 50 fed by the main feed drum 1502 in step S7b.

In the punching station 59, two image frames 22 are formed on the first continuous web 50 when the first continuous web 50 is stopped in step S8b. In the first joining station 62, the second continuous web 58 and the continuous sheet 60 are unreeled from the photosensitive sheet supply unit 809 and the undersheet supply unit 810, and bonded to the first continuous web 50. In the first heat-bonding station 64, the second continuous web 58 and the continuous sheet 60 are bonded to the first continuous web 50 across two successive image frames 22 in step S9b.

Two rails 65 are unreeled in the form of webs from the rail supply unit 812, and cut to a predetermined length. The cut rails 65 are thermally bonded to the second continuous web 58 and the continuous sheet 60 on opposite sides of each image frame 22 in the second heat-bonding station 66 in step S10b. The third continuous web 68 disposed as a roll in the cover sheet supply unit 814 is unreeled and joined to the second continuous web 58 in the second joining station 70, after which the second and third continuous webs 58, 68 are thermally bonded to each other with the rails 65 in the third heat-bonding station 72 in step S11b.

In the folding station 74, the opposite marginal edges of the first continuous web 50 are folded back inwardly along the folds 38a, 38b by the former 1277, wrapping the trap 42 and the developing liquid pod 40 in step S12b. In the fourth heat-bonding station 76, the opposite marginal edges of the first continuous web 50 are heat-bonded by the flap seal 1294 in step S13b.

The joined body 1702 which is composed of the first through third continuous webs 50, 58, 68 that are laminated and bonded together is transferred from the main feed drum 1502 via the second free loop 1504 to the cutting feed drum 1508, which intermittently feeds the joined body 1702 one pitch at a time in the direction indicated by the arrow X to the cutting station 78. In the cutting station 78, the joined body 1702 is cut off with the four corners beveled in step S14b, producing an instant photographic film unit 20 at a time. After a predetermined number of instant photographic film units 20 are stacked in the stacking station 80 in step S15b, they are reversed and delivered to the packing station 84 in which they are automatically stored in a film pack 82 in step S16b.

In the third embodiment, the mask sheet 24, the photosensitive sheet 30, and the cover sheet 36 are bonded as the first through third continuous webs 50, 58, 68 in a laminated state, and then cut off into instant photographic film units 20. As a consequence, the manufacturing system 2800 is simplified in structure and control, and the cost with which to manufacture instant photographic film units 20 is effectively reduced.

In the third embodiment, since the second and third free loops 1504, 2802, as at least one free loop, are disposed in a feed region where the first continuous web 50 needs to be positioned, the manufacturing system 2800 is capable of efficiently manufacturing high-quality instant photographic film units 20, and the process of manufacturing instant photographic film units 20 can be speeded up.

Specifically, of the first through third continuous webs 50, 58, 68, the second continuous web 58 which produces the photosensitive sheet 30 is liable to shrink due to changes in temperature and humidity in the heat bonding process. Therefore, after the second continuous web 58 is bonded to the first continuous web 50 in the first heat-bonding station 64 until the bonded assembly reaches the cutting station 78, the amount of shrinkage of the second continuous web 58 becomes relatively large. Therefore, the first continuous web 50 to which the second continuous web 58 is bonded is displaced in the direction indicated by the arrow X upon shrinkage of the second continuous web 58.

As shown in FIG. 3, various dimensions of the instant photographic film unit 20 are established based on the image frame 22, and various processes are performed in the manufacturing system 2800 with the image frame 22 used as a positioning reference. Therefore, if the first continuous web 50 is displaced in the direction in which it is fed upon shrinkage of the second continuous web 58, then the developing liquid pod 40, the trap 42, or the spacers 32 are positionally displaced with respect to the image frame 22, tending to make the produced instant photographic film unit 20 defective. Especially in the manufacturing system 2800, the distance over which the joined body is fed in the direction indicated by the arrow X is large, and errors accumulated in respective pitches are increased to cause the first continuous web 50 to be easily displaced positionally, and the second continuous web 58 shrinks greatly due to system shutdowns causing the first continuous web 50 to be easily displaced positionally.

In the third embodiment, the third free loop 2802 is formed in the feed region where the first continuous web 50 needs to be positioned. Upstream of the third free loop 2802, while the first continuous web 50 is being intermittently fed under constant tension at certain pitches at a time by the master drum 2806, traps 42 are bonded to the first continuous web 50, marks 53 are formed in the first continuous web 50, and developing liquid pods 40 are bonded to the first continuous web 50.

Downstream of the third free loop 2802, the position of a mark 53 formed in the first continuous web 50 in the mark detecting station 57 is detected, and the main feed drum 1502 is controlled based on the detected position to control the pitch at which the first continuous web 50 is fed in the unit of 10 μm, for example. Thus, it is possible to apply a trap, a developing liquid pod 40, and rail 65 to an image frame 22 reliably at desired dimensional accuracy, allowing high-quality instant photographic film units 20 to be manufactured efficiently.

Since the distance over which the joined body is fed from the punching station 59 to the fourth heat-bonding station 76 is relatively long, an accurate heat-bonding process can be performed on the image frame 22 when the flap seal 1294 is moved in each intermittent interval in the direction in which the joined body is fed. Dependent on the shrinkage of the second continuous web 58, the temporarily bonding mechanism 1040 and the finally bonding mechanism 1120 are positionally adjusted in the direction opposite to the direction indicated by the arrow X, allowing the processes to be accurately performed in the respective first through third heat-bonding stations 64, 66, 72.

In the third embodiment, the mask sheet 24, the photosensitive sheet 30, and the cover sheet 36 are bonded as the first through third continuous webs 50, 58, 68 in a laminated state, and then cut off into instant photographic film units 20. Thus, any complex and expensive control device is not required for positioning and bonding sheets, e.g., the photosensitive sheet 30 and the cover sheet 36, which have been cut off in the process on a continuous web, e.g., the first continuous web 50. Accordingly, the manufacturing system 2800 is simplified in structure, and the cost with which to manufacture instant photographic film units 20 is effectively reduced, compared with the conventional system.

In the third embodiment, since the time interval required for the heat-bonding processes in the first through third heat-bonding stations 64, 66, 72 is relatively long, the heat-bonding processes are efficiently performed by feeding the assembly a plurality pitches, e.g., two pitches, at a time, and the cutting process can successively be performed by feeding the assembly one pitch at a time. As a result, the entire process of manufacturing instant photographic film units 20 can effectively be speeded up.

In the third embodiment, in the cutting station 78, the four corners 48 of an instant photographic film unit 20 are beveled when the instant photographic film unit 20 is cut off. Therefore, when successively produced instant photographic film units 20 are stacked in the stacking station 20 or when each instant photographic film unit 20 is fed, the instant photographic film units 20 prevented from a stacking error or a feeding error which would otherwise occur when caught by the corners.

In the third embodiment, the first continuous web 50, the continuous sheet 60, and the third continuous web 68 that provide the mask sheet 24, the undersheet 44, and the cover sheet 36, which are light unshielded members, are disposed as rolls in the bright chamber 92. The light unshielded members can be handled more easily and efficiently than would be if they were placed in the dark chamber 94, so that the entire process of manufacturing instant photographic film units 20 can be carried out efficiently and quickly.

In the third embodiment, the master drum 2806 is used to feed the first continuous web 50 a certain interval at a time from the first free loop 244 to the pod attaching station 56. However, the master drum 2806 may be replaced with a feed means comprising a gripper and a fixing clamp. The gripper is capable of gripping a marginal side of the first continuous web 50 and deliver the first continuous web 50 at a certain number of pitches at a time in the direction indicated by the arrow X, and the fixing clamp is capable of fixing the first continuous web 50 immovably while the gripper is being retracted. Using the gripper and the fixing clamp, the space taken up by the feed means is smaller than the space taken up by the master drum 2086.

Figure 107:
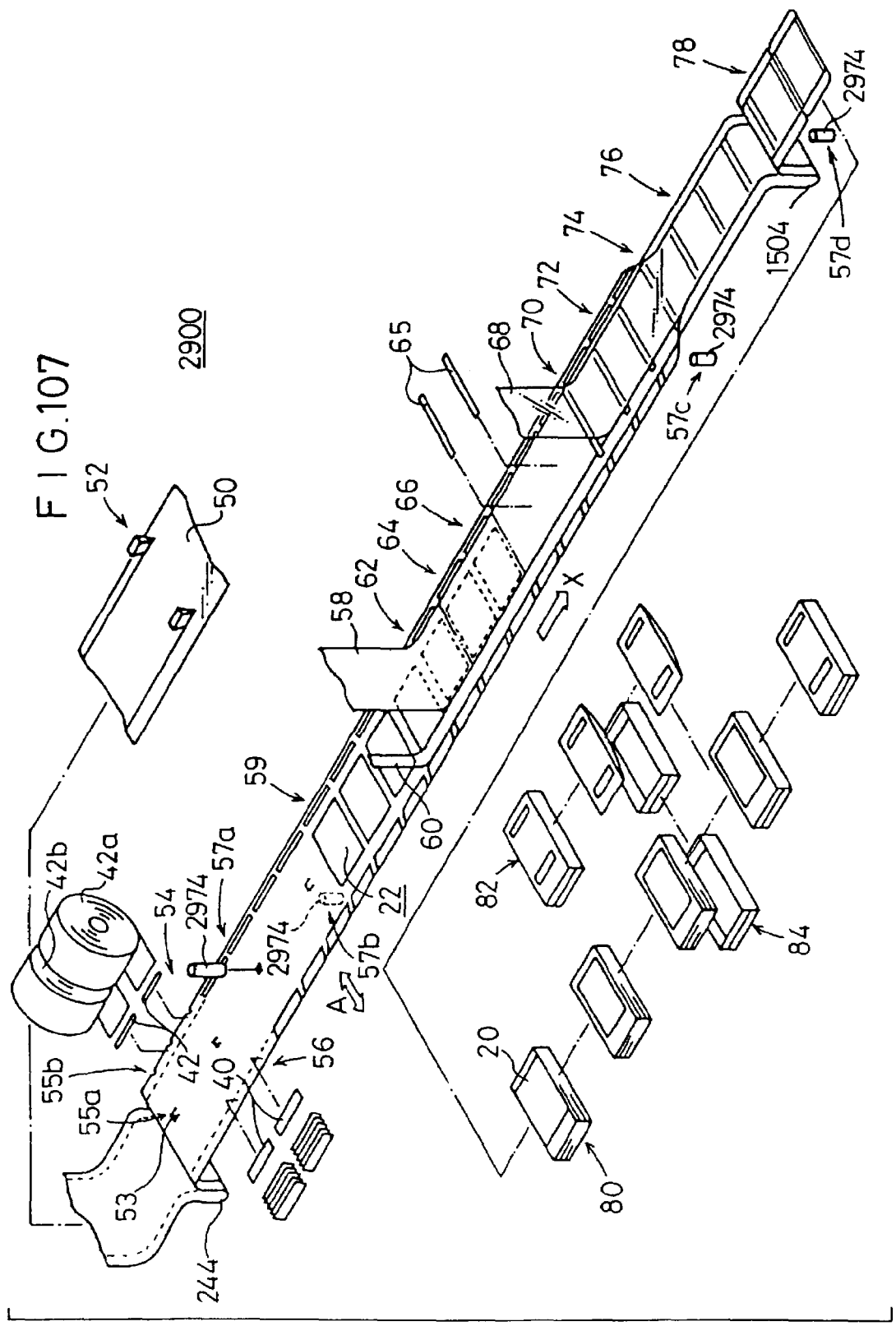
FIG. 107 is a schematic perspective view illustrative of a manufacturing method according to a fourth embodiment of the present invention.
Figure 108:
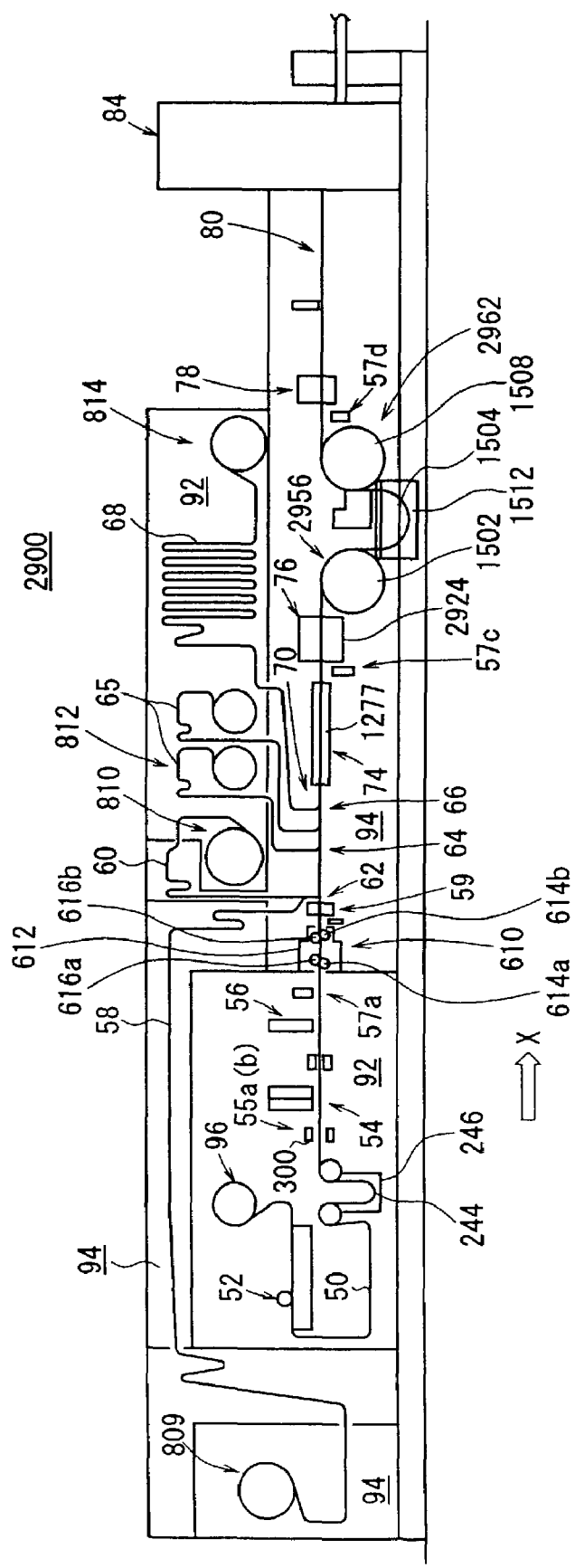
FIG. 108 is a schematic elevational view of a manufacturing system for carrying out the manufacturing method according to the fourth embodiment of the present invention.
Figure 109:
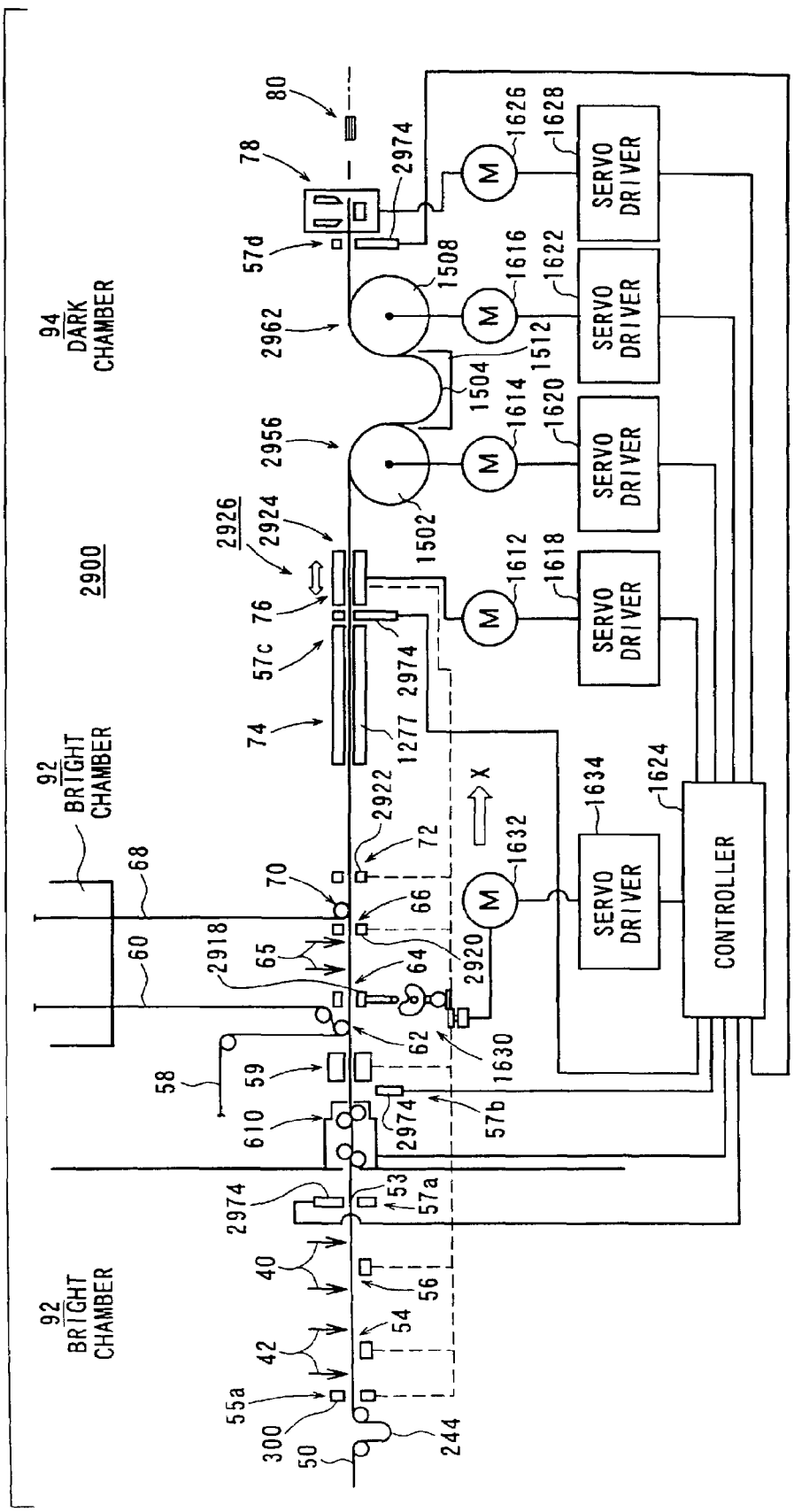
FIG. 109 is a schematic view, partly in block form, of the manufacturing system including a controller.

FIG. 107 schematically illustrates a manufacturing method according to a fourth embodiment of the present invention. FIGS. 108 and 109 show a manufacturing system (manufacturing apparatus) 2900 for carrying out the manufacturing method according to the fourth embodiment of the present invention. Those parts of the manufacturing system 2900 which are identical to those of the manufacturing system 90 according to the first embodiment are denoted by identical reference characters, and will not be described in detail below.

As shown in FIGS. 108 and 109, the folding station 74 has a former 1277 for folding back the opposite marginal edges of the first continuous web 50 inwardly. Two sets of heat-bonding units 2918, 2920, 2922 are disposed respectively in the first through third heat-bonding stations 64, 66, 72, the heat-bonding units 2918, 2920, 2922 being positionally adjustable in the direction in which the assembly is fed. In the fourth heat-bonding station 76, there is disposed a flap seal 2924 that is movable in the direction in which the assembly is fed. The flap seal 2924 and the heat-bonding units 2918, 2920, 2922 jointly make up a bonding mechanism 2926.

Figure 110:
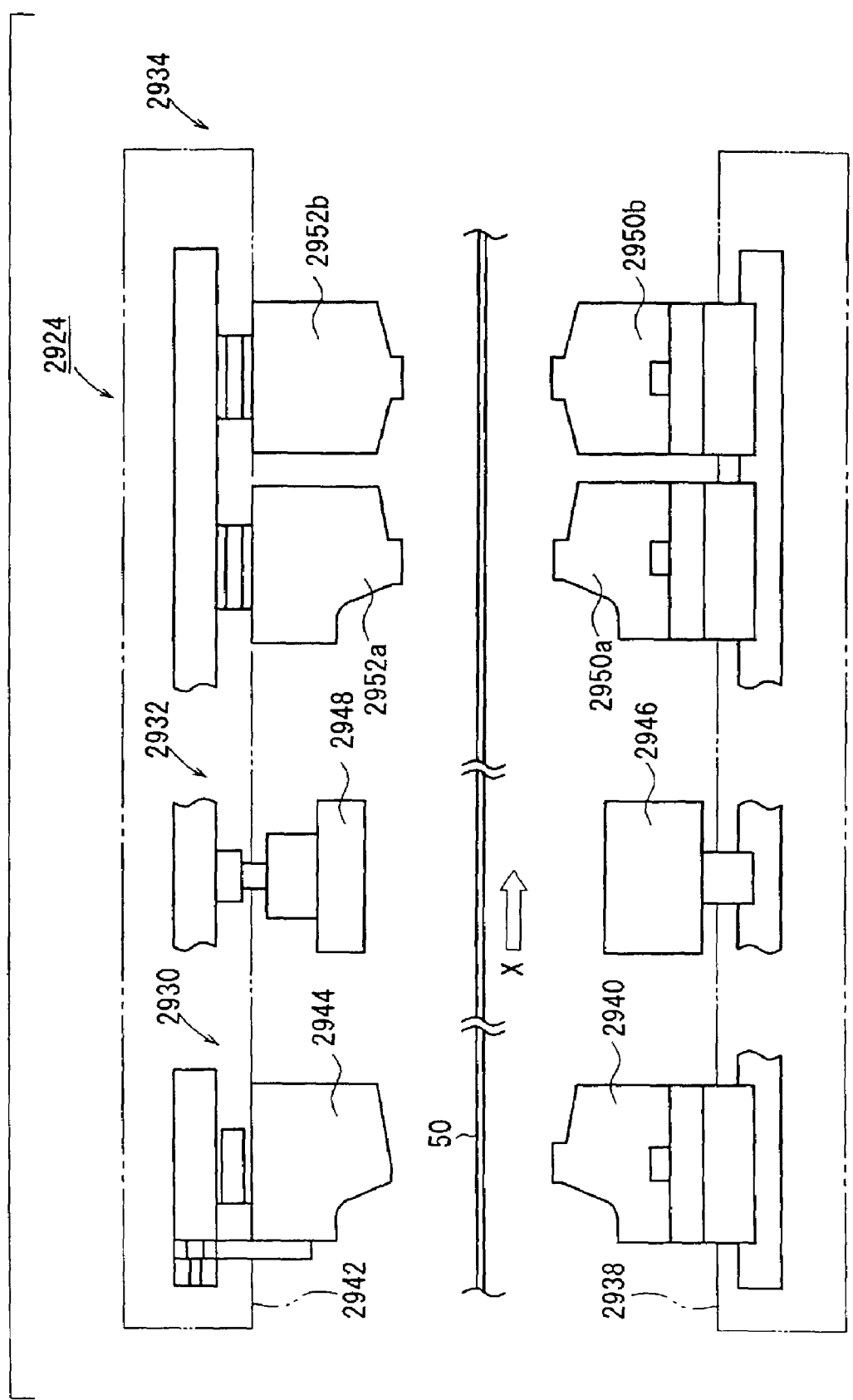
FIG. 110 is a view of a flap seal of the manufacturing system.

As shown in FIG. 110, the flap seal 2924 comprises a temporarily flap bonding means 2930 for temporarily bonding flaps that are folded marginal edges of the first continuous web 50, a finally flap bonding means 2932 for finally bonding the flaps, and a flap re-bonding means 2934 for re-bonding the edge of the flap near the trap 42. The temporarily flap bonding means 2930, the finally flap bonding means 2932, and the flap re-bonding means 2934 are successively arranged in the direction in which the assembly is fed, i.e., the direction indicated by the arrow X. The temporarily flap bonding means 2930 has a first presser block 2940 vertically movably supported on a lower frame 2938 and a second presser block 2944 vertically movably supported on an upper frame 2942. The first and second presser blocks 2940, 2944 have distal ends whose shape corresponds to the rails 65.

The finally flap bonding means 2932 has a third presser block 2946 vertically movably supported on the lower frame 2938 and a fourth presser block 2948 vertically movably supported on the upper frame 2942. The third presser block 2946 has a silicone rubber layer disposed in a range wider than the width of the first continuous web 50 whose opposite marginal edges are folded back, and the fourth presser block 2948 has a shape for sealing the flaps of two instant photographic film units 20.

The flap re-bonding means 2934 comprises fifth presser blocks 2950a, 2950b vertically movably supported on the lower frame 2938 and sixth presser blocks 2952a, 2952b vertically movably supported on the upper frame 2942. The fifth presser blocks 2950a, 2950b are disposed at the flap near the trap 42 in a manner to correspond to the rails 65. The lower frame 2938 and the upper frame 2942 are movable together back and forth in the direction indicated by the arrow X.

As shown in FIGS. 108 and 109, a main feed mechanism 2956 is disposed downstream of the flap seal 2924 for intermittently feeding the assembly by two pitches at a time from the mark forming station 55a to the fourth heat-bonding station 76. The main feed mechanism 2956 has a main freed drum 1502 which is controlled to vary the interval of feed pitches depending on the position of a mark 53 that is detected in the mark detecting station 57a.

A cutting feed mechanism 2962 has a cutting feed drum 1508 disposed downstream of the main feed drum 1502 with the second free loop 1504 interposed therebetween. The cutting feed drum 1508 is controlled to intermittently feed the assembly one pitch at a time through the cutting station 78. The first and second free loops 244, 1504 are produced in the first and second suction boxes 246, 1512 (see FIG. 108).

As shown in FIG. 109, the edge detecting station 57b and the frame detecting stations 57c, 57d for detecting an image frame 22 are disposed respectively immediately downstream of the light shielding mechanism 610, immediately upstream of the fourth heat-bonding station 76, and immediately upstream of the cutting station 78.

Figure 111:
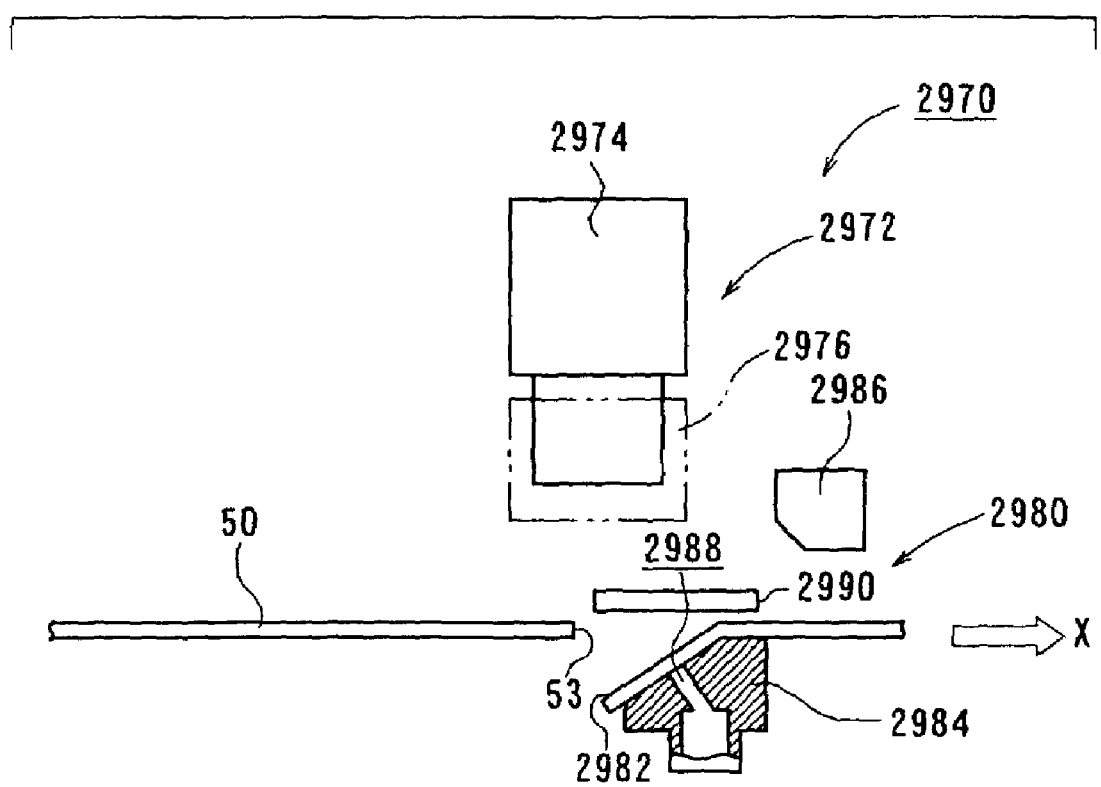
FIG. 111 is a side elevational view of a displacement detecting means of the manufacturing system.
Figure 112:
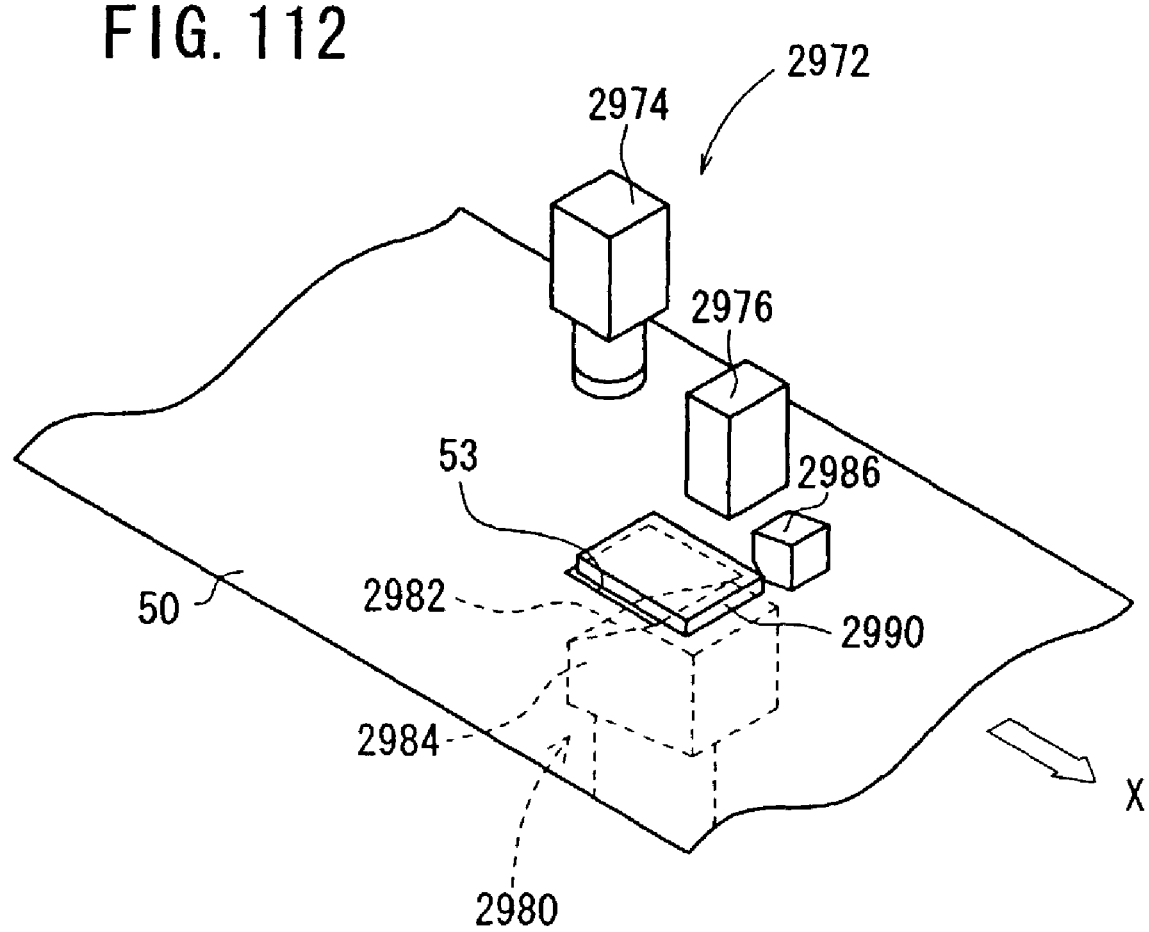
FIG. 112 is a perspective view of the displacement detecting means.

In the mark detecting station 57a, as shown in FIGS. 111 and 112, there is disposed a deviation detecting means 2972 of a positioning control mechanism 2970. The detecting means 2972 comprises a CCD camera 2974 for imaging a mark 53 on the first continuous web 50 from above, and an illuminating unit 2976 for illuminating the mark 53. The CCD camera 2974 is capable of detecting a wavelength of at least 800 nm, for example, to which the second continuous web 58 that forms the photosensitive sheet 30 is not sensitive, and the illuminating unit 2976 comprises an LED for emitting an infrared radiation having a wavelength of at least 800 nm, for example, to which the second continuous web 58 is not sensitive.

In the mark detecting station 57a, there is also disposed a mark holding means 2980 for holding a mark 53 on the first continuous web 50. The mark holding means 2980 comprises an attracting base 2984 for attracting a tongue 2982 cut out of the mark 53, and an air applying means 2986 for forcing the tongue 2982 toward the attracting base 2984 under an air pressure. The attracting base 2984 has an attracting surface inclined downwardly from the horizontal plane, and an attracting hole 2988 defined therein and communicating with a vacuum source (not shown). The mark detecting station 57a has a reference member 2990, and the deviation detecting means 2972 detects a deviation of the mark 53 by measuring a distance between the reference member 2990 and the mark 53.

Figure 113:
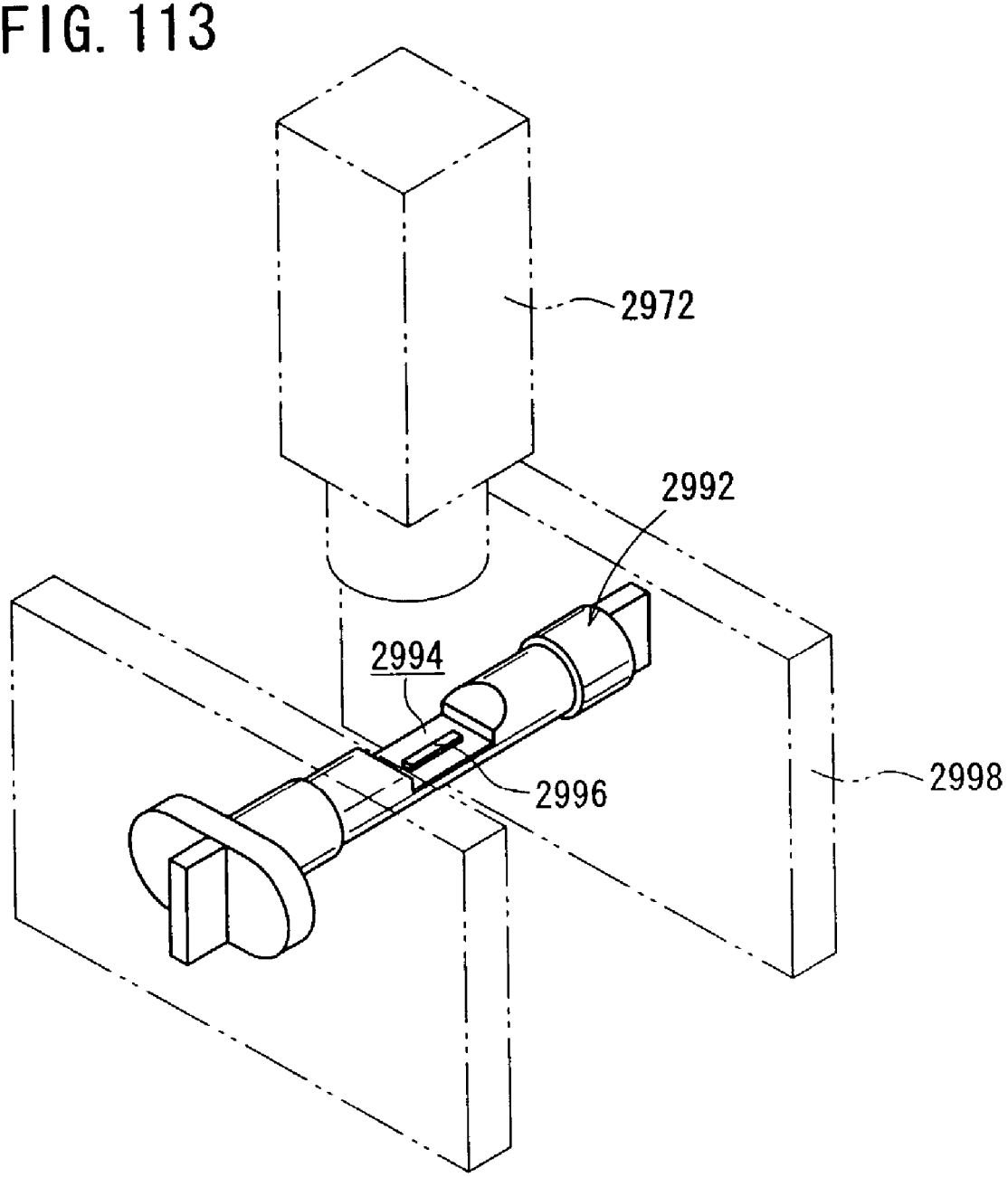
FIG. 113 is a perspective view of a target jig for adjusting a CCD camera of the displacement detecting means.

As shown in FIG. 113, a target jig 2992 is disposed in an exposure position of the CCD camera 2974 for establishing an imaging condition at the time the CCD camera 2974 is replaced or installed or removed. The target jig 2992 is substantially in the form of a rod and has a recess 2994 defined in a substantially intermediate portion thereof, with a reference protrusion 2996 disposed on and projecting upwardly from the bottom of the recess 2994. The reference protrusion 2996 has an upper surface lying at the same height as the first continuous web 50 as it passes over the reference protrusion 2996. The target jig 2992 is inserted in and held by a fixed base 2998. If the CCD camera 2974 is positioned below the first continuous web 50, then the target jig 2992 is turned upside down, i.e., inserted in and held by the fixed base 2998 such that the reference protrusion 2996 projects downwardly.

The edge detecting station 57b and the frame detecting stations 57c, 57d are identical in structure to the mark detecting station 57a. Those parts of the edge detecting station 57b and the frame detecting stations 57c, 57d which are identical to those of the mark detecting station 57a are denoted by identical reference characters, and will not be described in detail below. The edge detecting station 57b detects an edge of the first continuous web 50 in the direction indicated by the arrow A (see FIG. 107) which is perpendicular to the direction in which the first continuous web 50 is fed.

Figure 114:
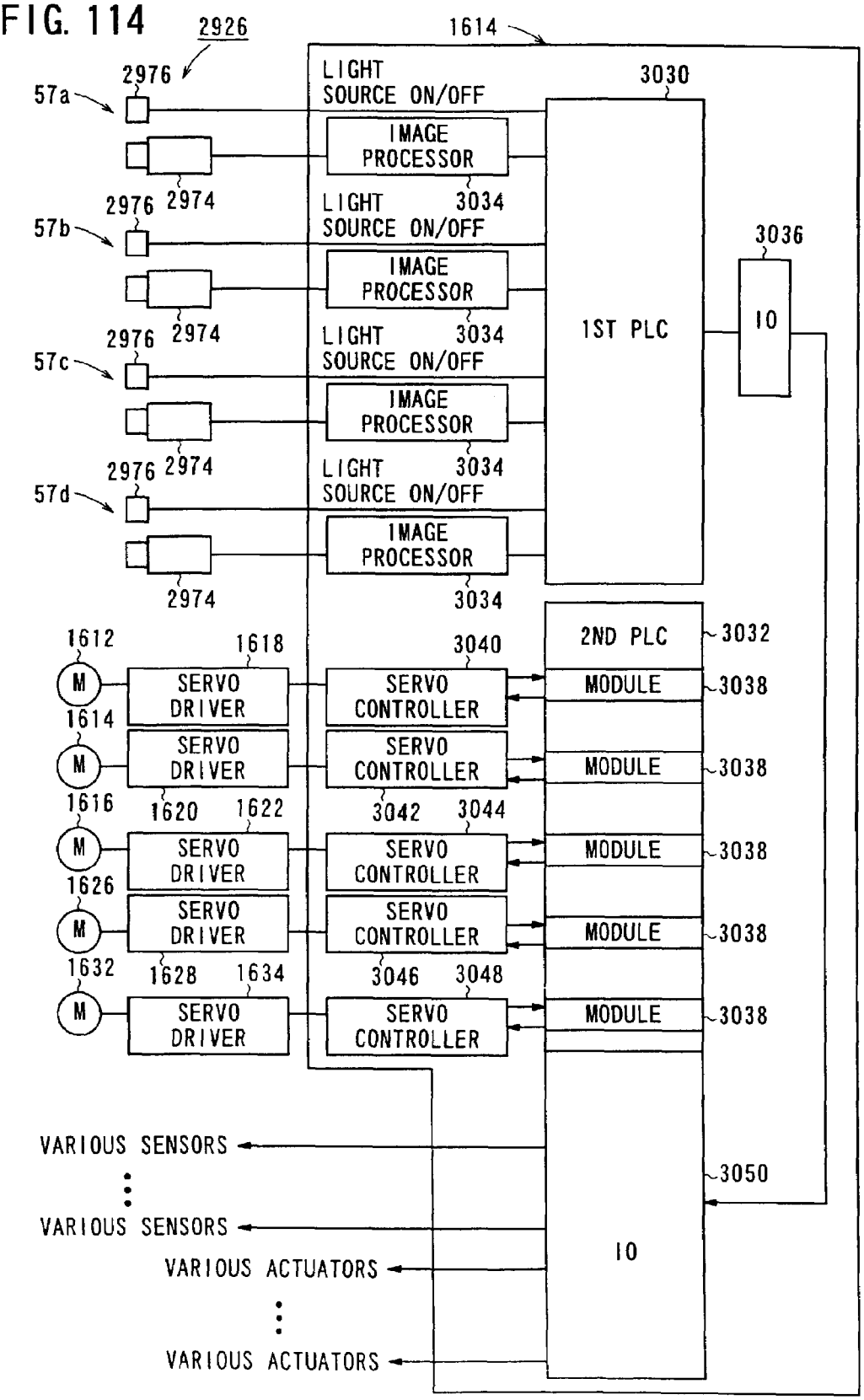
FIG. 114 is a block diagram of the controller of the manufacturing system.

As shown in FIG. 114, the controller 1624 has a first programmable logic controller (PLC) 3030 for controlling image processors and a second programmable logic controller 3032 for main control. The first programmable logic controller 3030 functions as an illuminating controller for controlling, i.e., turning on and off, the illuminating units 2796 in the edge detecting station 57b and the frame detecting stations 57c, 57d. To the first programmable logic controller 3030, there are connected image processors 3034 which are supplied with image information from the CCD cameras 2974. Decision results and numerical data are supplied from the first programmable logic controller 3030 to the second programmable logic controller 3032 via a remote I/O unit 3036.

The second programmable logic controller 3032 has position control modules 3038 for the respective servomotors 1612, 1614, 1616, 1626, 1632. To the position control modules 3038, there are connected a servo controller (flap seal position correcting means) 3040 for controlling the servomotor 1612 via the servo driver 1618, a servo controller (feed distance correcting means) 3042 for controlling the servomotor 1614 via the servo driver 1620, a servo controller (cut region correcting means) 3044 for controlling the servomotor 1616 via the servo driver 1622, a servo controller 3046 for controlling the servomotor 1626 via the servo driver 1628, and a servo controller 3048 for controlling the servomotor 1632 via the servo driver 1634. To the second programmable logic controller 3032, there are connected various sensors and actuators via an I/O unit 3050.

Operation of the manufacturing system 2900 in connection with the manufacturing method according to the fourth embodiment of the present invention will be described below with reference to FIGS. 115 and 116.

Of the first through third continuous webs 50, 58, 68, the second continuous web 58 which produces the photosensitive sheet 30 is liable to shrink due to changes in temperature and humidity in the heat bonding process. Therefore, after the second continuous web 58 is bonded to the first continuous web 50 in the first heat-bonding station 64 until the bonded assembly reaches the cutting station 78, the amount of shrinkage of the second continuous web 58 becomes relatively large. Therefore, the first continuous web 50 to which the second continuous web 58 is bonded is displaced in the direction indicated by the arrow X upon shrinkage of the second continuous web 58.

As shown in FIG. 3, various dimensions of the instant photographic film unit 20 are established based on the image frame 22, and various processes are performed in the manufacturing system 2900 with the image frame 22 used as a positioning reference. Therefore, if the first continuous web 50 is displaced in the direction in which it is fed upon shrinkage of the second continuous web 58, then the developing liquid pod 40, the trap 42, or the spacers 32 are positionally displaced with respect to the image frame 22, tending to make the produced instant photographic film unit 20 defective. Especially in the manufacturing system 2900, the distance over which the joined body is fed in the direction indicated by the arrow X is large, and errors accumulated in respective pitches are increased to cause the first continuous web 50 to be easily displaced positionally, and the second continuous web 58 shrinks greatly due to system shutdowns causing the first continuous web 50 to be easily displaced positionally.

In the fourth embodiment, the mark detecting station 57a detects the position of a mark 53 formed on the first continuous web 50, and the main feed drum 1502 is controlled based on the detected position of the mark 53. The frame detecting stations 57c, 57d detect the position of an image frame 22, and the flap seal 2924 and the cutting feed drum 1508 are controlled based on the detected position of the image frame 22. Operation of the manufacturing system 2900 will be described below primarily with respect to the above control of the main feed drum 1502, the flap seal 2924, and the cutting feed drum 1508.

The manufacturing system 2900 is controlled for its operation by the controller 1624. The first continuous web 50 in a rolled form set in the mask sheet supply unit 96 is unreeled in step S1c shown in FIG. 115. In the fold forming station 52, folds 38a, 38b are formed in respective marginal edges of the first continuous web 50 while the first continuous web 50 is being continuously transported in step S2c. The first continuous web 50 is released from tension by the first free lop 244. The main feed drum 1502 is operated to feed the first continuous web 50 by two pitches at a time in the direction indicated by the arrow X.

The first continuous web 50 is intermittently fed a preset distance (two pitches) at a time successively through the mark forming station 55a, the air hole forming station 55b, the trap attaching station 54, and the pod attaching station 56. In the mark forming station 55a, the mark forming mechanism 300 forms a mark 53 on the first continuous web 50 in every other image frame 22. In the air hole forming station 55b, a press (not shown) forms a recess centrally in trap attaching marginal edge of the first continuous web 50 in step S3c.

In the trap attaching station 54, as shown in FIG. 107, the trap webs 42a, 42b are unreeled and cut to respective two traps 42 of a predetermined length, which are then attached substantially simultaneously to one marginal edge of the first continuous web 50 at a given spaced interval when the first continuous web 50 is stopped in step S4c. In the pod attaching station 56, two developing liquid pods 40 are attached simultaneously to the other marginal edge of the first continuous web 50 at a spaced interval when the first continuous web 50 is stopped in step S5c.

The first continuous web 50 is fed to the mark detecting station 57a. As shown in FIGS. 111 and 112, the deviation detecting means 2972 of the positioning control mechanism 2970 detects a mark 53 on the first continuous web 50 in step S6c. In the mark detecting station 57a, the tongue 2982 is attracted to and held on the attracting surface of the attracting base 2984 under a vacuum developed by the attracting base 2984 of the mark holding means 2980, and the air applying means 1986 applies an air flow to the tongue 2982. The CCD camera 2974 of the deviation detecting means 2972 images the mark 53 and the reference member 2990, and sends image information of the mark 53 to the image processor 3034.

As shown in FIG. 114, when the first programmable logic controller 3030 is supplied with the image information from the image processor 3034, the first programmable logic controller 3030 processes the detected position of the mark 53 based on preset information, and supplies numerical data to the second programmable logic controller 3032. The second programmable logic controller 3032 enables the servo controller 3042 to control the servomotor 1614 via the servo driver 1620 for thereby adjusting the pitch-fed length of the first continuous web 50 fed by the main feed drum 1502 in step S7c.

A process of controlling the main feed drum 1502 will be described in detail below with reference to FIGS. 116 and 117.

The main feed drum 1502 is controlled based on the data of an average of 50 pitches in the past in every 64 pitches. Specifically, the main feed drum 1502 is controlled by excluding the data of first 14 pitches, reading the data of following 50 pitches, and calculating an average of the read data. It is possible to neglect short-period variations and random variations by calculating an average over a long span of 50 pitches in every 64 pitches.

After 14 pitches have elapsed from the previous control cycle in step S21c (YES), the positional data of a mark 53 is entered in step S22c. The positional data of each mark 53 is compared with preset reference positional data, and their difference is calculated in step S23c. If a deviation of the mark 53 is accumulated 50 times (m times) in step S24c (YES), then control goes to step S25c in which an average of the deviations is calculated.

Figure 117:
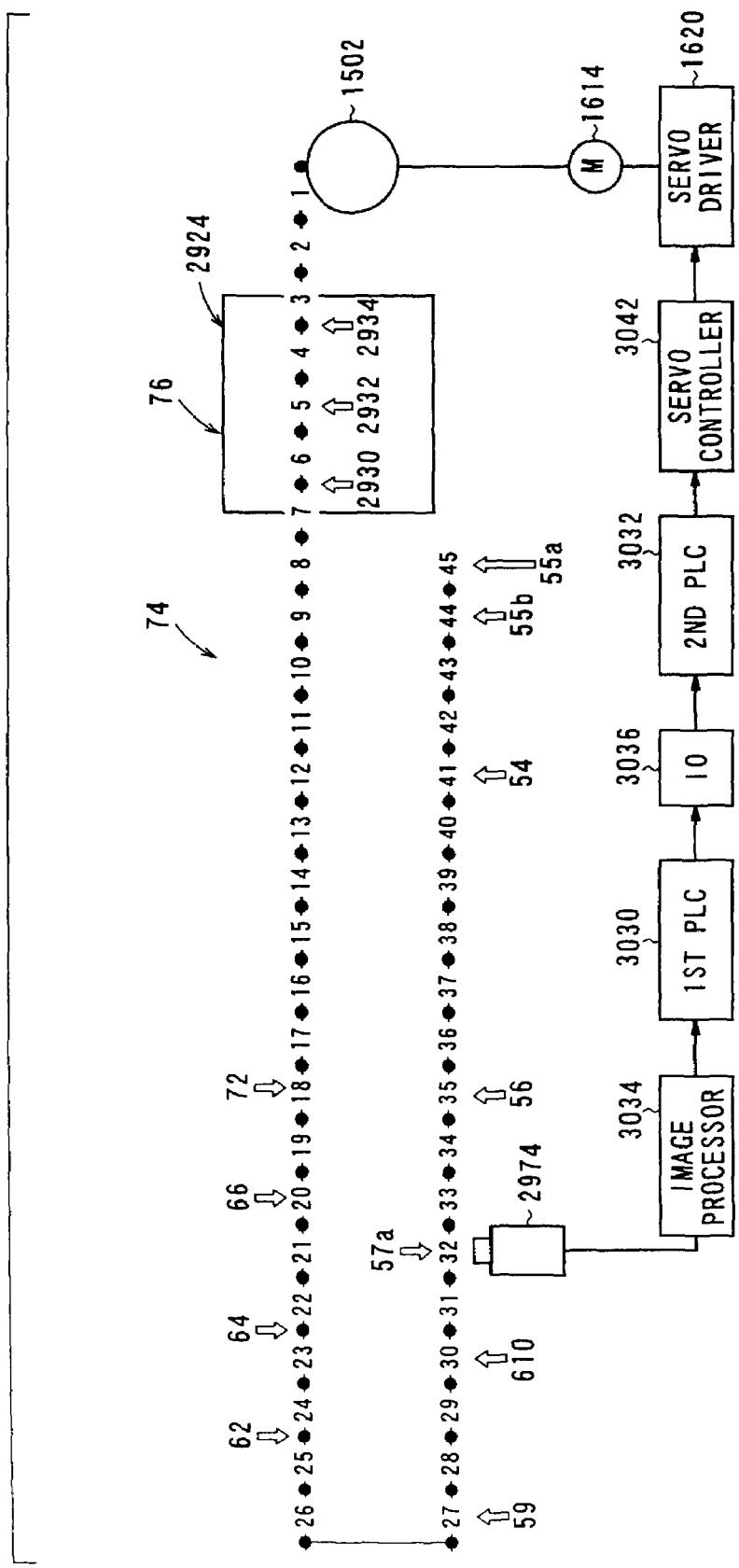
FIG. 117 is a diagram showing how the main feed drum is controlled.

As shown in FIG. 117, the mark forming station 55a and the mark detecting station 57a are spaced apart from each other by 13 (n) pitches. The average calculated in step S25c represents a deviation that is 13 times the distance of one intermittent feed cycle. Control then goes to step S26c in which the average is divided by 13 to calculate a deviation in one intermittent feed cycle of the main feed drum 1502.

If the calculated deviation is equal to or greater than a preset minimum control quantity in step S27c (YES), then control goes to step S28c which determines whether or not the calculated deviation is equal to or greater than a preset maximum control quantity. If the deviation is equal to or greater than a preset maximum control quantity in step S28c (YES), then control goes to step S29c in which the deviation is set to the maximum control quantity. The maximum control quantity is in the range from 0.1 mm to 10.0 mm, and set to about 1 mm, for example.

If the calculated deviation is present in the range from the minimum control quantity to the maximum control quantity, then control jumps from step S28c to step S30c. If the deviation is equal to or greater than the maximum control quantity, then control goes to step S30c after it is set to the maximum control quantity. In step S30c, the feed distance is corrected. The corrected feed distance is out-putted as a command to the second programmable logic controller 3032 in step S31c. The second programmable logic controller 3032 enables the servo controller 3042 to control the servomotor 1614 to correct the distance of one feed cycle of the main feed drum 1502 in the unit of 10 μm, for example.

In the fourth embodiment, as described above, after a deviation of the mark 53 is detected at a position that is spaced a certain number of pitches, e.g., 13 pitches, downstream from the mark forming station 55a which forms a mark 53 on the first continuous web 50, the detected deviation of the mark 53 is accumulated 50 times. Then, an average of the deviations of the mark 53 is calculated, and the average is divided by 13. Based on the quotient, the distance by which the first continuous web 50 is fed in one feed cycle by the main feed drum 1502 is corrected.

Therefore, it is possible to feed the first continuous web 50 accurately in each feed cycle with the main feed drum 1502. The relative positions of the marks 53, the developing liquid pods 40, and the traps 42, i.e., the relative positions of the image frames 22, the developing liquid pods 40, and the traps 42, and the relative position of the image frames 22 and the spacers 32, can be adjusted to desired accuracy ranges. Accordingly, the overall process of manufacturing instant photographic film units 20 is performed with high accuracy to produce high-quality instant photographic film units 20 quickly and efficiently.

The CCD camera 2974 and the illuminating unit 2976 of the deviation detecting means 2972 are capable of detecting and emitting a wavelength of at least 800 nm, for example, to which the second continuous web 58 that forms the photosensitive sheet 30 is not sensitive. Consequently, the deviation detecting means 2972 keeps the second continuous web 58 at a high-quality level. The illuminating unit 2976 is controlled such that it is energized only while the production line is in operation and de-energized when the production line is not in operation. Accordingly, the second continuous web 58 is more reliably prevented from being unduly exposed to undesired radiations.

The CCD camera 2974 may be replaced for maintenance. When the CCD camera 2974 is replaced with a new one it is necessary to establish imaging conditions for the new CCD camera 2974. Such imaging conditions are established as follows: The target jig 2992 is mounted on the fixed base 2998 in facing relation to the new CCD camera 2974 (see FIG. 113). The CCD camera 2974 images the reference protrusion 2996 which has its upper surface lying at the same height as the first continuous web 50 as it passes over the reference protrusion 2996.

The image processor 3034 stores predetermined reference data. The operator sets a dimensionally converted value per pixel and an offset for positional data such that the data of the image of the reference protrusion 2996 captured by the CCD camera 2974 agrees with the reference data. The new CCD camera 2974 is now capable of producing image data under the same conditions as the previous CCD camera 2974 which has been replaced, and hence of performing a highly accurate deviation detecting process. After the imaging conditions of the new CCD camera 2974 have been established, the target jig 2992 is removed from the fixed base 2998.

As shown in FIG. 108, the first continuous web 50 is introduced from the bright chamber 92 into the dark chamber 94 via the light shielding mechanism 610 by the main feed drum 1502. The first continuous web 50 which is introduced from the light shielding box 612 of the light shielding mechanism 610 into the dark chamber 94 is fed to the edge detecting station 57b.

In the edge detecting station 57b, the CCD camera 2974 images an edge portion of the first continuous web 50, and the image processor 3034 calculates a deviation of an end of the mark 53. If the calculated deviation is equal to or greater than a reference minimum value, then a motor (not shown) is energized to cause the light shielding mechanism 610 to positionally adjust the first continuous web 50 depending on the deviation in the direction indicated by the arrow A, thus controlling the feed position of the first continuous web 50 in the direction indicated by the arrow A in step S8c (see FIG. 115). Alternatively, it is possible to stop the entire system due to a malfunction without causing the light shielding mechanism 610 to positionally adjust the first continuous web 50 in the direction indicated by the arrow A.

Then, the first continuous web 50 is fed to the punching station 59 in which two image frames 22 are formed on the first continuous web 50 when the first continuous web 50 is stopped in step S9c. In the first joining station 62, the second continuous web 58 and the continuous sheet 60 are unreeled from the photosensitive sheet supply unit 809 and the undersheet supply unit 810, and bonded to the first continuous web 50. In the first heat-bonding station 64, the second continuous web 58 and the continuous sheet 60 are thermally bonded to the first continuous web 50 across two successive image frames 22 in step S10c.

Two rails 65 are unreeled in the form of webs from the rail supply unit 812, and cut to a predetermined length. The cut rails 65 are thermally bonded to the second continuous web 58 and the continuous sheet 60 on opposite sides of each image frame 22 in the second heat-bonding station 66 in step S11c. The third continuous web 68 disposed as a roll in the cover sheet supply unit 814 is unreeled and joined to the second continuous web 58 in the second joining station 70, after which the second and third continuous webs 58, 68 are thermally bonded to each other with the rails 65 in the third heat-bonding station 72 in step S12c.

In the folding station 74, the opposite marginal edges of the first continuous web 50 are folded back inwardly along the folds 38*a*, 38*b* by the former 2916, wrapping the trap 42 and the developing liquid pod 40 in step S13*c*. Thereafter, the flap seal 2924 is positionally controlled in step S14*c*.

The first through third heat-bonding stations 64, 66, 72, which cause thermal shrinkage of the various members, are spaced from the flap seal 2924 by the corresponding numbers of pitches, tending to produce a sealing failure and jamming due to thermal shrinkage and a slight sealing position variation because the main feed drum 1502 does not fully constrain the webs. To solve this problem, the frame detecting station 57*c* detects an image frame 22 for controlling the flap seal 2924 to move in the direction indicated by the arrow X in order to make constant the relative position of the image frame 22 and the sealing position.

Figure 118:
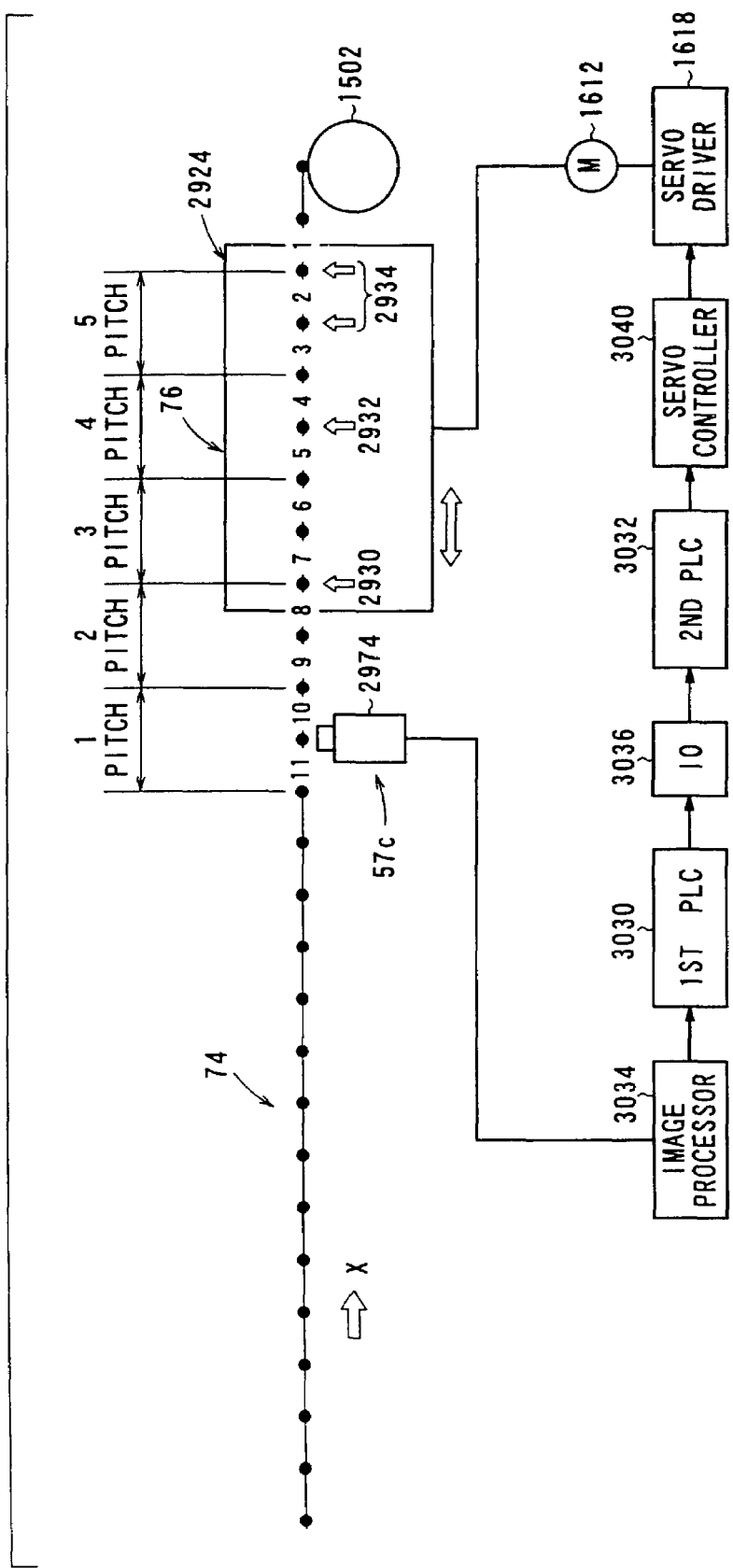
FIG. 118 is a diagram showing how the flap seal is controlled.

Specifically, as shown in FIG. 118, the flap seal 2924 performs a bonding process in a temporarily sealing step, a finally sealing step, and an edge sealing step in respective three pitches, and the frame detecting station 57*c* is spaced two pitches upstream of the flap seal 2924. In the frame detecting station 57*c*, based on the image information of an image frame 22 captured by the CCD camera 2974, a present deviation a4 of the image frame 22 is measured. Deviations a3, a2, a1 which are three previous data represent respective deviations from a reference value which corresponds to three pitches by which the assembly is fed to the flap seal 2924 in the present feed cycle. The flap seal 2924 may be moved in the direction indicated by the arrow X by an average a=(a1+a2+a3)/3 of the deviations a3, a2, a1.

It is assumed that the preceding position of the flap seal 2924 is represented by H1 and the designed reference position of the flap seal 2924 by H0. The position H of the flap seal 2924 to be set in a present measurement cycle is represented by H=H0−a, and the flap seal 2924 is moved by the positional difference H−H1 from the preceding position. The movement of the flap seal 2924 is controlled by the servomotor 1612 which is energized when the servo controller 3040 applies a drive signal to the servo driver 1618. If the average a is of a value between 0.001 mm and 0.1 mm, e.g., if the average a is equal to or less than 0.003 mm, or if the present control quantity H−H1 is equal to or less than a predetermined value, then the position of the flap seal 2924 is not corrected. If the absolute value of the position H of the flap seal 2924 to be set in the present measurement cycle is of a value between 0.01 mm and 10.0 mm, e.g., if it is equal to or greater than 0.2 mm, for example, then the position H of the flap seal 2924 is set to the value of 0.2 mm. Thus, an upper limit and a lower limit are provided for the control quantity.

In this manner, a deviation of the image frame 22 is detected immediately upstream of the flap seal 2924, and the flap seal 2924 is positionally adjusted based on the detected deviation. Consequently, if the second continuous web 58 thermally shrinks or the main feed drum 1502 fails to constrain the webs sufficiently, the relative position of the image frame 22 and the sealing position can be accurately equalized to a desired relative position, allowing the flaps to be bonded highly accurately and efficiently.

Figure 115:
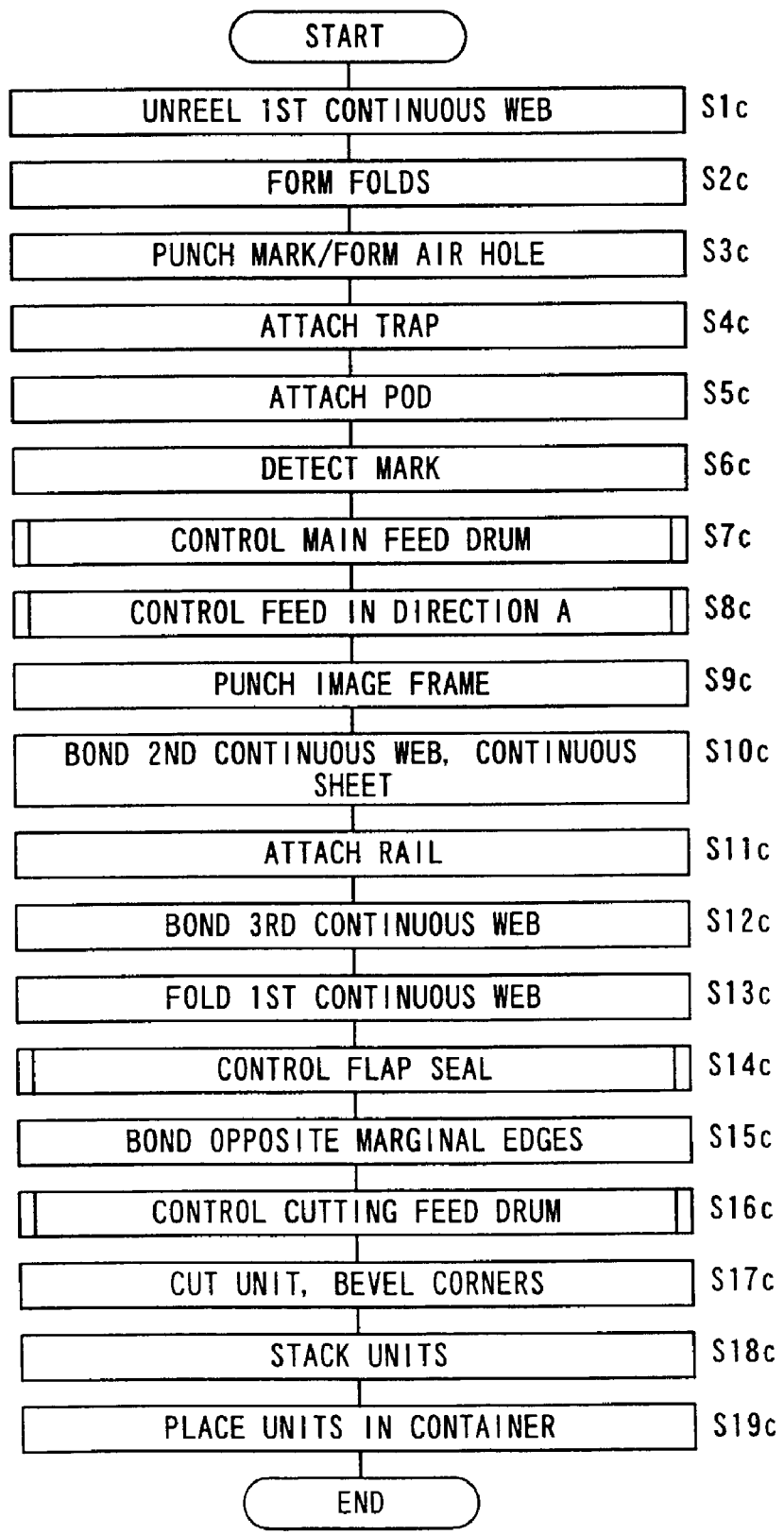
FIG. 115 is a flowchart of a processing sequence of the manufacturing method.
Figure 116:
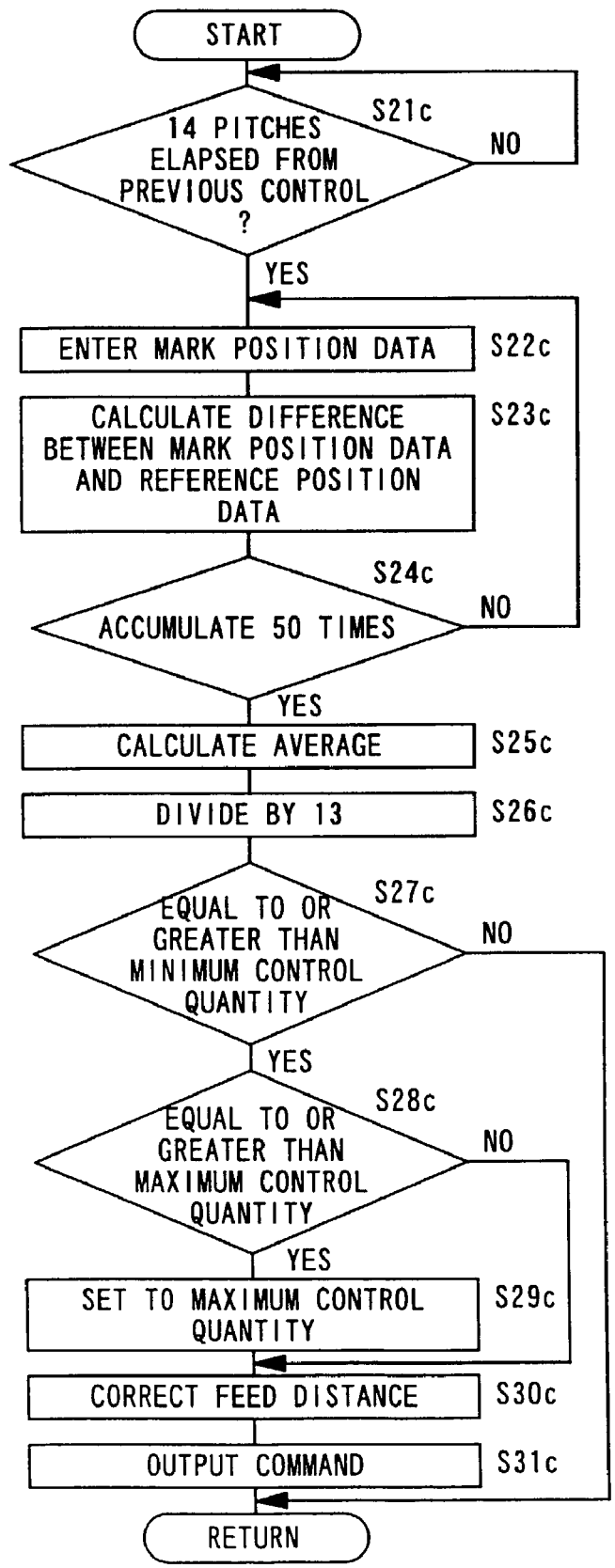
FIG. 116 is a flowchart of a process of controlling a main feed drum in the processing sequence shown in FIG. 115.

In the flap seal 2924, after the flaps of the first continuous web 50 are temporarily bonded by the temporarily flap bonding means 2930, the flaps are finally bonded by the finally flap bonding means 2932, and the edge of the flap near the trap is re-boded by the flap re-bonding means 2934 in step S15*c* (see FIG. 115).

The joined body which is constructed of the first through third continuous webs 50, 58, 68 that are bonded in a given laminated state is then transferred from the main feed drum 1502 via the second free loop 1504 to the cutting feed drum 1508, which is controlled to intermittently feed the joined body by each pitch at a time in the direction indicated by the arrow X to the cutting station 78.

Figure 119:
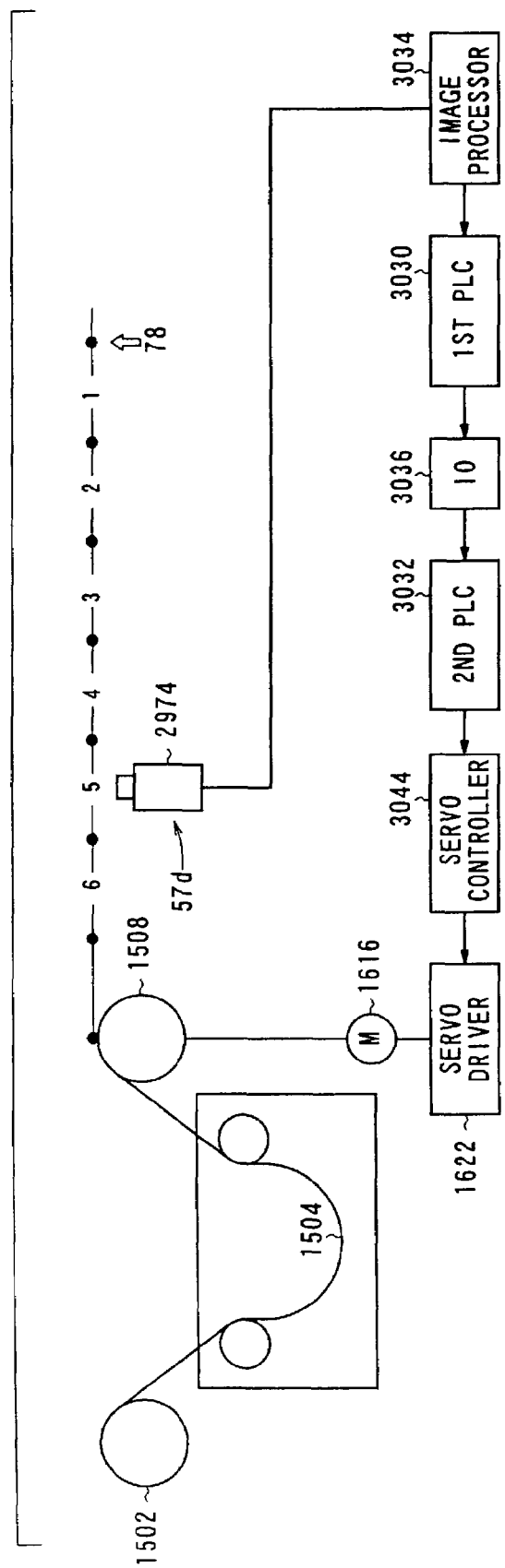
FIG. 119 is a diagram showing how a cutting feed drum is controlled.

In the cutting station 78, because the cutting mechanism is capable of high-speed operation and hence may be a single mechanism, the second free loop 1504 is formed, and an image frame 22 is detected downstream of the cutting feed drum 1508 to control the position of the webs and feed the webs in step S16*c*. Specifically, as shown in FIG. 119, between the cutting feed drum 1508 and the cutting station 78, the frame detecting station 57*d* is disposed immediately downstream of the cutting feed drum 1508, and the cutting station 78 is spaced five pitches from the frame detecting station 57*d*.

In the frame detecting station 57*d*, a deviation of the image frame 22 is detected for each instant photographic film unit 20, and the difference between the presently measured deviation and the previously measured deviation is added to the distance by which the assembly is previously fed prior to the present measurement cycle, thus obtaining the width of the presently measured instant photographic film unit 20. The data of the width is established as a distance by which the assembly is to be fed by the cutting feed drum 1508 five times later.

The data of the widths of the five instant photographic film units 20 between the cutting station 78 and the frame detecting station 57*d* are stored, and the distance by which the assembly is intermittently fed in a feed cycle by the cutting feed drum 1508 is corrected for each instant photographic film unit 20. If the width of the presently measured instant photographic film unit 20 is greater than a predetermined reference feed distance by at least a prescribed value, then the actual feed distance is set to at most the sum of the reference feed distance and the prescribed value, and is not corrected beyond that sum. The reference feed distance is 54 mm or 108 mm which is a standard value of instant photographic film units 20, and the prescribed value is set to a value in the range from 0.01 mm to 1 mm, or specifically a value of 0.1 mm.

In the fourth embodiment, the frame detecting station 57*d* is spaced upstream five pitches from the cutting station 78. However, the frame detecting station 57*d* is not limited to such a position, but may be disposed in any desired position.

In the fourth embodiment, an image frame 22 is detected upstream of the cutting station 78, and the cutting feed drum 1508 is controlled based on the detected position of the image frame 22. Therefore, instant photographic film units 22 are prevented from being cut at different positions, but can be cut accurately and reliably at desired positions. Thus, high-quality instant photographic film units 20 are efficiently produced.

In the cutting station 78, the joined body is cut off with the four corners beveled in step S17*c*, producing an instant photographic film unit 20 at a time. After a predetermined number of instant photographic film units 20 are stacked in the stacking station 80 in step S18*c*, they are reversed and delivered to the packing station 84 in which they are automatically stored in a film pack 82 in step S19*c*.

Upon machine shutdowns, amounts of thermal shrinkage are particularly large in the first through third heat-bonding stations 64, 66, 72, tending to produce large deviations of the relative positions of the image frames 22 and other members. To overcome this drawback, before the webs start being fed at the time of starting the system, the main feed drum 1502 is controlled to return until any deviation of the position of the mark 53 detected in the mark detecting station 57*a* becomes nil. In this fashion, the relative positions of the image frames 22 and other members can be adjusted to appropriate ranges upon machine shutdowns.

Specifically, the difference between measured data in the mark detecting station 57a upon a machine shutdown and measured data at the time an operation start command is outputted is judged as an amount of thermal shrinkage, and the main feed drum 1502 is rotated back an angular interval corresponding to the amount of thermal shrinkage before the operation starts. However, the assembly may not return by the amount of thermal shrinkage in the mark detecting station 57a because of various facilities disposed between the main feed drum 1502 and the mark detecting station 57a. Therefore, it is necessary to add an actually determined corrective value to the calculated amount of thermal shrinkage and rotate back the main feed drum 1502 by an angular interval corresponding to the sum. The corrective value may be a value in the range from 50% to 300% where 100% represents a non-corrective value, e.g., a value of about 150%.

Since the main feed drum 1502 is rotated back before the operation is resumed, the instant photographic film units 20 positioned in the first through third heat-bonding stations 64, 66, 72 are moved back. Therefore, it is necessary to correct the positional data of the flap seal 2924 already measured in the frame detecting station 57c. The amount of thermal shrinkage set when an angular interval by which the main feed drum 1502 is rotated back is calculated, or the difference between the positional data of the image frame 22 in the frame detecting station 57c before the operation stops and the positional data of the image frame 22 after the main feed drum 1502 is rotated back, is used. Then, the amount of thermal shrinkage or the difference between the positional data is subtracted from the measured deviations a4, a3, a2, a1 of the image frames 22 delivered to the flap seal 2924.

In the fourth embodiment, the main feed drum 1502 is controlled based on the detected positional deviation in the mark detecting station 57a as follows:

If the deviation detected based on the image information of the mark 53 imaged by the CCD camera 2974 is judged as being greater than deviations successively detected four times (m times) immediately earlier, i.e., if successive deviations of the mark 53 occur in one direction, then an average of the four measured data is calculated. Then, if the calculated average is equal to or greater than a predetermined value, then a quotient produced when the average is divided by 13 is used as a value to be added to or subtracted from the feed distance by the main feed drum 1502, and the distance by which the first continuous web 50 is intermittently fed in each feed cycle is corrected based on that value. In this manner, the first continuous web 50 can be fed stably and highly accurately.

Figure 120:
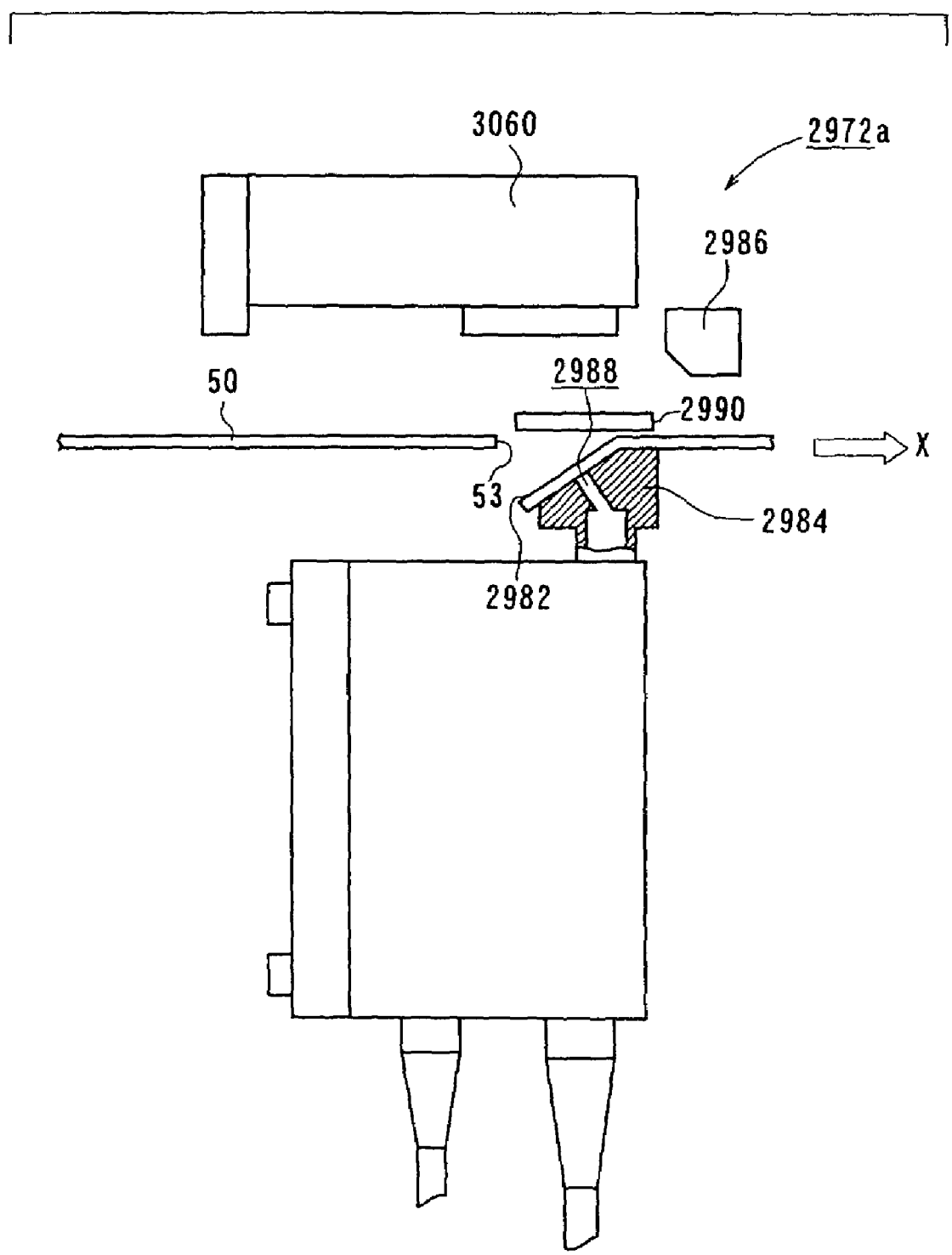

The deviation detecting means 2972 may be replaced with a deviation detecting means 2972a shown in FIG. 120. The deviation detecting means 2972a comprises a laser-scanning contactless length-measurement sensor 3060 in place of the CCD camera 2974. The contactless length-measurement sensor 3060 applies a scanning laser beam to measure the distance between the reference member 2990 and an end of the mark 53 to accurately detect the position of the mark 53 with respect to the reference member 2990. Therefore, it is possible to measure the position of the mark 53 with respect to the reference member 2990 each time the first continuous web 50 is intermittently fed in a feed cycle. The deviation detecting means 2972a thus offers the same advantages as those of the deviation detecting means 2972 which comprises the CCD camera 2974.

In the fourth embodiment, the photosensitive sheet 30 is composed of the second continuous web 58. However, the photosensitive sheet 30 may be composed of the third continuous web 68. In the fourth embodiment, instant photographic film units 20 have outer dimensions that are substantially equal to those of an ID card. However, it is possible to manufacture instant photographic film units 20 which have an outer dimension H1 of 108 mm in the transverse direction and an outer dimension H2 of 85.6 mm in the longitudinal direction. The manufacturing system 2900 can manufacture such instant photographic film units 20 by feeding the first continuous web 50 and other members over pitches of 108 mm.

Figure 121:
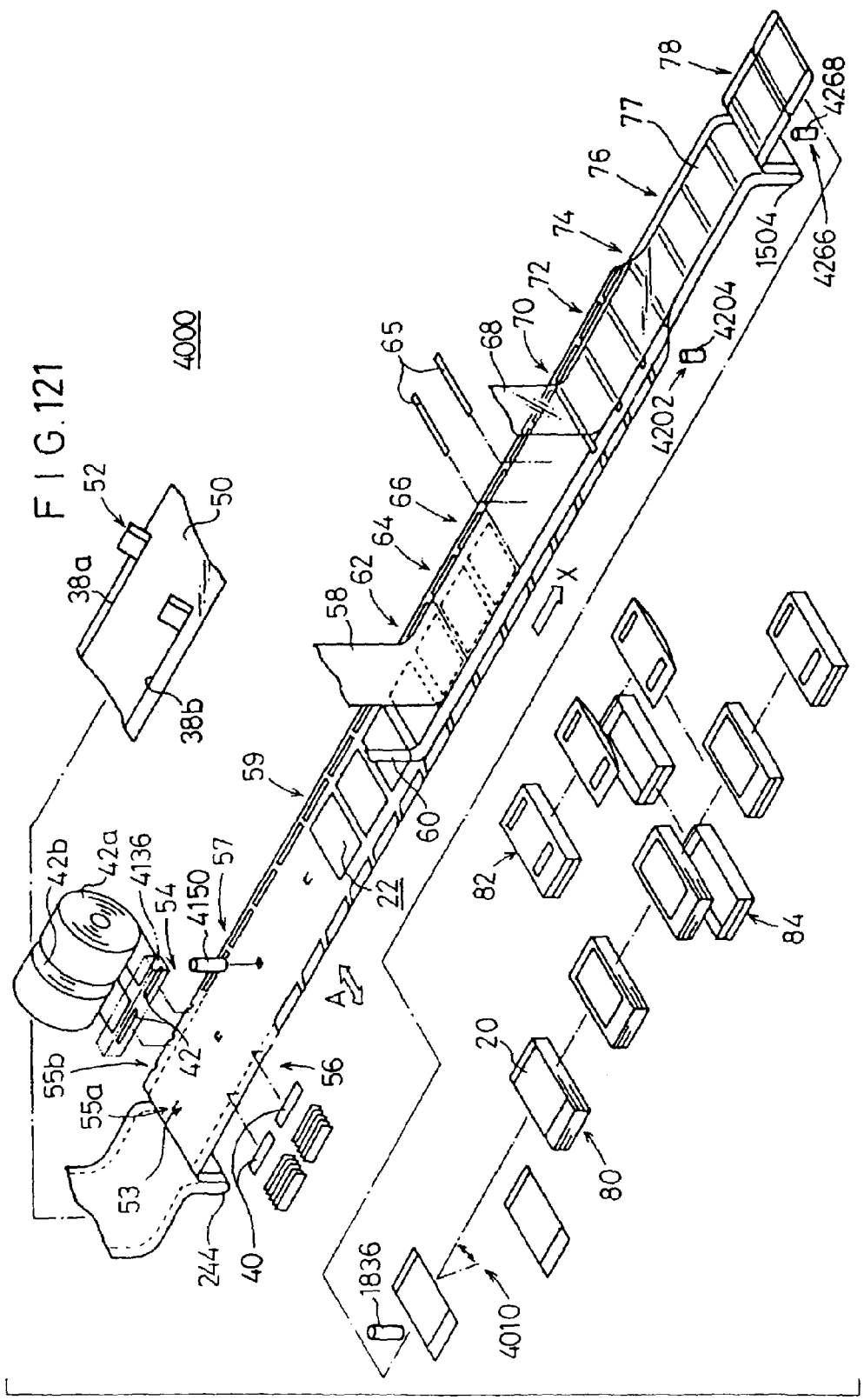
Figure 122:
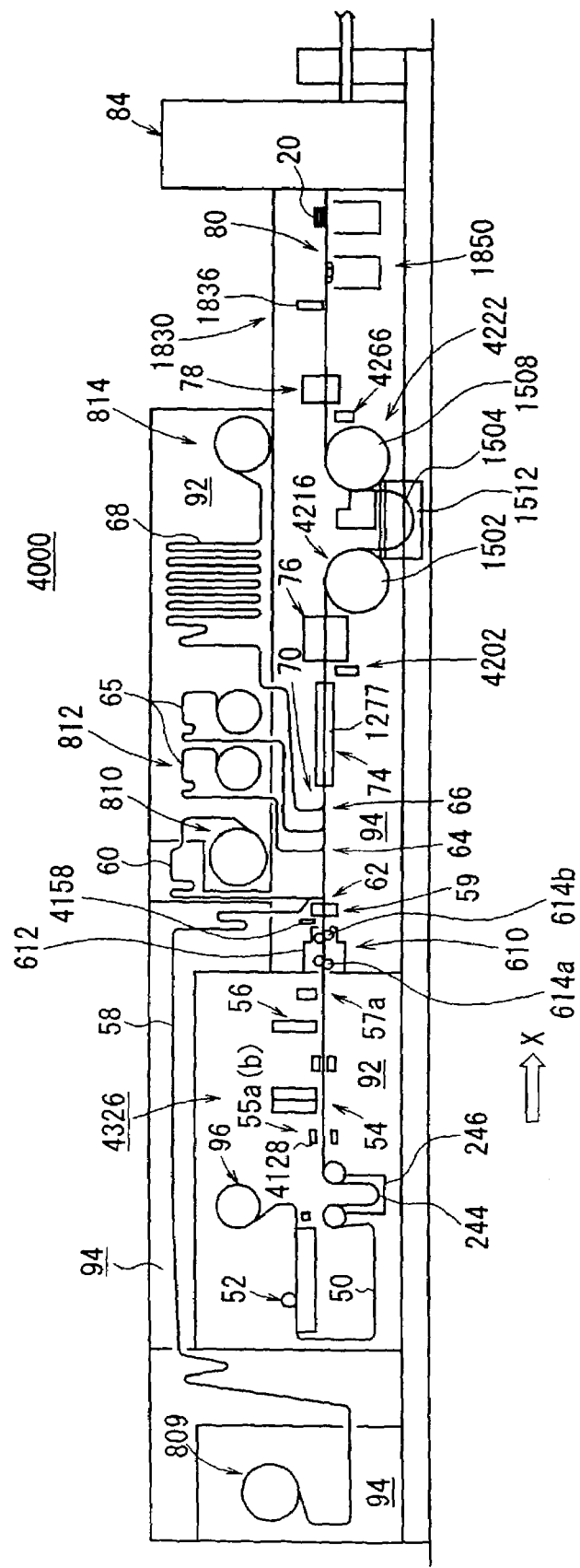
Figure 123:
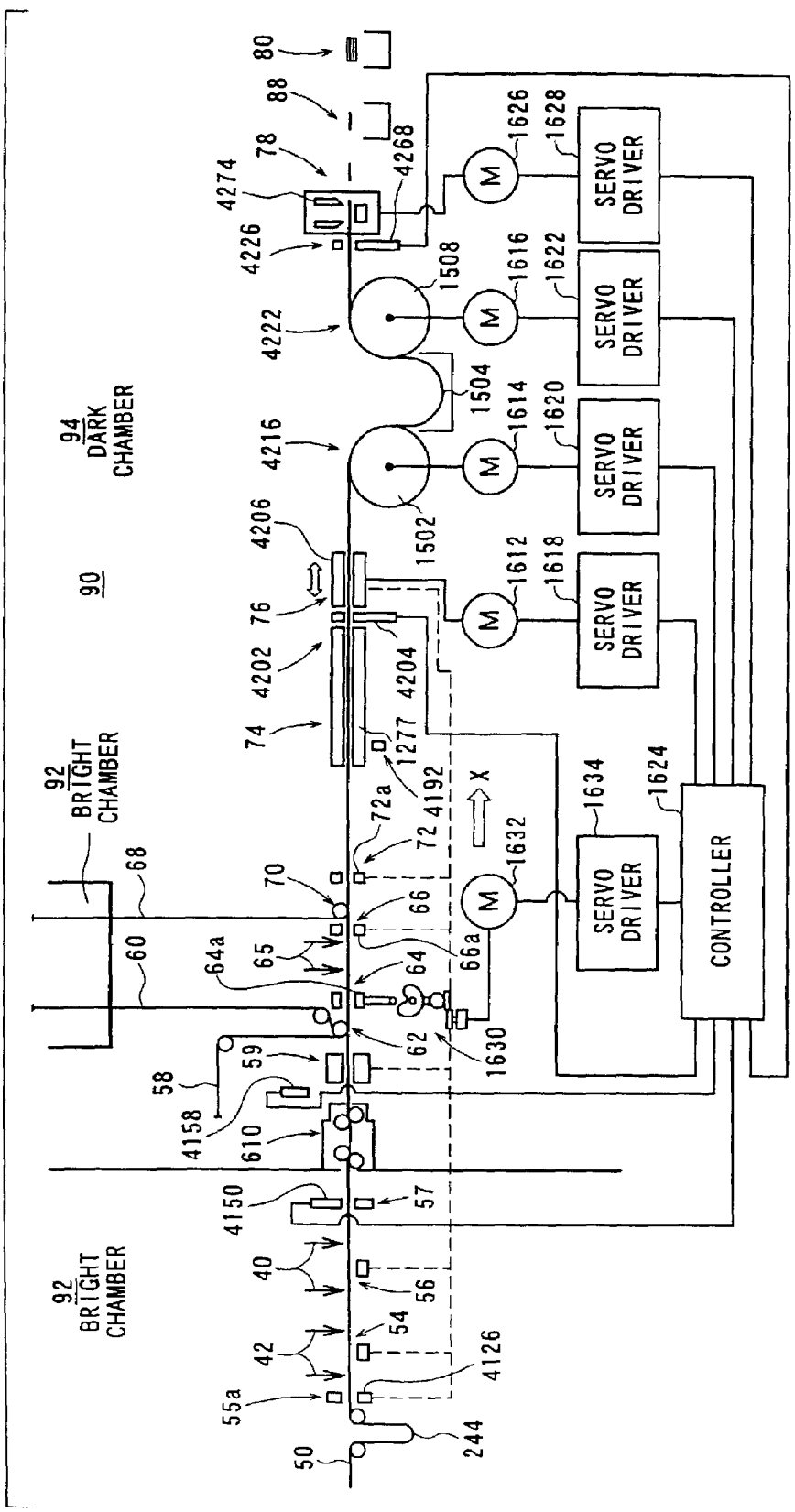
Figure 124:
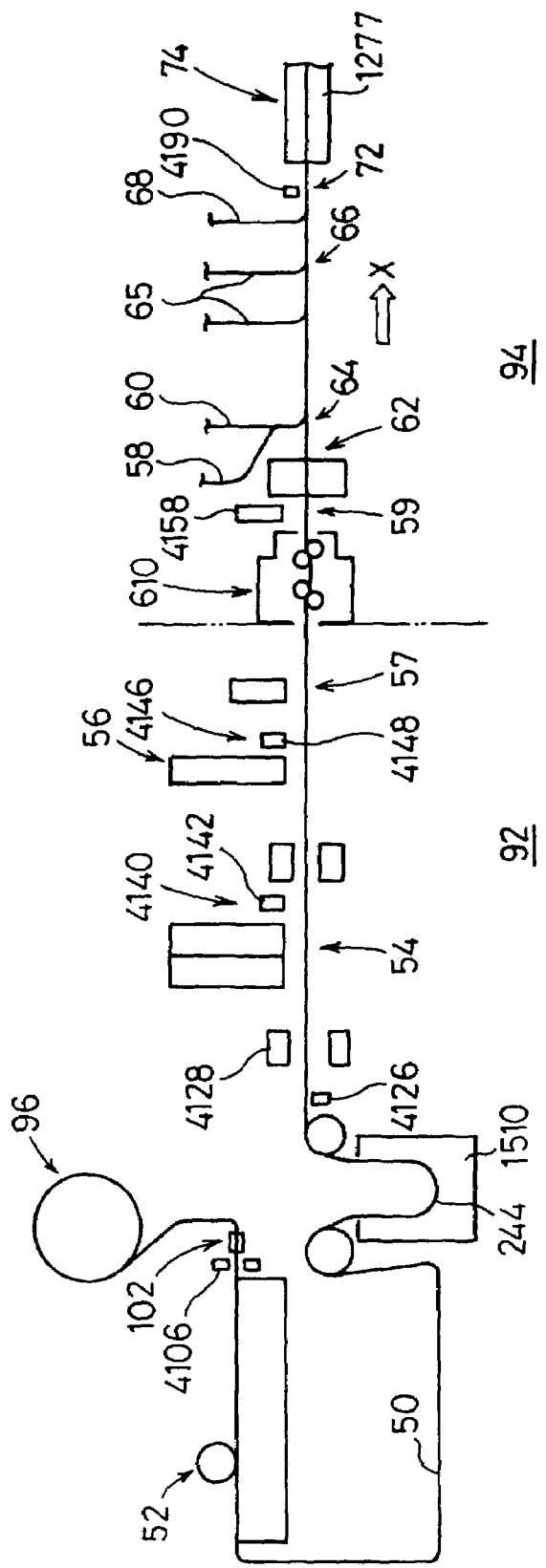
Figure 125:
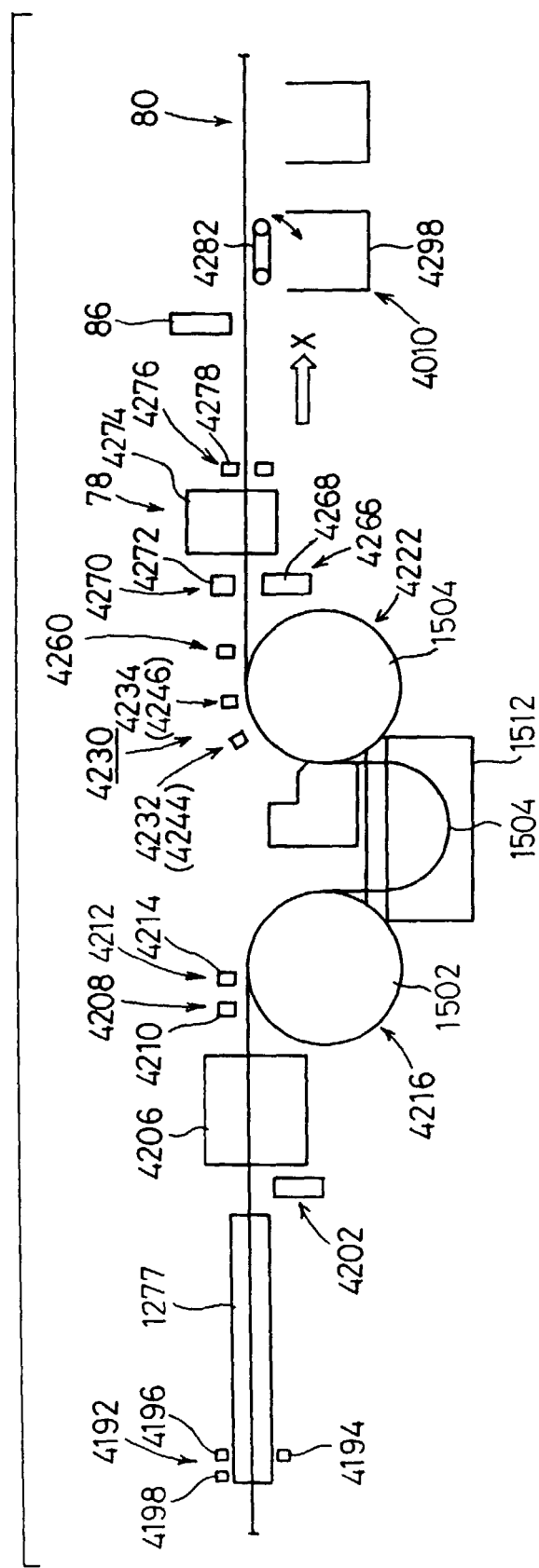

FIG. 121 schematically illustrates a manufacturing method according to a fifth embodiment of the present invention. FIGS. 122 and 123 show a manufacturing system (manufacturing apparatus) 4000 for carrying out the manufacturing method according to the fifth embodiment of the present invention. FIGS. 124 and 125 schematically show a defect detecting mechanism of the manufacturing system 4000. Those parts of the manufacturing system 4000 which are identical to those of the manufacturing system 90 according to the first embodiment are denoted by identical reference characters, and will not be described in detail below.

The manufacturing system 4000 has a bright chamber 92 and a dark chamber 94. The bright chamber 92 houses therein a mask sheet supply unit 96 for unreeling the first continuous web 50 from a web roll. The fold forming station 52, the mark forming station 55a, the air hole forming station 55b, the trap attaching station 54, and the pod attaching station 56 are successively disposed downstream of the mask sheet supply unit 96. An ink jet printer 1836 and a defect detecting mechanism 4010 are disposed between the cutting station 78 and the stacking station 80.

Figure 126:
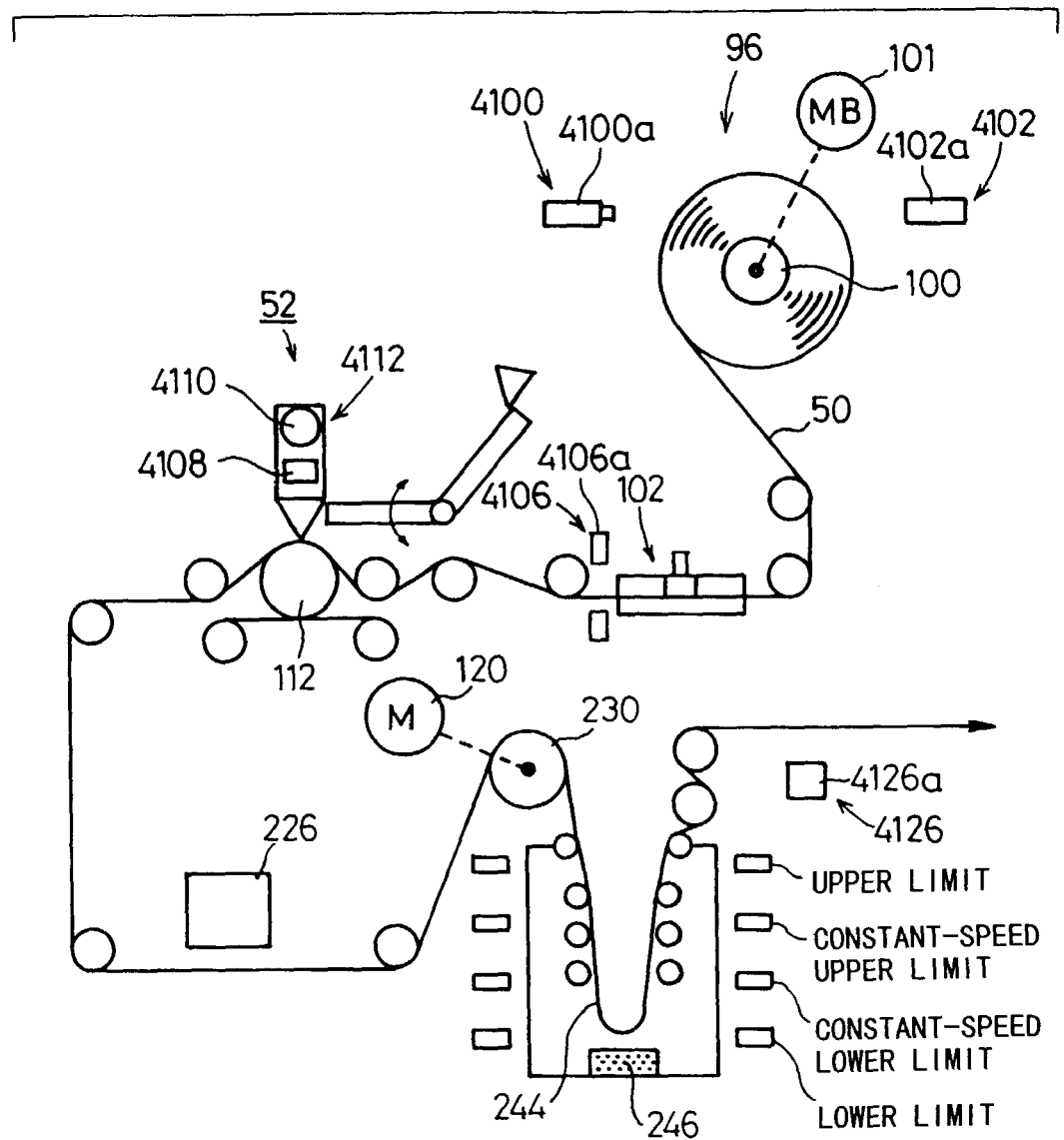

As shown in FIG. 126, the mask sheet supply unit 96 has an unreeling shaft 100 supporting a roll of the first continuous web 50 thereon. The unreeling shaft 100 is combined with a braking means (not shown) for applying a braking torque thereto. The mask sheet supply unit 96 includes a remaining length detecting means 4100 for detecting a remaining length of the rolled first continuous web 50 on the unreeling shaft 100, and a roll displacement detecting means 4102 for detecting a protrusion of the first continuous web 50 from an end surface of the unreeling shaft 100. The remaining length detecting means 4100 and the roll displacement detecting means 4102 comprise photosensors 4100a, 4100b, respectively.

There is provided a splicing unit 102 for splicing the trailing end of a first continuous web 50 which has been unwound from the mask sheet supply unit 96 to the leading end of a first continuous web 50 which is newly loaded in the mask sheet supply unit 96. Downstream of the splicing unit 102, there is disposed a splicing error detecting means 4106 for detecting a spliced end displacement of the first continuous web 50. The splicing error detecting means 4106 comprises a reflective fiber photosensor 4106a disposed on both sides of the first continuous web 50 for detecting a web protrusion due to misaligned web ends that are spliced.

The fold forming station 52 has a fold forming means 4112 which is displaceable and includes a heater 4108 and a temperature sensor 4110. The roller 112 as a drive roller is rotatably disposed across the first continuous web 50 from the fold forming means 4112. An electrostatic charge removing means 226 is positioned downstream of the fold forming station 52, and a suction roller 230 is positioned downstream of the electrostatic charge removing means 226.

The first free loop 244 is formed in the first suction box 246. The first free loop 244 in the first suction box 246 is detected in four positions including a lower limit position, a constant-speed lower limit position, a constant-speed upper limit position, and an upper limit position. The suction roller 230 is controlled to rotate at a low speed when the first free loop 244 is positioned between the lower limit position and the constant-speed lower limit position, at a constant speed when the first free loop 244 is positioned between the constant-speed lower limit position and the constant-speed upper limit position, and at a high speed when the first free loop 244 is positioned between the constant-speed upper limit position and the upper limit position, for thereby continuously feeding the first continuous web 50. Downstream of the first free loop 244, there is disposed a junction detecting means 4126 for detecting a junction or spliced region of the first continuous web 50. The junction detecting means 4126 comprises a transmissive fiber photosensor 4126a for detecting a splicing tape (not shown) at a junction of the first continuous web 50.

As shown in FIG. 122, the mark forming station 55a has a mark punch 4128 for forming a substantially channel-shaped mark 53 on the first continuous web 50. The air hole forming station 55b is located in the same position as the mark forming station 55a, and has a press (not shown) for forming a recess centrally in a trap attaching marginal edge of the first continuous web 50.

Figure 127:
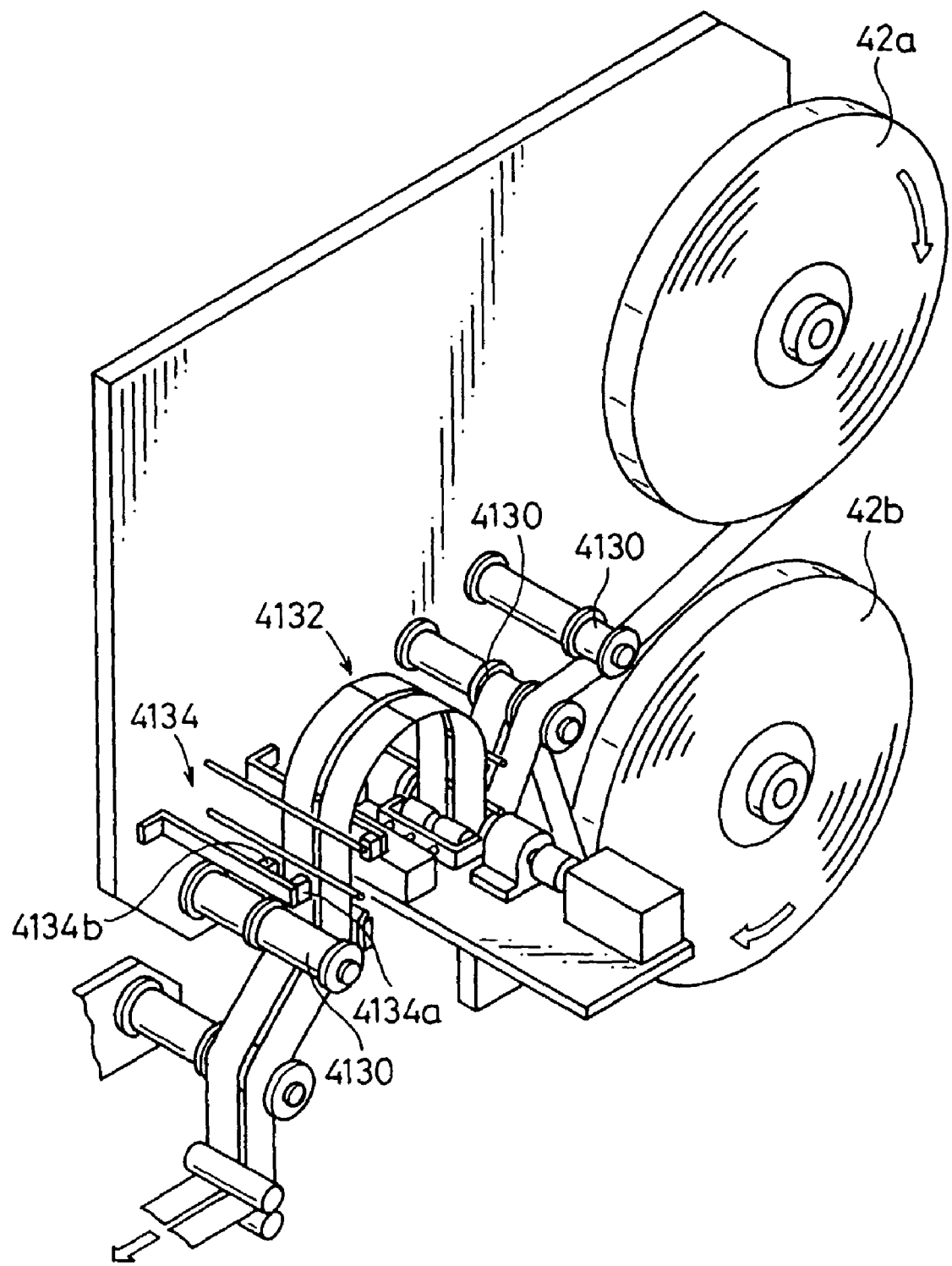

As shown in FIG. 127, the trap attaching station 54 has two rolls of trap webs 42a, 42b positioned in juxtaposed relation to each other. A trap splicing unit 4132 is disposed in a position where the trap webs 42a, 42b unreeled from their rolls are supplied, with a plurality of guide rollers 4130 being interposed between the trap splicing unit 4132 and the trap webs 42a, 42b. The trap splicing unit 4132 splices the trap webs 42a, 42b while they are formed as loops. A trap junction detecting means 4134 is disposed downstream of the trap splicing unit 4132. The trap junction detecting means 4134 comprises transmissive photosensors 4134a, 4134b for detecting splicing tapes applied to the junctions of the trap webs 42a, 42b.

As shown in FIG. 121, the trap webs 42a, 42b are unreeled and cut to respective two traps 42 of a predetermined length, which are then held by a bearing block 4136 under a vacuum and bonded to the first continuous web 50. The bearing block 4136 has a pressure switch (trap transfer error detecting means) for detecting a suction pressure developed by the bearing block 4136. If traps 42 are present on the bearing block 4136, the absolute pressure detected by the pressure switch is lowered. If no traps 42 are present on the bearing block 4136, the absolute pressure detected by the pressure switch is not lowered. Therefore, the absence of traps 42 on the bearing block 4136 is detected if no pressure reduction is detected by the pressure switch.

As shown in FIG. 124, a trap bonding inspecting means 4140 is disposed immediately downstream of the trap attaching station 54. The trap bonding inspecting means 4140 has a CCD camera 4142 for inspecting whether there is a trap 42 on the first continuous web 50 or not. The CCD camera 4141 also serves as a positional displacement detecting means for inspecting a positional displacement of a trap 42.

Figure 128:
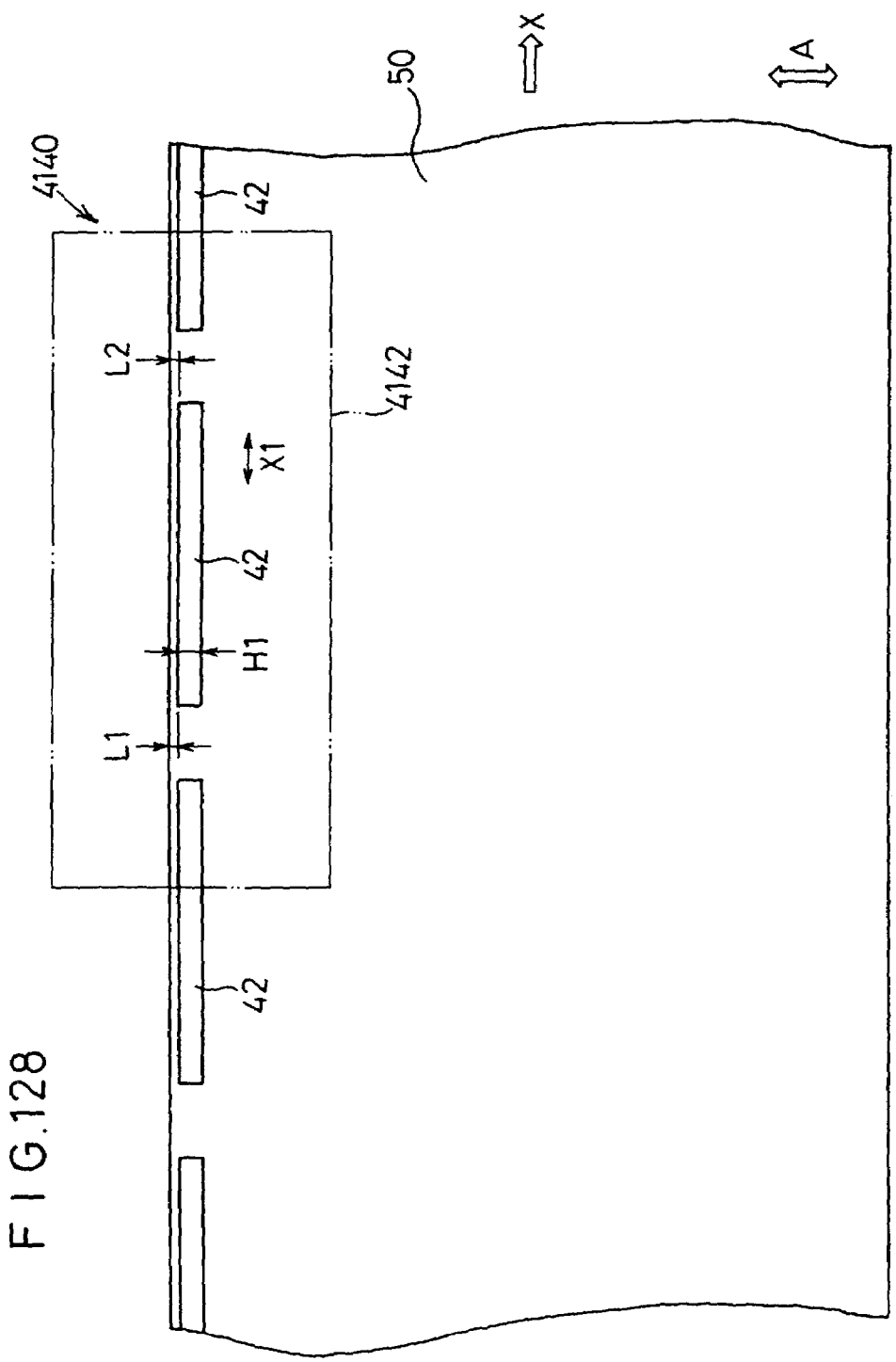
Figure 129:
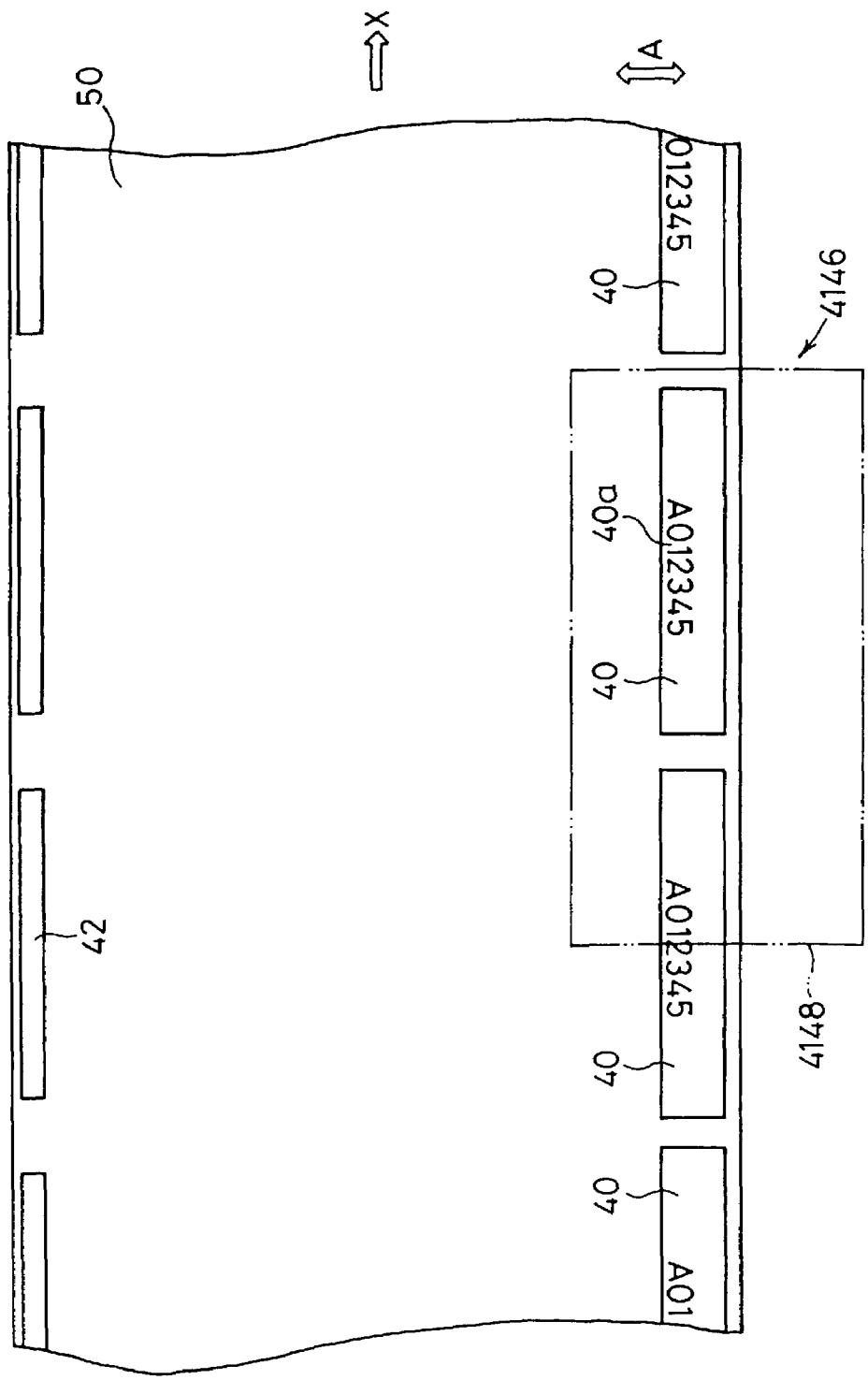

Specifically, as shown in FIG. 128, a trap 42 on the first continuous web 50 is detected by an image inspection process. Distances L1, L2 from an edge of the first continuous web 50 to a trap 42 at two locations are also measured by an image inspection process to calculate an inclination of the trap 42. The position of the trap 42 in the direction indicated by the arrow X1, the position of the trap 42 in the direction indicated by the arrow A, and the width H1 of the trap 42 are also measured.

As shown in FIG. 121, the pod attaching station 56 is capable of simultaneously supplying two developing liquid pods 40 to the first continuous web 50. The pod attaching station 56 has a pod detecting means such as a reflective photosensor for detecting whether there are developing liquid pods 40 or not.

As shown in FIG. 124, a pod bonding inspecting means 4146 is positioned immediately downstream of the pod attaching station 56. The pod bonding inspecting means 4146 has a CCD camera 4148 positioned in alignment with each developing liquid pod 40 bonded to the first continuous web 50. The pod bonding inspecting means 4146 serves as an attitude detecting means for detecting a bonded attitude of a developing liquid pod 40 based on imaged information from the CCD camera 4148, i.e., whether the orientation of a printed region 40a is correct or not, and also as a positional deviation detecting means for inspecting a positional deviation of the developing liquid pod 40. As with the process of inspecting a positional deviation of a trap 42, the pod bonding inspecting means 4146 inspects a positional deviation of the developing liquid pod 40 by measuring an inclination of the developing liquid pod 40, the position of the developing liquid pod 40 in the direction indicated by the arrow X, and the position of the developing liquid pod 40 in the direction indicated by the arrow A.

As shown in FIG. 121, the mark detecting station 57 has a CCD camera (mark positional deviation detecting means) 4150 for measuring a positional deviation of a mark 53 formed on the first continuous web 50.

As shown in FIG. 122, the dark chamber 94 extends from opposite sides of the bright chamber 92 to a position above the bright chamber 92. A light shielding mechanism 610 for shielding the dark chamber 94 from the light of the bright chamber 92 is disposed downstream of the mark detecting station 57a. A CCD camera (continuous web positional deviation inspecting means) 4158 is disposed immediately downstream of the light shielding mechanism 610 for detecting an edge of the first continuous web 50 and calculating a deviation of the edge position. A pressure sensor for detecting the pressure of a suction pad when punched debris is removed by the suction pad is disposed immediately downstream of the punching station 59. The pressure sensor serves to inspect whether the punched debris is reliably removed or not.

Figure 130:
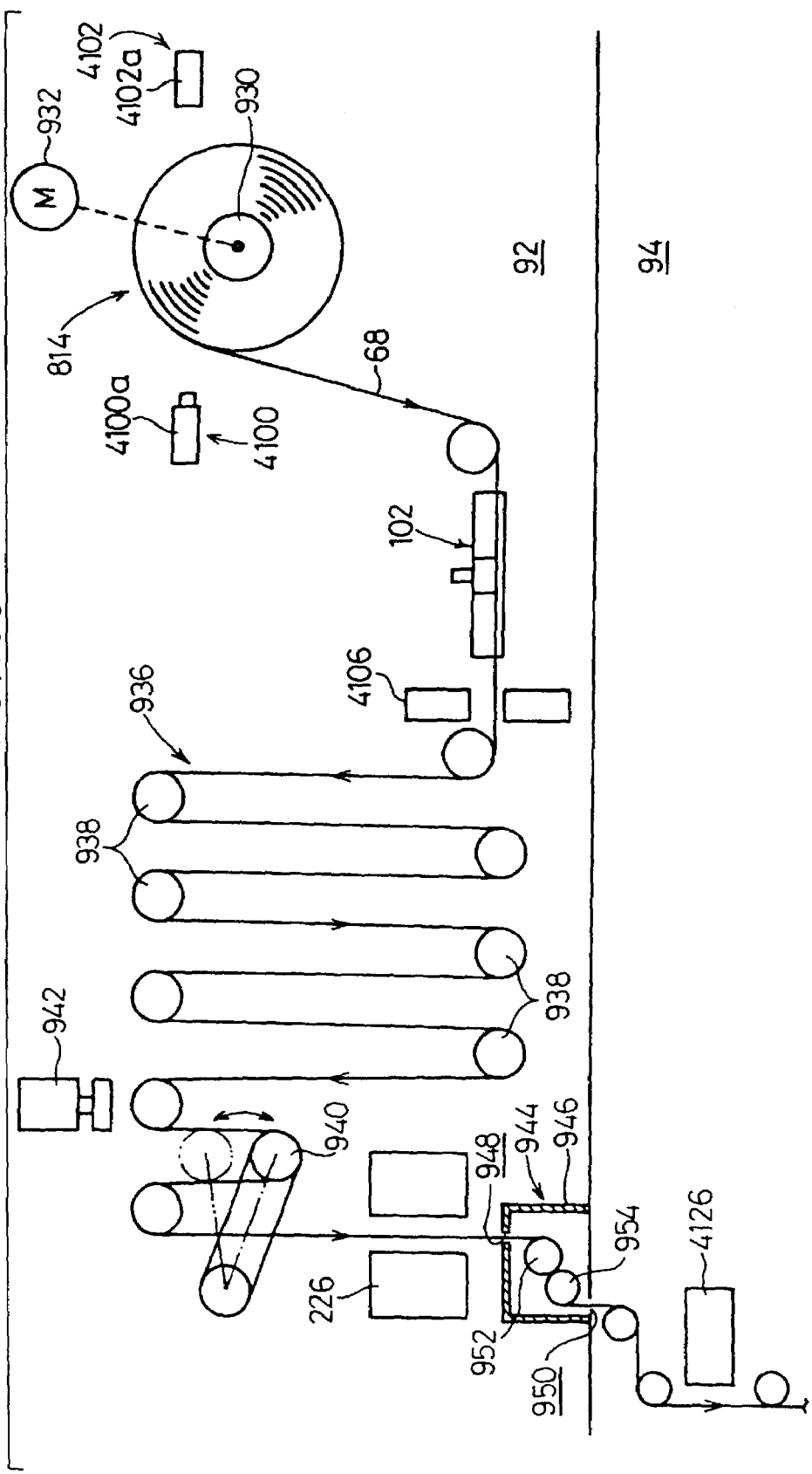

FIG. 130 shows an arrangement of a cover sheet supply unit 814. Those parts of the cover sheet supply unit 814 which are identical to those of the mask sheet supply unit 96 shown in FIG. 126 are denoted by identical reference characters, and will not be described in detail below.

The cover sheet supply unit 814 has an unreeling shaft 930 supporting a roll of the third continuous web 68. The unreeling shaft 930 can be rotated by a servomotor 932. A splicing error detecting means 4106 is disposed downstream of a splicing unit 102, and a path forming unit 936 for adjusting the path length of the third continuous web 68 is disposed downstream of the splicing error detecting means 4106. The path forming unit 936 comprises a plurality of path rollers 938, a dancer roller 940, and a clamp 942. The dancer roller 940 is associated with a sensor (not shown) for detecting when the dancer roller 940 reaches upper and lower limit positions. When the sensor detects a malfunction, the system is stopped.

As shown in FIG. 122, the photosensitive sheet supply unit 809, the undersheet supply unit 810, and the rail supply unit 812 are of a structure similar to the cover sheet supply unit 814, and will not be described in detail below. The photosensitive sheet supply unit 809 has a proximity sensor for detecting a splicing tape (aluminum-deposited tape) applied to a junction of the second continuous web 58.

As shown in FIG. 124, a reflective fiber photosensor 4190 is disposed between the third heat-bonding station 72 and the folding station 74 for inspecting whether a rail 65 bonded to the first continuous web 50 projects from the third continuous web 68 or not.

As shown in FIGS. 122 and 123, the folding station 74 has a former 1277 for folding back opposite marginal edges of the first continuous web 50 inwardly, and two sets of heat-bonding units 64a, 66a, 72a are disposed respectively in the first through third heat-bonding stations 64, 66, 72, the heat-bonding units 64a, 66a, 72a being positionally adjustable in the direction in which the assembly or the joined body is fed. An image frame and member position inspecting means 4192 are disposed immediately upstream of the former 1277 (see FIG. 125).

Figure 131:
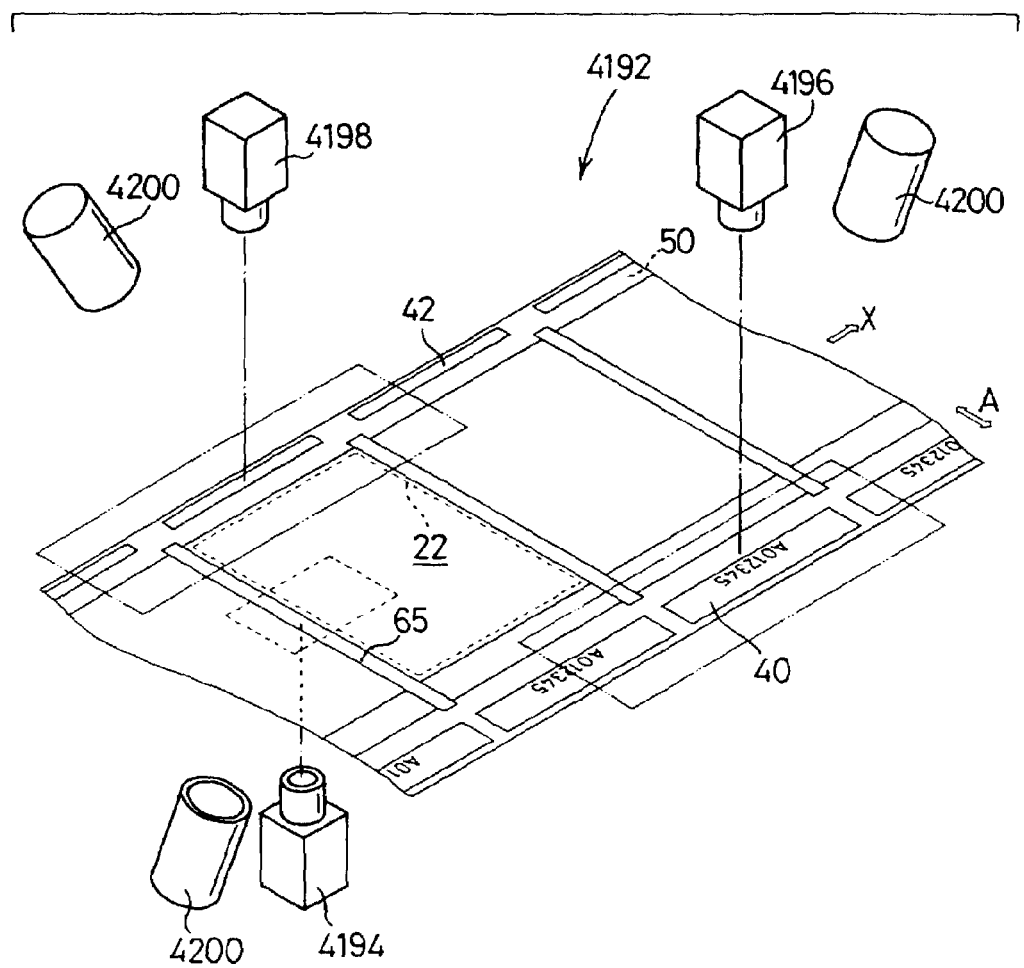

As shown in FIGS. 131 and 132, the image frame and member position inspecting means 4192 comprises a first CCD camera 4194 disposed below the first continuous web 50 in alignment with an image frame 22, a second CCD camera 4196 disposed above the first continuous web 50 in alignment with a developing liquid pod 40, a third CCD camera 4198 disposed above the first continuous web 50 in alignment with a trap 42, and a plurality of illuminating units 4200 for applying illuminating light, the illuminating units 4200 being positioned near imaging positions of the first through third CCD cameras 4194, 4196, 4198.

The first through third CCD cameras 4194, 4196, 4198 have respective imaging ranges indicated in FIGS. 131 and 132. The first CCD camera 4194 captures an image in its imaging range to confirm the position of an image frame 22 in the direction indicated by the arrow X. The second CCD camera 4196 captures an image in its imaging range to confirm the position of a developing liquid pod 40 in the direction indicated by the arrow X. The third CCD camera 4198 captures an image in its imaging range to confirm the position of a trap 42 in the direction indicated by the arrow X and also the position of the trap 42 in the direction indicated by the arrow A.

As shown in FIGS. 122 and 123, a CCD camera 4204 of a flap seal inspecting means 4202 is disposed downstream of the former 1277. The CCD camera 4204 images an image frame 22, and the position of a flap seal is corrected based on the position of the imaged image frame 22.

As shown in FIG. 125, the fourth heat-bonding station 76 has a flap seal 4206 movable in the direction in which the assembly is fed. A folded dimension inspecting means 4208 is disposed immediately downstream of the flap seal 4206. The folded dimension inspecting means 4208 comprises a transmissive photosensor 4210 which detects when the folded flaps are spread, resulting in an overall increased assembly width. A folded dimension image inspecting means 4212 is disposed near the folded dimension inspecting means 4208 and comprises a CCD camera 4214 for imaging and inspecting the widths of flap seals on the developing liquid pod 40 and the trap 42.

As shown in FIGS. 122 and 123, a main feed mechanism 4126 is disposed downstream of the flap seal 4206 for intermittently feeding the assembly from the mark forming station 55a to the fourth heat-bonding station 76 over two pitches at a time. A cutting feed drum 1508 of a cutting feed mechanism 4222 is disposed downstream of the main feed mechanism 4216 with a second free loop 1504 interposed between the main feed mechanism 4216 and the cutting feed drum 1508.

A trap bonded state detecting means 4230 is disposed above the cutting feed drum 1508 for detecting whether a trap 42 is peeled off and projects from the assembly (see FIG. 125). As shown in FIG. 133, the trap bonded state detecting means 4230 comprises a trap detector 4232 for detecting whether there is a trap 42 or not, and a displacement detector 4234 for detecting whether a trap 42 is displaced on the assembly. The trap detector 4232 has a roller 4236 rotatably disposed in alignment with traps 42 on a joined body 4235, and a movable rod 4238 supporting the roller 4236 on one end thereof and swingably supported on a base plate 4240 about a pivot 4241. A microphotosensor 4242 is disposed at an upper end of the movable rod 4238. When the roller 4236 rides on a trap 42, the movable rod 4238 swings to trigger the microphotosensor 4242 to detect the trap 42.

As shown in FIGS. 133 and 135, the displacement detector 4234 is disposed above the joined body 4235 in a position out of alignment with traps 42. The displacement detector 4234 is similar in structure to the trap detector 4232, and those parts of the displacement detector 4234 which are identical to those of the trap detector 4232 are denoted by identical reference characters and will not be described in detail below. When the roller 4236 of the displacement detector 4234 rides on a trap 42 and hence is displaced, such a displacement is detected by the microphotosensor 4242, which determines that the trap 42 is in a displaced position.

A junction confirming means 4244 for detecting junctions or spliced regions of the first continuous web 50, the second continuous web 58, and the third continuous web 68, and a pot rupture detecting means 4246 for detecting a rupture of a developing liquid pod 40 are disposed above the cutting feed drum 1508.

As shown in FIG. 134, the junction confirming means 4244 and the trap detector 4232 are mounted on the base plate 4240. The junction confirming means 4244 comprises a first confirmation sensor 4248 for detecting a junction or spliced region of the first continuous web 50, a second confirmation sensor 4250 for detecting a junction or spliced region of the second continuous web 58, and a third confirmation sensor 4252 for detecting a junction or spliced region of the third continuous web 68. Each of the first, second, and third confirmation sensors 4248, 4250, 4252 comprises a reflective fiber photosensor (not shown). The controller 1624 functions as a comparing means for comparing a junction signal detected by each of these sensors with a junction signal shifted from an upstream region to determine whether the compared junction signals agree with each other or not.

As shown in FIG. 135, the pot rupture detecting means 4246 comprises a reference sensor 4254 and a detection sensor 4256 each comprising a reflective fiber photosensor. The detection sensor 4256 is spaced from the reference sensor 4254 by a certain distance in the direction indicated by the arrow X. The rails 65 are black in color, and the developing liquid in the developing liquid pods 40 is also black in color. The reference sensor 4254 and the detection sensor 4256 output a detected signal when they detect a rail 65 and the developing liquid.

As shown in FIG. 136, the reference sensor 4254 first detects a rail 65 and generates a gate signal, and a timing signal is generated to detect whether a rupture of a developing liquid pod 40 occurs in an area free of rails 65 or not.

If the detection sensor 4256 detects the developing liquid after having detected a rail 65, then the detection sensor 4256 outputs a detected signal following the detected signal representing the rail 65. The detected signal representing the developing liquid is gated by the timing signal, thus detecting the rupture of the developing liquid pod 40.

A pod bonded state detecting means 4260 is disposed immediately downstream of the cutting feed drum 1508 (see FIG. 125). As shown in FIG. 137, the pod bonded state detecting means 4260 comprises a pod detector 4262 positioned in alignment with developing liquid pods 40 for detecting whether there is a developing liquid pod 40 or not, and a displacement detector 4264 positioned out of alignment with developing liquid pods 40 for detecting whether a developing liquid pod 40 is displaced or not. Each of the pod detector 4262 and the displacement detector 4264 comprises a proximity sensor, and detects aluminum foil contained in a developing liquid pod 40 to determine whether there is a developing liquid pod 40 or not and also whether a developing liquid pod 40 is displaced or not.

As shown in FIG. 125, a CCD unit 4268 of a unit width detecting means 4266 is disposed between the cutting feed mechanism 4222 and the cutting station 78. The unit width detecting means 4266 performs an image inspection process for cutting feed control, and controls the cutting feed drum 1508 depending on cut position image information detected by the CCD camera 4268.

A CCD camera 4272 of a phase detecting means 4270 is disposed across the joined body from the unit width detecting means 4266. The phase detecting means 4270 detects the bonded positions of an image frame 22 and a rail 65, and calculates their relative position.

The cutting station 78 has a cutter 4274, and a cutting failure detecting means 4276 is positioned immediately downstream of the cutter 4274. The cutting failure detecting means 4276 comprises a photosensor 4278. As shown in FIG. 138, if the photosensor 4278 does not output a detected signal representing an instant photographic film unit 20 a certain time after a cutting completion signal, then it is determined that the instant photographic film unit 20 is completely severed from the joined body.

As shown in FIG. 139, a defective product discharging mechanism 4010 comprises a swingable conveyor 4282 which can be driven by a conveyor drive motor 4280 and is connected to a swinging means 4284. The swinging means 4284 has a gate drive motor 4286 whose rotatable shaft 4288 engages a lower end of an eccentric rod 4290. The eccentric rod 4290 has an upper end engaging a distal end of the swingable conveyor 4282 that is swingable about a support shaft 4292 at the other end of the swingable conveyor 4282. A chute 4294 is positioned below the distal end of the swingable conveyor 4282, and associated with a photoswitch 4296 for confirming the passage of a defective product through the chute 4294. A storage box 4298 is disposed in the lower end of the chute 4294.

A defect detecting mechanism 4326 is constructed of the components shown in FIG. 140. If defects are detected by the inspection processes performed by those components, then the controller 1624 carries out various corresponding processes as a result of the detects shown in FIG. 140. The controller 1624 confirms acknowledgment signals from response switches (magnetic sensors) mounted on various actuators such as cylinders at their opposite ends.

The manufacturing system 4000 of the above structure operates in the same manner as the manufacturing system 90 according to the first embodiment. Operation of the manufacturing system 4000 will be described below primarily with respect to its own features.

When the first continuous web 50 which is introduced from the light shielding box 612 into the dark chamber 94, as shown in FIGS. 122 and 124, one marginal edge of the first continuous web 50 is imaged by the CCD camera 4158, and a deviation of an end of a mark 53 is calculated. If the calculated deviation is equal to or greater than a threshold value, then the first continuous web 50 is judged as unacceptable. If the calculated deviation is equal to or greater than the threshold value N successive times (N is an integer of 2 or more), then the manufacturing system is judged as malfunctioning. Specifically, a tendency of deviations from the normal value is inspected by an image inspection process. If the first continuous web 50 is judged as unacceptable in random occasions, then the manufacturing system is not stopped. If the first continuous web 50 is judged as unacceptable in a certain number of successive times, then the manufacturing system is judged as malfunctioning and stopped.

Then, the first continuous web 50 is fed to the punching station 59 where two image frames 22 are formed on the first continuous web 50 at a time when the first continuous web 50 is stopped. In the first joining station 62, the second continuous web 58 and the continuous sheet 60 are unreeled from the photosensitive sheet supply unit 809 and the undersheet supply unit 810, and bonded to the first continuous web 50.

Specifically, as shown in FIG. 130, the unreeling shaft 930 of the cover sheet supply unit 814 is rotated to unreel the third continuous web 68 rolled thereon. The third continuous web 68 is fed over a path length by the path forming unit 936. Thereafter, electrostatic charges are removed from the third continuous web 68 by the electrostatic charge removing means 226, and the third continuous web 68 is then introduced into the dark chamber 94 via the light shielding mechanism 244. If the remaining length detecting means 4100 detects a certain remaining length of the third continuous web 68, then a new roll of the third continuous web 68 is mounted on the unreeling shaft 930, and leading and trailing ends of the new and old rolls are spliced by the splicing unit 102. The unreeling shaft 930 is rotated to unreel the new third continuous web 68 rolled thereon. The splicing error detecting means 4106 determines whether the spliced ends are acceptable or not.

In the fifth embodiment, the manufacturing system 4000 has the defect detecting mechanism 4326 for performing various inspection processes in the production of instant photographic film units 20. If defects are detected, then various corresponding processes are carried out as a result of the detects. For example, if a defective region is detected, an alarm is issued to stop the manufacturing system. If a defect is detected, the defect is shifted successively downstream into the cutting station 78, which cuts off an instant photographic film unit 20 containing the defect, and the instant photographic film unit 20 containing the defect is discharged by the defect detecting mechanism 4010 (see FIG. 140).

A process of processing a spliced region, which is regarded as a defect, of the first continuous web 50 will be described in specific detail below.

In the mask sheet supply unit 96, as shown in FIG. 126, the rolled first continuous web 50 is unreeled from the unreeling shaft 98. When a certain remaining length of the first continuous web 50 is detected by the remaining length detecting means 4100, new and old rolls are replaced and spliced by the splicing unit 102. A splicing table attached to a junction or spliced region of the first continuous web 50 is detected by the junction detecting means 4126 after the junction or spliced region has passed through the first free loop 244.

A detected signal representing the junction or spliced region is supplied to the controller 1624, and stored in a memory corresponding to an instant photographic film unit 20 that is judged as defective. The detected signal is shifted downstream as the first continuous web 50 is intermittently fed. The junction or spliced region of the first continuous web 50 is intermittently fed two pitches at a time from the main feed drum 1502 via the second free loop 1504 to the cutting feed drum 1508. Then, the first continuous web 50 is intermittently fed one pitch at a time.

At this time, the first confirmation sensor 4248 of the junction confirming means 4244 which is disposed above the cutting feed drum 1508 as shown in FIG. 134 detects the junction of the first continuous web 50. To the cutting feed drum 1508, there has been shifted the junction signal detected by the junction detecting means 4126. The controller 1624 determines whether the shifted junction signal and the detected signal from the first confirmation sensor 4248 agree with each other or not. If the shifted junction signal and the detected signal from the first confirmation sensor 4248 do not agree with each other, then the controller 1624 shuts off the manufacturing system 4000 and requests the operator to confirm the situation. If the shifted junction signal and the detected signal from the first confirmation sensor 4248 agree with each other, then the controller 1624 shifts the junction signal further downstream.

The instant photographic film unit 20 with the defect which has been cut off in the cutting station 78 is discharged by the defect detecting mechanism 4010. As shown in FIG. 139, when the instant photographic film unit 20 delivered by the swingable conveyor 4282 is judged as defective, the gate drive motor 4286 is energized to rotate the shaft 4288 for thereby displacing the distal end of the eccentric rod 4290 downwardly. Since the swingable conveyor 4282 is supported on the distal end of the eccentric rod 4290, the downward displacement of the eccentric rod 4290 causes the swingable conveyor 4282 to swing downwardly about the support shaft 4292.

The instant photographic film unit 20 delivered by the swingable conveyor 4282 now drops into the chute 4294 and is discharged into the storage box 4298. At this time, the photoswitch 4296 confirms the passage of the instant photographic film unit 20 down the chute 4294.

A process of determining a defect based on an image inspection using each of the CCD cameras is performed as follows: If an end of a member to be detected by an image inspection cannot be detected, then the manufacturing system is stopped. If a defect is determined based on a deviation of a measured value from a reference value, then a threshold for determining the deviation is set to a value in a range from 0.1 mm to 1.0 mm. Actually, such a threshold is set to 0.5 mm, for example. If an instant photographic film unit 20 is determined as defective because the deviation is in excess of the threshold, then the defect data of the instant photographic film unit 20 is stored in a memory, and shifted downstream as the joined body or assembly is intermittently fed. If a defect is detected N successively times, then the manufacturing system is stopped. N is set to a value ranging from 1 to 100, and is usually set to 5, 10, or 20.

In the fifth embodiment, the joined body 4235 including the first continuous web 50 is intermittently fed two pitches at a time (so-called tact feed operation). If one of two instant photographic film units 20 fed in one feed cycle is inspected and judged as defective, then the two instant photographic film units 20 are regarded as defective, and discharged by the defect detecting mechanism 4010.

In the fifth embodiment, as described above, if any of components of an instant photographic film unit 20 is determined as defective upstream of the second free loop 1504, then a detected signal representing the defect is shifted downstream as the joined body is intermittently fed. After the instant photographic film unit 20 is cut off in the cutting station 78, it is discharged by the defect detecting mechanism 4010. Therefore, even though the first and second free loops 244, 2504 are present in the unit production line, any instant photographic film unit 20 which includes a defective component can reliably be discharged by the defect detecting mechanism 4010. As a result, high-quality instant photographic film units 20 can efficiently be manufactured.

Furthermore, since various processes including a system shutdown are performed depending on detected defects, optimum processes corresponding to various defects are quickly performed for making the entire production process efficient.

Moreover, optimum defect detecting processes corresponding to various components are carried out. For example, with respect to the developing liquid pod 40, the manufacturing system 4000 includes the pod detecting means for detecting whether there is a developing liquid pod 40 or not, the pod bonding inspecting means 4146 for detecting a bonded attitude and a bonded position deviation of a developing liquid pod 40, the pod bonded state detecting means 4260 for detecting a positional deviation and a peeling-off of a developing liquid pod 40 while being fed, and the pot rupture detecting means 4246 for detecting a rupture of a developing liquid pod 40. As a consequence, it is possible to reliably and efficiently manufacture high-quality instant photographic film units 20 each having a developing liquid pod 40 reliably bonded at a desired position and a desired attitude.

In the first through fifth embodiments, the photosensitive sheet 30 is composed of the second continuous web 58. However, the photosensitive sheet 30 may be composed of the third continuous web 68. In the fifth embodiment, instant photographic film units 20 have outer dimensions that are substantially equal to those of an ID card. However, it is possible to manufacture instant photographic film units 20 which have an outer dimension H1 of 108 mm in the transverse direction and an outer dimension H2 of 85.6 mm in the longitudinal direction. The manufacturing system 400 can manufacture such instant photographic film units 20 by feeding the first continuous web 50 and other members over pitches of 108 mm.

In the method of and the apparatus for manufacturing instant photographic film units according to the present invention, instant photographic film units are manufactured, and then a certain number of instant photographic film units are stacked and automatically placed in a film pack. Thus, instant photographic film units can be manufactured and packaged automatically and efficiently. Since a manual packaging process in the dark chamber is not required, the entire manufacturing process is easily performed efficiently and automatically.

In the method of and the apparatus for manufacturing instant photographic film units according to the present invention, while a mask sheet is continuously fed, folds are formed in opposite marginal edges thereof at image frames to a certain depth. After two sheets are bonded to the mark sheet, the opposite marginal edges of the mask sheet can smoothly and highly accurately be folded back along the folds. Therefore, high-quality self-developed instant photographic film units can efficiently be manufactured with a simple process and arrangement.

In the method of and the apparatus for manufacturing instant photographic film units according to the present invention, debris produced when an image frame is punched in a master sheet is attracted and forcibly caused to drop, and retrieved in the stock chamber with an air flow. The debris is prevented from being attached to the master sheet and other members, and can reliably be retrieved in the stock chamber. The debris can thus be processed reliably, and image frames are formed efficiently.

According to the present invention, substantially at the same time that a joined body composed of a master sheet and two sheets that are laminated and bonded together is cut off, both corners of one cut side are beveled, and thereafter corners of the other cut side are beveled. Therefore, it is possible to efficiently produce an instant photographic film unit with four beveled corners.

In the method of and the apparatus for manufacturing instant photographic film units according to the present invention, a plurality of developing liquid containers and/or excessive developing liquid traps are simultaneously supplied to marginal sides of a continuous web on both sides of image frames. The developing liquid containers and/or excessive developing liquid traps can thus be bonded efficiently, making it possible to speed up an entire process of manufacturing instant photographic film units.

In the method of and the apparatus for manufacturing instant photographic film units according to the present invention, after a mask sheet and at least one sheet are temporarily bonded to each other in a laminated state, they are finally bonded to each other. Therefore, bonding steps are distributed and the times required by these bonding steps are shortened, making efficient an entire process of manufacturing instant photographic film units.

In the method of and the apparatus for manufacturing instant photographic film units according to the present invention, at least one free loop is formed in a feed region in which a continuous web needs to be positioned, within a process of manufacturing instant photographic film units, and the free loop is used to control the feed of continuous web. Various parts can thus be bonded highly accurately to the continuous web with respect to a desired positioning reference, and the number of pitches for feeding the continuous web can be varied before and after the free loop. Therefore, it is possible to manufacture high-quality instant photographic film units quickly and efficiently.

Light unshielded members including at least a master sheet are provided in the form of continuous webs and placed in a bright chamber and automatically fed into a dark chamber. Since the light unshielded members can be handled in the bright chamber, they can easily and efficiently be handled. Therefore, the entire process of manufacturing high-quality instant photographic film units is made simple and efficient.

In the method of and the apparatus for manufacturing instant photographic film units according to the present invention, a detected region on a continuous web is measured, and the relative position of the continuous web and a processing unit is adjusted based on the difference between the measured detected region and a positioning reference. Consequently, a mask sheet and two sheets can accurately be accumulated and bonded together into a joined body, and components such as developing liquid pods can highly accurately bonded to the joined body for thereby efficiently manufacturing high-quality instant photographic film units.

In the method of and the apparatus for manufacturing instant photographic film units according to the present invention, a defect signal detected upstream of a loop is shifted downstream of the loop, and an instant photographic film unit containing a defect represented by the defect signal is discharged after it has been cut off. Thus, high-quality instant photographic film units can be manufactured. It is not necessary to interrupt the entire manufacturing process each time a defect occurs, but only minimum process interruptions are needed, so that the entire process of manufacturing high-quality instant photographic film units is made simple and efficient.

Although certain preferred embodiments of the present invention have been shown and described in detail, it should be understood that various changes and modifications may be made therein without departing from the scope of the appended claims.

What is claimed is:

1. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:
   member supply stations for supplying said mask sheet and said two sheets;
   bonding stations for bonding said mask sheet and said two sheets together in a predetermined laminated state, wherein said mask sheet and said two sheets are bonded together to form a continuous web;
   a cutting station for cutting off said continuous web into self-developed instant photographic film units of a predetermined length, such that said mask sheet and said two sheets are cut at said cutting station;
   a stacking station for automatically stacking a predetermined number of instant photographic film units; and
   a packing station for automatically placing the stacked instant photographic film units in a film pack, and
   wherein said film pack has a pack casing storing the instant photographic film units therein, a light shielding plate placed in said pack casing in facing relation to exposure surfaces of the instant photographic film units in said pack casing, and a lid fused to said pack casing, further comprising,
   light shielding plate holding means for holding said light shielding plate in said pack casing in spaced relation thereto when said lid is ultrasonically fused to said pack casing.

2. An apparatus according to claim 1, further comprising:
   a stacking mechanism for stacking said predetermined number of instant photographic film units in said stacking station and supplying the stacked instant photographic film units to a standby station;
   and a selective feeding mechanism for feeding the instant photographic film units in said standby station selectively to said packing station and a discharge station.

3. An apparatus according to claim 1, further comprising:
   a unit reversing mechanism for reversing the stacked instant photographic film units such that exposure surfaces thereof face downwardly before said instant photographic film units are loaded in said film pack.

4. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:

member supply stations for supplying said mask sheet and said two sheets;

bonding stations for bonding said mask sheet and said two sheets together in a predetermined laminated state, wherein said mask sheet and said two sheets are bonded together to form a continuous web;

a cutting station for cutting off said continuous web into self-developed instant photographic film units of a predetermined length, such that said mask sheet and said two sheets are cut at said cutting station; and parts supply stations for simultaneously supplying either a plurality of developing liquid containers or a plurality of excessive developing liquid traps to opposite marginal edges of said continuous web on opposite sides of said image frame while individually holding either each of said plurality of developing liquid containers or each of said plurality of excessive developing liquid traps to be simultaneously supplied.

5. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:

member supply stations for supplying said mask sheet and said two sheets;

bonding stations for bonding said mask sheet and said two sheets together in a predetermined laminated state, wherein said mask sheet and said two sheets are bonded together to form a continuous web;

a cutting station for cutting off said continuous web into self-developed instant photographic film units of a predetermined length, such that said mask sheet and said two sheets are cut at said cutting station; and means for providing at least one free loop disposed in a feed region where said continuous web needs to be positioned to control feeding of said continuous web, wherein the means for providing at least one free loop comprises a suction device and a plurality of rollers, at least a pair of the plurality of rollers being disposed within the suction device.

6. An apparatus according to claim 5, further comprising:

first feed means disposed upstream of said free loop for intermittently feeding said continuous web in successive feed cycles; and second feed means disposed downstream of said free loop for intermittently feeding said continuous web in successive feed cycles.

7. An apparatus according to claim 6, further comprising:

detecting means disposed downstream of said free loop for detecting a positioning region of said continuous web, and intermittently feeding said continuous web over a given number of pitches at a time with said second feed means based on the detected positioning region.

8. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:

light unshielded member supply stations for holding light unshielded members including said master sheet as rolls of continuous webs;

a photosensitive sheet supply station for supplying one of the sheets which has a photosensitive sheet;

bonding stations for bonding said mask sheet and said two sheets together in a predetermined laminated state;

a cutting station for cutting off said continuous web into self-developed instant photographic film units of a predetermined length;

a bright chamber, said light unshielded member supply stations being disposed in said bright chamber; and a dark chamber, at least said photosensitive sheet supply station, said bonding stations, and said cutting station being disposed in said dark chamber.

9. An apparatus according to claim 8, further comprising:

a light shielding mechanism disposed between said light unshielded member supply station and said dark chamber;

said light shielding mechanism comprising:

a light shielding box disposed at an inlet of said dark chamber; and first and second path rollers disposed in said light shielding box respectively at opposite surfaces of said light unshielded member and having respective circumferential surfaces for lapping said light unshielded member to form a light shielding step therein.

10. An apparatus according to claim 9, wherein said first and second path rollers are disposed in two sets in said light shielding box, further comprising slit-shaped web chutes disposed upstream of said first and second path rollers respectively.

11. An apparatus according to claim 8, wherein said dark chamber has a plurality of openable and closable light shielding doors.

12. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:

a main feed mechanism for intermittently feeding at least one of said mask sheet and said two sheets as a continuous web in successive feed cycles;

a bonding mechanism for bonding said mask sheet and said two sheets in a laminated state;

a cutting mechanism for cutting off said continuous web into self-developed instant photographic film units of a predetermined length; and a positioning control mechanism for, before said continuous web is cut off, measuring a detected region of said continuous web and detecting the difference between the measured detected region and a positioning reference, and adjusting the relative position of said continuous web and a processing unit based on said difference.

13. An apparatus for manufacturing instant photographic film units each including a mask sheet having an image frame and two sheets, one of which has a photosensitive layer, laminated and bonded together, and a developing liquid container disposed in a predetermined position for supplying a developing liquid between the two sheets to produce an image, comprising:

a bonding mechanism for bonding said mask sheet and said two sheets together in a predetermined laminated state to produce a joined body, with at least one of said mask sheet and said two sheets being in the form of a continuous web;

a loop forming mechanism for forming a loop in said joined body at a region where conditions for feeding said joined body are to be varied;

a cutting mechanism for cutting off said joined body into self-developed instant photographic film units of a predetermined length downstream of said loop;

a defect detecting mechanism for detecting a defect of components of an instant photographic film unit upstream of said loop; and a defective product discharging mechanism for shifting a detected signal representing the defect, downstream of said loop in association with the instant photographic film unit whose defect is detected, and discharging said instant photographic film unit which has been cut off, based on said detected signal representing the defect.

* * * * *